US012142159B2

(12) United States Patent
Acree

(10) Patent No.: US 12,142,159 B2
(45) **Date of Patent: *Nov. 12, 2024**

(54) SYSTEM AND METHOD OF PENALTY DATA COMPILATION, ANALYSIS AND REPORT GENERATION

(71) Applicant: Rusty Acree, LLC, Sharps, VA (US)

(72) Inventor: Russell Acree, Sharps, VA (US)

(73) Assignee: RUSTY ACREE, LLC, Sharps, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,797

(22) Filed: Mar. 22, 2024

(65) Prior Publication Data

US 2024/0233561 A1 Jul. 11, 2024

Related U.S. Application Data

(63) Continuation of application No. 16/780,455, filed on Feb. 3, 2020, now Pat. No. 11,984,047, which is a continuation of application No. 15/664,573, filed on Jul. 31, 2017, now Pat. No. 10,553,124, which is a continuation of application No. 13/843,027, filed on Mar. 15, 2013, now abandoned, which is a continuation-in-part of application No. 13/328,195,
(Continued)

(51) Int. Cl.

| | |
|---|---|
| *G09B 5/00* | (2006.01) |
| *G06Q 10/0639* | (2023.01) |
| *G09B 5/06* | (2006.01) |
| *G09B 7/02* | (2006.01) |
| *G09B 19/00* | (2006.01) |

(52) U.S. Cl.
CPC ......... *G09B 5/00* (2013.01); *G06Q 10/06398* (2013.01); *G09B 5/06* (2013.01); *G09B 7/02* (2013.01); *G09B 19/0038* (2013.01)

(58) Field of Classification Search
CPC ... G09B 5/00; G09B 5/06; G09B 7/02; G09B 19/0038; G06Q 10/06398; G06Q 10/0639
See application file for complete search history.

(56) References Cited

U.S. PATENT DOCUMENTS 6,015,345 A 1/2000 Kail
6,135,881 A 10/2000 Abbott et al.
(Continued)

OTHER PUBLICATIONS

Ekin et al. Jul. 7, 2003, "Automatic Soccer Video Analysis and Summarization" (Year: 2003).*
(Continued)

*Primary Examiner* — Matthew J Ellis
(74) *Attorney, Agent, or Firm* — MILES & STOCKBRIDGE P.C.; David R. Schaffer

(57) ABSTRACT

The present invention relates generally to a system and method for reviewing and evaluating performance. In particular, the present invention relates to a system, method, and computer program produce for reviewing and evaluating performances of an official or group of officials at an event or events. Even more specifically, according to embodiments of the present invention, the system and method can involve reviewing and evaluating an official or group of official's performance during a sporting event or events, such as a football game or games or a basketball game or games.

20 Claims, 178 Drawing Sheets

Supervisor Permission, Find Games,
View Game Summaries / Grade Tape, Game Fouls & Grading tab:

Related U.S. Application Data filed on Dec. 16, 2011, now abandoned, which is a continuation-in-part of application No. 12/334,439, filed on Dec. 12, 2008, now Pat. No. 8,079,910.

(60) Provisional application No. 60/996,962, filed on Dec. 12, 2007.

(56) References Cited

U.S. PATENT DOCUMENTS

| | | | | |
|---|---|---|---|---|
| 6,311,041 | B1 | 10/2001 | Goodyear | |
| 6,389,467 | B1 * | 5/2002 | Eyal | G06F 16/48 707/E17.108 |
| 6,431,985 | B1 | 8/2002 | Kim | |
| 7,552,467 | B2 | 6/2009 | Lindsay | |
| 8,204,750 | B2 | 6/2012 | DeWitt | |
| 8,522,300 | B2 | 8/2013 | Relyea et al. | |
| 2002/0086731 | A1 * | 7/2002 | Kim | A63B 24/0003 463/42 |
| 2002/0143412 | A1 * | 10/2002 | Spector | A63B 71/06 700/91 |
| 2005/0132401 | A1 * | 6/2005 | Boccon-Gibod | H04N 21/8455 725/35 |
| 2005/0162257 | A1 | 7/2005 | Gonzalez | |
| 2005/0187644 | A1 * | 8/2005 | Neale | G07F 17/3232 700/91 |
| 2006/0217027 | A1 | 9/2006 | Martuccio | |
| 2007/0100891 | A1 | 5/2007 | Nee | |
| 2007/0250920 | A1 | 10/2007 | Lindsay | |
| 2007/0279494 | A1 * | 12/2007 | Aman | H04N 5/278 348/169 |
| 2008/0016531 | A1 * | 1/2008 | Eyal | H04N 21/26258 725/40 |
| 2008/0016538 | A1 * | 1/2008 | Eyal | H04L 67/63 725/83 |
| 2008/0065507 | A1 | 3/2008 | Morrison et al. | |
| 2008/0126172 | A1 | 5/2008 | Melamed et al. | |
| 2009/0082110 | A1 * | 3/2009 | Relyea | A63F 13/00 463/42 |
| 2009/0189982 | A1 * | 7/2009 | Tawiah | A63B 24/0006 463/31 |

OTHER PUBLICATIONS

Any copies of information that are not included with this Information Disclosure Statement can be found in U.S. Appl. No. 16/780,455.

* cited by examiner

Login Page With All Regions Displayed

Supervisor Permission, CFO West, Welcome Screen:

Big 12 tab Welcome Page with All Roles Displayed:

Supervisor Permission Navigation Page:

FIG. 7
Application Architecture - racree - Windows Internet Explorer
http://www.qwikref.com/CFO//apps/Big12/default.asp?fVal=1
File Edit View Favorites Tools Help
Application Architecture - racree
home :: contact :: admin
Big 12
:: View Reports :: Maintenance
--- Welcome To The CFO (West) QwikRef Program ---
BIG 12 CONFERENCE
Schedule Games
View Game Summaries / Grade Tape
View Replay Reports / Grade Stoppages
View Coach's Plays for Review
View Schedule
Search Games

Supervisor Permission, Find Games, Menu Page:

Supervisor Permission, Find Games, Schedule Games:

Supervisor Permission, Find Games,
View Game Summaries / Grade Tape Game Info tab:

Supervisor Permission, Find Games,
View Game Summaries / Game Fouls & Grading tab:

Supervisor Permission, Find Games,
View Replay Reports / Grade Stoppages

Supervisor Permission, Find Games,
View Replay Reports / Grade Stoppages

Supervisor Permission, Find Games, View Coach's Plays for Review

Supervisor Permission, Find Games, View Coach's Plays for Review

Supervisor Permission, View Reports, Menu Page

Supervisor Permission, View Reports, Supervisor's Report Weekly Summary tab

Supervisor Permission, View Reports, Supervisor's Report Qwik Look tab

Supervisor Permission, View Reports,
Supervisor's Report Fouls per Quarter tab:

Supervisor Permission, View Reports,
Position Foul Report:

Supervisor Permission, View Reports, Officials Foul Summary:

Supervisor Permission, View Reports,
Officials Foul Summary, Bobby Ables Checked:

Supervisor Permission,
View Reports, Foul Grade Report.

Supervisor Permission, View Reports, Foul Grade Report, Fouls Checked

Supervisor Permission, View Reports, Foul Grade Report, Fouls Checked, View Details Supervisor Permission, View Reports,
Foul Position Report:

Supervisor Permission, View Reports,
Crew Grade Summary:

Supervisor Permission, View Reports, Crew Grade Summary, Referee

Supervisor Permission, View Report, Weekly TA Report:

Supervisor Permission, View Reports, View Replay Grades:

Supervisor Permission, View Reports, View Replay Grades, Replay 1

FIG. 31
http://www.qwikref.com/CFO/apps/Big12/frmGameReport.asp
File Edit View Favorites Tools Help
Application Architecture - racree
home :: contact :: admin
Big 12
:: Maintenance
Select Week: 6
Select Game: 10/4/2008 - Colorado v. Texas
Game Fouls & Grading
EXCEL
Click for Grade Help
:: ADD FOULS :: Required Fields
Entry QTR Time Team Code Category Player Officials Calling Foul Description Play Number D/D/YD Play Type Grade Training Tape Score Comment Add
Select N/A N/A N/A N/A N/A N/A N/A N/A N/A N/A N/A N/A N/A N/A N/A
:: EDIT FOULS ::
Entry Game Number QTR Time Team Foul Code Category Player Acc/Dec Officials Calling Foul Description Play Number D/D/YD Play Type Grade Training Tape Score Comment Edit
Comment 191 1 15:00 Texas CMT 03 BJ 1/10/A20 Pass NG-RMKS NS
BJ: Excellent position and coverage on long incompletion. Defender reaches around the receiver and knocks the ball down.
EDIT

Grader Permission, Find Games,
View Game Summaries / Grade Tape:

Replay Permission, Find Games, Submit Replay Report:

Replay Permission, View Reports, Replay Official Grade Summary:

Referee Permission, Game Report,
View Game Summaries / Submit Game Report, Game Information Tab Referee Permission, Game Report, View Game Summaries / Submit Game Report, Game Foul Summary Tab Referee Permission, View Reports,
View Crew Report, Game Duration tab:

Referee Permission, View Reports, View Crew Report, Crew Foul Summary tab:

FIG. 38

Referee Permission, View Reports, View Graders Comments:

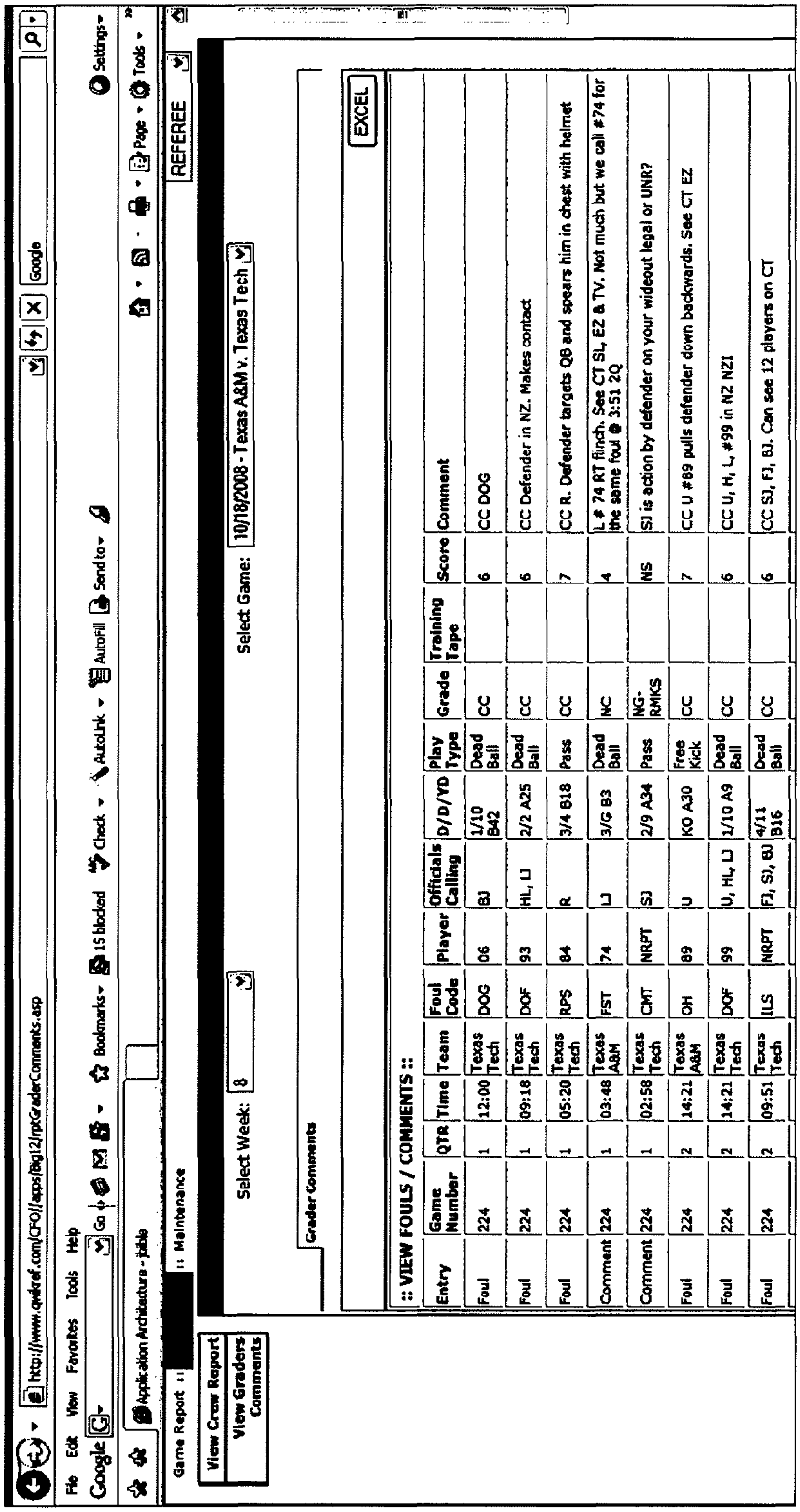

| Entry | Game Number | QTR | Time | Team | Foul Code | Player | Officials Calling | D/D/YD | Play Type | Grade | Training Tape | Score | Comment |
|---|---|---|---|---|---|---|---|---|---|---|---|---|---|
| Foul | 224 | 1 | 12:00 | Texas Tech | DOG | 06 | BJ | 1/10 B42 | Dead Ball | CC | | 6 | CC DOG |
| Foul | 224 | 1 | 09:18 | Texas Tech | DOF | 93 | HL, LJ | 2/2 A25 | Dead Ball | CC | | 6 | CC Defender in NZ. Makes contact |
| Foul | 224 | 1 | 05:20 | Texas Tech | RPS | 84 | R | 3/4 B18 | Pass | CC | | 7 | CC R. Defender targets QB and spears him in chest with helmet |
| Comment | 224 | 1 | 03:48 | Texas A&M | FST | 74 | LJ | 3/G B3 | Dead Ball | NC | | 4 | L # 74 RT flinch. See CT SJ, EZ & TV. Not much but we call #74 for the same foul @ 3:51 2Q |
| Comment | 224 | 1 | 02:58 | Texas Tech | CMT | NRPT | SJ | 2/9 A34 | Pass | NG-RMKS | | NS | SJ is action by defender on your wideout legal or UNR? |
| Foul | 224 | 2 | 14:21 | Texas A&M | OH | 89 | U | KO A30 | Free Kick | CC | | 7 | CC U #89 pulls defender down backwards. See CT EZ |
| Foul | 224 | 2 | 14:21 | Texas Tech | DOF | 99 | U, HL, LJ | 1/10 A9 | Dead Ball | CC | | 6 | CC U, H, L, #99 in NZ NZI |
| Foul | 224 | 2 | 09:51 | Texas Tech | ILS | NRPT | FJ, SJ, BJ | 4/11 B16 | Dead Ball | CC | | 6 | CC SJ, FJ, BJ. Can see 12 players on CT |

Officials Permission, View Reports, Officials Foul Summary:

Officials Permission, View Reports, Officials Grade Summary:

FIG. 41
Application Architecture abriles Windows Internet Explorer
http://www.qwiref.com/CFO/apps/Big12/rptCoach.asp
File Edit View Favorites Tools Help
Application Architecture - abriles
home :: contact :: admin
Big 12
:: Maintenance
Crew Foul Summary
Submit Plays for Review
Entire Season
Word Download
LLC
Big12 Quick Look (Week 14 of the Season)
Totals | Home Points Scored | Visitor Points Scored | Home Team Wins | Visitor Team Wins | Home Team Fouls | Visitor Team Fouls | Total Fouls
Points Scored | 5560 | 3263 | 2297 | 62 | 27 | 634 | 667 | 1301
Number of Games | 89 | 89 | 89 | 89 | 89 | 89 | 89 | 89
Average Points Per Game | 62.47 | 36.66 | 25.81
% Wins | 69.66% | 30.34%
Fouls Per Game | 14.62 | 7.12 | 7.49 | 14.62
Done
Internet
100%
start

Coach Permission, View Reports, Coach's Report, Quick Look:

Coach Permission, View Reports,
Coach's Report, Game Summary:

Coach Permission, View Reports, Coach's Report, Game Report:

Coach Permission, View Reports,
Coach's Report, Season Foul Summary:

Coach Permission, View Reports,
Coach's Report, Season Foul Detail:

Coach Permission, View Reports,
Coach's Report, Season Fouls per Week:

Coach Permission, View Reports,
Coach's Report, Fouls by Player:

Coach Permission, View Reports,
Coach's Report, Foul per Quarter:

Coach Permission, View Reports,
Submit Plays For Review.

Coach Permission, View Reports,
Submit Officials Evaluation.

Coach Permission, View Reports, Submit Officials Evaluation.

Login Page for National Coordinator

National Coordinator Welcome Screen:

National Coordinator tab Welcome Page with National Coordinator role highlighted:

National Coordinator Navigation Page:

National Coordinator Menu Page:

National Coordinator's Report, Weekly Summary tab:

National Coordinator's Report,
Weekly Summary tab:

| | Totals | Home Points Scored | Visitor Points Scored | Home Team Wins | Visitor Team Wins | Home Team Fouls | Visitor Team Fouls | Total Fouls |
|---|---|---|---|---|---|---|---|---|
| Points Scored | 18806 | 10998 | 7808 | 213 | 110 | 2314 | 2504 | 4818 |
| Number of Games | 323 | 323 | 323 | 323 | 323 | 323 | 323 | 323 |
| Average Points Per Game | 58.22 | 34.05 | 24.17 | | | | | |
| % Wins | | | | 65.94% | 34.06% | | | |
| Fouls Per Game | 14.92 | | | | | 7.16 | 7.75 | 14.92 |

National Coordinator's Report, Game Duration tab:

National Coordinator's Report,
Season Foul Summary tab:

FIG. 61

National Coordinator's Report,
Foul Description tab:

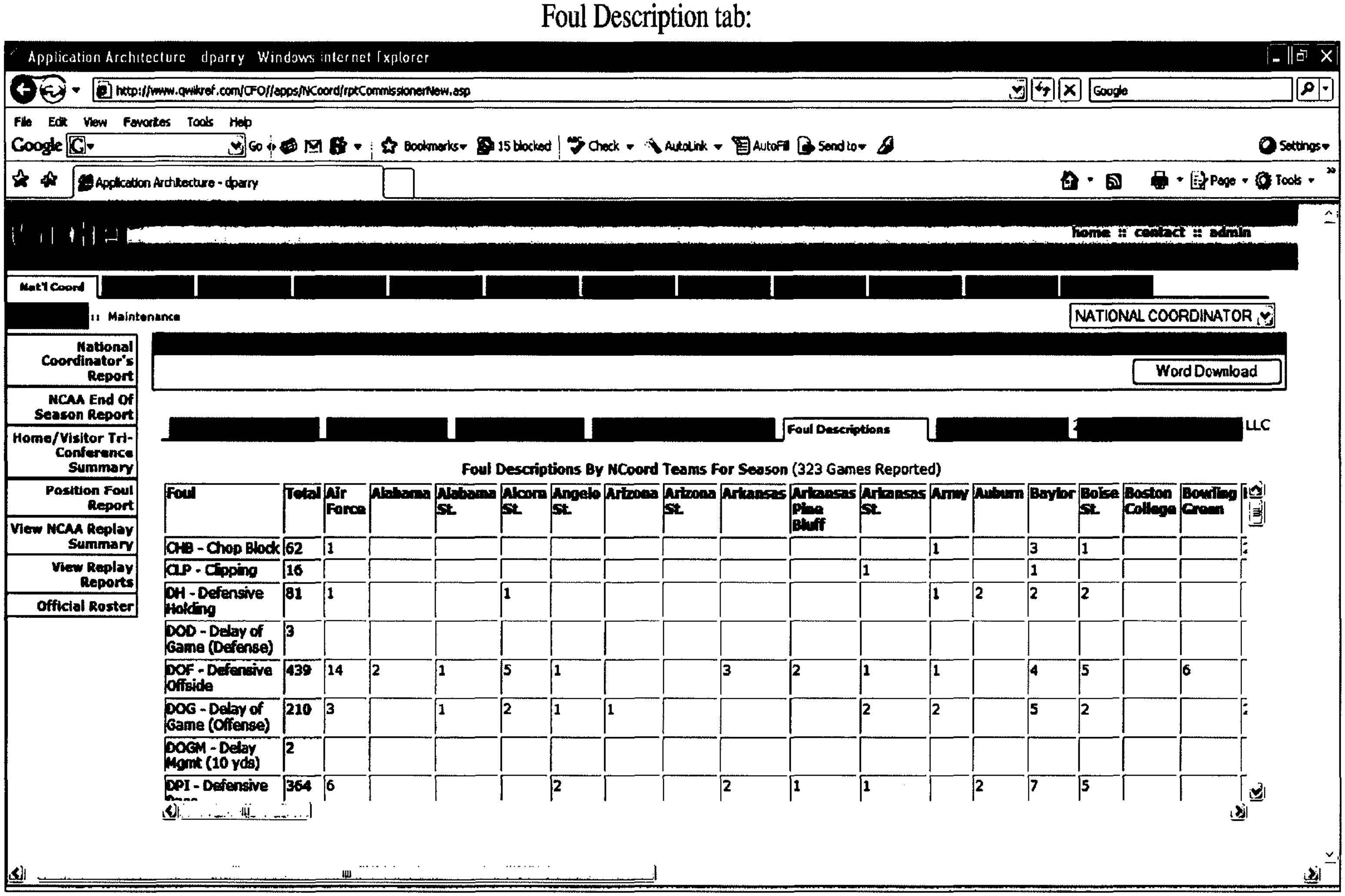

| Foul | Total | Air Force | Alabama | Alabama St. | Alcorn St. | Angelo St. | Arizona | Arizona St. | Arkansas | Arkansas Pine Bluff | Arkansas St. | Army | Auburn | Baylor | Boise St. | Boston College | Bowling Green |
|---|---|---|---|---|---|---|---|---|---|---|---|---|---|---|---|---|---|
| CHB - Chop Block | 62 | 1 | | | | | | | | | | 1 | | 3 | 1 | | |
| CLP - Clipping | 16 | | | | | | | | | | 1 | | | 1 | | | |
| DH - Defensive Holding | 81 | 1 | | | 1 | | | | | | | 1 | 2 | 2 | 2 | | |
| DOD - Delay of Game (Defense) | 3 | | | | | | | | | | | | | | | | |
| DOF - Defensive Offside | 439 | 14 | 2 | 1 | 5 | 1 | | | 3 | 2 | 1 | 1 | | 4 | 5 | | 6 |
| DOG - Delay of Game (Offense) | 210 | 3 | | 1 | 2 | 1 | 1 | | | | 2 | 2 | | 5 | 2 | | |
| DOGM - Delay Mgmt (10 yds) | 2 | | | | | | | | | | | | | | | | |
| DPI - Defensive … | 364 | 6 | | | | 2 | | | 2 | 1 | 1 | | 2 | 7 | 5 | | |

National Coordinator's Report, Fouls Per Week tab:

| TEAMS | Week 1 | Week 2 | Week 3 | Week 4 | Week 5 | Week 6 | Week 7 | Week 8 | Week 9 | Week 10 | Week 11 | Week 12 | Week 13 | Week 14 | Week 15 |
|---|---|---|---|---|---|---|---|---|---|---|---|---|---|---|---|
| Air Force | 8 | 8 | 11 | 4 | * | 11 | 5 | 8 | * | 8 | 5 | 9 | * | * | * |
| Alabama | * | 7 | * | * | * | * | * | * | * | * | * | * | * | * | * |
| Alabama St. | * | * | * | 4 | * | * | * | * | * | * | * | * | * | * | * |
| Alcorn St. | 12 | * | * | * | * | 5 | * | * | * | * | * | * | * | * | * |
| Angelo St. | 8 | * | * | * | * | * | * | * | * | * | * | * | * | * | * |
| Arizona | 6 | * | 2 | * | * | * | * | * | * | * | * | * | * | * | * |
| Arizona St. | * | * | 4 | * | * | * | * | * | * | * | * | * | * | * | * |
| Arkansas | * | * | 8 | * | 8 | * | * | * | * | 6 | * | * | * | * | * |
| Arkansas Pine Bluff | * | * | * | * | * | * | * | * | * | * | * | * | * | * | * |
| Arkansas St. | 6 | * | 6 | * | 11 | * | * | * | * | * | * | * | * | * | * |
| Army | * | * | * | * | 6 | 3 | * | * | 2 | 5 | 5 | * | * | * | * |
| Auburn | * | 10 | * | * | * | * | * | * | * | * | * | * | * | * | * |
| Baylor | 9 | 8 | 12 | 8 | * | 4 | 9 | 6 | 6 | 8 | 11 | 5 | * | * | * |

National Coordinator's Report,
Crew Foul Summary tab:

National Coordinator's Report, NCAA End of Season Report

National Coordinator's Report,
Home Visitor TriConference Summary;

National Coordinator's Report, Home Visitor TriConference Summary, Click to View Official Detail:

FIG. 67

National Coordinator's Report,
Position Foul Report, Line Judges:

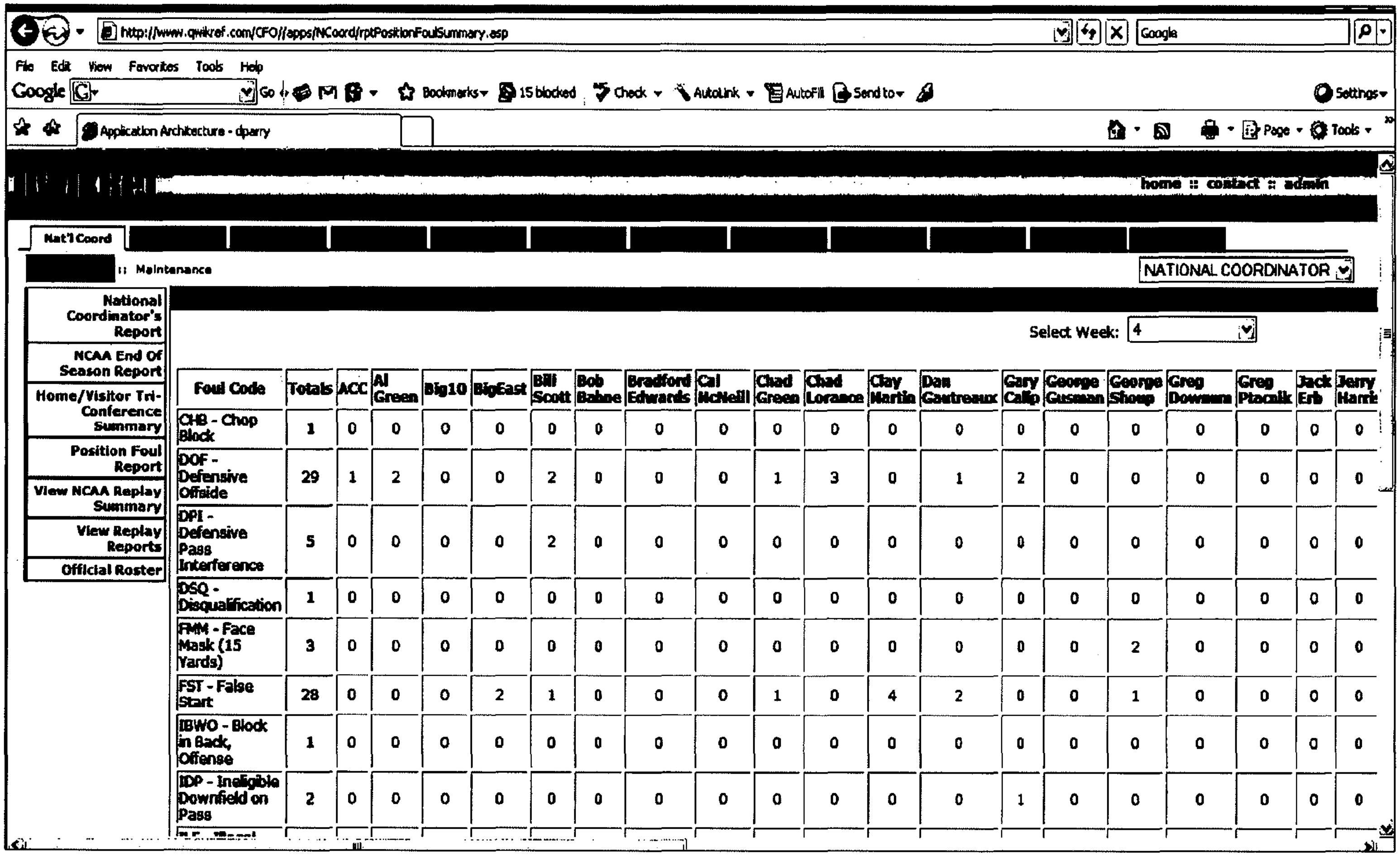

| Foul Code | Totals | ACC | Al Green | Big10 | BigEast | Bill Scott | Bob Bahne | Bradford Edwards | Cal McNeill | Chad Green | Chad Lorance | Clay Martin | Dan Gautreaux | Gary Calip | George Gusman | George Shoup | Greg Downum | Greg Ptaczik | Jack Erb | Jerry Harri |
|---|---|---|---|---|---|---|---|---|---|---|---|---|---|---|---|---|---|---|---|---|
| CHB - Chop Block | 1 | 0 | 0 | 0 | 0 | 0 | 0 | 0 | 0 | 0 | 0 | 0 | 0 | 0 | 0 | 0 | 0 | 0 | 0 | 0 |
| DOF - Defensive Offside | 29 | 1 | 2 | 0 | 0 | 2 | 0 | 0 | 0 | 1 | 3 | 0 | 1 | 2 | 0 | 0 | 0 | 0 | 0 | 0 |
| DPI - Defensive Pass Interference | 5 | 0 | 0 | 0 | 0 | 2 | 0 | 0 | 0 | 0 | 0 | 0 | 0 | 0 | 0 | 0 | 0 | 0 | 0 | 0 |
| DSQ - Disqualification | 1 | 0 | 0 | 0 | 0 | 0 | 0 | 0 | 0 | 0 | 0 | 0 | 0 | 0 | 0 | 0 | 0 | 0 | 0 | 0 |
| FMM - Face Mask (15 Yards) | 3 | 0 | 0 | 0 | 0 | 0 | 0 | 0 | 0 | 0 | 0 | 0 | 0 | 0 | 0 | 2 | 0 | 0 | 0 | 0 |
| FST - False Start | 28 | 0 | 0 | 0 | 2 | 1 | 0 | 0 | 0 | 1 | 0 | 4 | 2 | 0 | 0 | 1 | 0 | 0 | 0 | 0 |
| IBWO - Block in Back, Offense | 1 | 0 | 0 | 0 | 0 | 0 | 0 | 0 | 0 | 0 | 0 | 0 | 0 | 0 | 0 | 0 | 0 | 0 | 0 | 0 |
| IDP - Ineligible Downfield on Pass | 2 | 0 | 0 | 0 | 0 | 0 | 0 | 0 | 0 | 0 | 0 | 0 | 0 | 1 | 0 | 0 | 0 | 0 | 0 | 0 |

FIG. 68

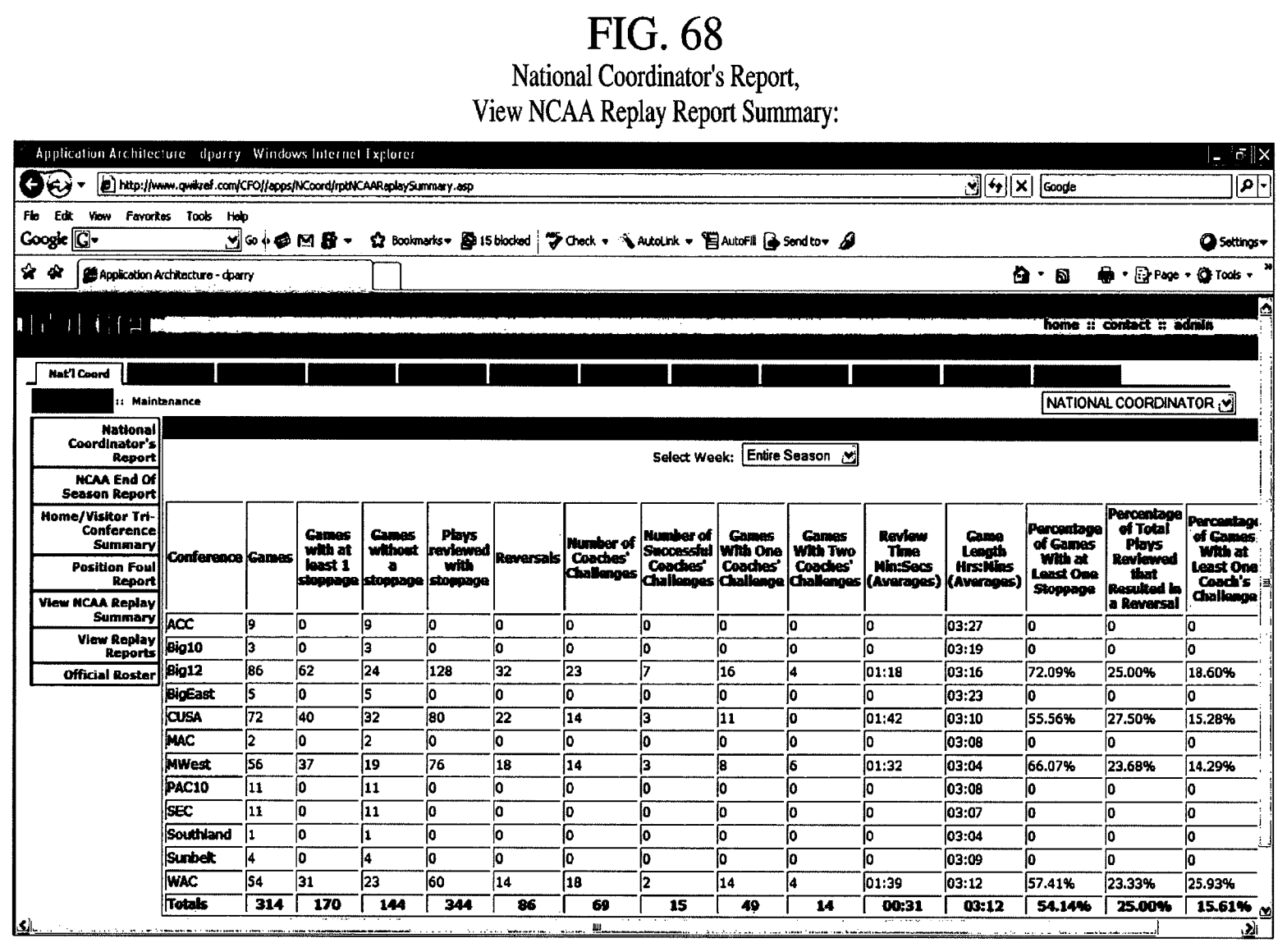

National Coordinator's Report,
View NCAA Replay Report Summary:

Application Architecture dparry Windows Internet Explorer http://www.qwikref.com/CFO//apps/NCoord/rptNCAAReplaySummary.asp File Edit View Favorites Tools Help home :: contact :: admin Nat'l Coord :: Maintenance

NATIONAL COORDINATOR

- National Coordinator's Report
- NCAA End Of Season Report
- Home/Visitor Tri-Conference Summary
- Position Foul Report
- View NCAA Replay Summary
- View Replay Reports
- Official Roster Select Week: Entire Season

| Conference | Games | Games with at least 1 stoppage | Games without a stoppage | Plays reviewed with stoppage | Reversals | Number of Coaches' Challenges | Number of Successful Coaches' Challenges | Games With One Coaches' Challenge | Games With Two Coaches' Challenges | Review Time Min:Secs (Averages) | Game Length Hrs:Mins (Averages) | Percentage of Games With at Least One Stoppage | Percentage of Total Plays Reviewed that Resulted in a Reversal | Percentage of Games With at Least One Coach's Challenge |
|---|---|---|---|---|---|---|---|---|---|---|---|---|---|---|
| ACC | 9 | 0 | 9 | 0 | 0 | 0 | 0 | 0 | 0 | 0 | 03:27 | 0 | 0 | 0 |
| Big10 | 3 | 0 | 3 | 0 | 0 | 0 | 0 | 0 | 0 | 0 | 03:19 | 0 | 0 | 0 |
| Big12 | 86 | 62 | 24 | 128 | 32 | 23 | 7 | 16 | 4 | 01:18 | 03:16 | 72.09% | 25.00% | 18.60% |
| BigEast | 5 | 0 | 5 | 0 | 0 | 0 | 0 | 0 | 0 | 0 | 03:23 | 0 | 0 | 0 |
| CUSA | 72 | 40 | 32 | 80 | 22 | 14 | 3 | 11 | 0 | 01:42 | 03:10 | 55.56% | 27.50% | 15.28% |
| MAC | 2 | 0 | 2 | 0 | 0 | 0 | 0 | 0 | 0 | 0 | 03:08 | 0 | 0 | 0 |
| MWest | 56 | 37 | 19 | 76 | 18 | 14 | 3 | 8 | 6 | 01:32 | 03:04 | 66.07% | 23.68% | 14.29% |
| PAC10 | 11 | 0 | 11 | 0 | 0 | 0 | 0 | 0 | 0 | 0 | 03:08 | 0 | 0 | 0 |
| SEC | 11 | 0 | 11 | 0 | 0 | 0 | 0 | 0 | 0 | 0 | 03:07 | 0 | 0 | 0 |
| Southland | 1 | 0 | 1 | 0 | 0 | 0 | 0 | 0 | 0 | 0 | 03:04 | 0 | 0 | 0 |
| Sunbelt | 4 | 0 | 4 | 0 | 0 | 0 | 0 | 0 | 0 | 0 | 03:09 | 0 | 0 | 0 |
| WAC | 54 | 31 | 23 | 60 | 14 | 18 | 2 | 14 | 4 | 01:39 | 03:12 | 57.41% | 23.33% | 25.93% |
| **Totals** | **314** | **170** | **144** | **344** | **86** | **69** | **15** | **49** | **14** | **00:31** | **03:12** | **54.14%** | **25.00%** | **15.61%** |

FIG. 69

National Coordinator's Report,
View Replay Reports:

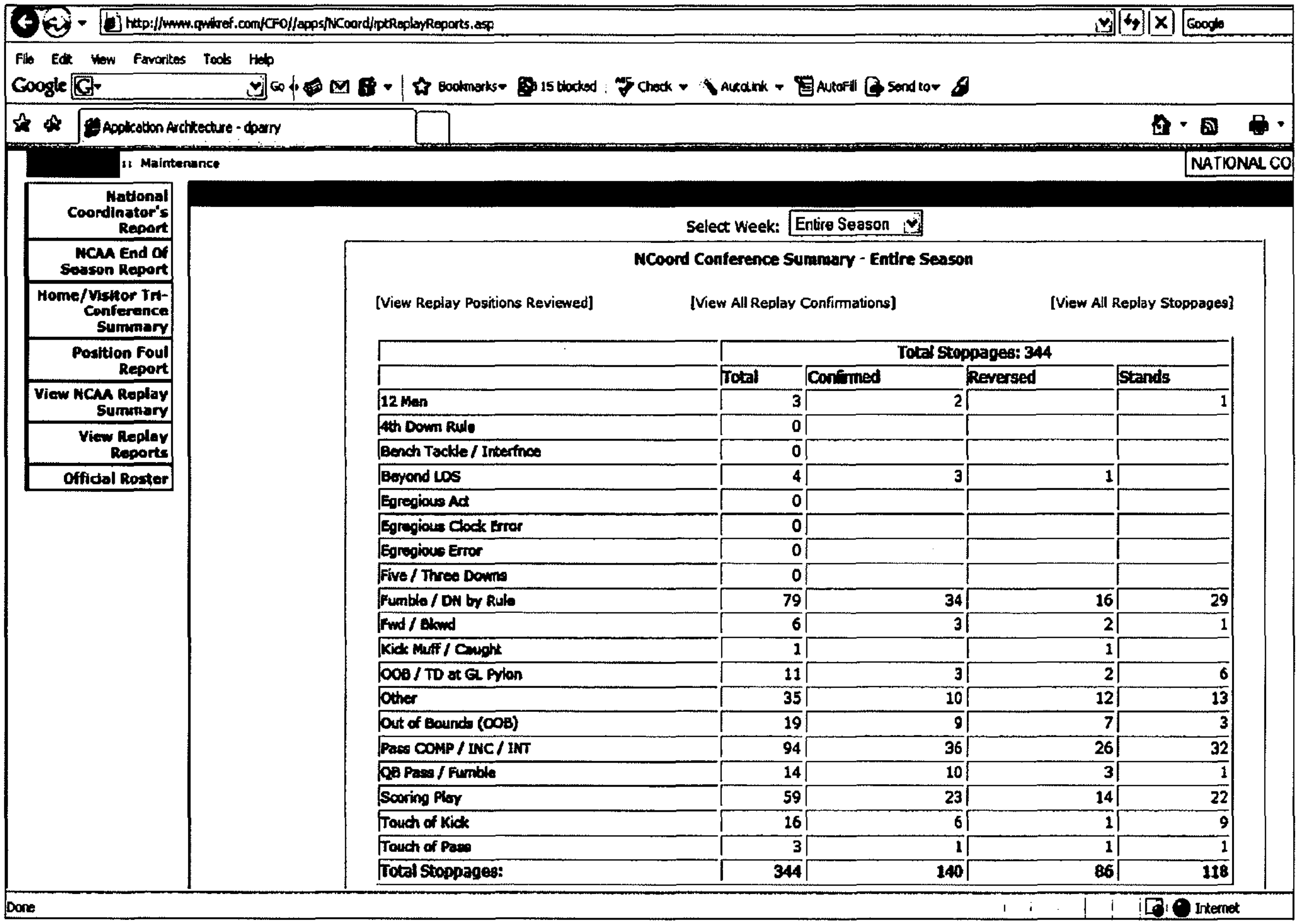

| | Total Stoppages: 344 | | | |
|---|---|---|---|---|
| | Total | Confirmed | Reversed | Stands |
| 12 Men | 3 | 2 | | 1 |
| 4th Down Rule | 0 | | | |
| Bench Tackle / Interfnce | 0 | | | |
| Beyond LOS | 4 | 3 | 1 | |
| Egregious Act | 0 | | | |
| Egregious Clock Error | 0 | | | |
| Egregious Error | 0 | | | |
| Five / Three Downs | 0 | | | |
| Fumble / DN by Rule | 79 | 34 | 16 | 29 |
| Fwd / Bkwd | 6 | 3 | 2 | 1 |
| Kick Muff / Caught | 1 | | 1 | |
| OOB / TD at GL Pylon | 11 | 3 | 2 | 6 |
| Other | 35 | 10 | 12 | 13 |
| Out of Bounds (OOB) | 19 | 9 | 7 | 3 |
| Pass COMP / INC / INT | 94 | 36 | 26 | 32 |
| QB Pass / Fumble | 14 | 10 | 3 | 1 |
| Scoring Play | 59 | 23 | 14 | 22 |
| Touch of Kick | 16 | 6 | 1 | 9 |
| Touch of Pass | 3 | 1 | 1 | 1 |
| Total Stoppages: | 344 | 140 | 86 | 118 |

National Coordinator's Report, View Replay Reports, View Replay Positions Reviewed, Field Judge:

FIG. 71

National Coordinator's Report, View Replay Reports, View Coach's Challenges Summary:

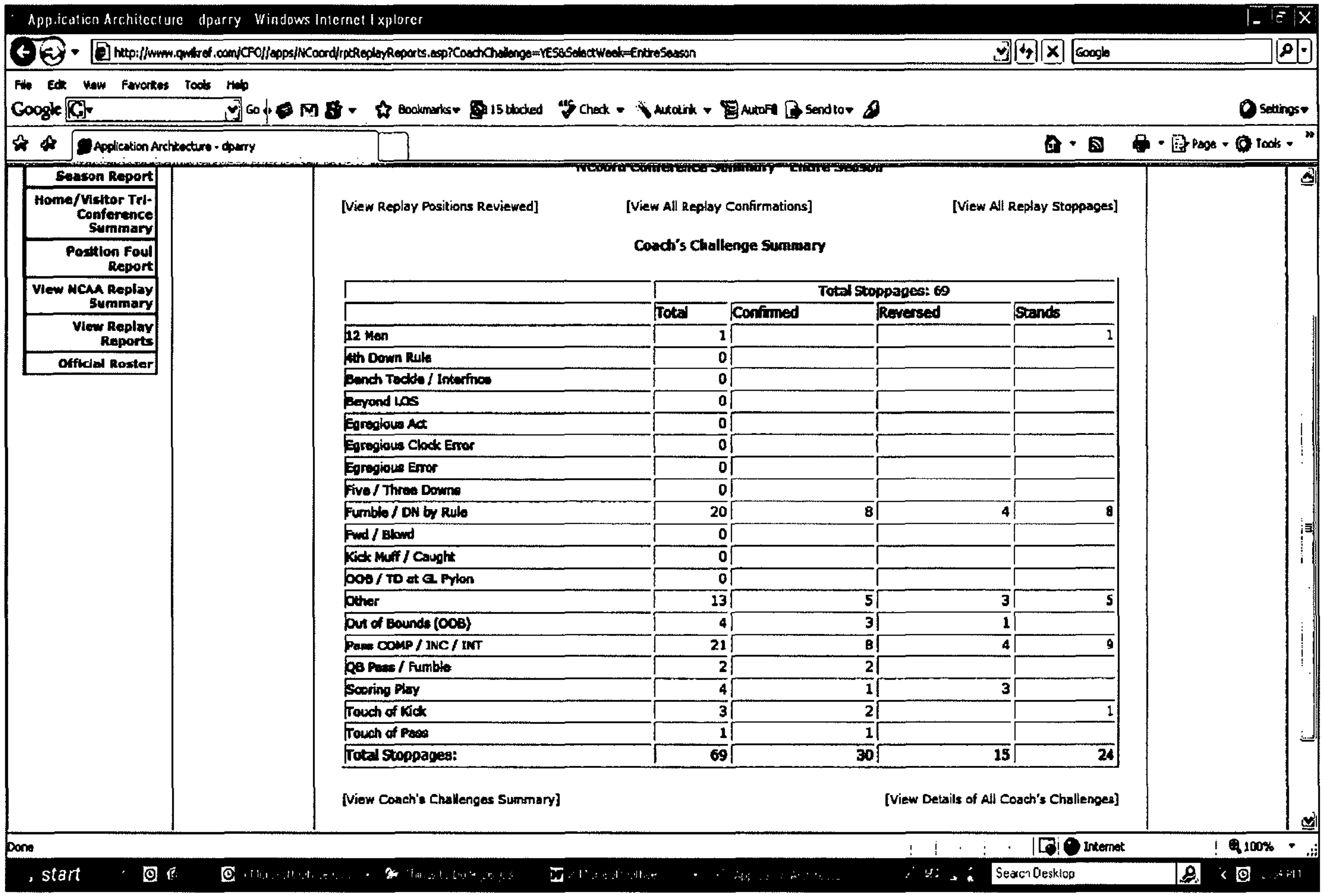

| | Total Stoppages: 69 | | | |
|---|---|---|---|---|
| | Total | Confirmed | Reversed | Stands |
| 12 Men | 1 | | | 1 |
| 4th Down Rule | 0 | | | |
| Bench Tackle / Interfnce | 0 | | | |
| Beyond LOS | 0 | | | |
| Egregious Act | 0 | | | |
| Egregious Clock Error | 0 | | | |
| Egregious Error | 0 | | | |
| Five / Three Downs | 0 | | | |
| Fumble / DN by Rule | 20 | 8 | 4 | 8 |
| Fwd / Blowd | 0 | | | |
| Kick Muff / Caught | 0 | | | |
| OOB / TD at GL Pylon | 0 | | | |
| Other | 13 | 5 | 3 | 5 |
| Out of Bounds (OOB) | 4 | 3 | 1 | |
| Pass COMP / INC / INT | 21 | 8 | 4 | 9 |
| QB Pass / Fumble | 2 | 2 | | |
| Scoring Play | 4 | 1 | 3 | |
| Touch of Kick | 3 | 2 | | 1 |
| Touch of Pass | 1 | 1 | | |
| Total Stoppages: | 69 | 30 | 15 | 24 |

National Coordinator's Login, ACC tab,
Commissioner tab, Menu page:

National Coordinator's Login, ACC tab, Commissioner tab, Commissioner's Report:

Login Page with All Regions Displayed

QwikRef Welcome Screen:

Big 12 tab Welcome page with All Roles Displayed:

Supervisor Permission Navigation Page:

Supervisor Permission, Find Games, Menu Page:

FIG. 82

Supervisor Permission, Find Games, Schedule Games:

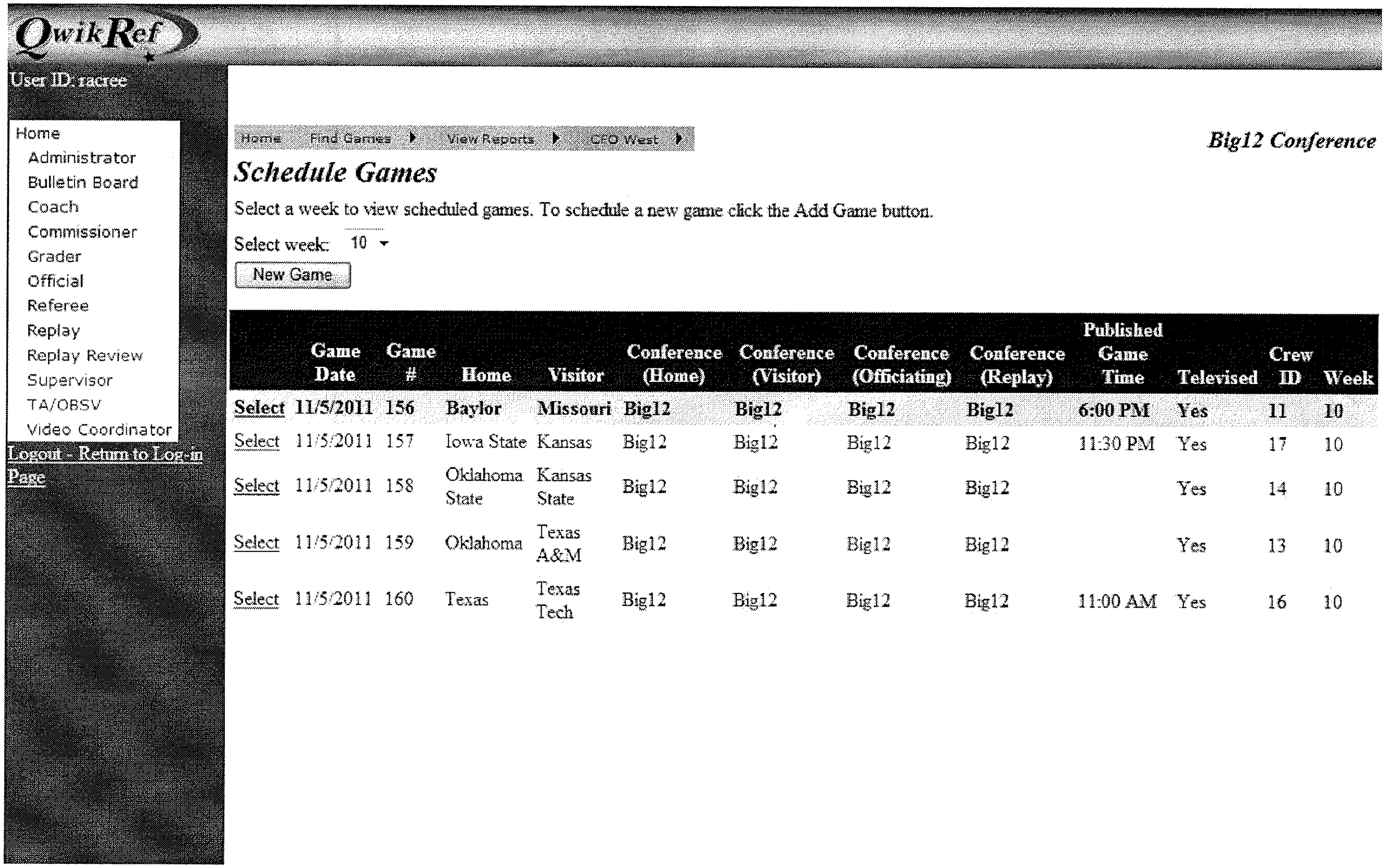

| | Game Date | Game # | Home | Visitor | Conference (Home) | Conference (Visitor) | Conference (Officiating) | Conference (Replay) | Published Game Time | Televised | Crew ID | Week |
|---|---|---|---|---|---|---|---|---|---|---|---|---|
| **Select** | **11/5/2011** | **156** | **Baylor** | **Missouri** | **Big12** | **Big12** | **Big12** | **Big12** | **6:00 PM** | **Yes** | **11** | **10** |
| Select | 11/5/2011 | 157 | Iowa State | Kansas | Big12 | Big12 | Big12 | Big12 | 11:30 PM | Yes | 17 | 10 |
| Select | 11/5/2011 | 158 | Oklahoma State | Kansas State | Big12 | Big12 | Big12 | Big12 | | Yes | 14 | 10 |
| Select | 11/5/2011 | 159 | Oklahoma | Texas A&M | Big12 | Big12 | Big12 | Big12 | | Yes | 13 | 10 |
| Select | 11/5/2011 | 160 | Texas | Texas Tech | Big12 | Big12 | Big12 | Big12 | 11:00 AM | Yes | 16 | 10 |

Supervisor Permission, Find Games,
View Game Summaries / Grade Tape, Game Info tab:

Supervisor Permission, Find Games,
View Game Summaries / Grade Tape, Game Info Tab open :

Supervisor Permission, Find Games,
View Game Summaries / Grade Tape, Game Fouls & Grading tab:

Supervisor Permission, Find Games,
View Game Summaries / Grade Tape, Game Fouls & Grading tab with Edit Record Screen Open:

Supervisor Permission, Find Games,
View Game Summaries / Grade Tape, Game Fouls & Grading tab with Add New Record Screen Open:

Supervisor Permission, Find Games, View Replay Reports / Grade Stoppages

Supervisor Permission, Find Games,
View Replay Reports / Grade Stoppages

Supervisor Permission, Find Games,
View Replay Reports / Grade Stoppages with Edit page open Supervisor Permission, Find Games, View Coach's Plays for Review Supervisor Permission, Find Games, View Coach's Plays for Review Supervisor Permission, Find Games,
View Coach's Plays for Review with Edit Record Page Open

FIG. 94

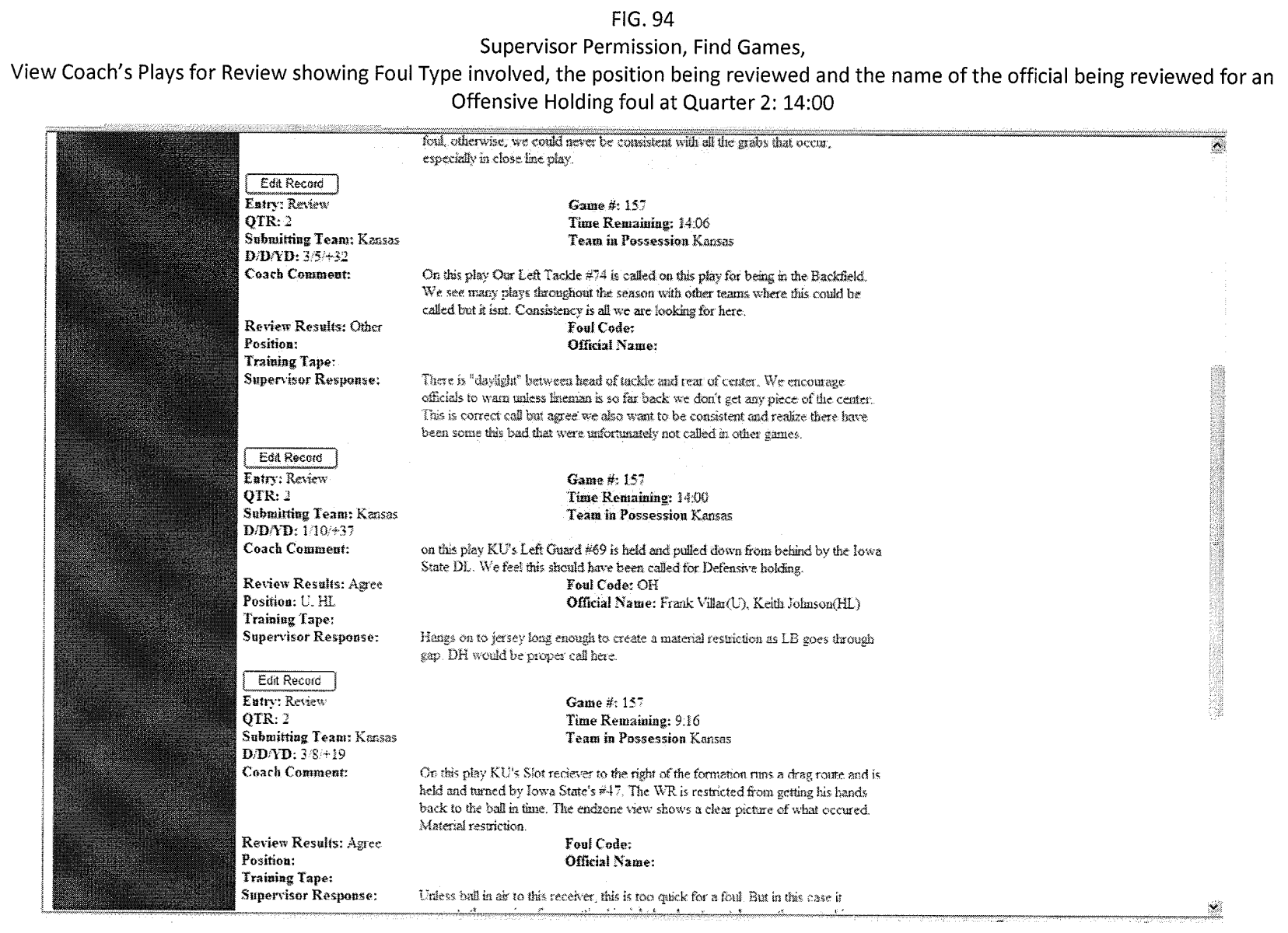

Supervisor Permission, Find Games,

View Coach's Plays for Review showing Foul Type involved, the position being reviewed and the name of the official being reviewed for an Offensive Holding foul at Quarter 2: 14:00 foul, otherwise, we could never be consistent with all the grabs that occur, especially in close line play.

Edit Record

Entry: Review
QTR: 2
Submitting Team: Kansas
D/D/YD: 3/5/+32
Game #: 157
Time Remaining: 14:06
Team in Possession Kansas

Coach Comment: On this play Our Left Tackle #74 is called on this play for being in the Backfield. We see many plays throughout the season with other teams where this could be called but it isnt. Consistency is all we are looking for here.

Review Results: Other
Position:
Training Tape:
Foul Code:
Official Name:

Supervisor Response: There is "daylight" between head of tackle and rear of center. We encourage officials to warn unless lineman is so far back we don't get any piece of the center. This is correct call but agree we also want to be consistent and realize there have been some this bad that were unfortunately not called in other games.

Edit Record

Entry: Review
QTR: 2
Submitting Team: Kansas
D/D/YD: 1/10/+37
Game #: 157
Time Remaining: 14:00
Team in Possession Kansas

Coach Comment: on this play KU's Left Guard #69 is held and pulled down from behind by the Iowa State DL. We feel this should have been called for Defensive holding.

Review Results: Agree
Position: U. HL
Training Tape:
Foul Code: OH
Official Name: Frank Villar(U), Keith Johnson(HL)

Supervisor Response: Hangs on to jersey long enough to create a material restriction as LB goes through gap. DH would be proper call here.

Edit Record

Entry: Review
QTR: 2
Submitting Team: Kansas
D/D/YD: 3/8/+19
Game #: 157
Time Remaining: 9:16
Team in Possession Kansas

Coach Comment: On this play KU's Slot reciever to the right of the formation runs a drag route and is held and turned by Iowa State's #47. The WR is restricted from getting his hands back to the ball in time. The endzone view shows a clear picture of what occured. Material restriction.

Review Results: Agree
Position:
Training Tape:
Foul Code:
Official Name:

Supervisor Response: Unless ball in air to this receiver, this is too quick for a foul. But in this case it Supervisor Permission, Find Games, View Coach's Plays for Review with Edit Record Showing the Email alert Button for Initiating Email alerts to Coaches Supervisor Permission, View Reports, Menu Page Supervisor Permission, View Reports,
Supervisor's Report Weekly Summary FIG. 98
Supervisor Permission, View Reports,
Supervisor's Report Quick Look QwikRef User ID: racree Home
Administrator
Bulletin Board
Coach
Commissioner
Grader
Official
Referee
Replay
Replay Review
Supervisor
TA/OBSV
Video Coordinator
Logout - Return to Log-in Page Home Find Games ▶ View Reports ▶ CFO West ▶

*Big12 Conference*

*Supervisor's Report Quick Look*

Select Week: 10

Quick Look (Week 10 of the Season)

| | Home | Visitor | Total |
|---|---|---|---|
| Points Scored | 200 | 139 | 339 |
| Wins | 5 | 0 | 5 |
| Average Points Per Game | 40.00 | 27.80 | 67.80 |
| % Wins | 100.00 | 0.00 | |
| Foul Totals | 25 | 36 | 61 |
| Fouls Per Game | 5.00 | 7.20 | 12.20 |

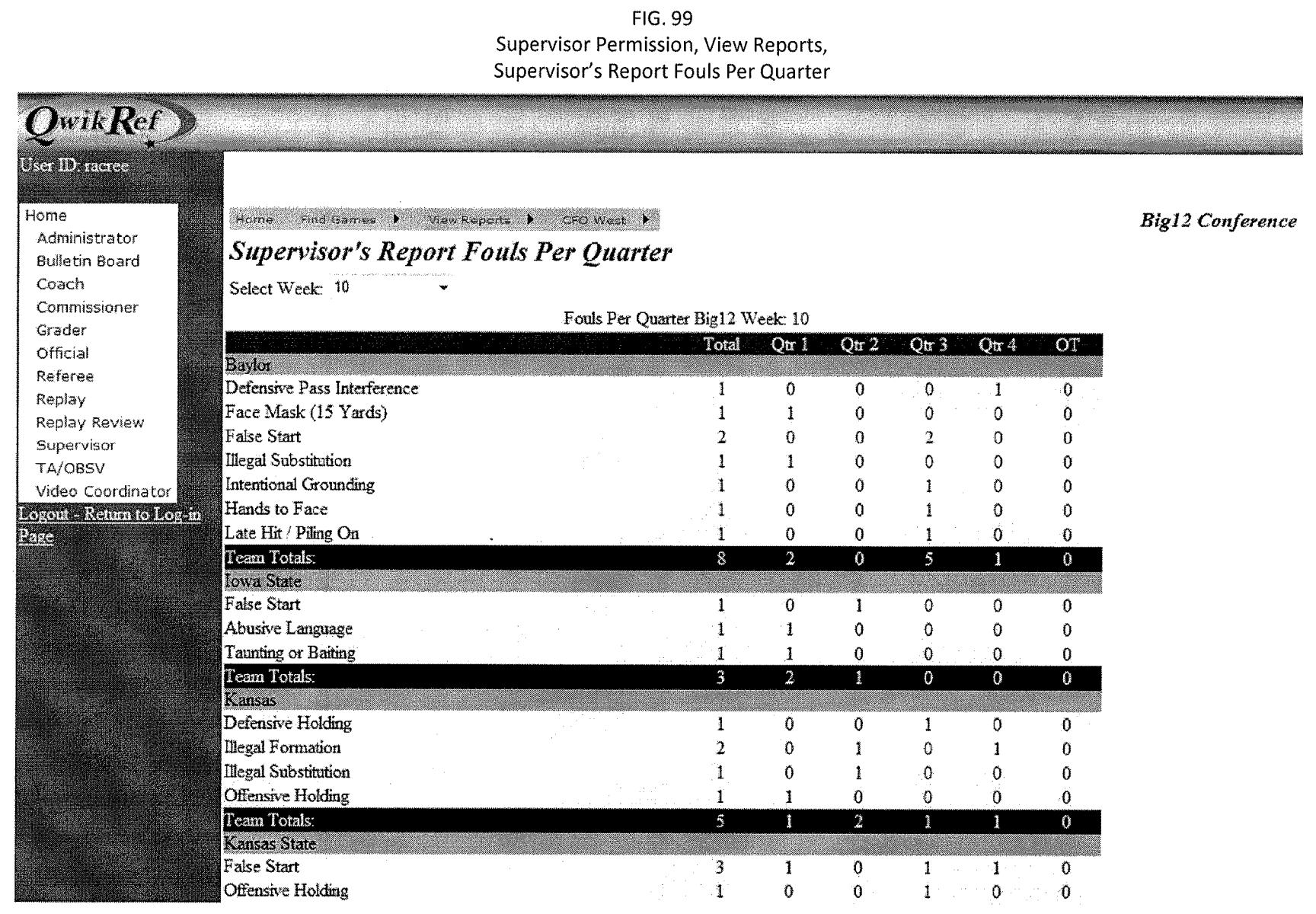

FIG. 99
Supervisor Permission, View Reports,
Supervisor's Report Fouls Per Quarter QwikRef User ID: racree

- Home
  - Administrator
  - Bulletin Board
  - Coach
  - Commissioner
  - Grader
  - Official
  - Referee
  - Replay
  - Replay Review
  - Supervisor
  - TA/OBSV
  - Video Coordinator Logout - Return to Log-in Page Home | Find Games ▸ | View Reports ▸ | CFO West ▸

*Big12 Conference*

*Supervisor's Report Fouls Per Quarter*

Select Week: 10

Fouls Per Quarter Big12 Week: 10

| | Total | Qtr 1 | Qtr 2 | Qtr 3 | Qtr 4 | OT |
|---|---|---|---|---|---|---|
| Baylor | | | | | | |
| Defensive Pass Interference | 1 | 0 | 0 | 0 | 1 | 0 |
| Face Mask (15 Yards) | 1 | 1 | 0 | 0 | 0 | 0 |
| False Start | 2 | 0 | 0 | 2 | 0 | 0 |
| Illegal Substitution | 1 | 1 | 0 | 0 | 0 | 0 |
| Intentional Grounding | 1 | 0 | 0 | 1 | 0 | 0 |
| Hands to Face | 1 | 0 | 0 | 1 | 0 | 0 |
| Late Hit / Piling On | 1 | 0 | 0 | 1 | 0 | 0 |
| Team Totals: | 8 | 2 | 0 | 5 | 1 | 0 |
| Iowa State | | | | | | |
| False Start | 1 | 0 | 1 | 0 | 0 | 0 |
| Abusive Language | 1 | 1 | 0 | 0 | 0 | 0 |
| Taunting or Baiting | 1 | 1 | 0 | 0 | 0 | 0 |
| Team Totals: | 3 | 2 | 1 | 0 | 0 | 0 |
| Kansas | | | | | | |
| Defensive Holding | 1 | 0 | 0 | 1 | 0 | 0 |
| Illegal Formation | 2 | 0 | 1 | 0 | 1 | 0 |
| Illegal Substitution | 1 | 0 | 1 | 0 | 0 | 0 |
| Offensive Holding | 1 | 1 | 0 | 0 | 0 | 0 |
| Team Totals: | 5 | 1 | 2 | 1 | 1 | 0 |
| Kansas State | | | | | | |
| False Start | 3 | 1 | 0 | 1 | 1 | 0 |
| Offensive Holding | 1 | 0 | 0 | 1 | 0 | 0 |

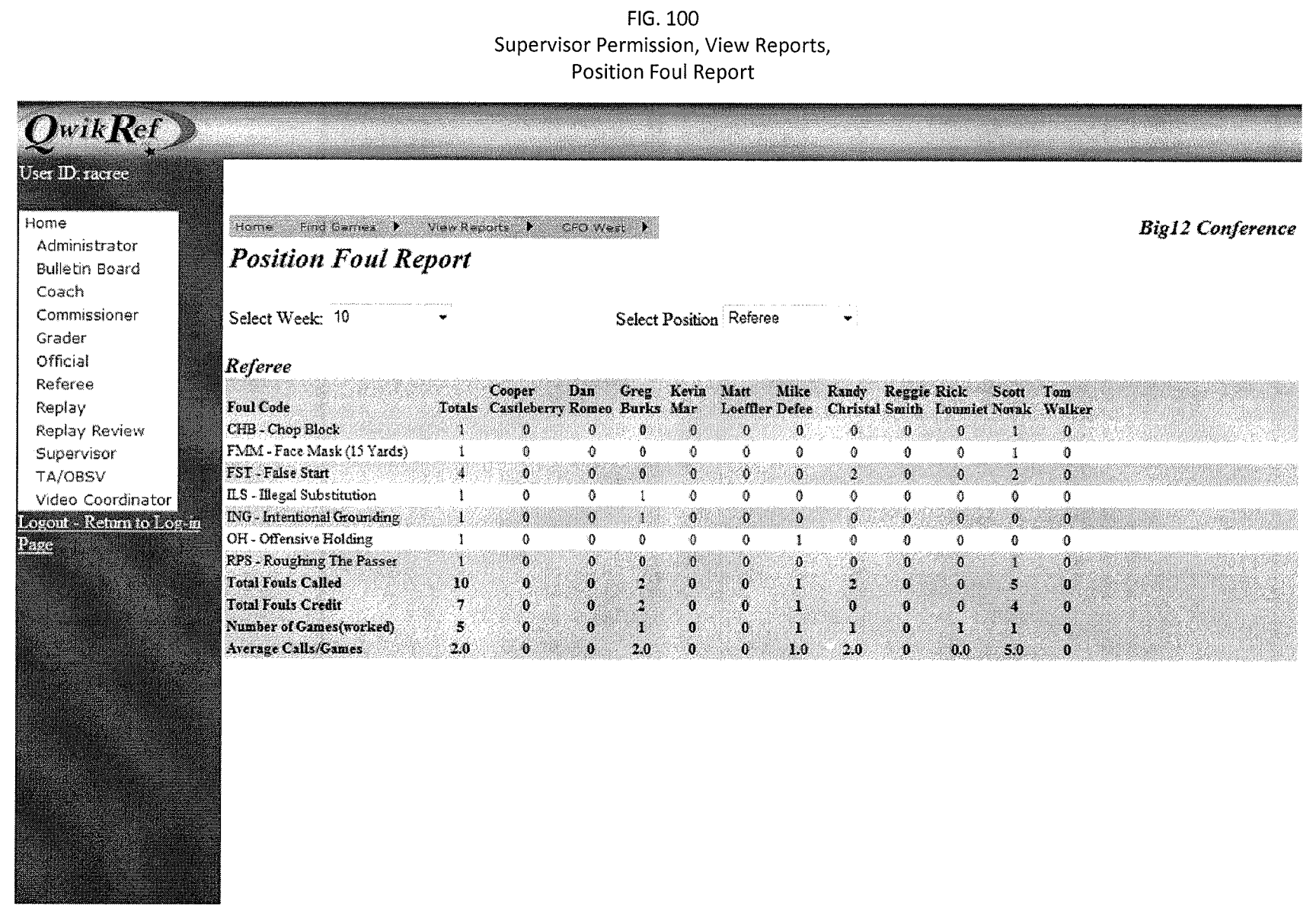

FIG. 100
Supervisor Permission, View Reports,
Position Foul Report

QwikRef

User ID: racree

- Home
  - Administrator
  - Bulletin Board
  - Coach
  - Commissioner
  - Grader
  - Official
  - Referee
  - Replay
  - Replay Review
  - Supervisor
  - TA/OBSV
  - Video Coordinator Logout - Return to Log-in Page Home Find Games ▸ View Reports ▸ CFO West ▸

*Big12 Conference*

*Position Foul Report*

Select Week: 10 Select Position Referee

*Referee*

| Foul Code | Totals | Cooper Castleberry | Dan Romeo | Greg Burks | Kevin Mar | Matt Loeffler | Mike Defee | Randy Christal | Reggie Smith | Rick Loumiet | Scott Novak | Tom Walker |
|---|---|---|---|---|---|---|---|---|---|---|---|---|
| CHB - Chop Block | 1 | 0 | 0 | 0 | 0 | 0 | 0 | 0 | 0 | 0 | 1 | 0 |
| FMM - Face Mask (15 Yards) | 1 | 0 | 0 | 0 | 0 | 0 | 0 | 0 | 0 | 0 | 1 | 0 |
| FST - False Start | 4 | 0 | 0 | 0 | 0 | 0 | 0 | 2 | 0 | 0 | 2 | 0 |
| ILS - Illegal Substitution | 1 | 0 | 0 | 1 | 0 | 0 | 0 | 0 | 0 | 0 | 0 | 0 |
| ING - Intentional Grounding | 1 | 0 | 0 | 1 | 0 | 0 | 0 | 0 | 0 | 0 | 0 | 0 |
| OH - Offensive Holding | 1 | 0 | 0 | 0 | 0 | 0 | 1 | 0 | 0 | 0 | 0 | 0 |
| RPS - Roughing The Passer | 1 | 0 | 0 | 0 | 0 | 0 | 0 | 0 | 0 | 0 | 1 | 0 |
| **Total Fouls Called** | 10 | 0 | 0 | 2 | 0 | 0 | 1 | 2 | 0 | 0 | 5 | 0 |
| **Total Fouls Credit** | 7 | 0 | 0 | 2 | 0 | 0 | 1 | 0 | 0 | 0 | 4 | 0 |
| **Number of Games(worked)** | 5 | 0 | 0 | 1 | 0 | 0 | 1 | 1 | 0 | 1 | 1 | 0 |
| **Average Calls/Games** | 2.0 | 0 | 0 | 2.0 | 0 | 0 | 1.0 | 2.0 | 0 | 0.0 | 5.0 | 0 |

Supervisor Permission, View Reports,
Officials Foul Summary

Supervisor Permission, View Reports,
Officials Foul Summary, Bobby Ables Checked:

Supervisor Permission, View Reports,
Foul Grade Report

Supervisor Permission, View Reports,
Foul Grade Report, Fouls Checked

Supervisor Permission, View Reports,
Foul Grade Report, Fouls Checked, View Details Supervisor Permission, View Reports,
Foul Position Report FIG. 107
Supervisor Permission, View Reports,
Crew Grade Summary QwikRef User ID: racree

Figure 107:
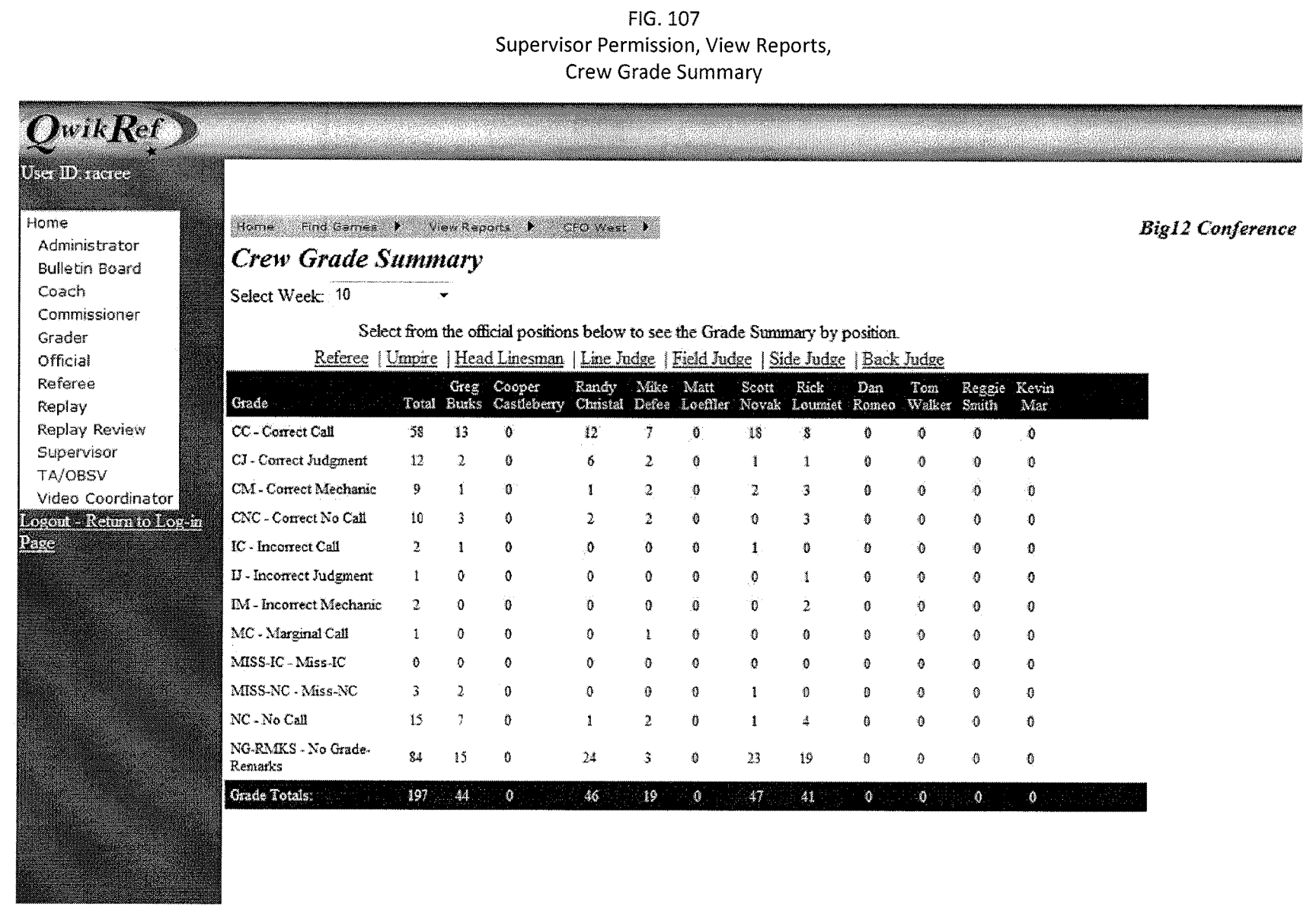

- Home
  - Administrator
  - Bulletin Board
  - Coach
  - Commissioner
  - Grader
  - Official
  - Referee
  - Replay
  - Replay Review
  - Supervisor
  - TA/OBSV
  - Video Coordinator Logout - Return to Log-in Page Home Find Games ▶ View Reports ▶ CFO West ▶

*Big12 Conference*

*Crew Grade Summary*

Select Week: 10

Select from the official positions below to see the Grade Summary by position.

Referee | Umpire | Head Linesman | Line Judge | Field Judge | Side Judge | Back Judge

| Grade | Total | Greg Burks | Cooper Castleberry | Randy Christal | Mike Defee | Matt Loeffler | Scott Novak | Rick Loumiet | Dan Romeo | Tom Walker | Reggie Smith | Kevin Mar |
|---|---|---|---|---|---|---|---|---|---|---|---|---|
| CC - Correct Call | 58 | 13 | 0 | 12 | 7 | 0 | 18 | 8 | 0 | 0 | 0 | 0 |
| CJ - Correct Judgment | 12 | 2 | 0 | 6 | 2 | 0 | 1 | 1 | 0 | 0 | 0 | 0 |
| CM - Correct Mechanic | 9 | 1 | 0 | 1 | 2 | 0 | 2 | 3 | 0 | 0 | 0 | 0 |
| CNC - Correct No Call | 10 | 3 | 0 | 2 | 2 | 0 | 0 | 3 | 0 | 0 | 0 | 0 |
| IC - Incorrect Call | 2 | 1 | 0 | 0 | 0 | 0 | 1 | 0 | 0 | 0 | 0 | 0 |
| IJ - Incorrect Judgment | 1 | 0 | 0 | 0 | 0 | 0 | 0 | 1 | 0 | 0 | 0 | 0 |
| IM - Incorrect Mechanic | 2 | 0 | 0 | 0 | 0 | 0 | 0 | 2 | 0 | 0 | 0 | 0 |
| MC - Marginal Call | 1 | 0 | 0 | 0 | 1 | 0 | 0 | 0 | 0 | 0 | 0 | 0 |
| MISS-IC - Miss-IC | 0 | 0 | 0 | 0 | 0 | 0 | 0 | 0 | 0 | 0 | 0 | 0 |
| MISS-NC - Miss-NC | 3 | 2 | 0 | 0 | 0 | 0 | 1 | 0 | 0 | 0 | 0 | 0 |
| NC - No Call | 15 | 7 | 0 | 1 | 2 | 0 | 1 | 4 | 0 | 0 | 0 | 0 |
| NG-RMKS - No Grade-Remarks | 84 | 15 | 0 | 24 | 3 | 0 | 23 | 19 | 0 | 0 | 0 | 0 |
| Grade Totals: | 197 | 44 | 0 | 46 | 19 | 0 | 47 | 41 | 0 | 0 | 0 | 0 |

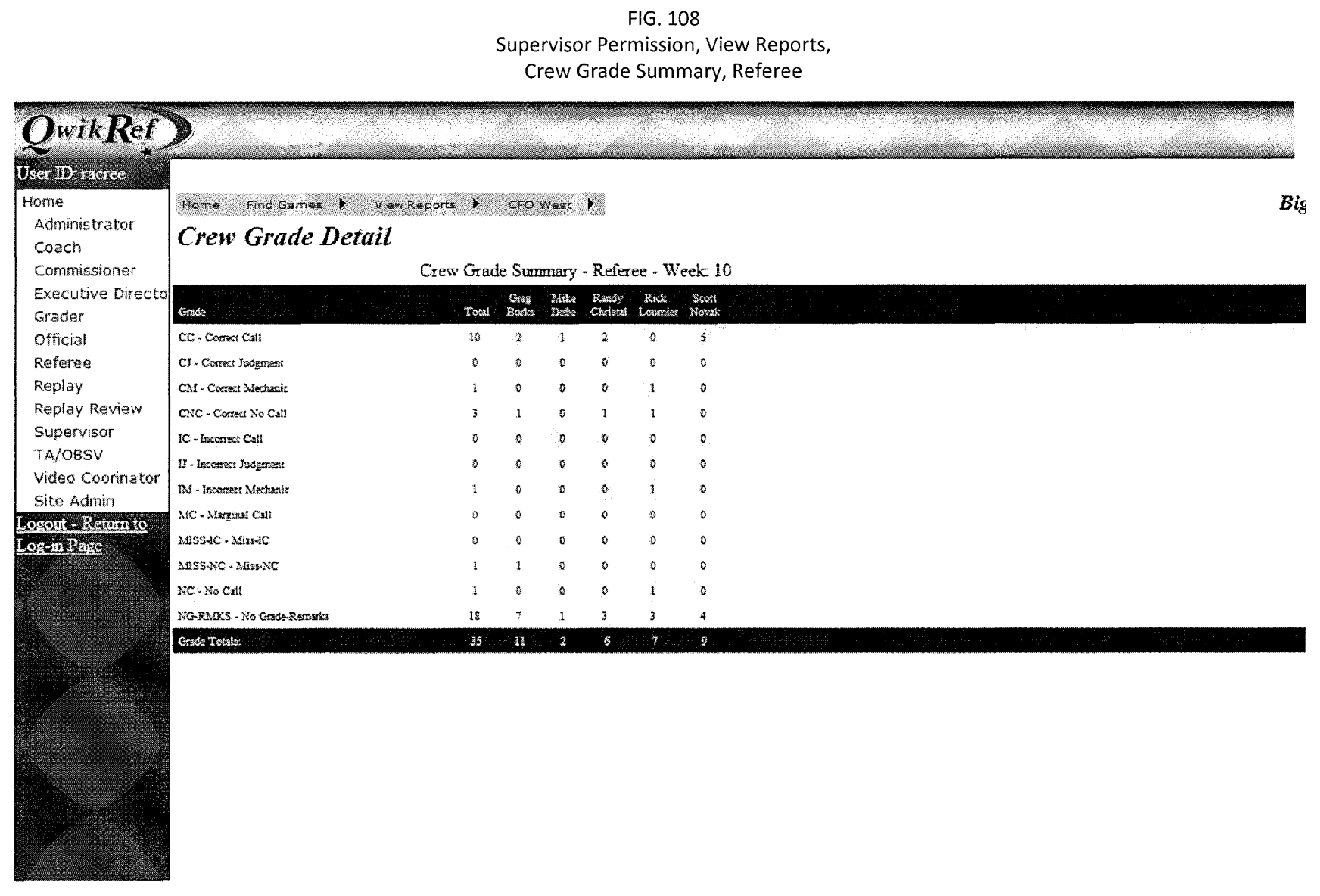

FIG. 108
Supervisor Permission, View Reports,
Crew Grade Summary, Referee

QwikRef

User ID: racree

- Home
  - Administrator
  - Coach
  - Commissioner
  - Executive Directo
  - Grader
  - Official
  - Referee
  - Replay
  - Replay Review
  - Supervisor
  - TA/OBSV
  - Video Coorinator
  - Site Admin Logout - Return to Log-in Page Home ▸ Find Games ▸ View Reports ▸ CFO West ▸

Big

Crew Grade Detail

Crew Grade Summary - Referee - Week 10

| Grade | Total | Greg Burks | Mike Defee | Randy Christal | Rick Loumiet | Scott Novak |
|---|---|---|---|---|---|---|
| CC - Correct Call | 10 | 2 | 1 | 2 | 0 | 5 |
| CJ - Correct Judgment | 0 | 0 | 0 | 0 | 0 | 0 |
| CM - Correct Mechanic | 1 | 0 | 0 | 0 | 1 | 0 |
| CNC - Correct No Call | 3 | 1 | 0 | 1 | 1 | 0 |
| IC - Incorrect Call | 0 | 0 | 0 | 0 | 0 | 0 |
| IJ - Incorrect Judgment | 0 | 0 | 0 | 0 | 0 | 0 |
| IM - Incorrect Mechanic | 1 | 0 | 0 | 0 | 1 | 0 |
| MC - Marginal Call | 0 | 0 | 0 | 0 | 0 | 0 |
| MISS-IC - Miss-IC | 0 | 0 | 0 | 0 | 0 | 0 |
| MISS-NC - Miss-NC | 1 | 1 | 0 | 0 | 0 | 0 |
| NC - No Call | 1 | 0 | 0 | 0 | 1 | 0 |
| NG-RMKS - No Grade-Remarks | 18 | 7 | 1 | 3 | 3 | 4 |
| Grade Totals: | 35 | 11 | 2 | 6 | 7 | 9 |

Supervisor Permission, View Reports, Weekly TA Report

Supervisor Permission, View Reports, View Replay Grades

Supervisor Permission, View Reports,
View Replay Grades, View Grade Summary for Replay Officials Grader Permission, Find Games,
View Game Summary / Grade Tape Grader Permission, Find Games,
View Game Summary / Grade Tape Grader Permission, Find Games,
View Game Summary / Grade Tape with Add New Record page open Replay Permission, Find Games
Submit Replay Report Replay Permission, Find Games
Submit Replay Report with Add Replay Report Page Open Replay Permission, Find Games
Submit Replay Report with Edit Page Open Replay Permission, View Reports,
Replay Official Grade Summary Replay Permission, View Reports,
Replay Official Grade Summary with Review all Grades as Replay Official page open Referee Permission, Game Report,
View Game Summary / Submit Game Report, Game Information Tab Referee Permission, Game Report,
View Game Summary / Submit Game Report, Game Information Tab with Edit page open Referee Permission, Game Report,
View Game Summary / Submit Game Report, Game Foul & Grading Tab Referee Permission, Game Report,
View Game Summary / Submit Game Report, Game Foul & Grading Tab with Add New Record page open Referee Permission, View Reports,
View Crew Report, Game Duration Tab FIG. 125
Referee Permission, View Reports,
View Crew Report, Crew Foul Summary Tab QwikRef User ID: gburks Home
Official
Referee Logout - Return to Log-in Page Home Game Report ▸ View Reports ▸

*Big12 Conference*

*Crew Report*

Select Week: Entire Season

Game Duration | Crew Foul Summary

Foul Summary By Big12 Football Officiating Crews - Week: Entire Season

*Official: Greg Burks*

| Foul Code | Totals | Crew Totals |
|---|---|---|
| BBW - Block Below Waist | 4 | 0 |
| CHB - Chop Block | 15 | 2 |
| CLP - Clipping | 5 | 1 |
| DH - Defensive Holding | 14 | 1 |
| DOD - Delay of Game (Defense) | 3 | 0 |
| DOF - Defensive Offside | 103 | 8 |
| DOG - Delay of Game (Offense) | 39 | 1 |
| DPI - Defensive Pass Interference | 75 | 9 |
| DSQ - Disqualification | 1 | 1 |
| FMM - Face Mask (15 Yards) | 45 | 6 |
| FST - False Start | 201 | 19 |
| IBB - Illegal Block in Back | 36 | 2 |
| ICB - Ilegal Crackback | 8 | 0 |
| IDP - Ineligible Downfield on Pass | 4 | 0 |
| IFP - Illegal Forward Pass | 1 | 0 |

Referee Permission, View Reports,
View Graders Comments

Officials Permission, View Reports, Officials Foul Summary

Figure 131:
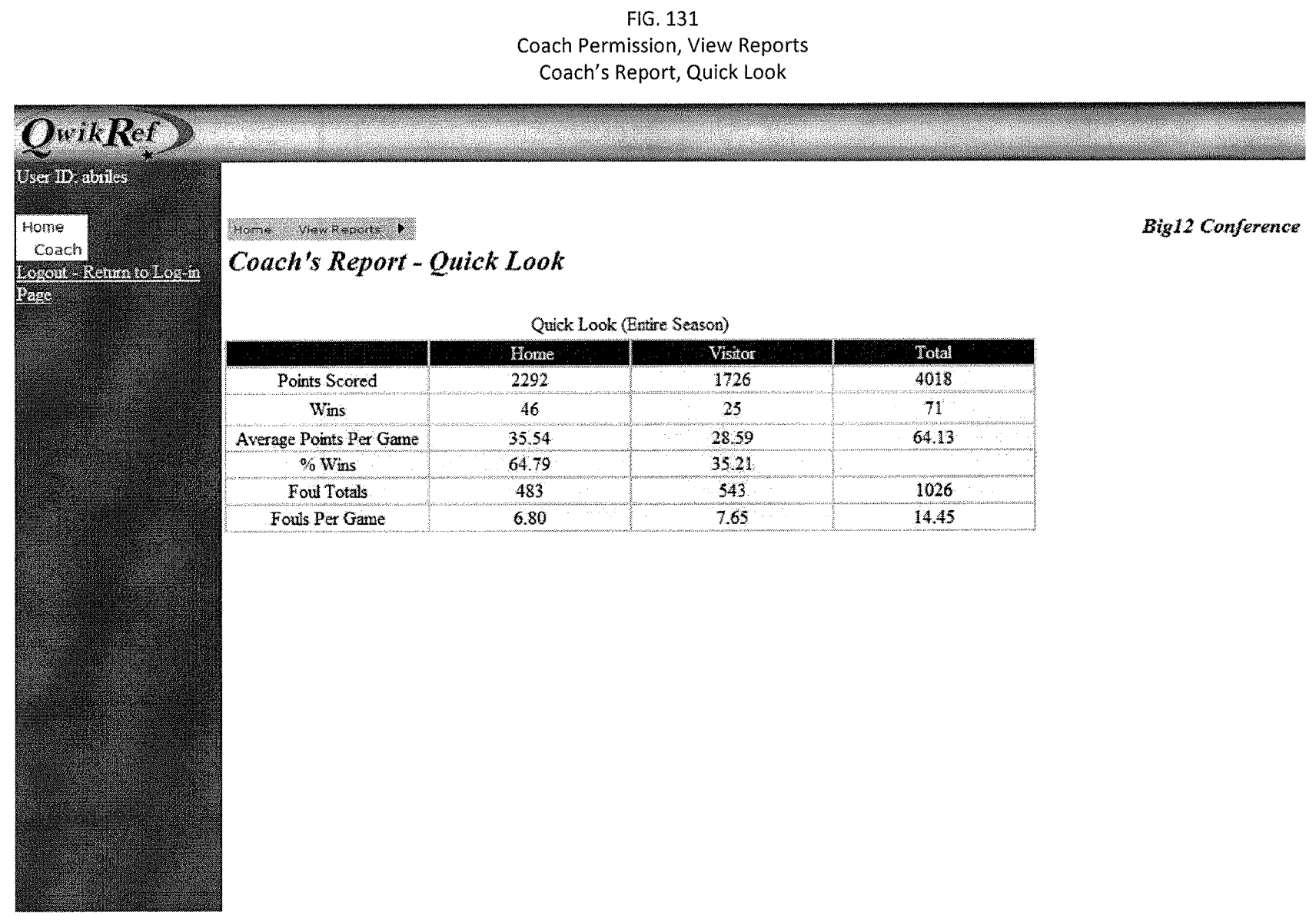

Officials Permission, View Reports,
Officials Foul Summary with the View Details page open Officials Permission, View Reports,
Officials Grade Summary Officials Permission, View Reports,
Officials Grade Summary with the View Details Page open FIG. 131
Coach Permission, View Reports
Coach's Report, Quick Look QwikRef User ID: abriles Home
Coach
Logout - Return to Log-in Page Home View Reports

*Big12 Conference*

*Coach's Report - Quick Look*

Quick Look (Entire Season)

| | Home | Visitor | Total |
|---|---|---|---|
| Points Scored | 2292 | 1726 | 4018 |
| Wins | 46 | 25 | 71 |
| Average Points Per Game | 35.54 | 28.59 | 64.13 |
| % Wins | 64.79 | 35.21 | |
| Foul Totals | 483 | 543 | 1026 |
| Fouls Per Game | 6.80 | 7.65 | 14.45 |

Coach Permission, View Report,
Coach's Report, Game Summary

Coach Permission, View Reports,
Coach's Report, Game Report

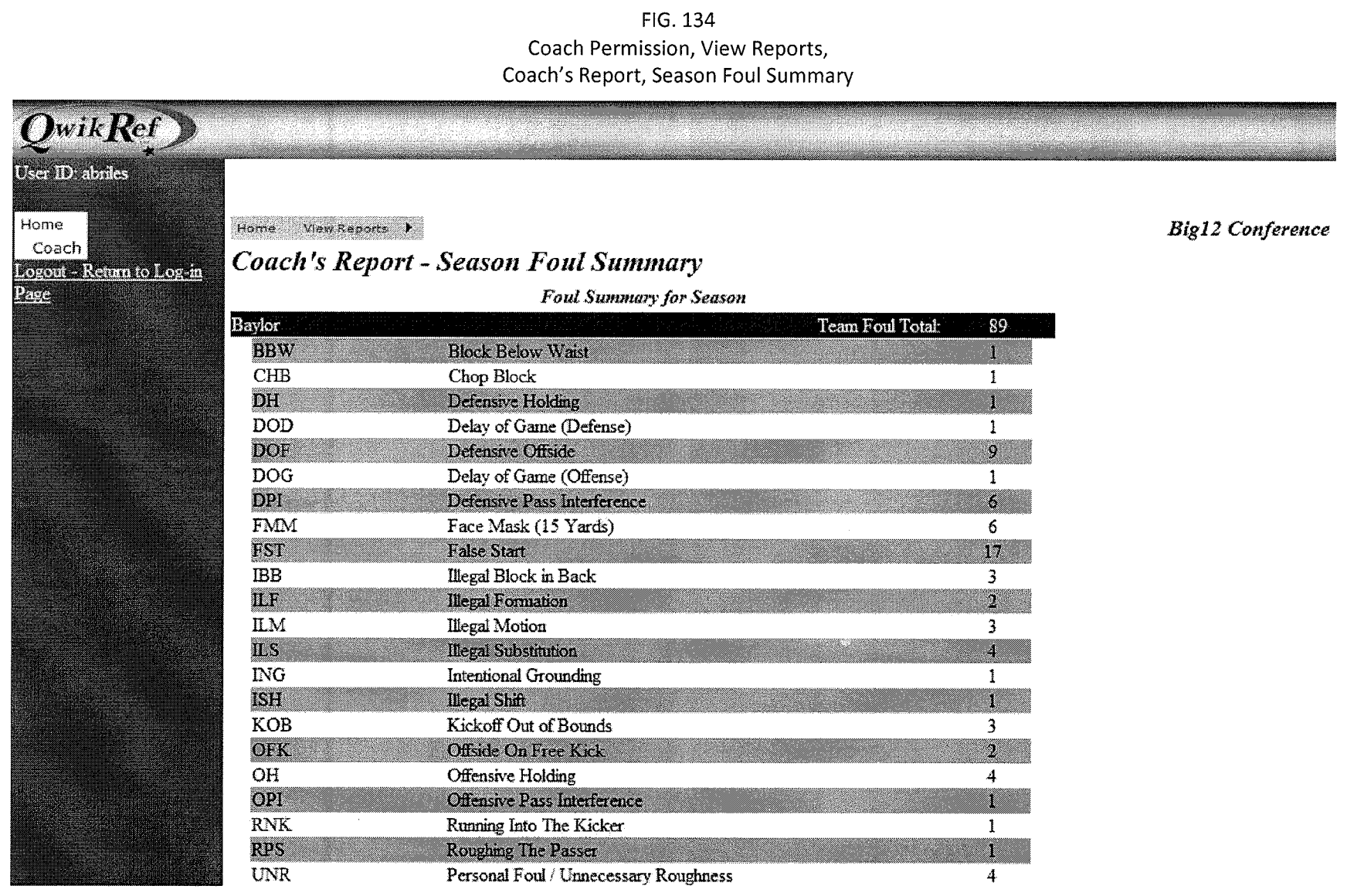

FIG. 134
Coach Permission, View Reports,
Coach's Report, Season Foul Summary

QwikRef

User ID: abriles

Home
Coach
Logout - Return to Log-in Page

Home View Reports ▸

*Big12 Conference*

*Coach's Report - Season Foul Summary*

*Foul Summary for Season*

| Baylor | | Team Foul Total: 89 |
|---|---|---|
| BBW | Block Below Waist | 1 |
| CHB | Chop Block | 1 |
| DH | Defensive Holding | 1 |
| DOD | Delay of Game (Defense) | 1 |
| DOF | Defensive Offside | 9 |
| DOG | Delay of Game (Offense) | 1 |
| DPI | Defensive Pass Interference | 6 |
| FMM | Face Mask (15 Yards) | 6 |
| FST | False Start | 17 |
| IBB | Illegal Block in Back | 3 |
| ILF | Illegal Formation | 2 |
| ILM | Illegal Motion | 3 |
| ILS | Illegal Substitution | 4 |
| ING | Intentional Grounding | 1 |
| ISH | Illegal Shift | 1 |
| KOB | Kickoff Out of Bounds | 3 |
| OFK | Offside On Free Kick | 2 |
| OH | Offensive Holding | 4 |
| OPI | Offensive Pass Interference | 1 |
| RNK | Running Into The Kicker | 1 |
| RPS | Roughing The Passer | 1 |
| UNR | Personal Foul / Unnecessary Roughness | 4 |

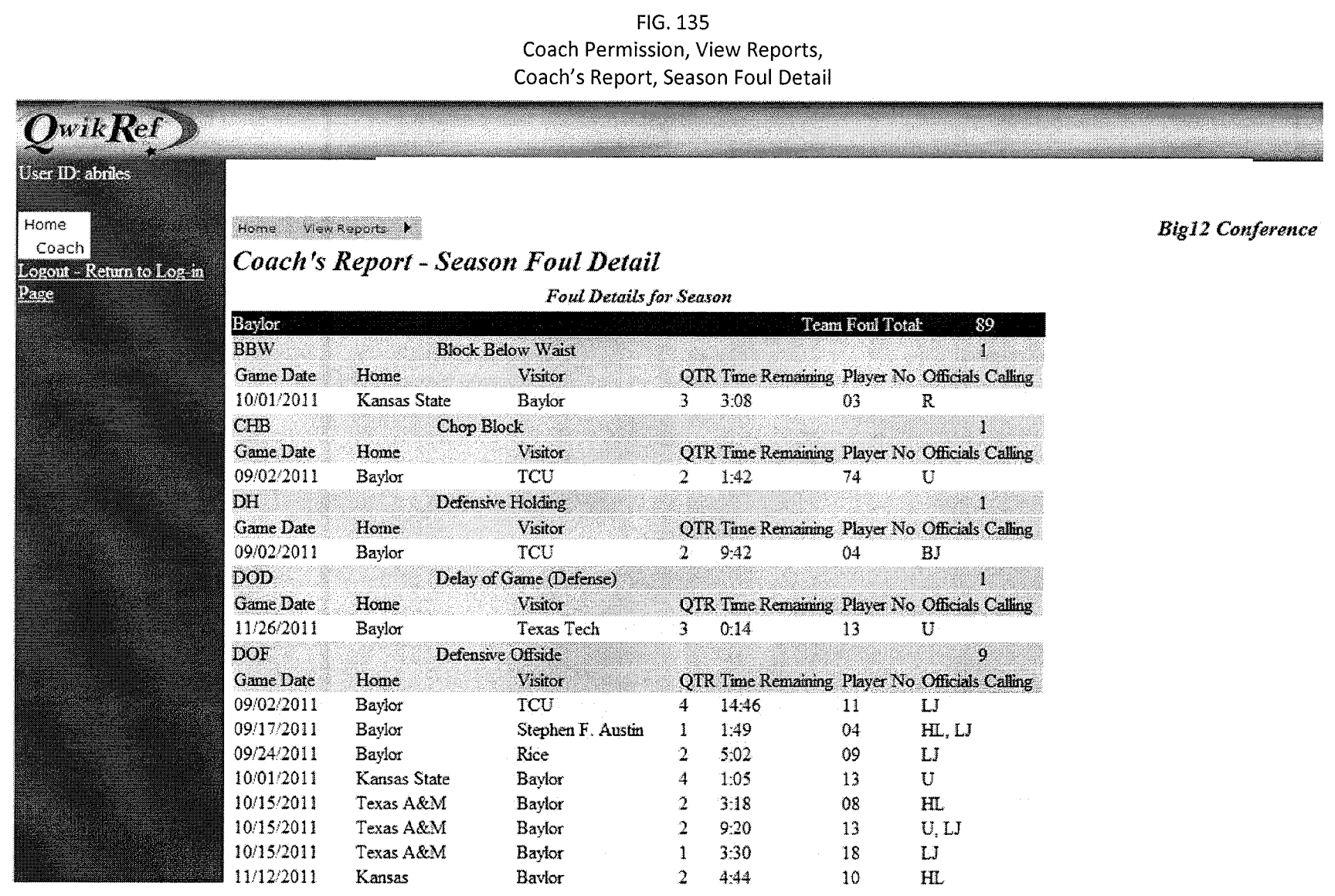

FIG. 135
Coach Permission, View Reports,
Coach's Report, Season Foul Detail

QwikRef

User ID: abriles

Home
Coach
Logout - Return to Log-in Page

Home View Reports

*Big12 Conference*

*Coach's Report - Season Foul Detail*

*Foul Details for Season*

| Baylor | | | | | Team Foul Total | 89 |
|---|---|---|---|---|---|---|
| BBW | | Block Below Waist | | | | 1 |
| Game Date | Home | Visitor | QTR | Time Remaining | Player No | Officials Calling |
| 10/01/2011 | Kansas State | Baylor | 3 | 3:08 | 03 | R |
| CHB | | Chop Block | | | | 1 |
| Game Date | Home | Visitor | QTR | Time Remaining | Player No | Officials Calling |
| 09/02/2011 | Baylor | TCU | 2 | 1:42 | 74 | U |
| DH | | Defensive Holding | | | | 1 |
| Game Date | Home | Visitor | QTR | Time Remaining | Player No | Officials Calling |
| 09/02/2011 | Baylor | TCU | 2 | 9:42 | 04 | BJ |
| DOD | | Delay of Game (Defense) | | | | 1 |
| Game Date | Home | Visitor | QTR | Time Remaining | Player No | Officials Calling |
| 11/26/2011 | Baylor | Texas Tech | 3 | 0:14 | 13 | U |
| DOF | | Defensive Offside | | | | 9 |
| Game Date | Home | Visitor | QTR | Time Remaining | Player No | Officials Calling |
| 09/02/2011 | Baylor | TCU | 4 | 14:46 | 11 | LJ |
| 09/17/2011 | Baylor | Stephen F. Austin | 1 | 1:49 | 04 | HL, LJ |
| 09/24/2011 | Baylor | Rice | 2 | 5:02 | 09 | LJ |
| 10/01/2011 | Kansas State | Baylor | 4 | 1:05 | 13 | U |
| 10/15/2011 | Texas A&M | Baylor | 2 | 3:18 | 08 | HL |
| 10/15/2011 | Texas A&M | Baylor | 2 | 9:20 | 13 | U, LJ |
| 10/15/2011 | Texas A&M | Baylor | 1 | 3:30 | 18 | LJ |
| 11/12/2011 | Kansas | Baylor | 2 | 4:44 | 10 | HL |

Coach Permission, View Reports,
Coach's Report, Season Fouls Per Week

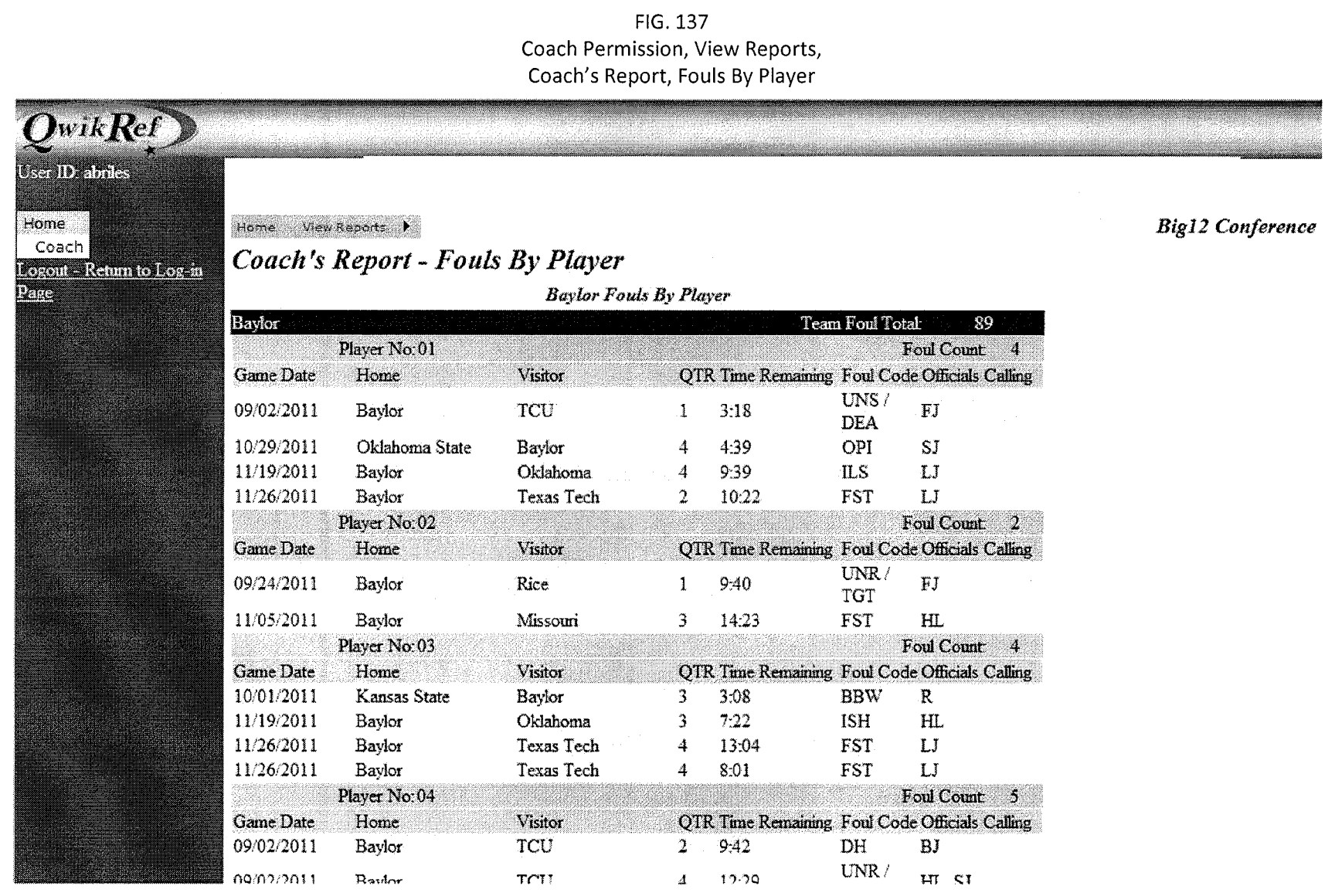

FIG. 137
Coach Permission, View Reports,
Coach's Report, Fouls By Player

QwikRef

User ID: abriles

Home
Coach
Logout - Return to Log-in Page

Home View Reports

*Big12 Conference*

*Coach's Report - Fouls By Player*

*Baylor Fouls By Player*

Baylor — Team Foul Total: 89

Player No: 01 — Foul Count: 4

| Game Date | Home | Visitor | QTR | Time Remaining | Foul Code | Officials Calling |
|---|---|---|---|---|---|---|
| 09/02/2011 | Baylor | TCU | 1 | 3:18 | UNS / DEA | FJ |
| 10/29/2011 | Oklahoma State | Baylor | 4 | 4:39 | OPI | SJ |
| 11/19/2011 | Baylor | Oklahoma | 4 | 9:39 | ILS | LJ |
| 11/26/2011 | Baylor | Texas Tech | 2 | 10:22 | FST | LJ |

Player No: 02 — Foul Count: 2

| Game Date | Home | Visitor | QTR | Time Remaining | Foul Code | Officials Calling |
|---|---|---|---|---|---|---|
| 09/24/2011 | Baylor | Rice | 1 | 9:40 | UNR / TGT | FJ |
| 11/05/2011 | Baylor | Missouri | 3 | 14:23 | FST | HL |

Player No: 03 — Foul Count: 4

| Game Date | Home | Visitor | QTR | Time Remaining | Foul Code | Officials Calling |
|---|---|---|---|---|---|---|
| 10/01/2011 | Kansas State | Baylor | 3 | 3:08 | BBW | R |
| 11/19/2011 | Baylor | Oklahoma | 3 | 7:22 | ISH | HL |
| 11/26/2011 | Baylor | Texas Tech | 4 | 13:04 | FST | LJ |
| 11/26/2011 | Baylor | Texas Tech | 4 | 8:01 | FST | LJ |

Player No: 04 — Foul Count: 5

| Game Date | Home | Visitor | QTR | Time Remaining | Foul Code | Officials Calling |
|---|---|---|---|---|---|---|
| 09/02/2011 | Baylor | TCU | 2 | 9:42 | DH | BJ |
| 09/02/2011 | Baylor | TCU | 4 | 12:29 | UNR / | HL SJ |

Coach Permission, View Reports,
Coach's Report, Foul per Quarter

| Team: Baylor | Total | Qtr 1 | Qtr 2 | Qtr 3 | Qtr 4 | OT |
|---|---|---|---|---|---|---|
| Defensive Pass Interference | 1 | 0 | 0 | 0 | 1 | 0 |
| Face Mask (15 Yards) | 1 | 1 | 0 | 0 | 0 | 0 |
| False Start | 2 | 0 | 0 | 2 | 0 | 0 |
| Illegal Substitution | 1 | 1 | 0 | 0 | 0 | 0 |
| Intentional Grounding | 1 | 0 | 0 | 1 | 0 | 0 |
| Hands to Face | 1 | 0 | 0 | 1 | 0 | 0 |
| Late Hit / Piling On | 1 | 0 | 0 | 1 | 0 | 0 |
| Team Totals | 8 | 2 | 0 | 5 | 1 | 0 |

Coach Permission, View Reports,
Submit Play for Review

Coach Permission, View Reports,
Submit Play for Review for Big 12 Conference with the Add New Record page open Coach Permission, View Reports,
Submit Play for Review for Big 12 Conference with the Edit Record page open Coach Permission, View Reports, Submit Play for Review for Atlantic Coast Conference showing Email alert button for the function for initiating an Email alert to the Coordinator Coach Permission, View Reports, Coach Evaluation Coach Permission, View Reports,
Coach Evaluation Login Page for National Coordinator National Coordinator Welcome Screen National Coordinator Menu Page

FIG. 148

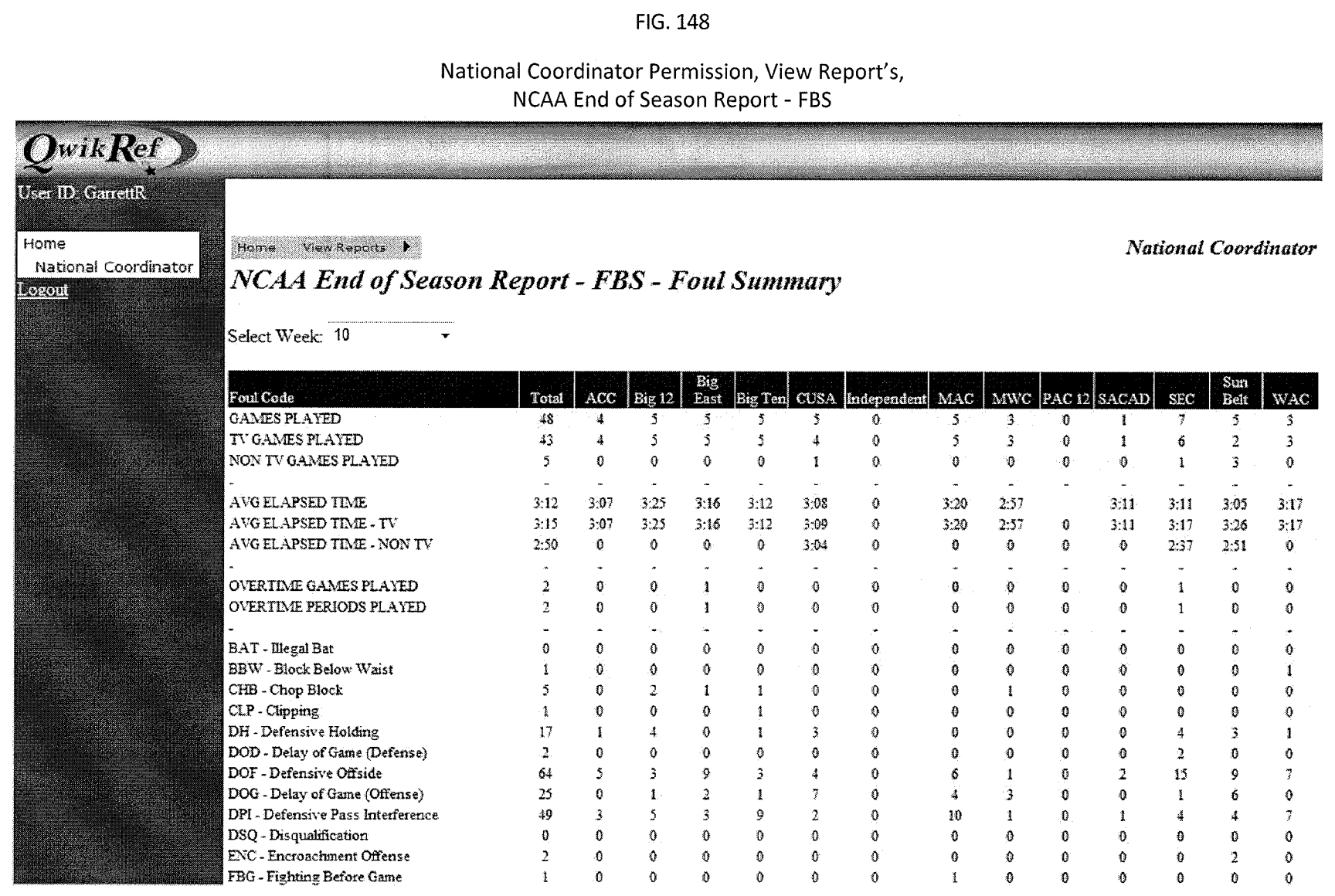

National Coordinator Permission, View Report's,
NCAA End of Season Report - FBS

QwikRef

User ID: GarrettR

Home
National Coordinator
Logout

Home View Reports

National Coordinator

NCAA End of Season Report - FBS - Foul Summary

Select Week: 10

| Foul Code | Total | ACC | Big 12 | Big East | Big Ten | CUSA | Independent | MAC | MWC | PAC 12 | SACAD | SEC | Sun Belt | WAC |
|---|---|---|---|---|---|---|---|---|---|---|---|---|---|---|
| GAMES PLAYED | 48 | 4 | 5 | 5 | 5 | 5 | 0 | 5 | 3 | 0 | 1 | 7 | 5 | 3 |
| TV GAMES PLAYED | 43 | 4 | 5 | 5 | 5 | 4 | 0 | 5 | 3 | 0 | 1 | 6 | 2 | 3 |
| NON TV GAMES PLAYED | 5 | 0 | 0 | 0 | 0 | 1 | 0 | 0 | 0 | 0 | 0 | 1 | 3 | 0 |
| - | - | - | - | - | - | - | - | - | - | - | - | - | - | - |
| AVG ELAPSED TIME | 3:12 | 3:07 | 3:25 | 3:16 | 3:12 | 3:08 | 0 | 3:20 | 2:57 | | 3:11 | 3:11 | 3:05 | 3:17 |
| AVG ELAPSED TIME - TV | 3:15 | 3:07 | 3:25 | 3:16 | 3:12 | 3:09 | 0 | 3:20 | 2:57 | 0 | 3:11 | 3:17 | 3:26 | 3:17 |
| AVG ELAPSED TIME - NON TV | 2:50 | 0 | 0 | 0 | 0 | 3:04 | 0 | 0 | 0 | 0 | 0 | 2:57 | 2:51 | 0 |
| - | - | - | - | - | - | - | - | - | - | - | - | - | - | - |
| OVERTIME GAMES PLAYED | 2 | 0 | 0 | 1 | 0 | 0 | 0 | 0 | 0 | 0 | 0 | 1 | 0 | 0 |
| OVERTIME PERIODS PLAYED | 2 | 0 | 0 | 1 | 0 | 0 | 0 | 0 | 0 | 0 | 0 | 1 | 0 | 0 |
| - | - | - | - | - | - | - | - | - | - | - | - | - | - | - |
| BAT - Illegal Bat | 0 | 0 | 0 | 0 | 0 | 0 | 0 | 0 | 0 | 0 | 0 | 0 | 0 | 0 |
| BBW - Block Below Waist | 1 | 0 | 0 | 0 | 0 | 0 | 0 | 0 | 0 | 0 | 0 | 0 | 0 | 1 |
| CHB - Chop Block | 5 | 0 | 2 | 1 | 1 | 0 | 0 | 0 | 1 | 0 | 0 | 0 | 0 | 0 |
| CLP - Clipping | 1 | 0 | 0 | 0 | 1 | 0 | 0 | 0 | 0 | 0 | 0 | 0 | 0 | 0 |
| DH - Defensive Holding | 17 | 1 | 4 | 0 | 1 | 3 | 0 | 0 | 0 | 0 | 0 | 4 | 3 | 1 |
| DOD - Delay of Game (Defense) | 2 | 0 | 0 | 0 | 0 | 0 | 0 | 0 | 0 | 0 | 0 | 2 | 0 | 0 |
| DOF - Defensive Offside | 64 | 5 | 3 | 9 | 3 | 4 | 0 | 6 | 1 | 0 | 2 | 15 | 9 | 7 |
| DOG - Delay of Game (Offense) | 25 | 0 | 1 | 2 | 1 | 7 | 0 | 4 | 3 | 0 | 0 | 1 | 6 | 0 |
| DPI - Defensive Pass Interference | 49 | 3 | 5 | 3 | 9 | 2 | 0 | 10 | 1 | 0 | 1 | 4 | 4 | 7 |
| DSQ - Disqualification | 0 | 0 | 0 | 0 | 0 | 0 | 0 | 0 | 0 | 0 | 0 | 0 | 0 | 0 |
| ENC - Encroachment Offense | 2 | 0 | 0 | 0 | 0 | 0 | 0 | 0 | 0 | 0 | 0 | 0 | 2 | 0 |
| FBG - Fighting Before Game | 1 | 0 | 0 | 0 | 0 | 0 | 0 | 1 | 0 | 0 | 0 | 0 | 0 | 0 |

FIG. 149

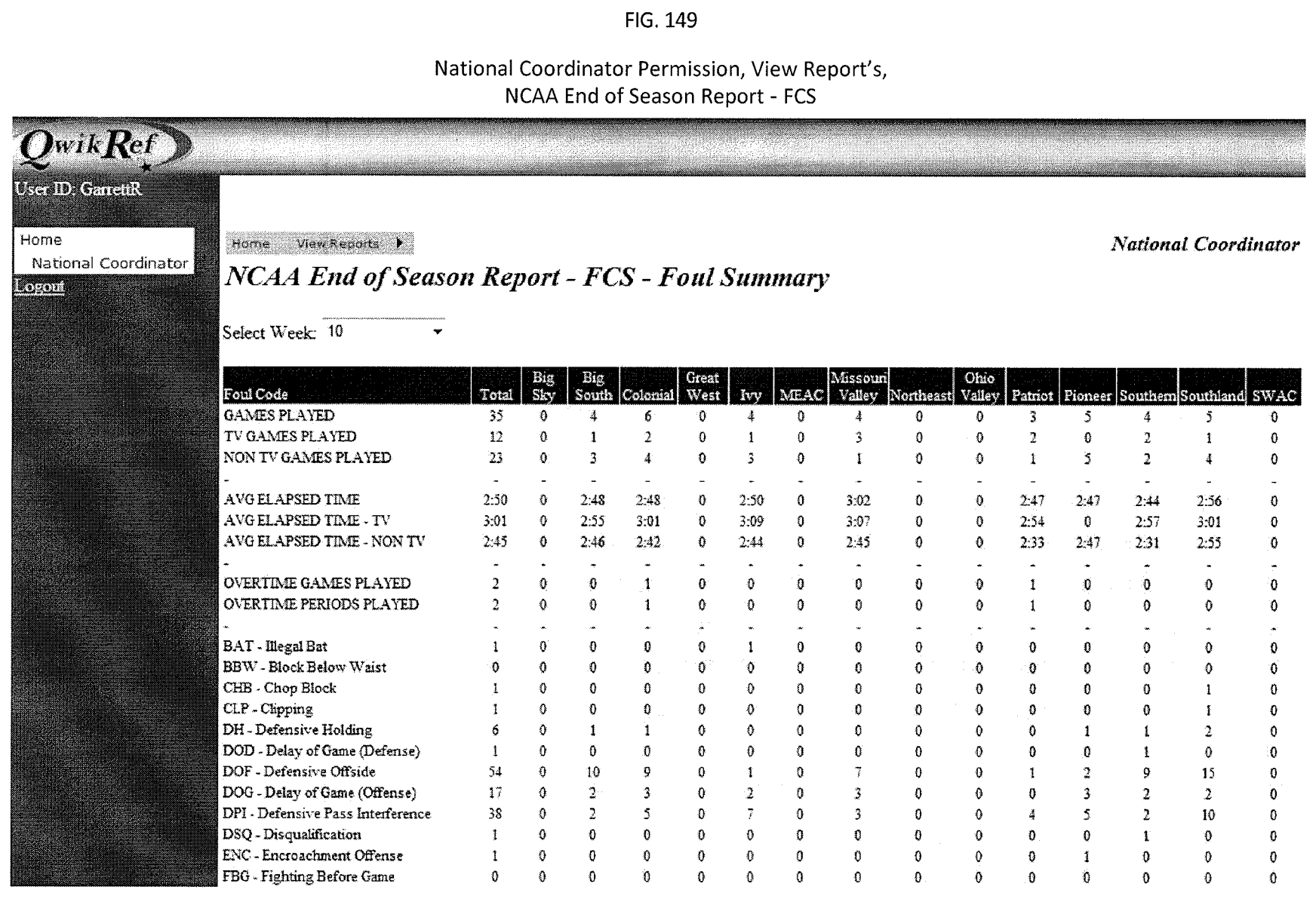

National Coordinator Permission, View Report's,
NCAA End of Season Report - FCS

QwikRef

User ID: GarrettR

Home
National Coordinator
Logout

Home View Reports

National Coordinator

NCAA End of Season Report - FCS - Foul Summary

Select Week: 10

| Foul Code | Total | Big Sky | Big South | Colonial | Great West | Ivy | MEAC | Missouri Valley | Northeast | Ohio Valley | Patriot | Pioneer | Southern | Southland | SWAC |
|---|---|---|---|---|---|---|---|---|---|---|---|---|---|---|---|
| GAMES PLAYED | 35 | 0 | 4 | 6 | 0 | 4 | 0 | 4 | 0 | 0 | 3 | 5 | 4 | 5 | 0 |
| TV GAMES PLAYED | 12 | 0 | 1 | 2 | 0 | 1 | 0 | 3 | 0 | 0 | 2 | 0 | 2 | 1 | 0 |
| NON TV GAMES PLAYED | 23 | 0 | 3 | 4 | 0 | 3 | 0 | 1 | 0 | 0 | 1 | 5 | 2 | 4 | 0 |
| - | - | - | - | - | - | - | - | - | - | - | - | - | - | - | - |
| AVG ELAPSED TIME | 2:50 | 0 | 2:48 | 2:48 | 0 | 2:50 | 0 | 3:02 | 0 | 0 | 2:47 | 2:47 | 2:44 | 2:56 | 0 |
| AVG ELAPSED TIME - TV | 3:01 | 0 | 2:55 | 3:01 | 0 | 3:09 | 0 | 3:07 | 0 | 0 | 2:54 | 0 | 2:57 | 3:01 | 0 |
| AVG ELAPSED TIME - NON TV | 2:45 | 0 | 2:46 | 2:42 | 0 | 2:44 | 0 | 2:45 | 0 | 0 | 2:33 | 2:47 | 2:31 | 2:55 | 0 |
| - | - | - | - | - | - | - | - | - | - | - | - | - | - | - | - |
| OVERTIME GAMES PLAYED | 2 | 0 | 0 | 1 | 0 | 0 | 0 | 0 | 0 | 0 | 1 | 0 | 0 | 0 | 0 |
| OVERTIME PERIODS PLAYED | 2 | 0 | 0 | 1 | 0 | 0 | 0 | 0 | 0 | 0 | 1 | 0 | 0 | 0 | 0 |
| - | - | - | - | - | - | - | - | - | - | - | - | - | - | - | - |
| BAT - Illegal Bat | 1 | 0 | 0 | 0 | 0 | 1 | 0 | 0 | 0 | 0 | 0 | 0 | 0 | 0 | 0 |
| BBW - Block Below Waist | 0 | 0 | 0 | 0 | 0 | 0 | 0 | 0 | 0 | 0 | 0 | 0 | 0 | 0 | 0 |
| CHB - Chop Block | 1 | 0 | 0 | 0 | 0 | 0 | 0 | 0 | 0 | 0 | 0 | 0 | 0 | 1 | 0 |
| CLP - Clipping | 1 | 0 | 0 | 0 | 0 | 0 | 0 | 0 | 0 | 0 | 0 | 0 | 0 | 1 | 0 |
| DH - Defensive Holding | 6 | 0 | 1 | 1 | 0 | 0 | 0 | 0 | 0 | 0 | 0 | 1 | 1 | 2 | 0 |
| DOD - Delay of Game (Defense) | 1 | 0 | 0 | 0 | 0 | 0 | 0 | 0 | 0 | 0 | 0 | 0 | 1 | 0 | 0 |
| DOF - Defensive Offside | 54 | 0 | 10 | 9 | 0 | 1 | 0 | 7 | 0 | 0 | 1 | 2 | 9 | 15 | 0 |
| DOG - Delay of Game (Offense) | 17 | 0 | 2 | 3 | 0 | 2 | 0 | 3 | 0 | 0 | 0 | 3 | 2 | 2 | 0 |
| DPI - Defensive Pass Interference | 38 | 0 | 2 | 5 | 0 | 7 | 0 | 3 | 0 | 0 | 4 | 5 | 2 | 10 | 0 |
| DSQ - Disqualification | 1 | 0 | 0 | 0 | 0 | 0 | 0 | 0 | 0 | 0 | 0 | 0 | 1 | 0 | 0 |
| ENC - Encroachment Offense | 1 | 0 | 0 | 0 | 0 | 0 | 0 | 0 | 0 | 0 | 0 | 1 | 0 | 0 | 0 |
| FBG - Fighting Before Game | 0 | 0 | 0 | 0 | 0 | 0 | 0 | 0 | 0 | 0 | 0 | 0 | 0 | 0 | 0 |

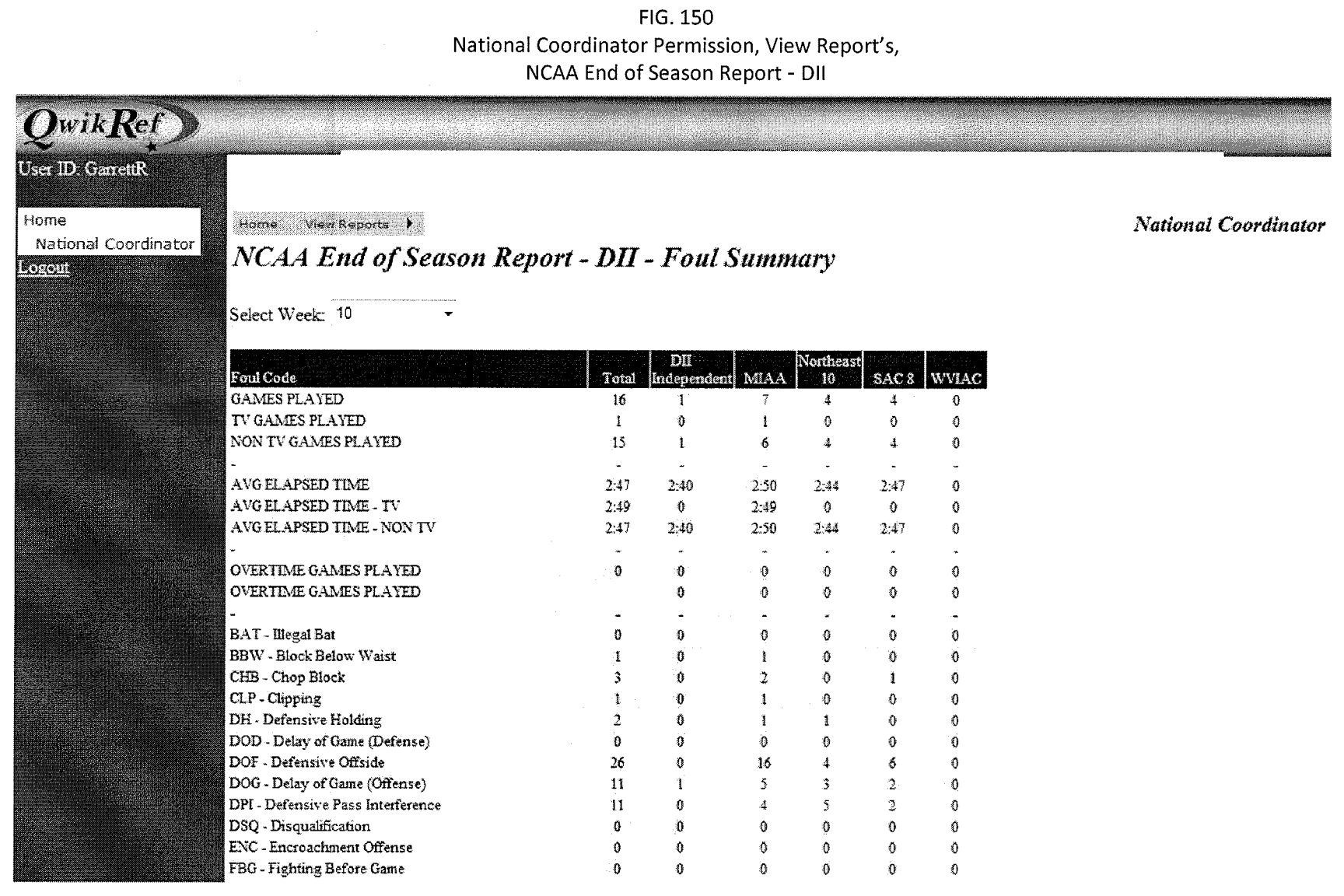

FIG. 150
National Coordinator Permission, View Report's,
NCAA End of Season Report - DII QwikRef User ID: GarrettR Home
National Coordinator
Logout Home View Reports National Coordinator

*NCAA End of Season Report - DII - Foul Summary*

Select Week: 10

| Foul Code | Total | DII Independent | MIAA | Northeast 10 | SAC 8 | WVIAC |
|---|---|---|---|---|---|---|
| GAMES PLAYED | 16 | 1 | 7 | 4 | 4 | 0 |
| TV GAMES PLAYED | 1 | 0 | 1 | 0 | 0 | 0 |
| NON TV GAMES PLAYED | 15 | 1 | 6 | 4 | 4 | 0 |
| - | - | - | - | - | - | - |
| AVG ELAPSED TIME | 2:47 | 2:40 | 2:50 | 2:44 | 2:47 | 0 |
| AVG ELAPSED TIME - TV | 2:49 | 0 | 2:49 | 0 | 0 | 0 |
| AVG ELAPSED TIME - NON TV | 2:47 | 2:40 | 2:50 | 2:44 | 2:47 | 0 |
| - | - | - | - | - | - | - |
| OVERTIME GAMES PLAYED | 0 | 0 | 0 | 0 | 0 | 0 |
| OVERTIME GAMES PLAYED | | 0 | 0 | 0 | 0 | 0 |
| - | - | - | - | - | - | - |
| BAT - Illegal Bat | 0 | 0 | 0 | 0 | 0 | 0 |
| BBW - Block Below Waist | 1 | 0 | 1 | 0 | 0 | 0 |
| CHB - Chop Block | 3 | 0 | 2 | 0 | 1 | 0 |
| CLP - Clipping | 1 | 0 | 1 | 0 | 0 | 0 |
| DH - Defensive Holding | 2 | 0 | 1 | 1 | 0 | 0 |
| DOD - Delay of Game (Defense) | 0 | 0 | 0 | 0 | 0 | 0 |
| DOF - Defensive Offside | 26 | 0 | 16 | 4 | 6 | 0 |
| DOG - Delay of Game (Offense) | 11 | 1 | 5 | 3 | 2 | 0 |
| DPI - Defensive Pass Interference | 11 | 0 | 4 | 5 | 2 | 0 |
| DSQ - Disqualification | 0 | 0 | 0 | 0 | 0 | 0 |
| ENC - Encroachment Offense | 0 | 0 | 0 | 0 | 0 | 0 |
| FBG - Fighting Before Game | 0 | 0 | 0 | 0 | 0 | 0 |

FIG. 151

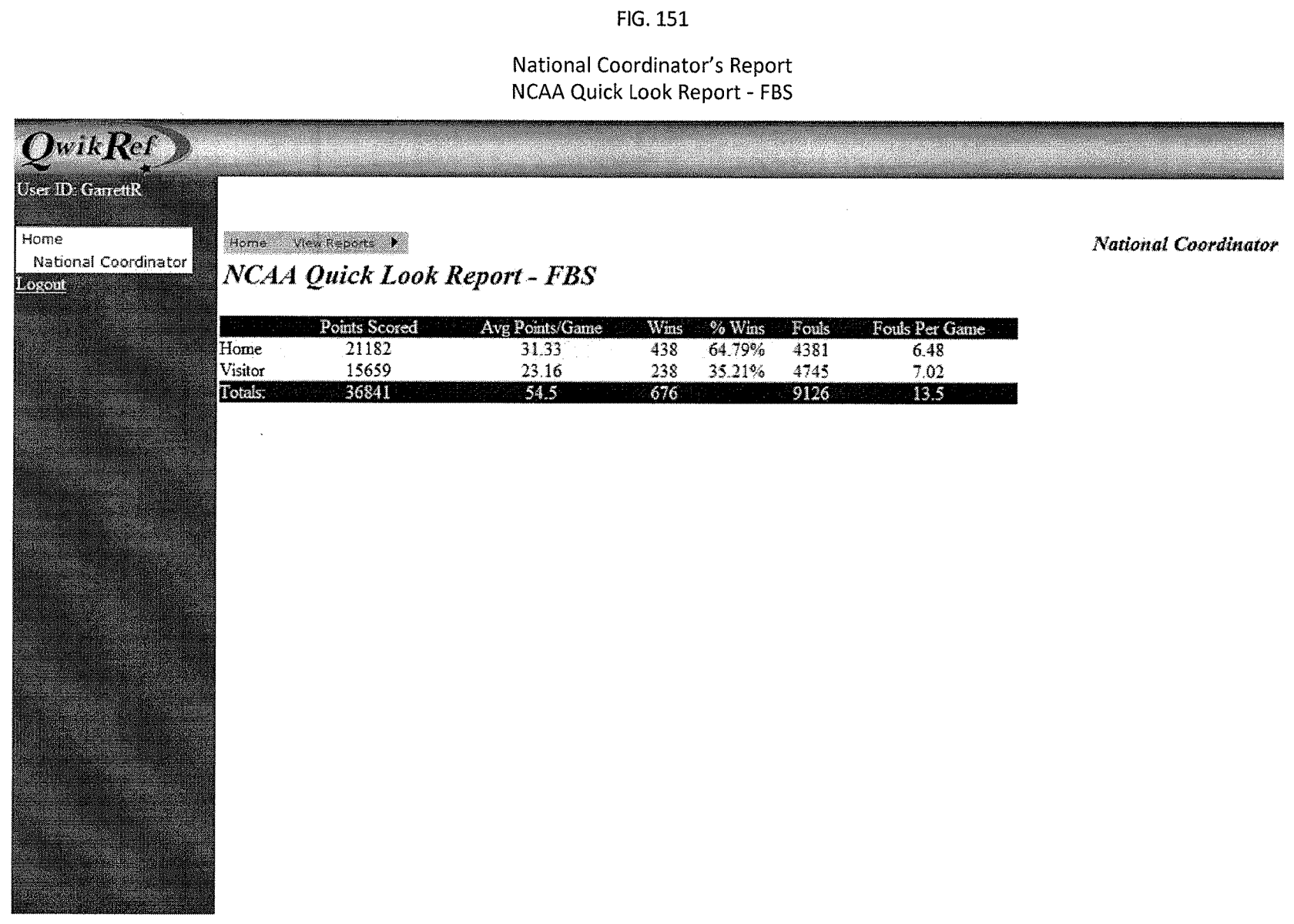

National Coordinator's Report
NCAA Quick Look Report - FBS

QwikRef

User ID: GarrettR

Home
National Coordinator
Logout

Home View Reports

*National Coordinator*

*NCAA Quick Look Report - FBS*

| | Points Scored | Avg Points/Game | Wins | % Wins | Fouls | Fouls Per Game |
|---|---|---|---|---|---|---|
| Home | 21182 | 31.33 | 438 | 64.79% | 4381 | 6.48 |
| Visitor | 15659 | 23.16 | 238 | 35.21% | 4745 | 7.02 |
| Totals: | 36841 | 54.5 | 676 | | 9126 | 13.5 |

National Coordinator's Report
NCAA Quick Look Report - FCS

| | Points Scored | Avg Points/Game | Wins | % Wins | Fouls | Fouls Per Game |
|---|---|---|---|---|---|---|
| Home | 11254 | 29.69 | 243 | 64.12% | 2656 | 7.01 |
| Visitor | 8601 | 22.69 | 136 | 35.88% | 2609 | 6.88 |
| Totals: | 19855 | 52.39 | 379 | | 5265 | 13.89 |

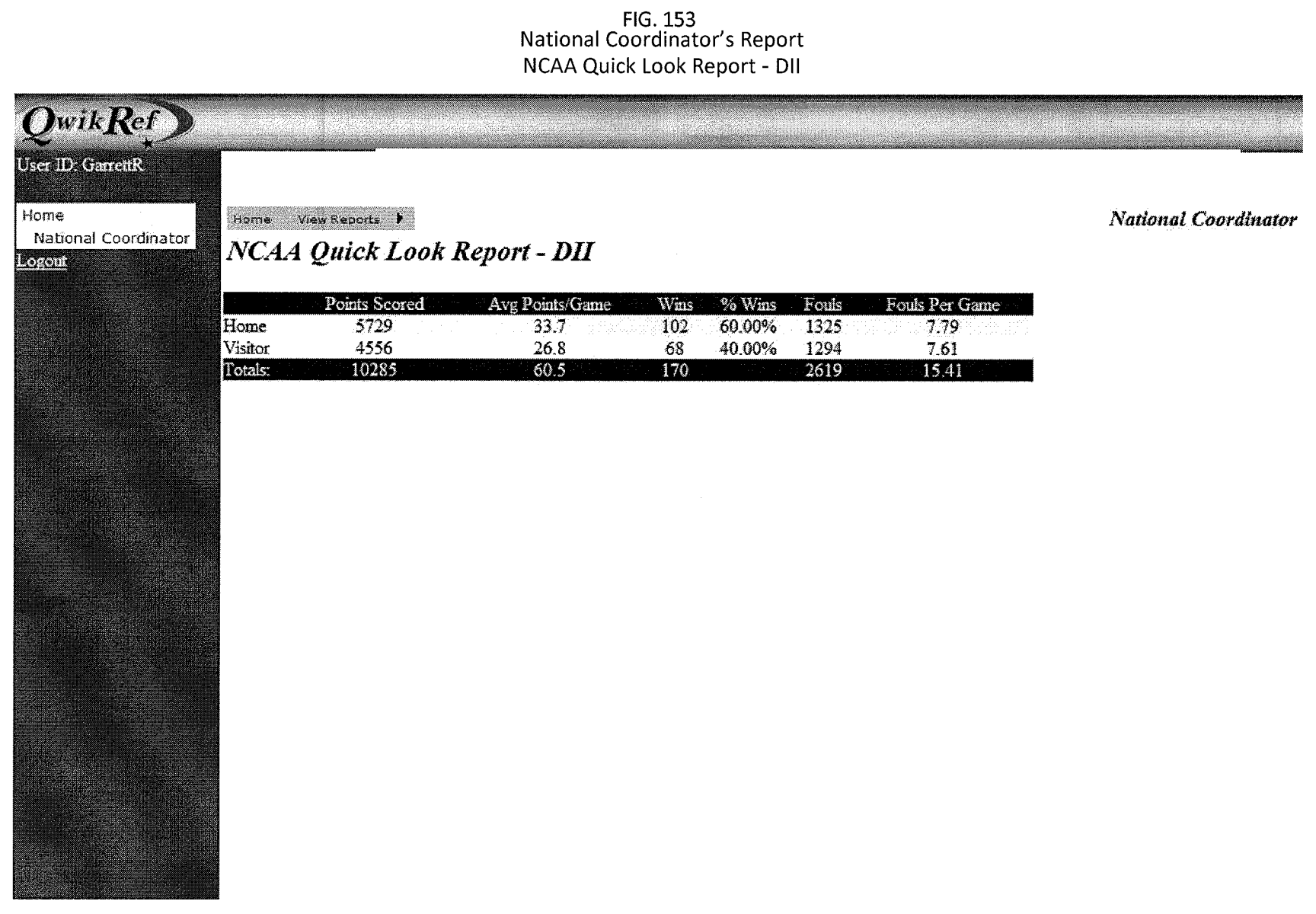

FIG. 153
National Coordinator's Report
NCAA Quick Look Report - DII

QwikRef

User ID: GarrettR

Home
National Coordinator
Logout

Home View Reports

National Coordinator

NCAA Quick Look Report - DII

| | Points Scored | Avg Points/Game | Wins | % Wins | Fouls | Fouls Per Game |
|---|---|---|---|---|---|---|
| Home | 5729 | 33.7 | 102 | 60.00% | 1325 | 7.79 |
| Visitor | 4556 | 26.8 | 68 | 40.00% | 1294 | 7.61 |
| Totals: | 10285 | 60.5 | 170 | | 2619 | 15.41 |

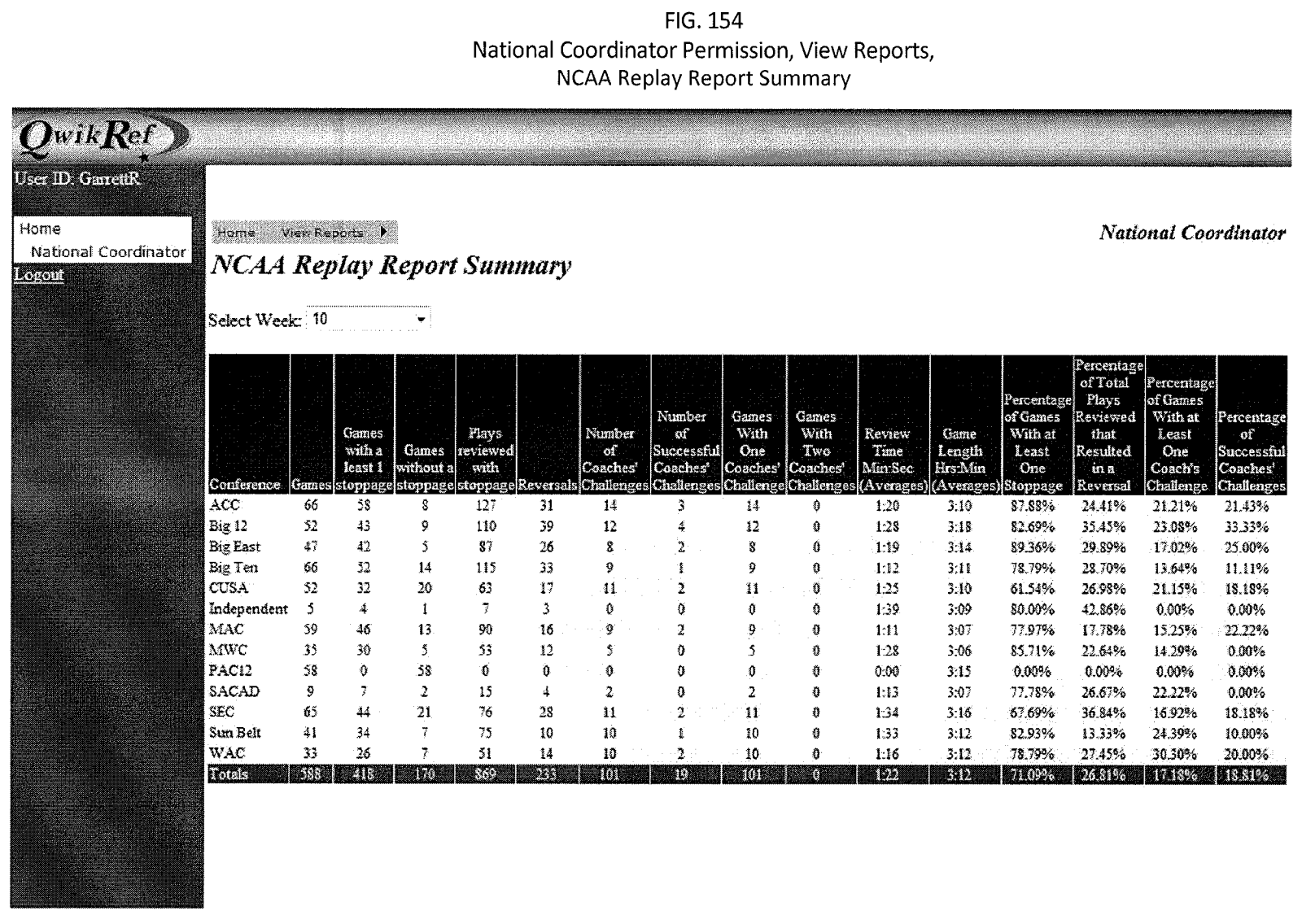

FIG. 154
National Coordinator Permission, View Reports,
NCAA Replay Report Summary QwikRef User ID: GarrettR Home
National Coordinator
Logout Home View Reports National Coordinator

NCAA Replay Report Summary

Select Week: 10

| Conference | Games | Games with a least 1 stoppage | Games without a stoppage | Plays reviewed with stoppage | Reversals | Number of Coaches' Challenges | Number of Successful Coaches' Challenges | Games With One Coaches' Challenge | Games With Two Coaches' Challenges | Review Time Min:Sec (Averages) | Game Length Hrs:Min (Averages) | Percentage of Games With at Least One Stoppage | Percentage of Total Plays Reviewed that Resulted in a Reversal | Percentage of Games With at Least One Coach's Challenge | Percentage of Successful Coaches' Challenges |
|---|---|---|---|---|---|---|---|---|---|---|---|---|---|---|---|
| ACC | 66 | 58 | 8 | 127 | 31 | 14 | 3 | 14 | 0 | 1:20 | 3:10 | 87.88% | 24.41% | 21.21% | 21.43% |
| Big 12 | 52 | 43 | 9 | 110 | 39 | 12 | 4 | 12 | 0 | 1:28 | 3:18 | 82.69% | 35.45% | 23.08% | 33.33% |
| Big East | 47 | 42 | 5 | 87 | 26 | 8 | 2 | 8 | 0 | 1:19 | 3:14 | 89.36% | 29.89% | 17.02% | 25.00% |
| Big Ten | 66 | 52 | 14 | 115 | 33 | 9 | 1 | 9 | 0 | 1:12 | 3:11 | 78.79% | 28.70% | 13.64% | 11.11% |
| CUSA | 52 | 32 | 20 | 63 | 17 | 11 | 2 | 11 | 0 | 1:25 | 3:10 | 61.54% | 26.98% | 21.15% | 18.18% |
| Independent | 5 | 4 | 1 | 7 | 3 | 0 | 0 | 0 | 0 | 1:39 | 3:09 | 80.00% | 42.86% | 0.00% | 0.00% |
| MAC | 59 | 46 | 13 | 90 | 16 | 9 | 2 | 9 | 0 | 1:11 | 3:07 | 77.97% | 17.78% | 15.25% | 22.22% |
| MWC | 35 | 30 | 5 | 53 | 12 | 5 | 0 | 5 | 0 | 1:28 | 3:06 | 85.71% | 22.64% | 14.29% | 0.00% |
| PAC12 | 58 | 0 | 58 | 0 | 0 | 0 | 0 | 0 | 0 | 0:00 | 3:15 | 0.00% | 0.00% | 0.00% | 0.00% |
| SACAD | 9 | 7 | 2 | 15 | 4 | 2 | 0 | 2 | 0 | 1:13 | 3:07 | 77.78% | 26.67% | 22.22% | 0.00% |
| SEC | 65 | 44 | 21 | 76 | 28 | 11 | 2 | 11 | 0 | 1:34 | 3:16 | 67.69% | 36.84% | 16.92% | 18.18% |
| Sun Belt | 41 | 34 | 7 | 75 | 10 | 10 | 1 | 10 | 0 | 1:33 | 3:12 | 82.93% | 13.33% | 24.39% | 10.00% |
| WAC | 33 | 26 | 7 | 51 | 14 | 10 | 2 | 10 | 0 | 1:16 | 3:12 | 78.79% | 27.45% | 30.30% | 20.00% |
| Totals | 588 | 418 | 170 | 869 | 233 | 101 | 19 | 101 | 0 | 1:22 | 3:12 | 71.09% | 26.81% | 17.18% | 18.81% |

National Coordinator Permission, View Reports,
View Replay Reports

National Coordinator Permission, View Reports, View Replay Report Details

National Coordinator Permission, View Reports, Coach's Challenge Summary

National Coordinator Permission, View Reports, Coach Challenge Detail

National Coordinator Permission, View Reports, Replay Stoppage Report

FIG. 160

National Coordinator Permission, View Reports, View Replay Report, View Replay Review Times

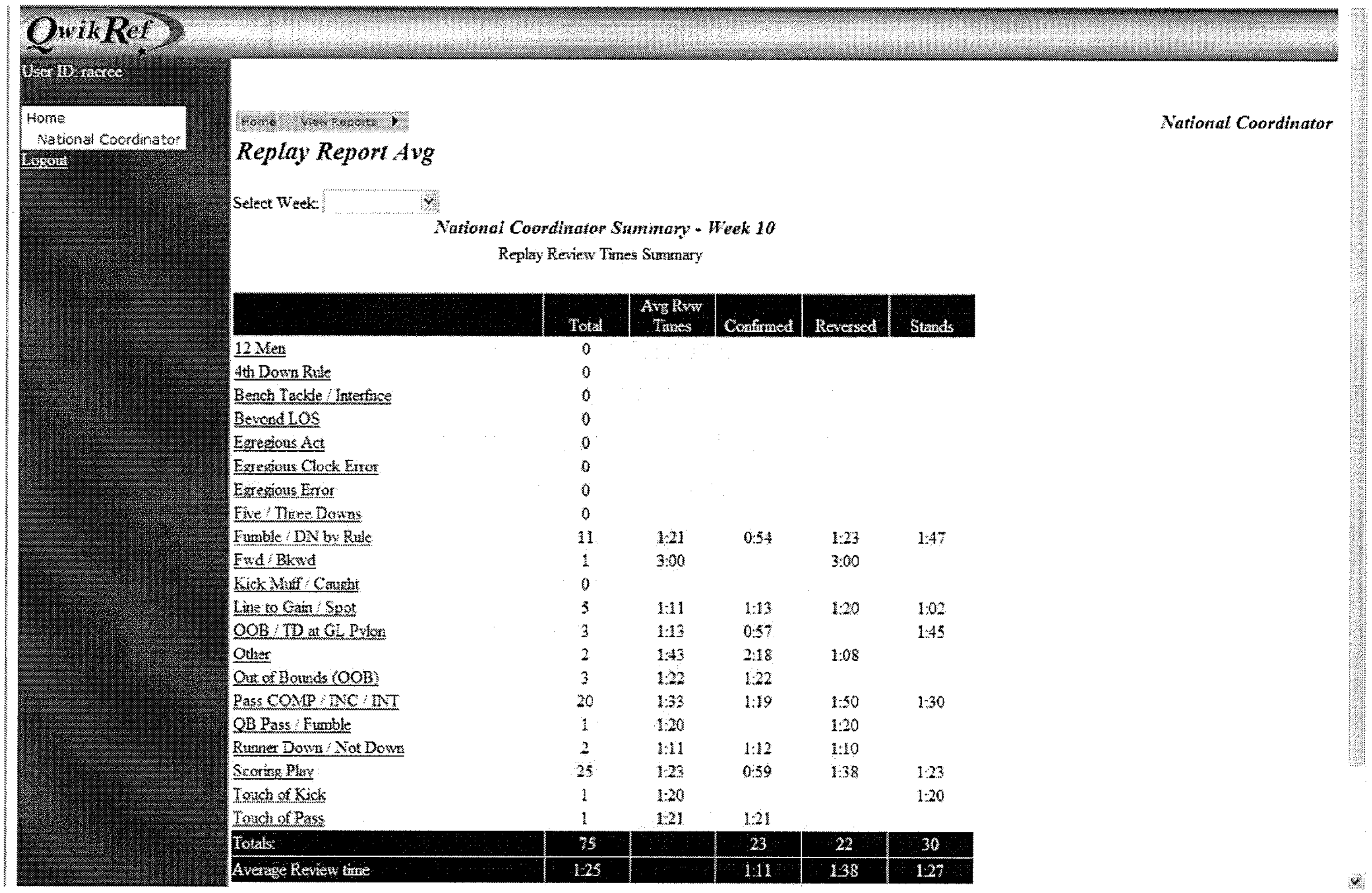

| | Total | Avg Rvw Times | Confirmed | Reversed | Stands |
|---|---|---|---|---|---|
| 12 Men | 0 | | | | |
| 4th Down Rule | 0 | | | | |
| Bench Tackle / Interfnce | 0 | | | | |
| Beyond LOS | 0 | | | | |
| Egregious Act | 0 | | | | |
| Egregious Clock Error | 0 | | | | |
| Egregious Error | 0 | | | | |
| Five / Three Downs | 0 | | | | |
| Fumble / DN by Rule | 11 | 1:21 | 0:54 | 1:23 | 1:47 |
| Fwd / Bkwd | 1 | 3:00 | | 3:00 | |
| Kick Muff / Caught | 0 | | | | |
| Line to Gain / Spot | 5 | 1:11 | 1:13 | 1:20 | 1:02 |
| OOB / TD at GL Pylon | 3 | 1:13 | 0:57 | | 1:45 |
| Other | 2 | 1:43 | 2:18 | 1:08 | |
| Out of Bounds (OOB) | 3 | 1:22 | 1:22 | | |
| Pass COMP / INC / INT | 20 | 1:33 | 1:19 | 1:50 | 1:30 |
| QB Pass / Fumble | 1 | 1:20 | | 1:20 | |
| Runner Down / Not Down | 2 | 1:11 | 1:12 | 1:10 | |
| Scoring Play | 25 | 1:23 | 0:59 | 1:38 | 1:23 |
| Touch of Kick | 1 | 1:20 | | | 1:20 |
| Touch of Pass | 1 | 1:21 | 1:21 | | |
| Totals: | 75 | | 23 | 22 | 30 |
| Average Review time | 1:25 | | 1:11 | 1:38 | 1:27 |

FIG. 161

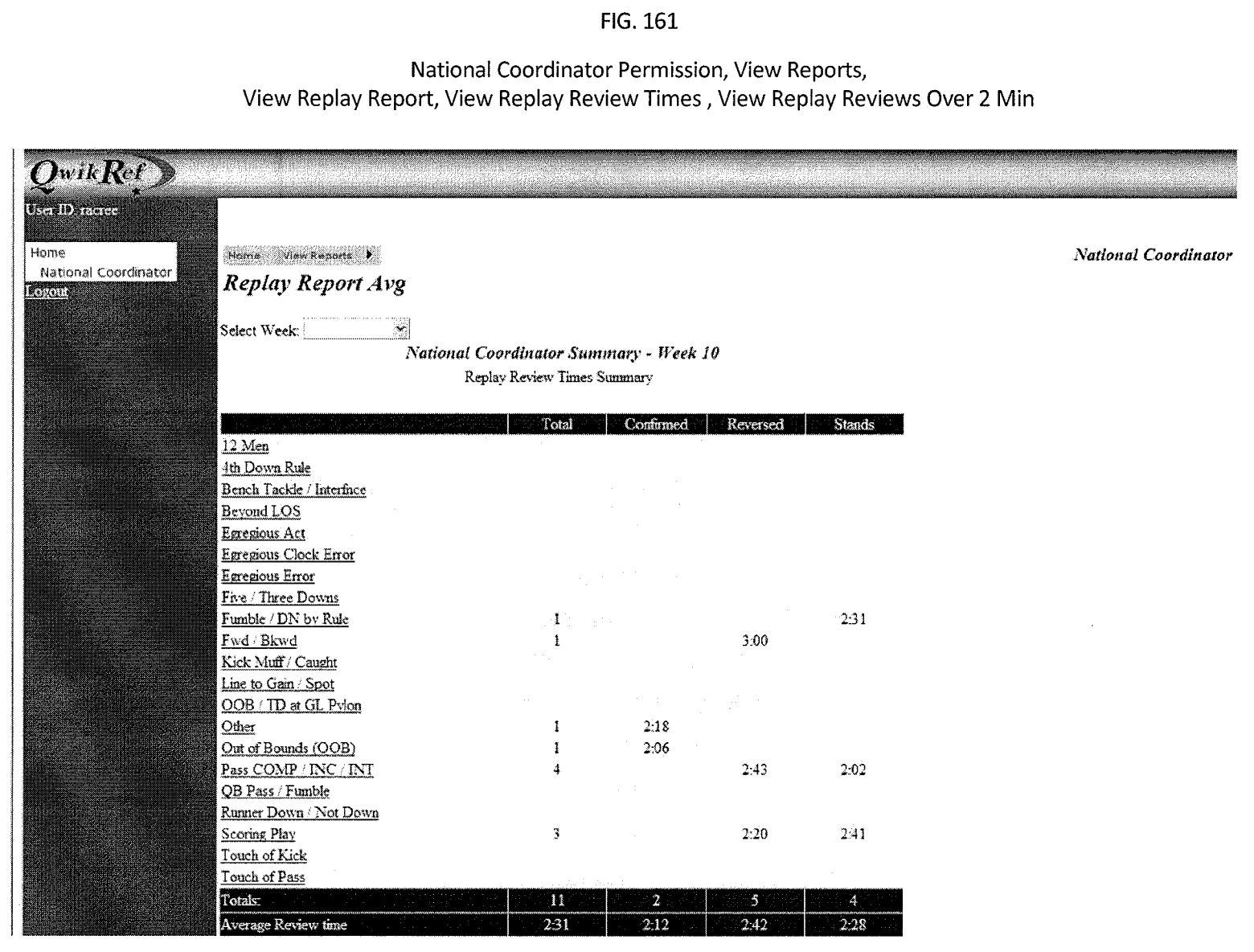

National Coordinator Permission, View Reports,
View Replay Report, View Replay Review Times , View Replay Reviews Over 2 Min QwikRef User ID: racree Home
National Coordinator
Logout Home View Reports

*National Coordinator*

*Replay Report Avg*

Select Week:

*National Coordinator Summary - Week 10*

Replay Review Times Summary

| | Total | Confirmed | Reversed | Stands |
|---|---|---|---|---|
| 12 Men | | | | |
| 4th Down Rule | | | | |
| Bench Tackle / Interfnce | | | | |
| Beyond LOS | | | | |
| Egregious Act | | | | |
| Egregious Clock Error | | | | |
| Egregious Error | | | | |
| Five / Three Downs | | | | |
| Fumble / DN by Rule | 1 | | | 2:31 |
| Fwd / Bkwd | 1 | | 3:00 | |
| Kick Muff / Caught | | | | |
| Line to Gain / Spot | | | | |
| OOB / TD at GL Pylon | | | | |
| Other | 1 | 2:18 | | |
| Out of Bounds (OOB) | 1 | 2:06 | | |
| Pass COMP / INC / INT | 4 | | 2:43 | 2:02 |
| QB Pass / Fumble | | | | |
| Runner Down / Not Down | | | | |
| Scoring Play | 3 | | 2:20 | 2:41 |
| Touch of Kick | | | | |
| Touch of Pass | | | | |
| Totals: | 11 | 2 | 5 | 4 |
| Average Review time | 2:31 | 2:12 | 2:42 | 2:28 |

Atlantic Coast Conference, Commissioner Menu Page

FIG. 163

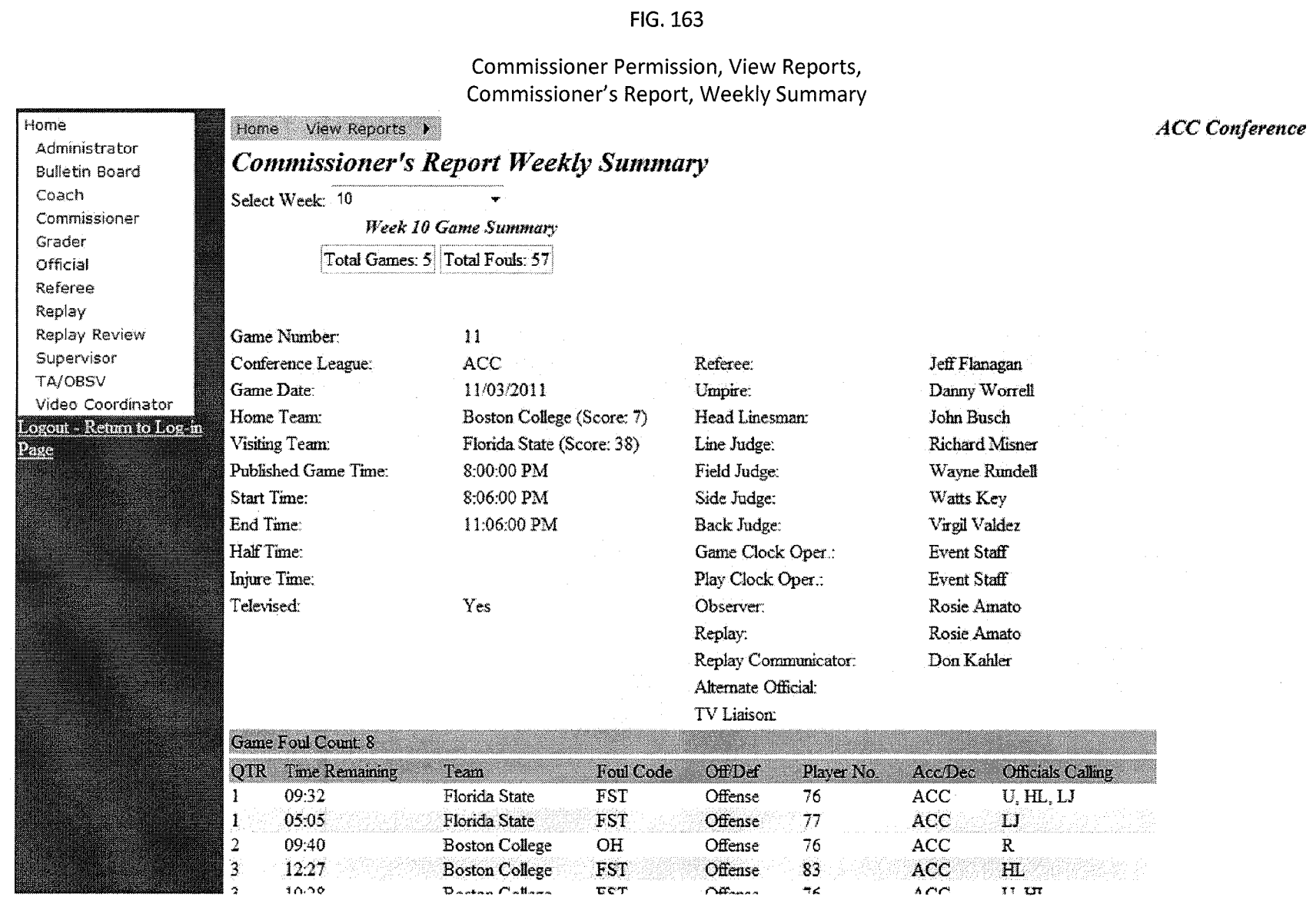

Commissioner Permission, View Reports, Commissioner's Report, Weekly Summary

Home
Administrator
Bulletin Board
Coach
Commissioner
Grader
Official
Referee
Replay
Replay Review
Supervisor
TA/OBSV
Video Coordinator
Logout - Return to Log-in Page Home View Reports

*ACC Conference*

*Commissioner's Report Weekly Summary*

Select Week: 10

*Week 10 Game Summary*

Total Games: 5 | Total Fouls: 57

| | | | |
|---|---|---|---|
| Game Number: | 11 | | |
| Conference League: | ACC | Referee: | Jeff Flanagan |
| Game Date: | 11/03/2011 | Umpire: | Danny Worrell |
| Home Team: | Boston College (Score: 7) | Head Linesman: | John Busch |
| Visiting Team: | Florida State (Score: 38) | Line Judge: | Richard Misner |
| Published Game Time: | 8:00:00 PM | Field Judge: | Wayne Rundell |
| Start Time: | 8:06:00 PM | Side Judge: | Watts Key |
| End Time: | 11:06:00 PM | Back Judge: | Virgil Valdez |
| Half Time: | | Game Clock Oper.: | Event Staff |
| Injure Time: | | Play Clock Oper.: | Event Staff |
| Televised: | Yes | Observer: | Rosie Amato |
| | | Replay: | Rosie Amato |
| | | Replay Communicator: | Don Kahler |
| | | Alternate Official: | |
| | | TV Liaison: | |

Game Foul Count: 8

| QTR | Time Remaining | Team | Foul Code | Off/Def | Player No. | Acc/Dec | Officials Calling |
|---|---|---|---|---|---|---|---|
| 1 | 09:32 | Florida State | FST | Offense | 76 | ACC | U, HL, LJ |
| 1 | 05:05 | Florida State | FST | Offense | 77 | ACC | LJ |
| 2 | 09:40 | Boston College | OH | Offense | 76 | ACC | R |
| 3 | 12:27 | Boston College | FST | Offense | 83 | ACC | HL |

Split screen display showing integration of data and associated video on the same screen Split screen display showing integration of data and associated video on the same screen TA/Observer Permission Navigation page for Atlantic Coast Conference with Find Games menu open TA/Observer Permission, Find Games, Submit TA Report for Atlantic Coast Conference with data populated TA/Observer Permission, Find Games, Submit Hot Sheet Plays for Atlantic Coast Conference with the submit play data entry open TA/Observer Permission, Find Games, Submit Game Report for the Atlantic Coast Conference with data populated Basketball Application, Evaluator Permission,
Game Evaluation Page Basketball Application, Media Liaison Permission,
TV Timeout Page Basketball Application, Supervisor Permission,
General Statistics Report

SYSTEM AND METHOD OF PENALTY DATA COMPILATION, ANALYSIS AND REPORT GENERATION

CROSS-REFERENCE TO RELATED APPLICATION

This application is a continuation of U.S. application Ser. No. 16/780,455 filed Feb. 3, 2020, which is a continuation of Ser. No. 15/664,573 filed Jul. 31, 2017, which is a continuation of U.S. application Ser. No. 13/843,027 filed Mar. 15, 2013, which is a continuation-in-part of U.S. application Ser. No. 13/328,195 filed Dec. 16, 2011, which is a continuation-in-part of U.S. application Ser. No. 12/334,439 filed Dec. 12, 2008, which claims the benefit of priority to U.S. Provisional Patent Application No. 60/996,962, filed Dec. 12, 2007; all of which are incorporated herein in their entireties by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to a system and method for reviewing and evaluating performance. In particular, the present invention relates to a system and method for reviewing and evaluating performances of an official or group of officials at an event or events. Even more specifically, according to embodiments of the present invention, the system and method can involve reviewing and evaluating a referee's performance in a football game or games by storing and/or automatically determining and providing access to video clips of specific plays or sub-events that occur during a game or larger event.

SUMMARY

According to embodiments of the present invention, a method for reviewing, analyzing, assessing, and evaluating performance can include (i.e., comprise) the steps of receiving data from various sources; storing the received data; accessing the stored data; displaying the data; compiling customized reports using the data; and submitting grades and comments for a performance. The method may also include submitting a performance to be reviewed and evaluated. The data that is received and stored can also include, for example, game information, rosters of officials for associated games, and assignments for each official in each roster. Further, game information, rosters of officials for associated games, and assignments for each person in each roster may be received in advance of the game. The data that is received and stored can also include, but is not limited to, penalty data, replay stoppage data, grader/evaluator data, coaches plays for review by a coordinator or a supervisor of officials, associated video data, and technical advisor (TA) data. A TA may be a person who attends a game and evaluates a crew of officials from onsite at the game and/or later during video reviews of the game. In various embodiments, a performance and/or conduct to be reviewed and evaluated may be with respect to a play or set of plays officiated by a crew of officials or an individual official. For example, the data can relate to penalties assessed during a football game by a referee or group of referees. The data can be accessed to evaluate the performances of the referees. Based on the evaluation, grades and/or comments associated with the performance can be submitted, and customized reports can be compiled and displayed from the data. Thus, the system may facilitate on-field performance evaluation, training, and assessment of crews and individual officials by a grader, evaluator, a coordinator, or a supervisor.

The system for reviewing and evaluating performance according to embodiments of the present invention can include means for storing data, means for processing, means for displaying, means for analyzing and assessing data, and means for accessing and inputting data. The system may also include means for transmitting data to and from the means for storing data. The means for accessing and inputting data can receive various types of data from various sources. The received data can then be stored in the means for storing data. The means for accessing and inputting data can also receive inputs to access data stored in the means for storing data. Further, the means for accessing and inputting data can both receive a submission for a performance to be reviewed and evaluated and receive a submission of grades and comments relating to performance.

While the disclosure and drawings show the system and method being implemented with American college football games and referees, such disclosure should not be construed as limiting the implementation of the system and method solely to the college football realm. The exemplification of college football is merely for illustrative purposes, and is in no way meant to limit the implementation of the system and method to college football or a particular division, conference, or team within college football. Rather, the system and method can be used at least with the following football levels: professional, college, high school, club football, and flag football. Moreover, the system and method can be used in any suitable sport and/or contest where it may be necessary or desirable to collect, display and compile penalty/foul data; review, analyze, assess, and evaluate an official's performance and/or enter and store data pertaining to the game; submit plays for review by coaches and/or responses by a coordinator or supervisor of officials. For example, the system and method can be used with, but not limited to, the following sports and their respective officials: football, soccer, field and ice hockey, basketball, baseball, lacrosse, rugby, mixed martial arts (MMA), Olympic games, etc. Also note that while the term "referee" is used generically to denote a football official, the term is intended to encompass all football officials, including, but not limited to, referees, umpires, head linesman, line judges, side judges, back judges, replay officials, replay communicators, chain persons, etc. Furthermore, the term "penalty," which may be used in the realm of football, is intended to encompass fouls, infractions, violations, and any calls in other realms (e.g., a "strike" or "ball" call or "out" determination in baseball), and any other suitable nomenclature.

BRIEF DESCRIPTION OF THE DRAWINGS

The accompanying drawings, which are incorporated in and constitute a part of this specification, illustrate embodiments of the invention. The invention will be best understood by reading the ensuing specification in conjunction with the drawings.

FIG. 38 is a screen shot of a referee permission, view reports, view graders comments display, in accordance with an embodiment of the present invention.

FIG. 61 is a screen shot of a national coordinator's report, foul description tab, in accordance with an embodiment of the present invention.

FIG. 67 is a screen shot of a national coordinator's report, position foul report, line judges display, in accordance with an embodiment of the present invention.

FIG. 68 is a screen shot of a national coordinator's report, view NCAA replay report summary display, in accordance with an embodiment of the present invention.

FIG. 69 is a screen shot of a national coordinator's report, view replay reports summary display, in accordance with an embodiment of the present invention.

FIG. 71 is a screen shot of a national coordinator's report, view replay reports, view coach's challenges summary display, in accordance with an embodiment of the present invention.

FIG. 82 is a screen shot of a supervisor permission, find games, schedule games page that is displayed after selecting the schedule games option directly under the find games option, in accordance with an embodiment of the present invention.

FIG. 94 is a screen shot of supervisor permission, find games, view coach's plays for review from FIG. 92 for the Big 12 Conference that is displayed after selecting the 11/5/2011—Iowa State v. Kansas game from the drop down menu in FIG. 91 and selecting the Edit Record button in FIG. 92 to allow the user to open the data entry screen for responding to a Coach's entry of a play for review, including identifying the position of the official involved in the review, the name of the official involved in the play and the foul type involved in the play with foul type, position involved and name of the official displayed in accordance with an embodiment of the present invention.

Figure 98:
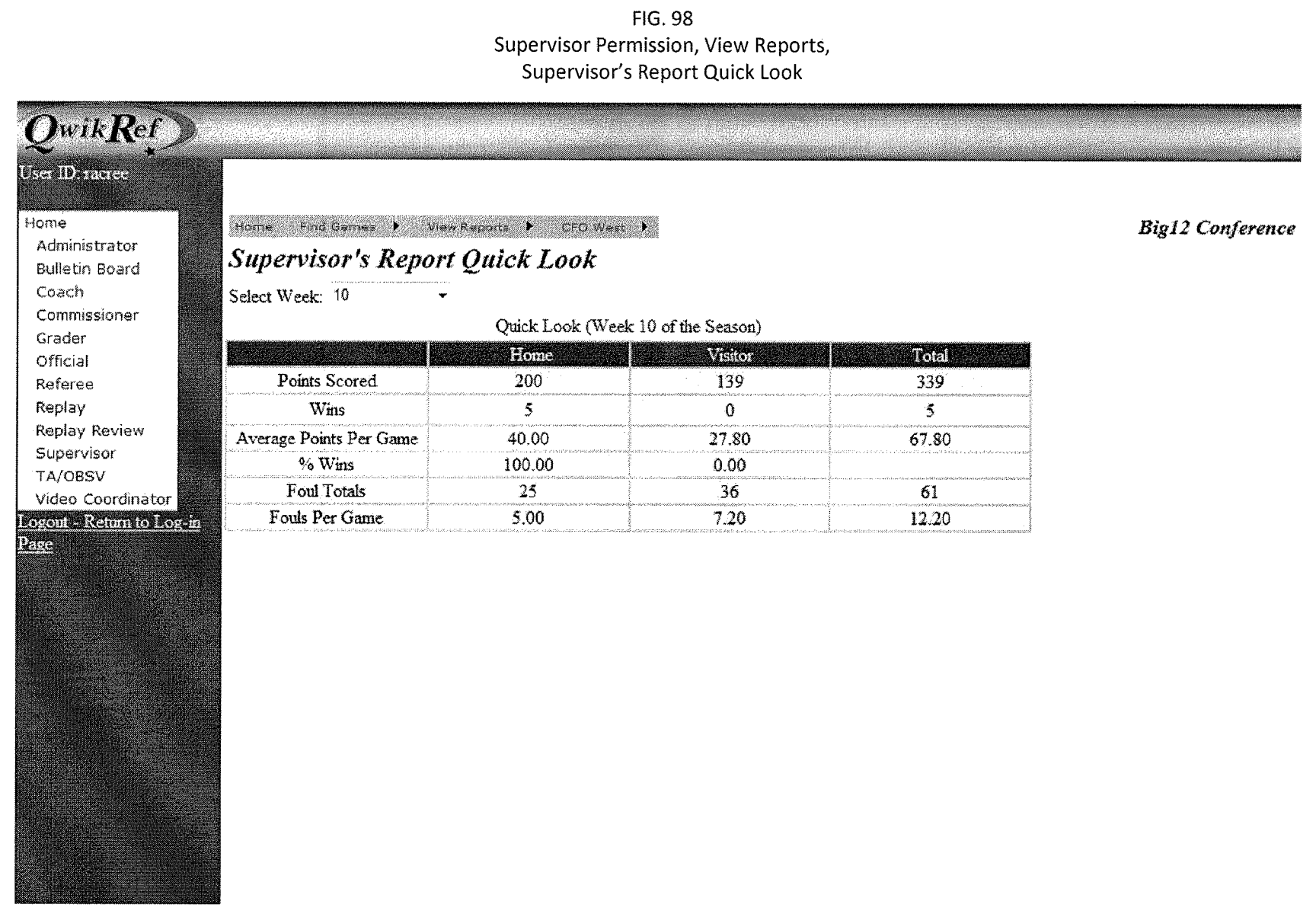

FIG. 98 is a screen shot of supervisor permission, view reports, supervisor's report quick look, in accordance with an embodiment of the present invention.

FIG. 99 is a screen shot of supervisor permission, view reports, supervisor's report fouls for quarter, in accordance with an embodiment of the present invention.

FIG. 100 is a screen shot of supervisor permission, view reports, position foul report that provides details on the fouls that were called and which officials made the call, in accordance with an embodiment of the present invention.

FIG. 107 is a screen shot of supervisor permission, view reports, crew grade summary report display that provides details on the grades for each crew of officials over the year, in accordance with an embodiment of the present invention.

FIG. 108 is a screen shot of supervisor permission, view reports, crew grade summary, referee report display that provides details on the grades for each referee over the year, in accordance with an embodiment of the present invention.

FIG. 119 is a screen shot of replay permission, view reports, replay official grade summary display after selecting the Review all Grades as Replay Official link in FIG. 118 that shows the grades given to the replay official for a given week's game, in accordance with an embodiment of the present invention.

FIG. 120 is a screen shot of referee permission, game report, view game summaries/submit game report, game information tab display, in accordance with an embodiment of the present invention.

FIG. 121 is a screen shot of referee permission, game report, view game summaries/submit game report, game information tab display after selecting the Edit button from FIG. 120 which allows the user to enter game information such as scores and times, in accordance with an embodiment of the present invention.

FIG. 122 is a screen shot of referee permission, game report, view game summaries/submit game report, game fouls & grading tab display, in accordance with an embodiment of the present invention. The "red font" text feature is also shown that enables the user to see entries that have edited by Coordinator/Supervisor of Officials in accordance with an embodiment of the present invention.

FIG. 123 is a screen shot of referee permission, game report, view game summaries/submit game report, game fouls & grading tab display after selecting the Add New Record button from FIG. 122 which allows a user to enter foul data, in accordance with an embodiment of the present invention.

FIG. 124 is a screen shot of referee permission, view reports, view crew report, game duration tab display, in accordance with an embodiment of the present invention.

Figure 125:
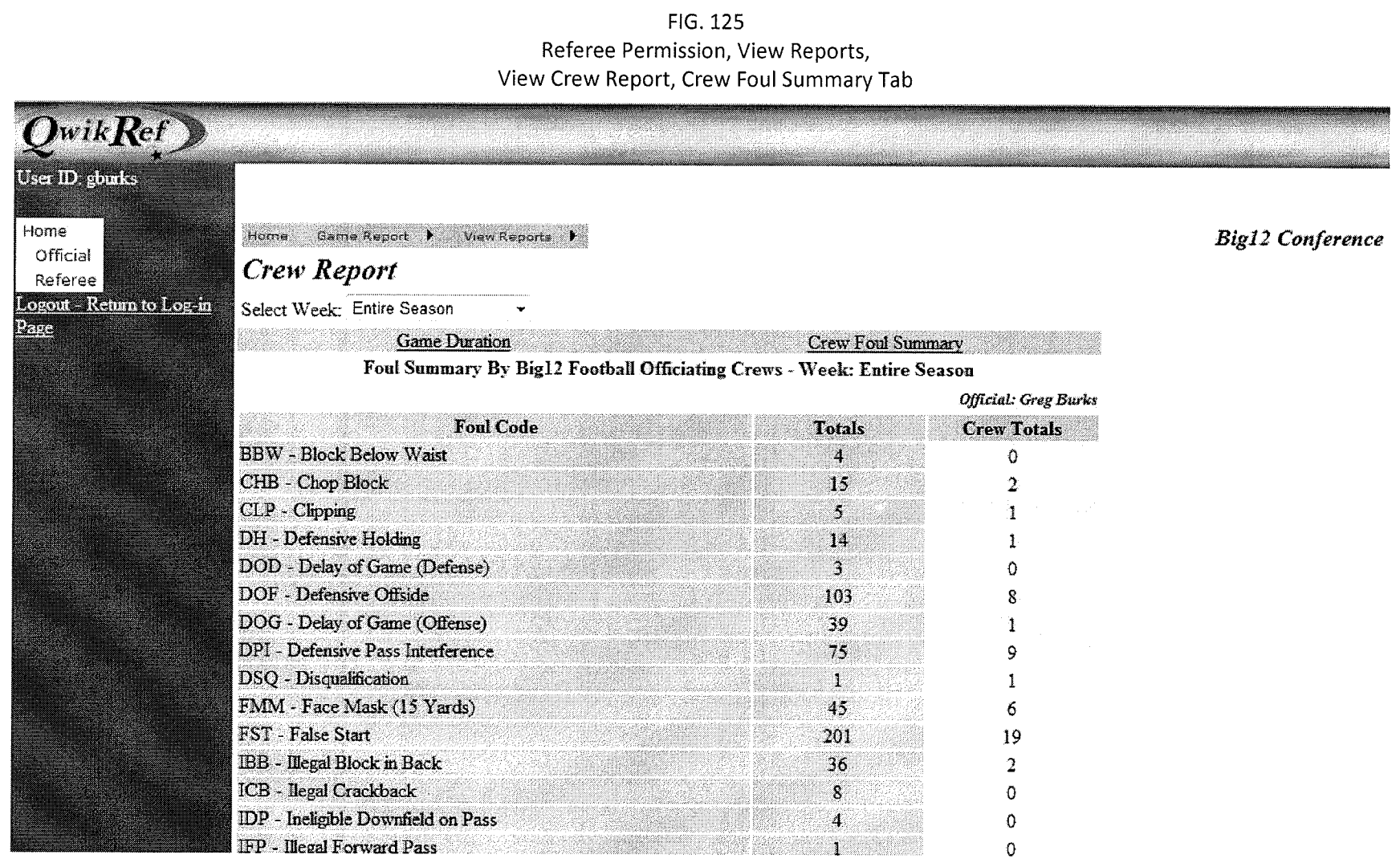

FIG. 125 is a screen shot of a referee permission, view reports, view crew report, crew foul summary tab display, in accordance with an embodiment of the present invention.

FIG. 126 is a screen shot of a referee permission, view reports, view graders comments display, in accordance with an embodiment of the present invention.

FIG. 127 is a screen shot of officials permission, view reports, officials foul summary display, in accordance with an embodiment of the present invention.

FIG. 128 is a screen shot of officials permission, view reports, officials foul summary display after selecting the View Details link from FIG. 127, in accordance with an embodiment of the present invention.

FIG. 129 is a screen shot of an officials permission, view reports, officials grade summary display, in accordance with an embodiment of the present invention.

FIG. 130 is a screen shot of an officials permission, view reports, officials grade summary display after selecting the View Details link from FIG. 129, in accordance with an embodiment of the present invention., in accordance with an embodiment of the present invention.

FIG. 131 is a screen shot of coach permission, view reports, coach's report, quick look display, in accordance with an embodiment of the present invention.

Figure 132:
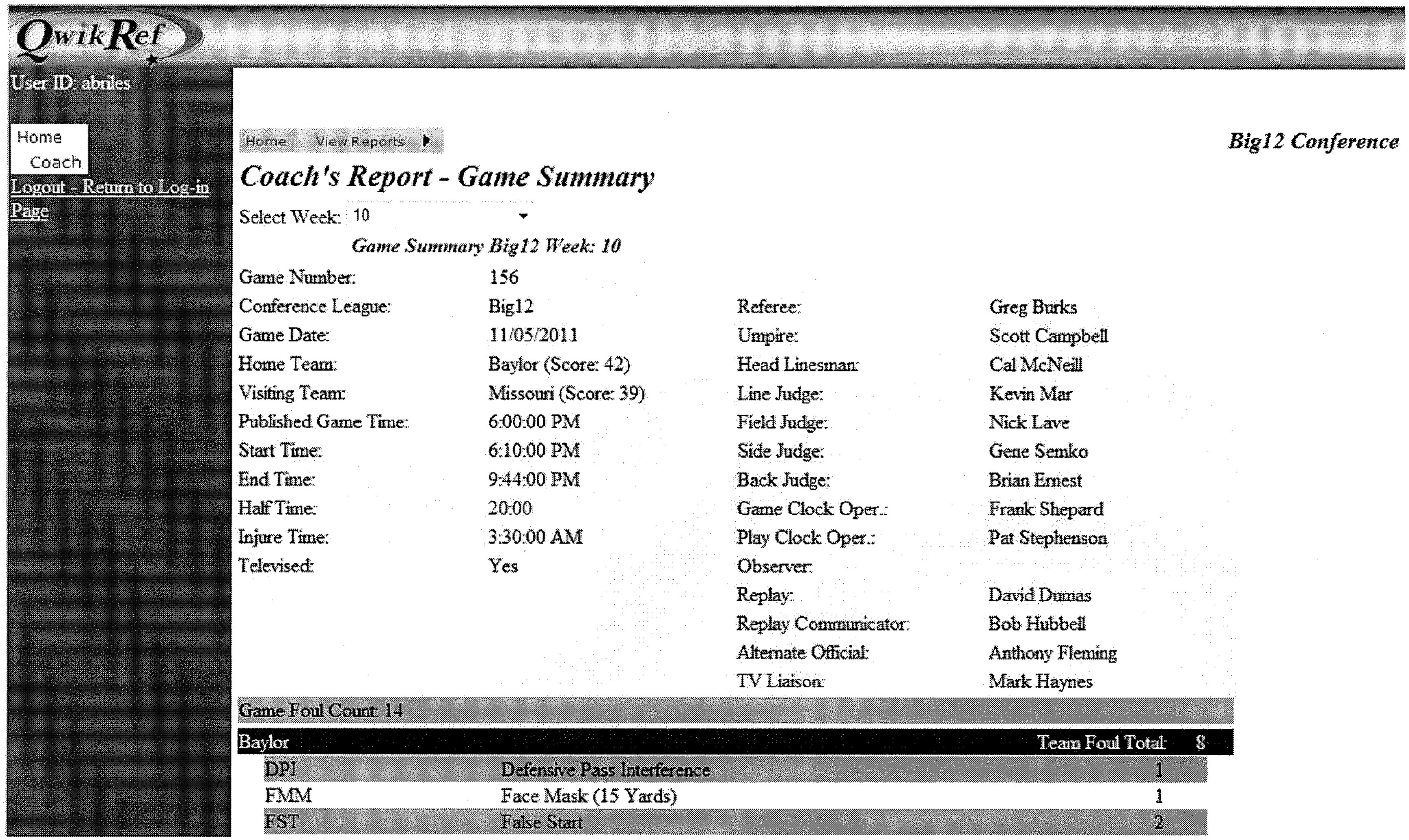

FIG. 132 is a screen shot of coach permission, view reports, coach's report, game summary display, in accordance with an embodiment of the present invention.

Figure 133:
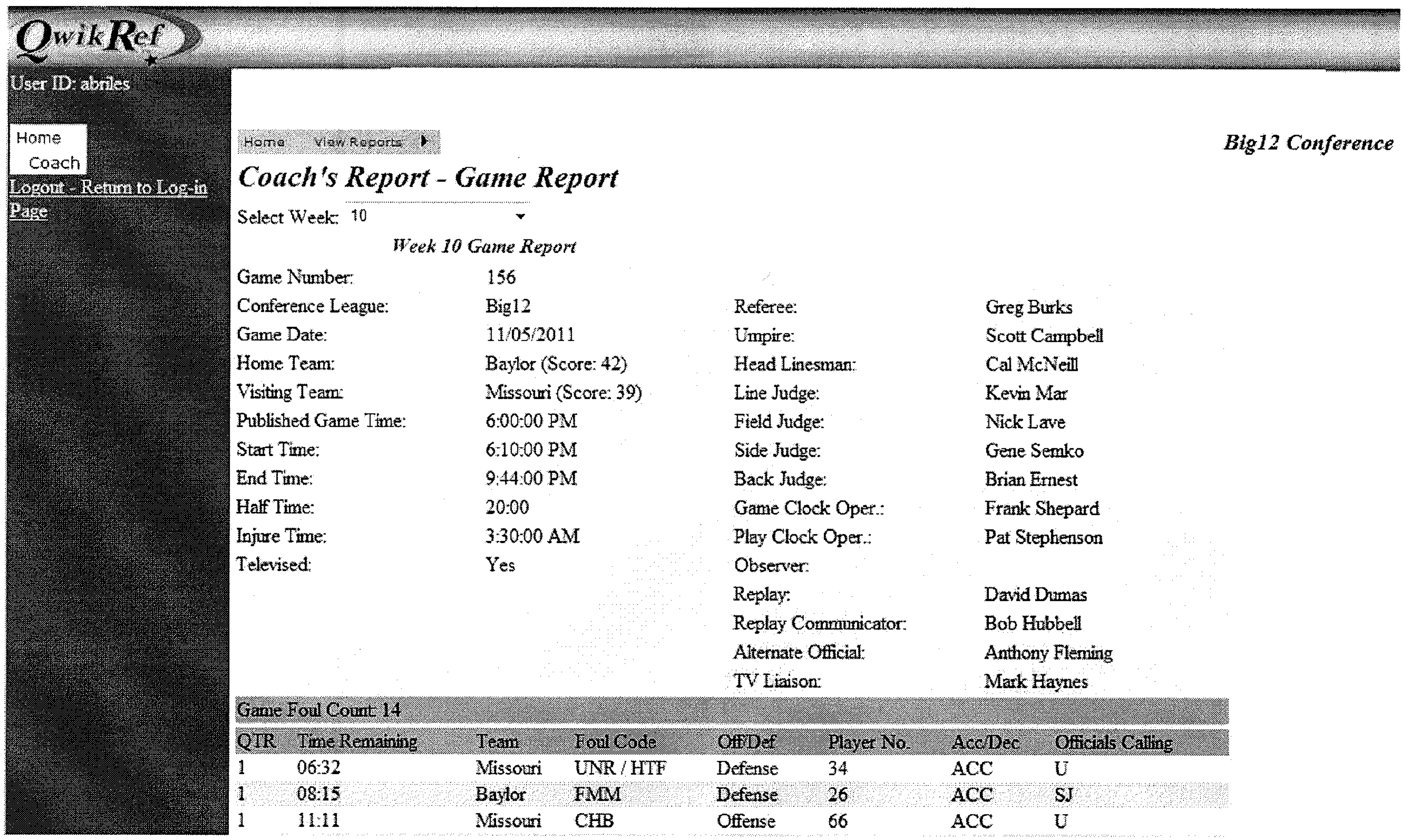

FIG. 133 is a screen shot of coach permission, view reports, coach's report, game report, in accordance with an embodiment of the present invention.

FIG. 134 is a screen shot of coach permission, view reports, coach's report, season foul summary display, in accordance with an embodiment of the present invention.

FIG. 135 is a screen shot of coach permission, view reports, coach's report, season foul detail display, in accordance with an embodiment of the present invention.

Figure 136:
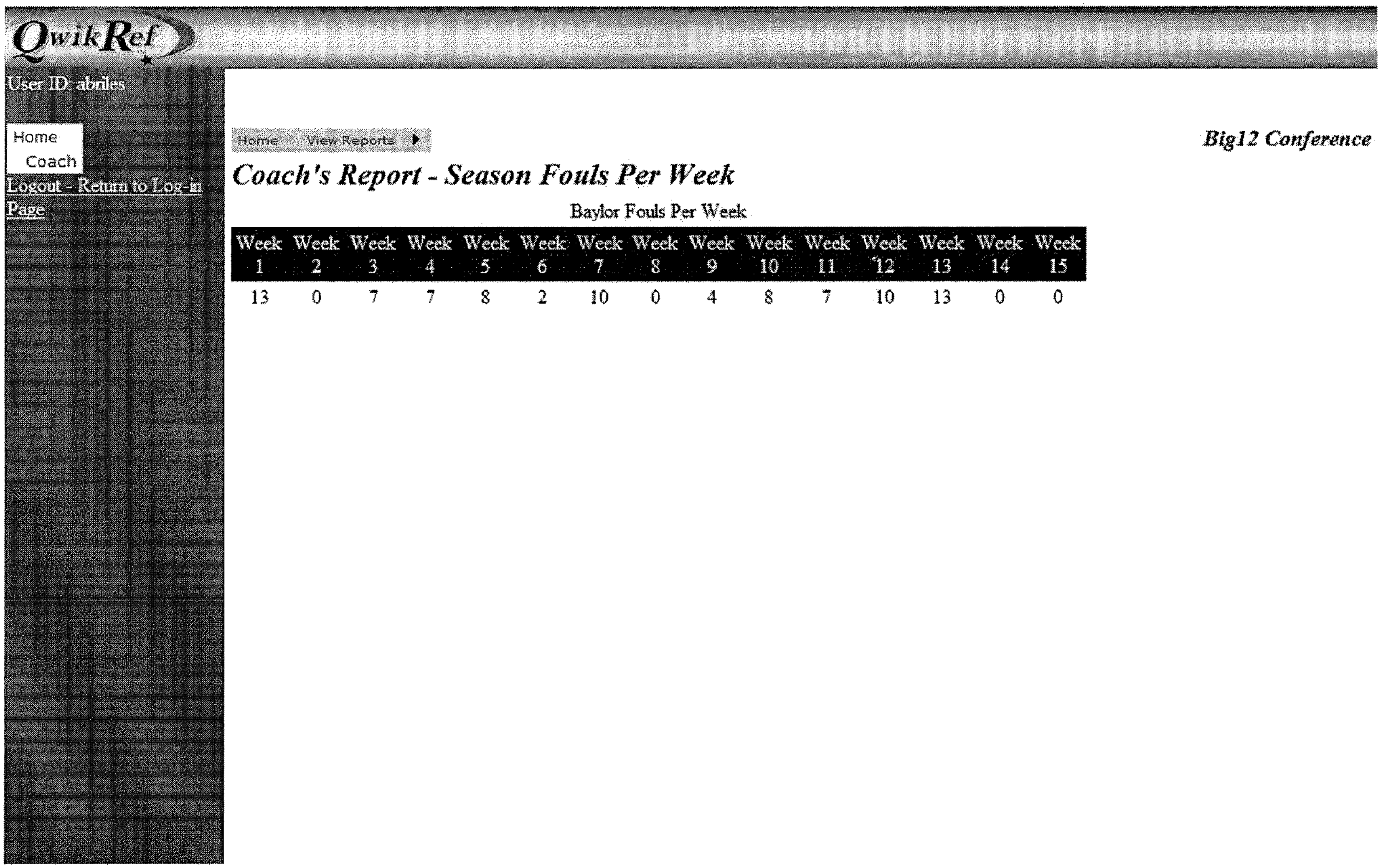

FIG. 136 is a screen shot of coach permission, view reports, coach's report, season fouls per week display, in accordance with an embodiment of the present invention.

FIG. 137 is a screen shot of coach permission, view reports, coach's report, fouls by player display, in accordance with an embodiment of the present invention.

Figure 138:
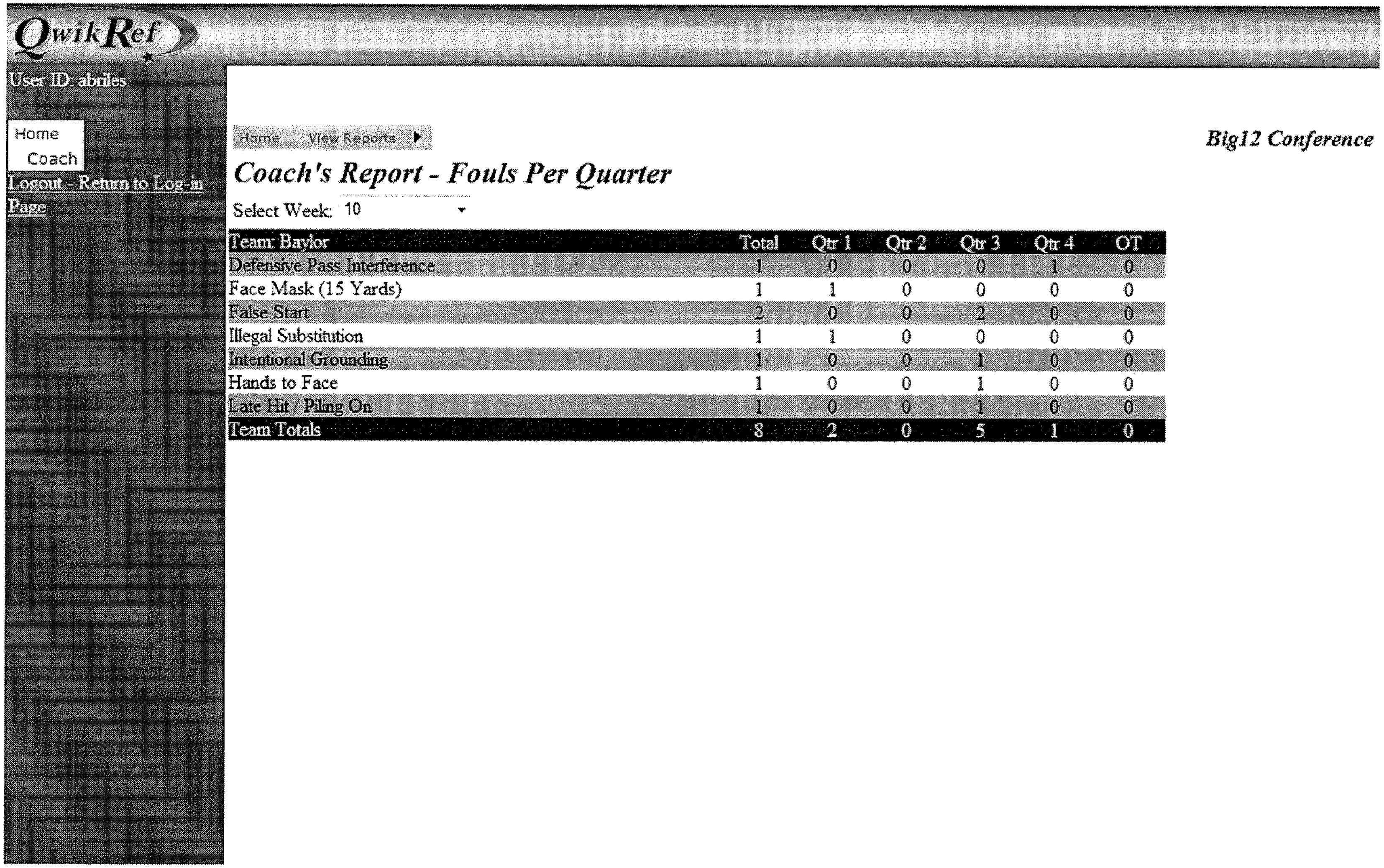

FIG. 138 is a screen shot of a coach permission, view reports, coach's report, fouls per quarter display, in accordance with an embodiment of the present invention.

Figure 139:
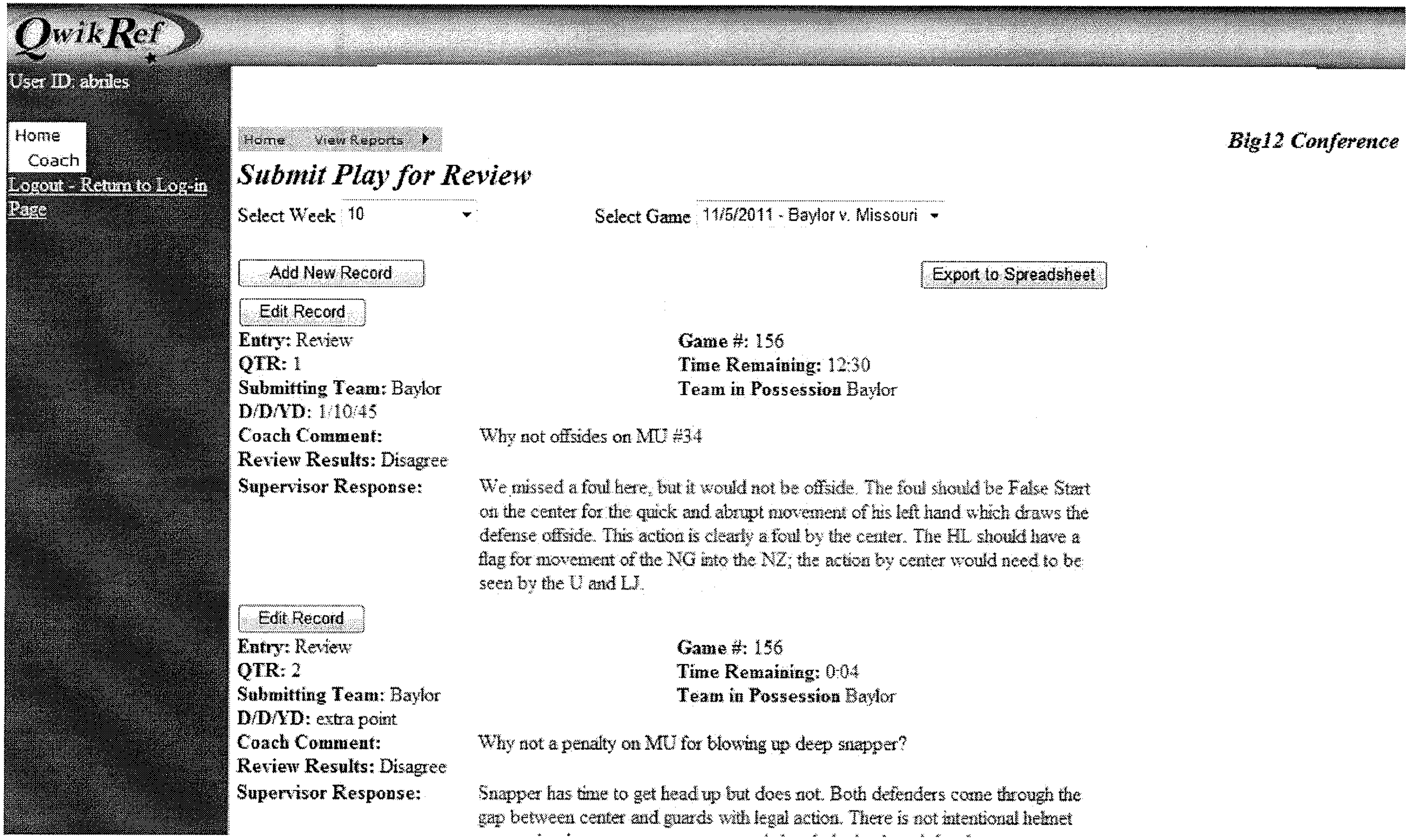

FIG. 139 is a screen shot of coach permission, view reports, submit plays for review display for the Big 12 Conference coach, in accordance with an embodiment of the present invention.

Figure 140:
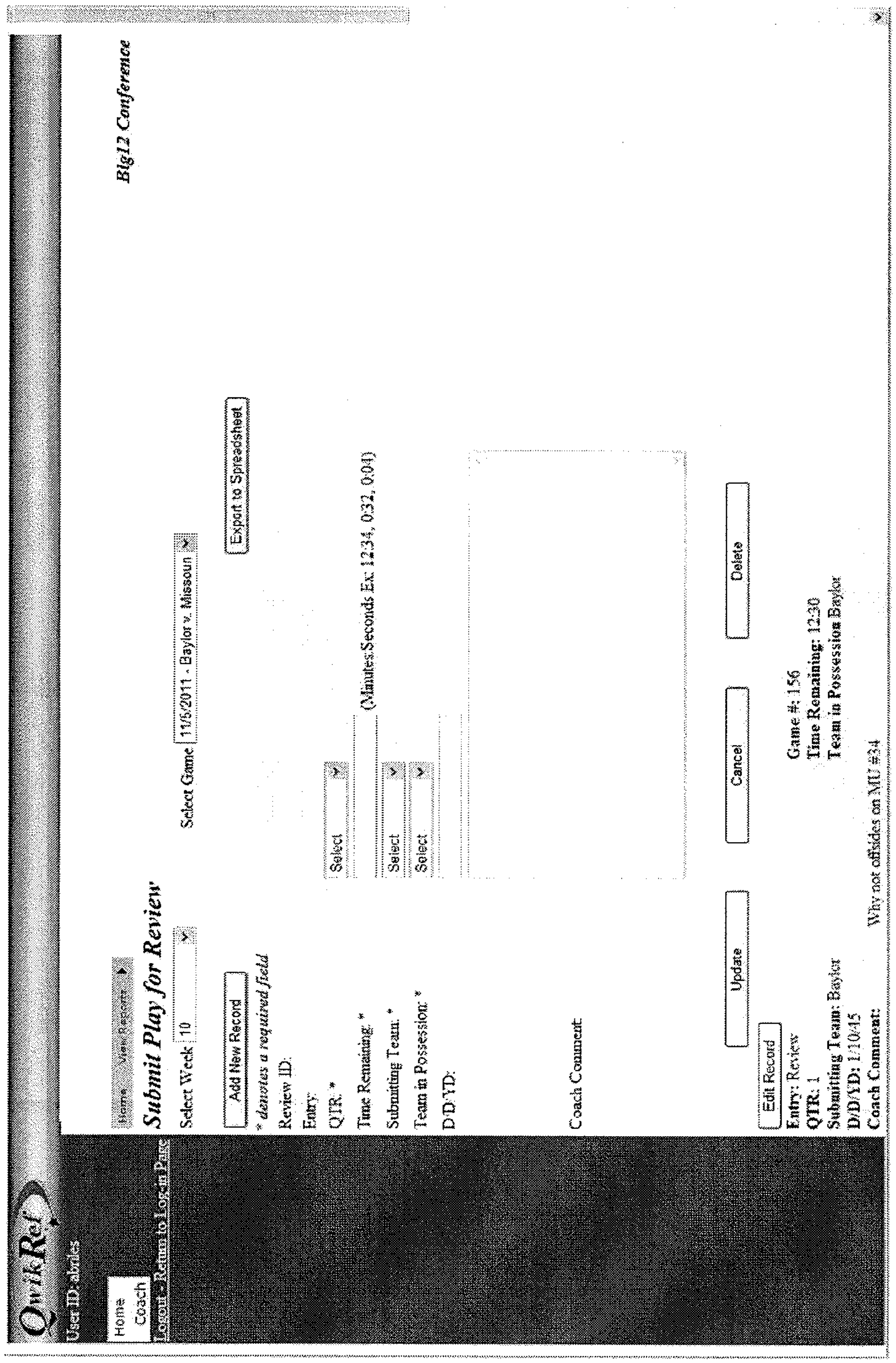

FIG. 140 is a screen shot of coach permission, view reports, submit plays for review display after selecting the Add New Record button in FIG. 139 to enter a new play for review, in accordance with an embodiment of the present invention.

Figure 141:
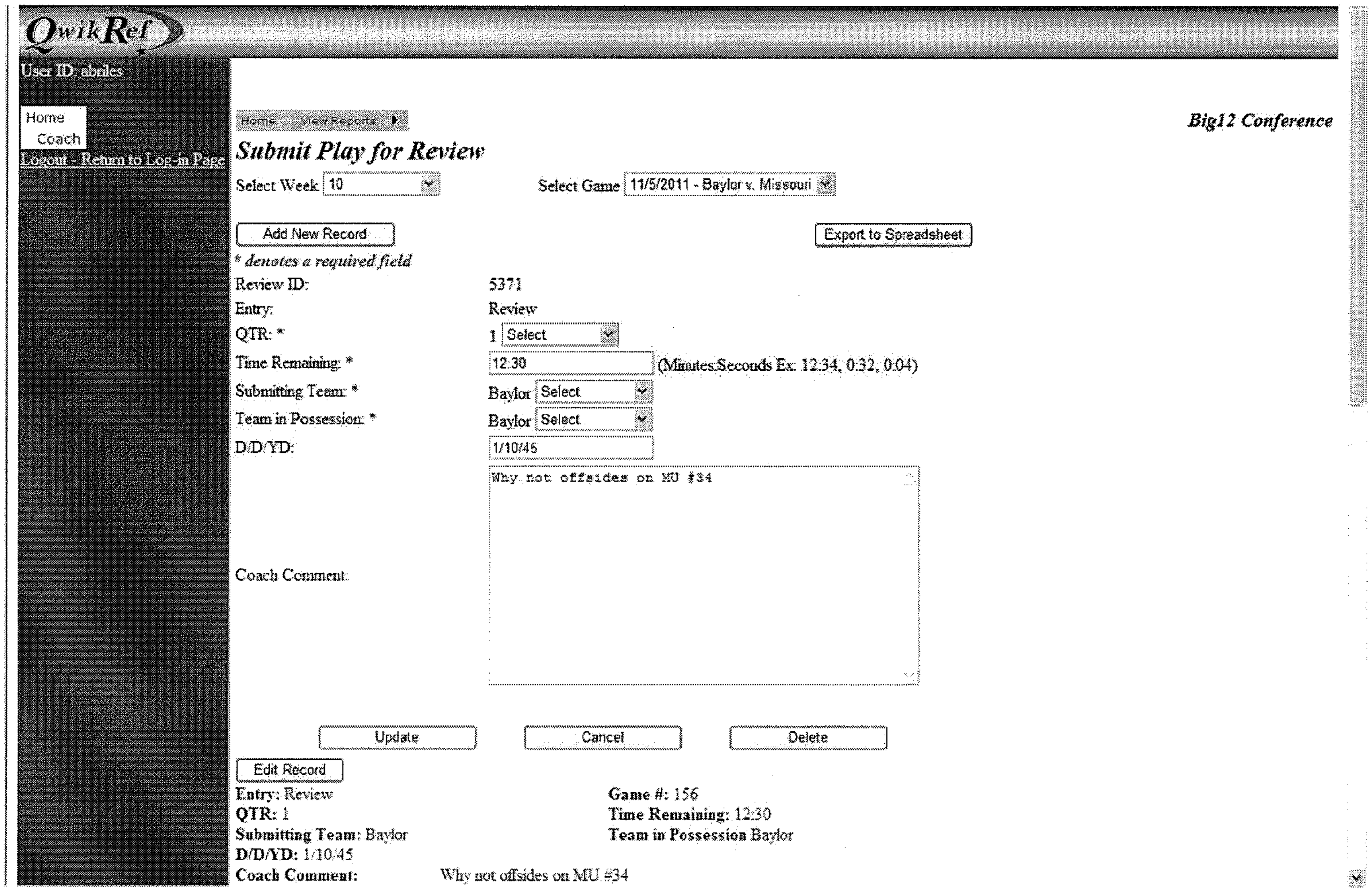

FIG. 141 is a screen shot of coach permission, view reports, submit plays for review display after selecting the Edit Record button in FIG. 139 to edit a previously entered play for review, in accordance with an embodiment of the present invention.

Figure 142:
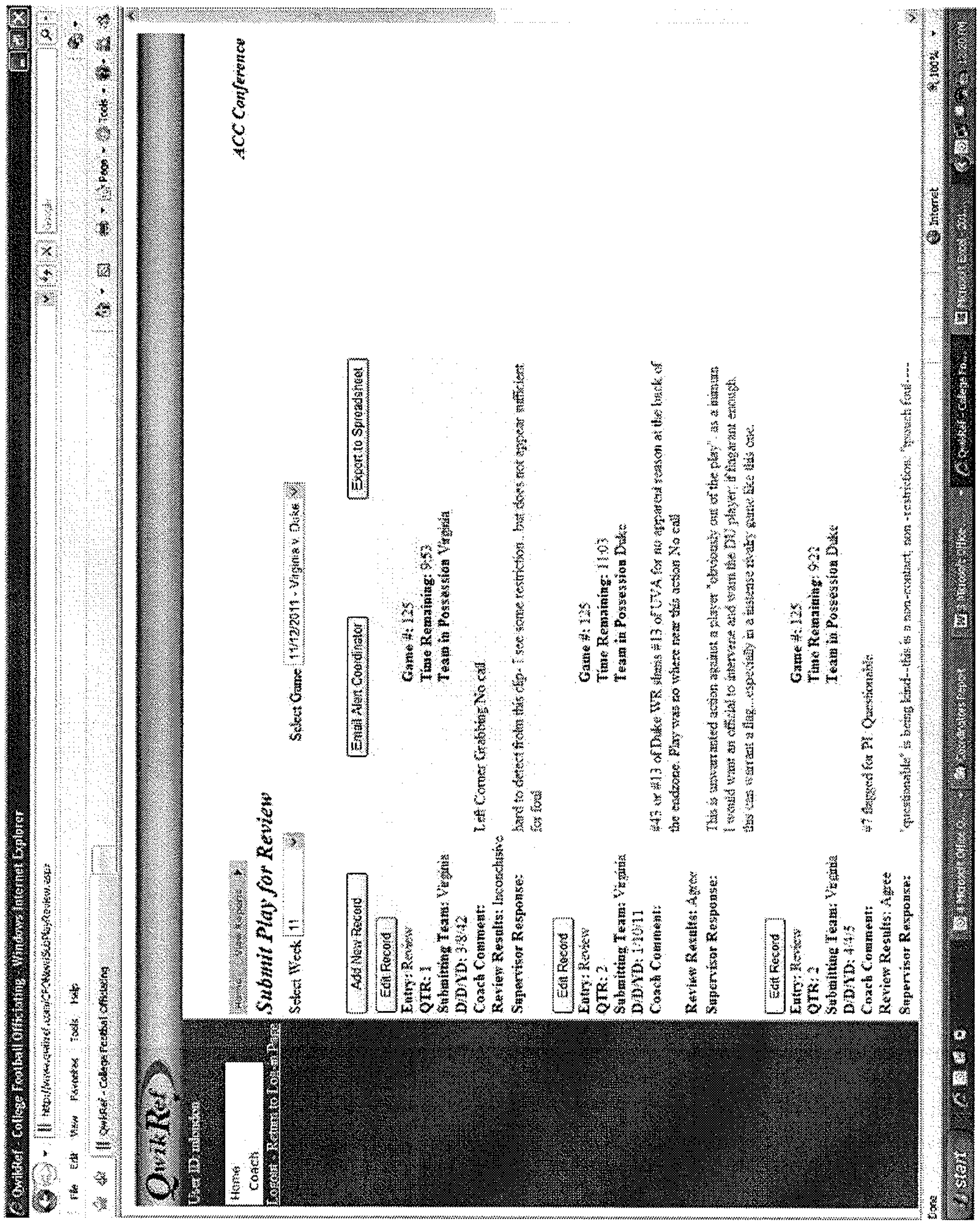

FIG. 142 is a screen shot of coach permission, view reports, submit plays for review display after selecting the Add New Record button on the Atlantic Coast Conference corresponding page of FIG. 139 to enter a new play for review that shows the Email alert button for initiating an email alert to either the Home, Visitor or Both coaches that their plays have been reviewed, in accordance with an embodiment of the present invention.

Figure 143:
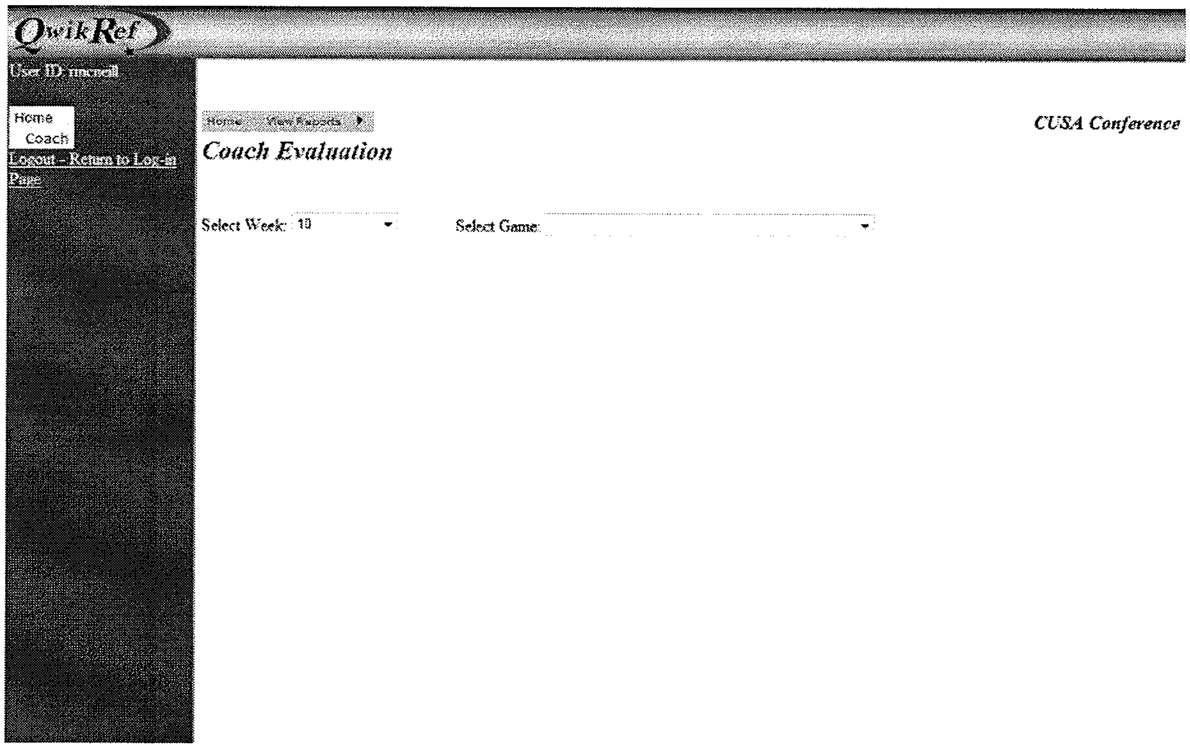

FIG. 143 is a screen shot of a coach permission, view reports, coach's report, coach evaluation display, in accordance with an embodiment of the present invention.

Figure 144:
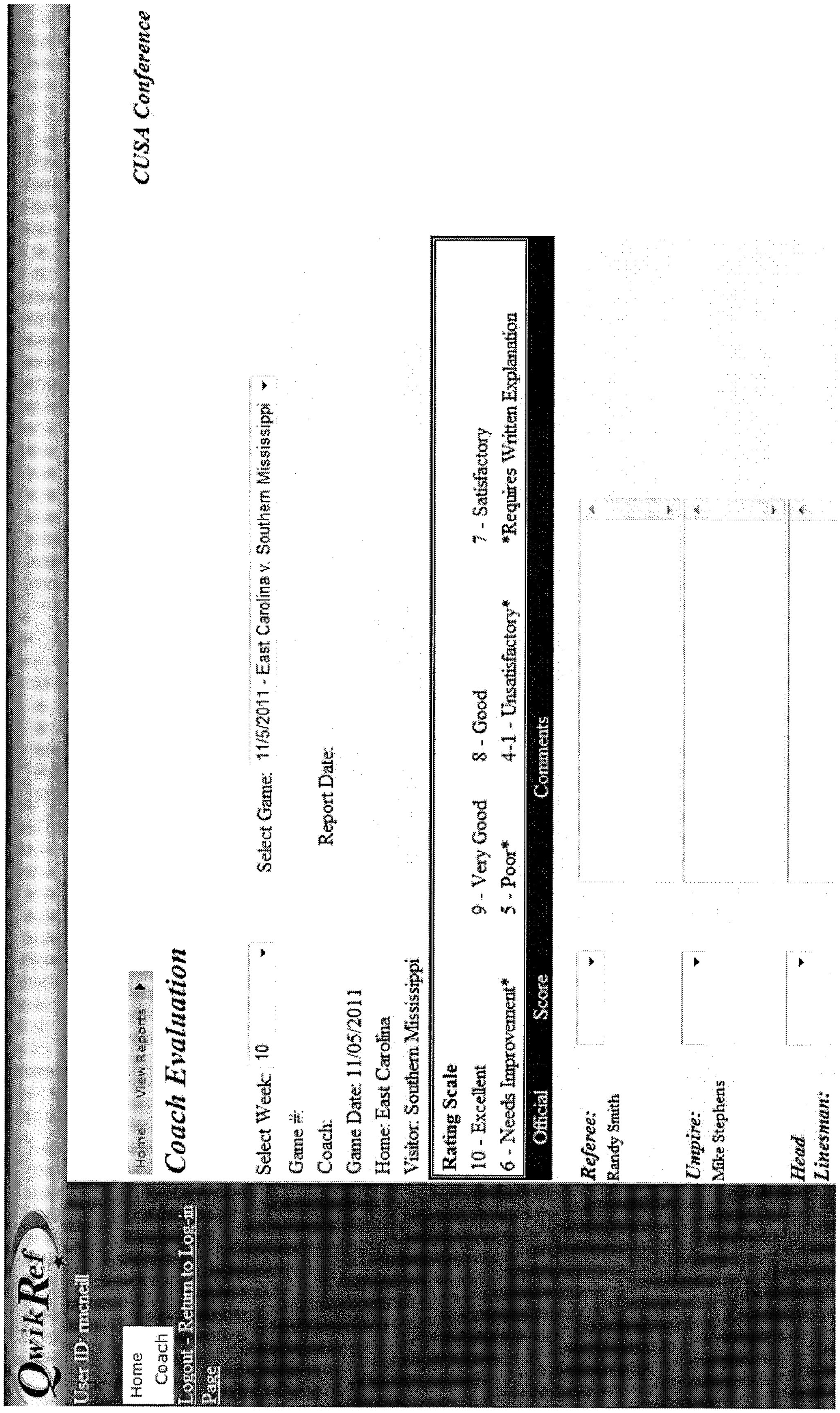

FIG. 144 is a screen shot of a coach permission, view reports, coach's report, coach evaluation display, in accordance with an embodiment of the present invention.

Figure 145:
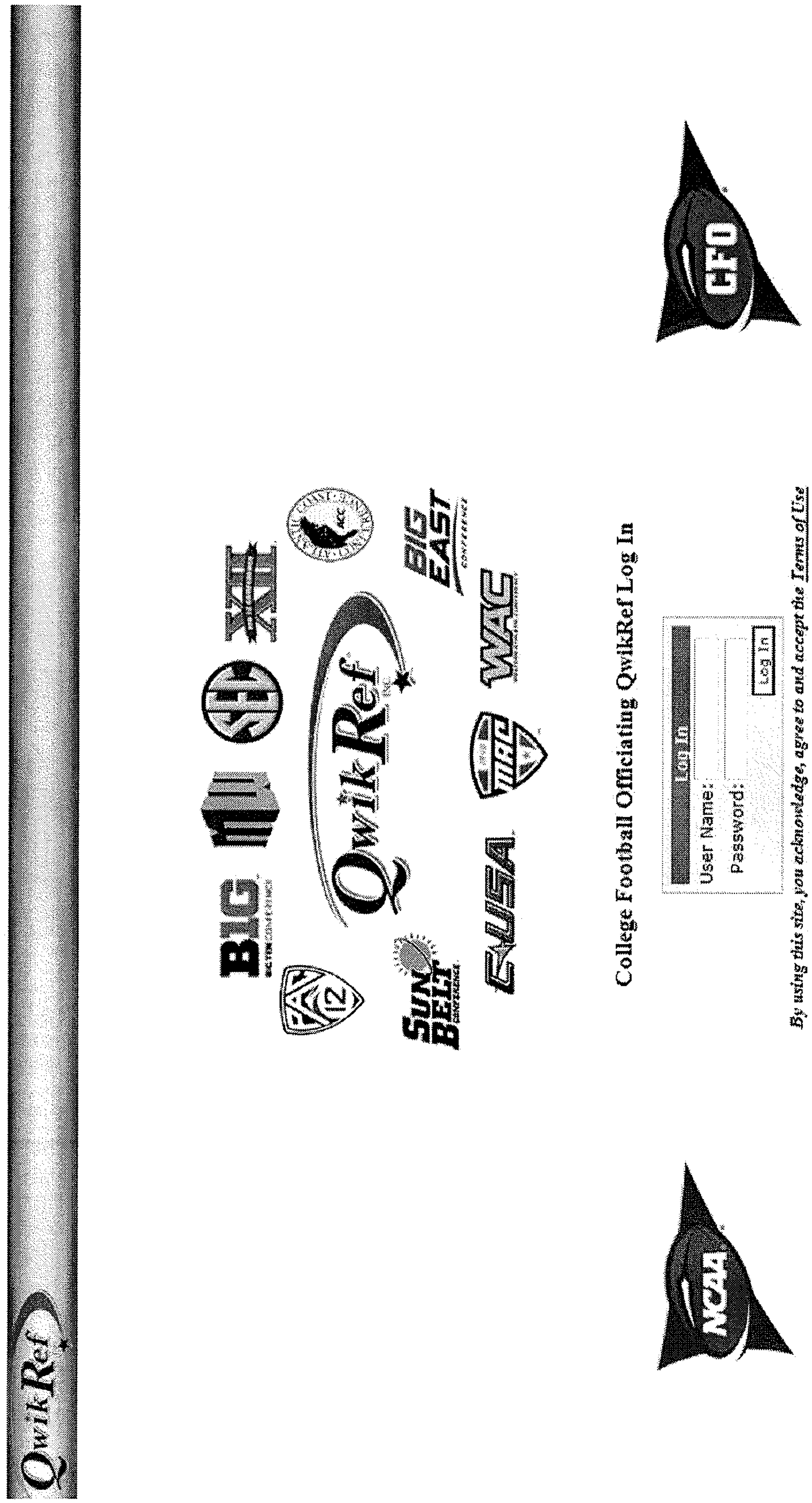

FIG. 145 is a screen shot of a login page for a national coordinator, in accordance with an embodiment of the present invention.

Figure 146:
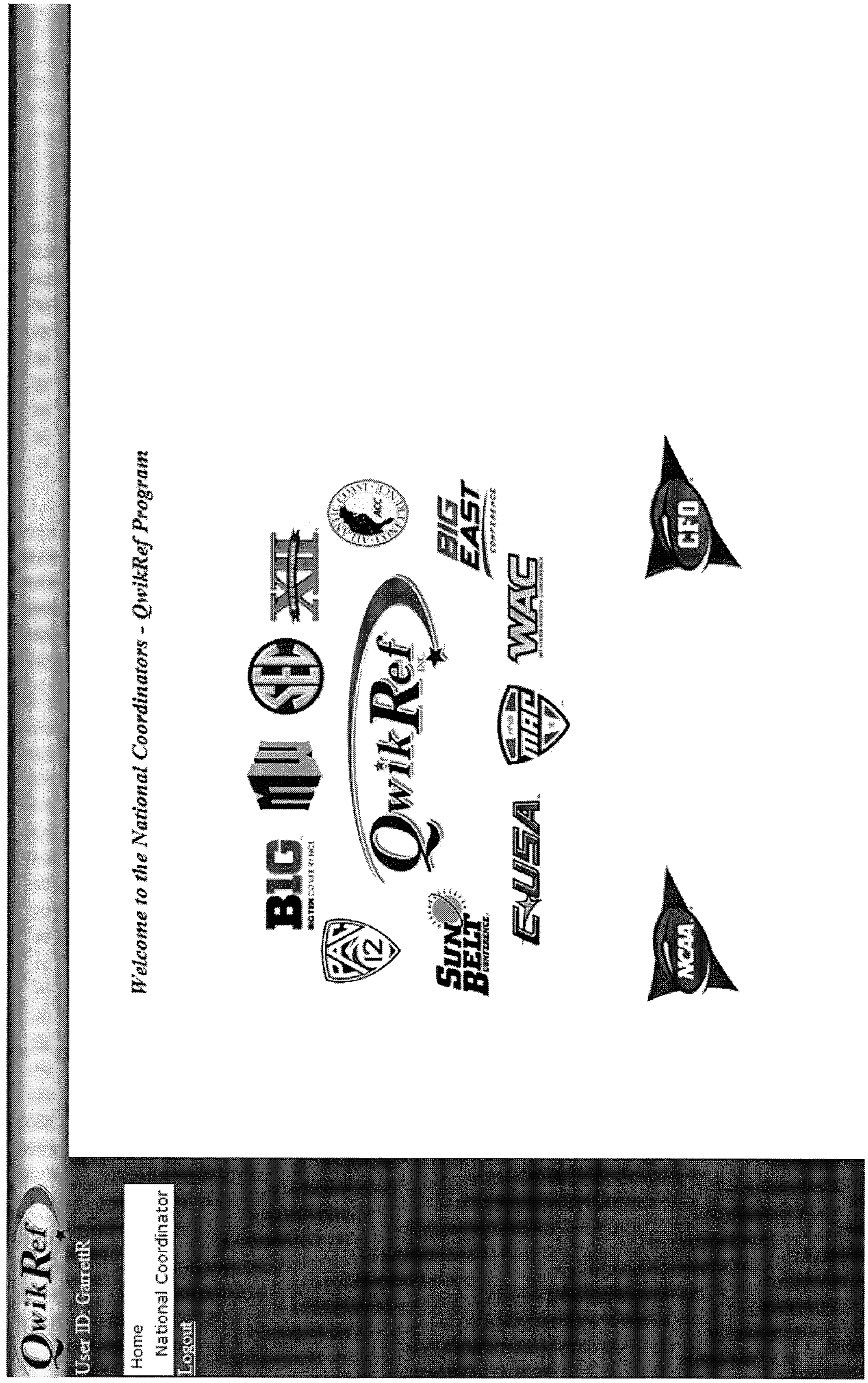

FIG. 146 is a screen shot of a national coordinator welcome screen, in accordance with an embodiment of the present invention.

Figure 147:
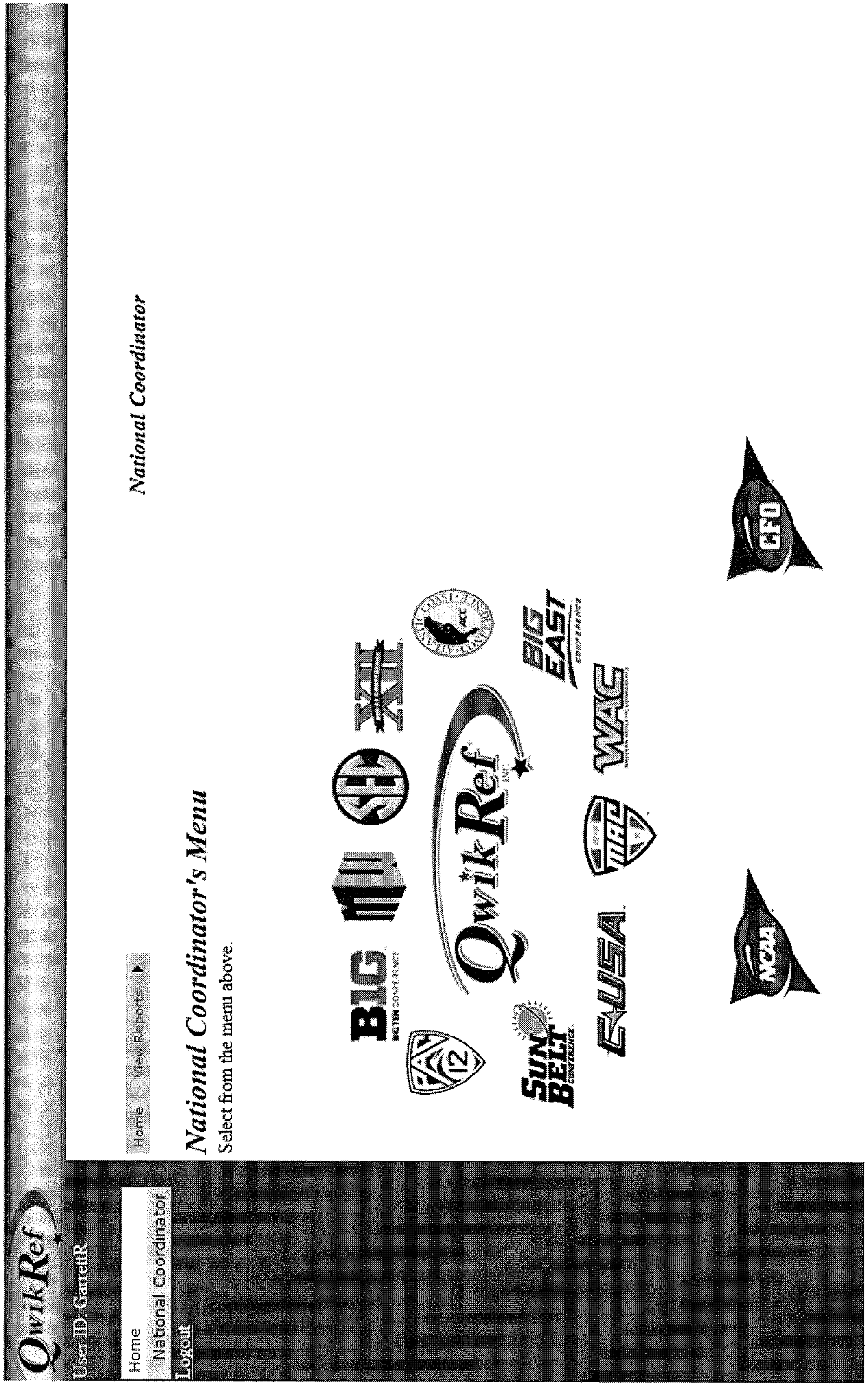

FIG. 147 is a screen shot of a national coordinator menu page, in accordance with an embodiment of the present invention.

FIG. 148 is a screen shot of the national coordinator permission, view reports, NCAA End of Season Report—FBS, in accordance with an embodiment of the present invention.

FIG. 149 is a screen shot of the national coordinator permission, view reports, NCAA End of Season Report—FCS, in accordance with an embodiment of the present invention.

FIG. 150 is a screen shot of the national coordinator permission, view reports, NCAA End of Season Report—DII, in accordance with an embodiment of the present invention.

FIG. 151 is a screen shot of a national coordinator's report NCAA quick look report—FBS according to an embodiment of the present invention.

Figure 152:
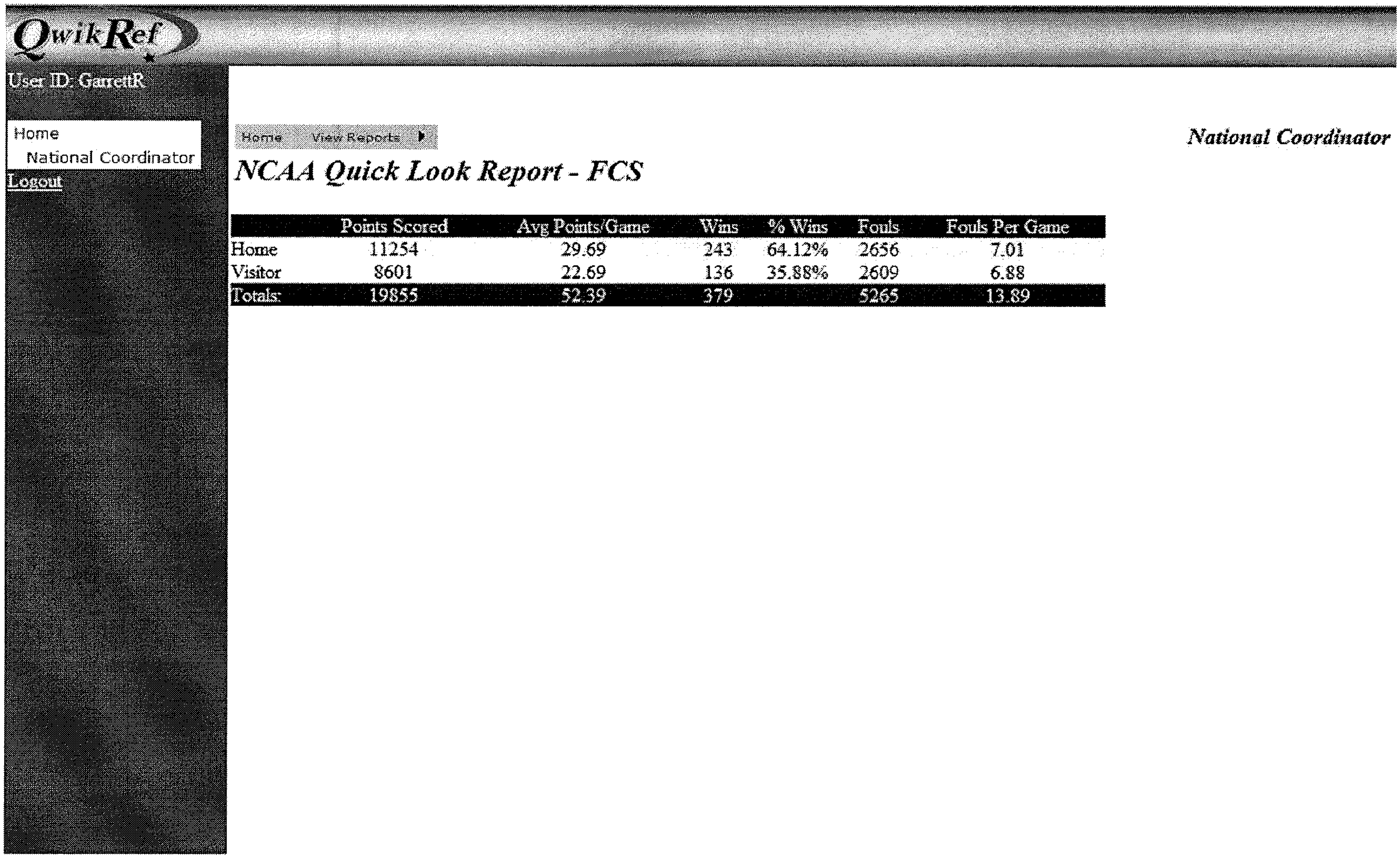

FIG. 152 is a screen shot of the national coordinator permission, view reports, NCAA Quick Look Report—FCS, in accordance with an embodiment of the present invention.

FIG. 153 is a screen shot of the national coordinator permission, view reports, NCAA Quick Look Report—DII, in accordance with an embodiment of the present invention.

FIG. 154 is a screen shot of the national coordinator permission, view reports, NCAA Replay Report Summary, in accordance with an embodiment of the present invention.

Figure 155:
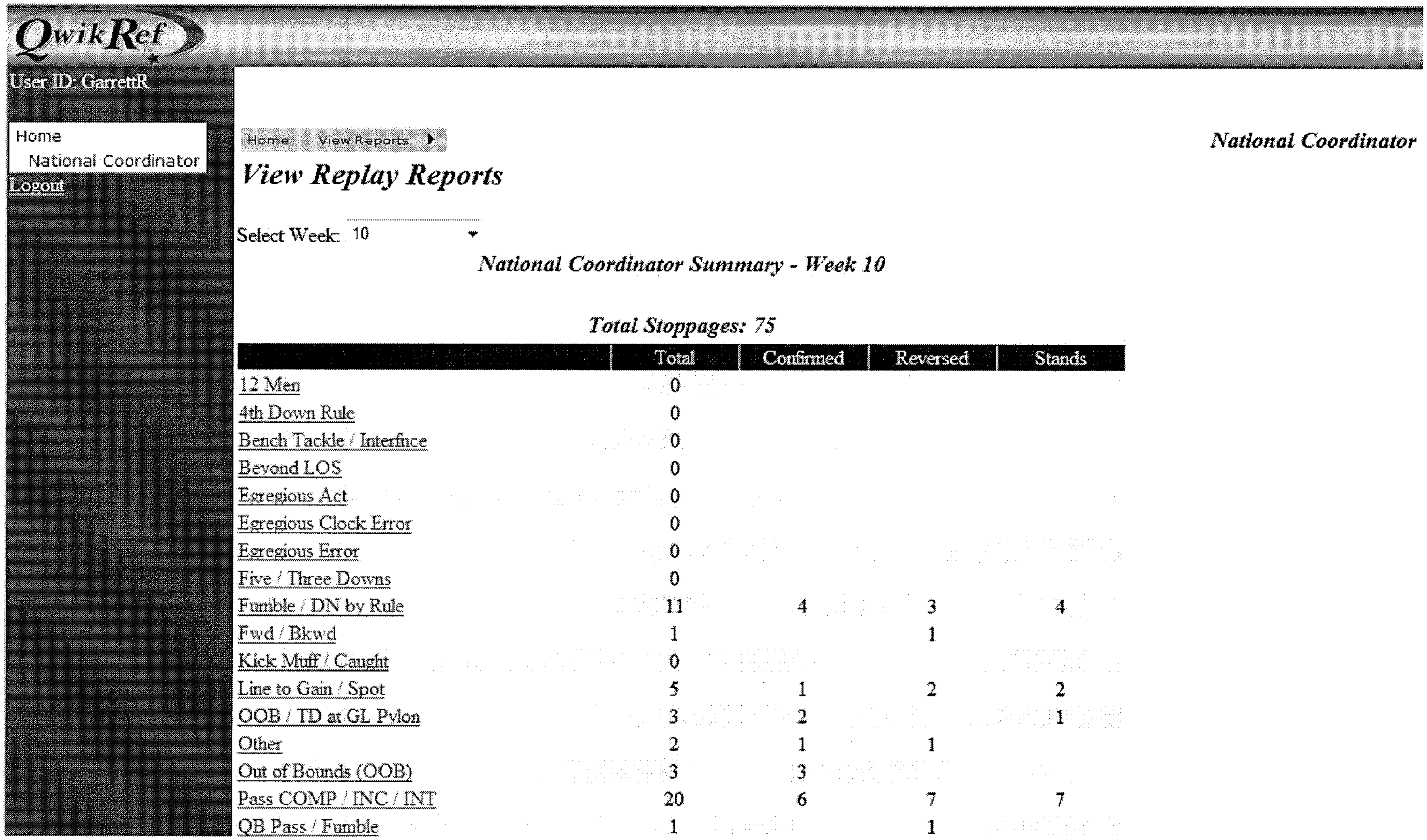

FIG. 155 is a screen shot of the national coordinator permission, view reports, View Replay Reports, in accordance with an embodiment of the present invention.

Figure 156:
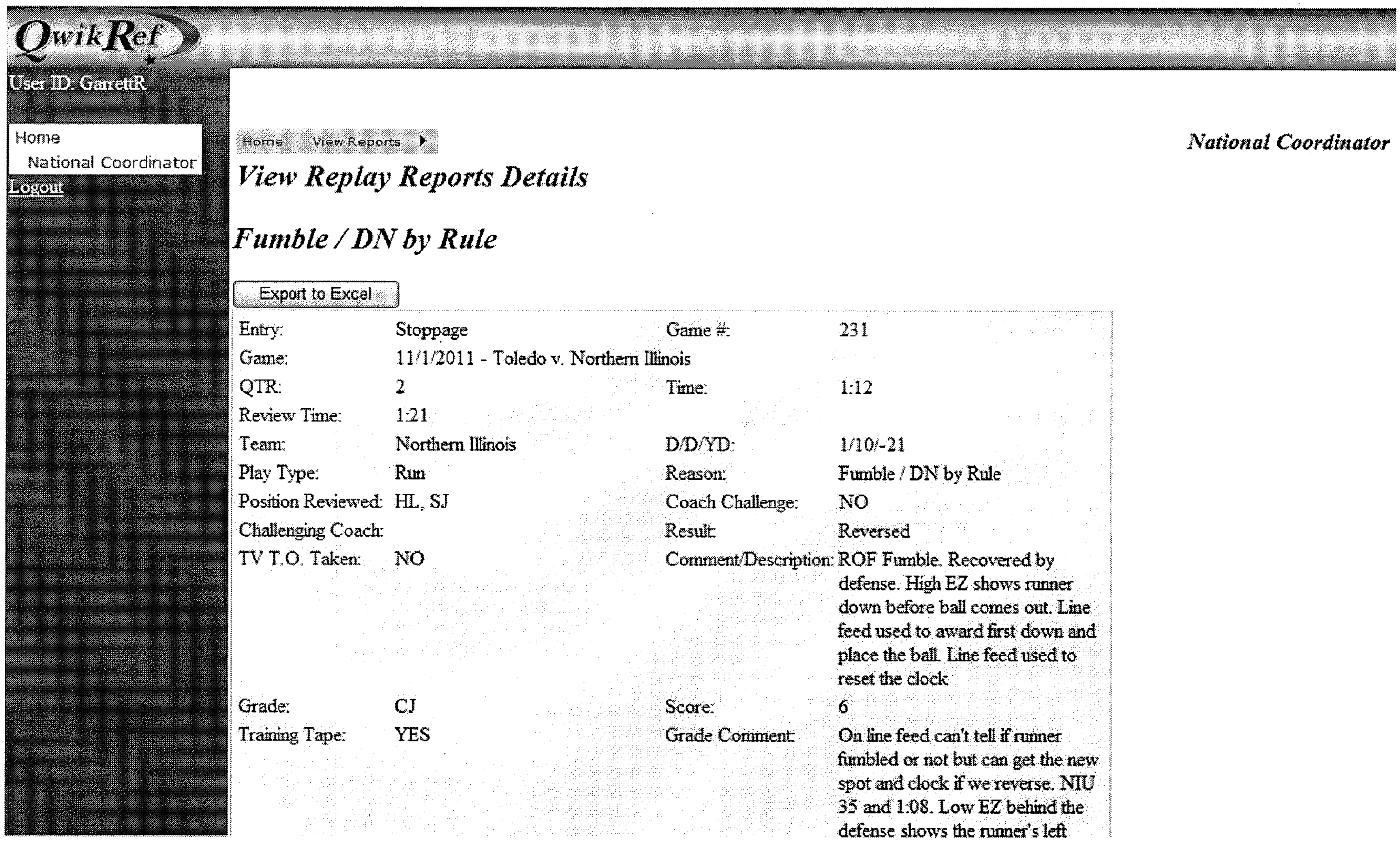

FIG. 156 is a screen shot of the national coordinator permission, view reports, Coach Challenge Detail, in accordance with an embodiment of the present invention.

Figure 157:
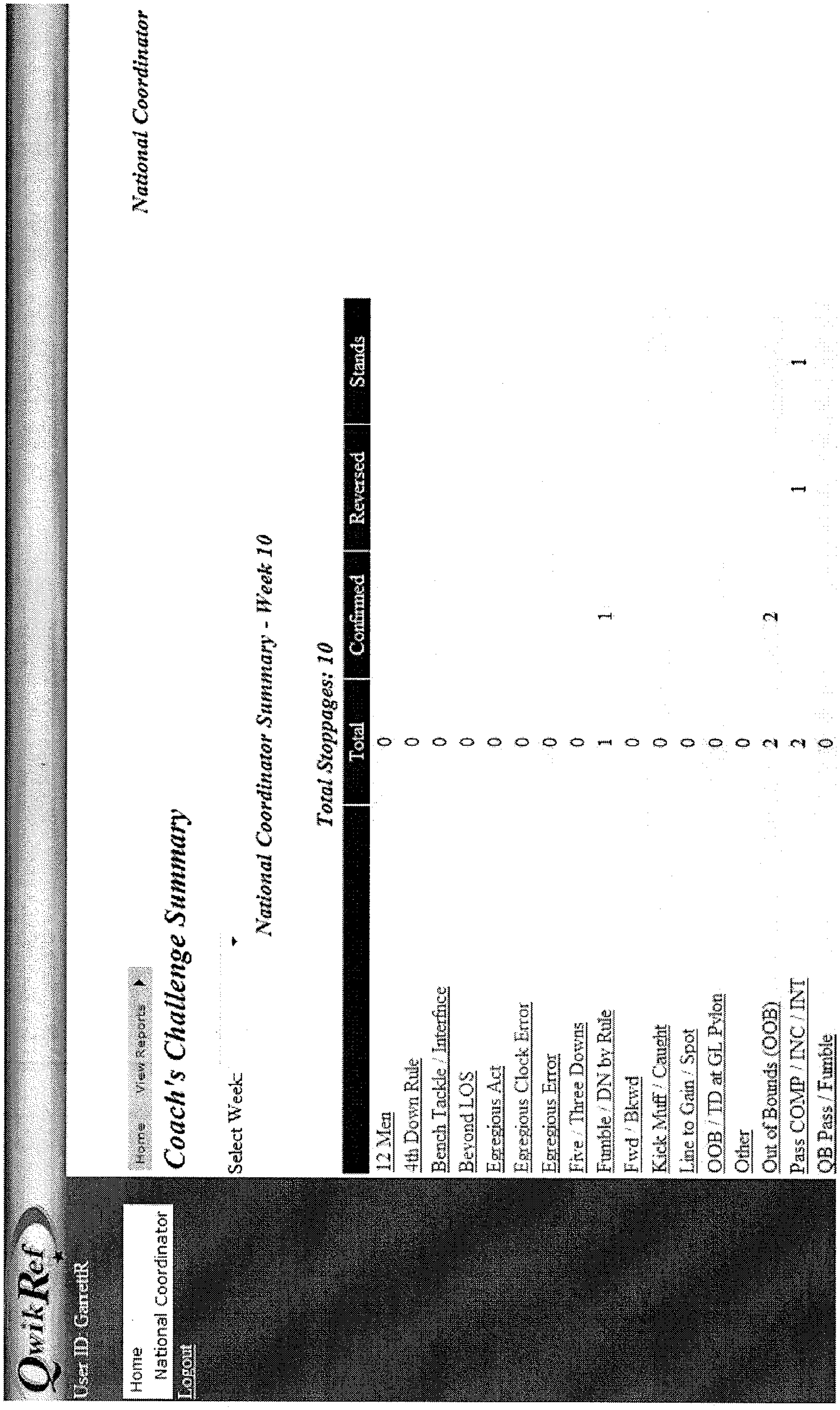

FIG. 157 is a screen shot of the national coordinator permission, view reports, Coach Challenge Summary, in accordance with an embodiment of the present invention.

Figure 158:
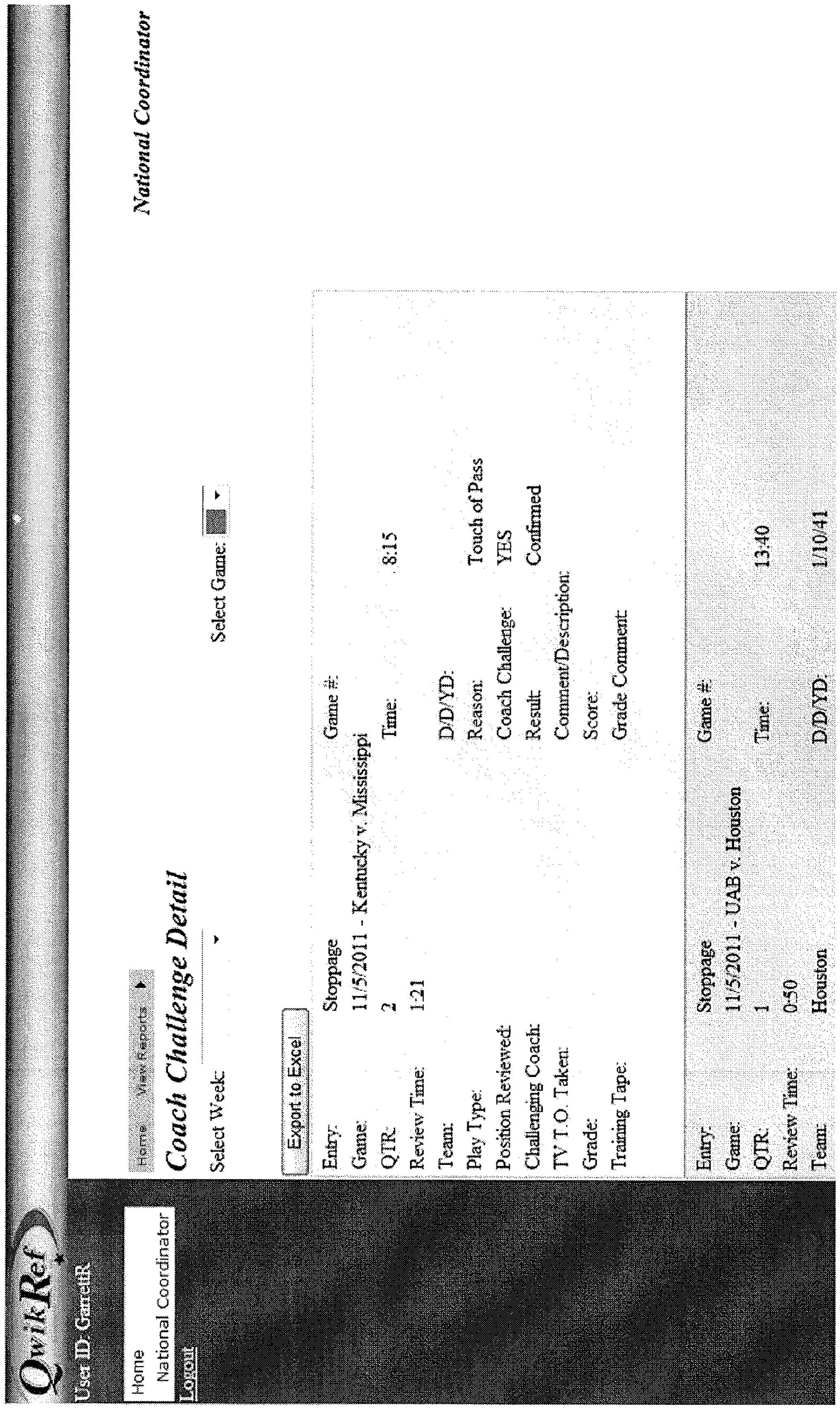

FIG. 158 is a screen shot of the national coordinator permission, view reports, Coach Challenge Detail's report, position foul report, line judges display, in accordance with an embodiment of the present invention.

Figure 159:
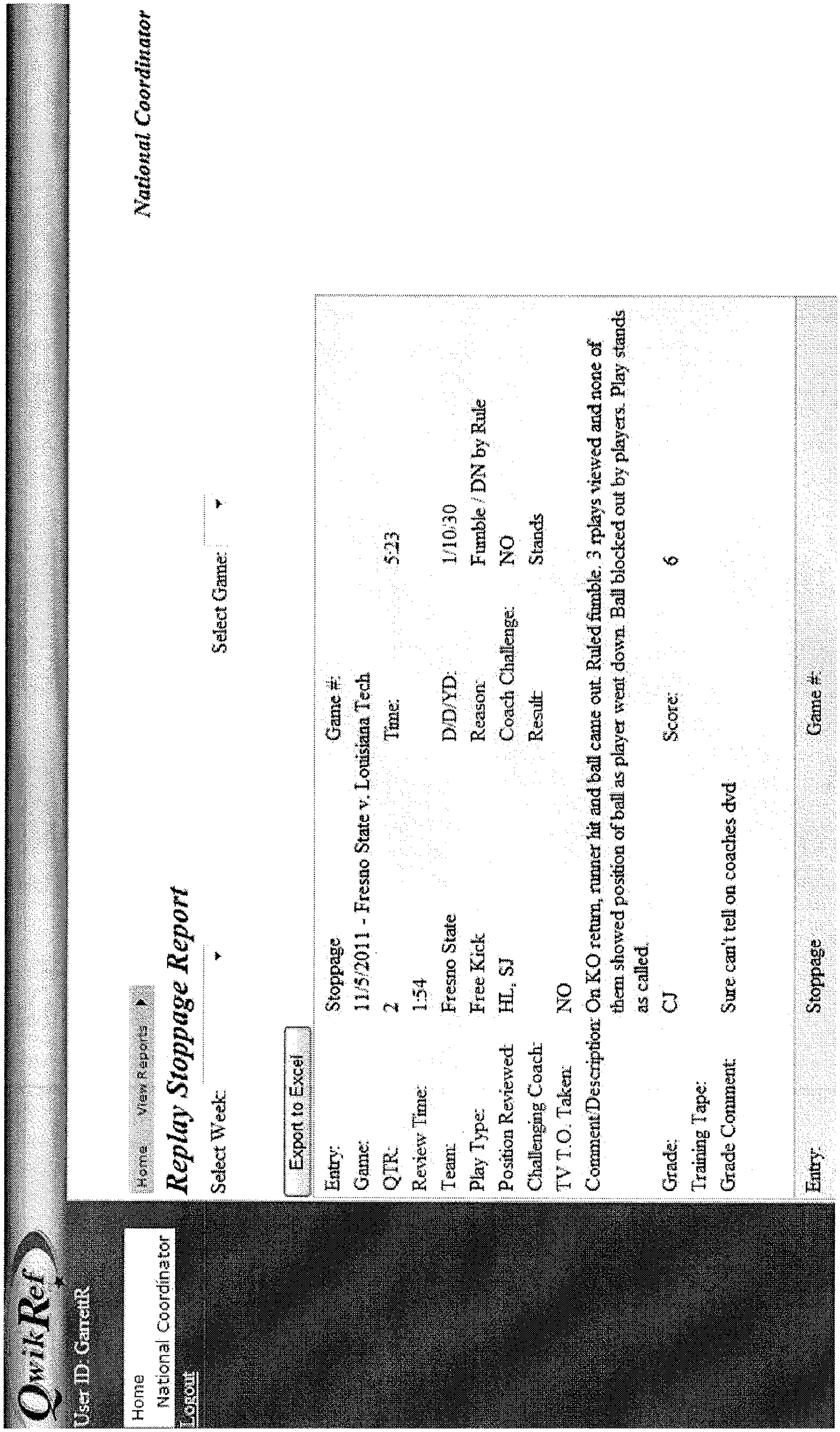

FIG. 159 is a screen shot of the national coordinator permission, view reports, Replay Stoppage Report, in accordance with an embodiment of the present invention.

FIG. 160 is a screen shot of the national coordinator permission, view reports, View Replay Review Times, in accordance with an embodiment of the present invention.

FIG. 161 is a screen shot of the national coordinator permission, view reports, View Replay Review Times, View Replay Reviews Over 2 Min, in accordance with an embodiment of the present invention.

Figure 162:

FIG. 162 is a screen shot of the ACC tab, commissioner tab, menu page summary display, in accordance with an embodiment of the present invention.

FIG. 163 is a screen shot of the ACC tab, commissioner tab, commissioner's report weekly summary, in accordance with an embodiment of the present invention.

Figure 164:
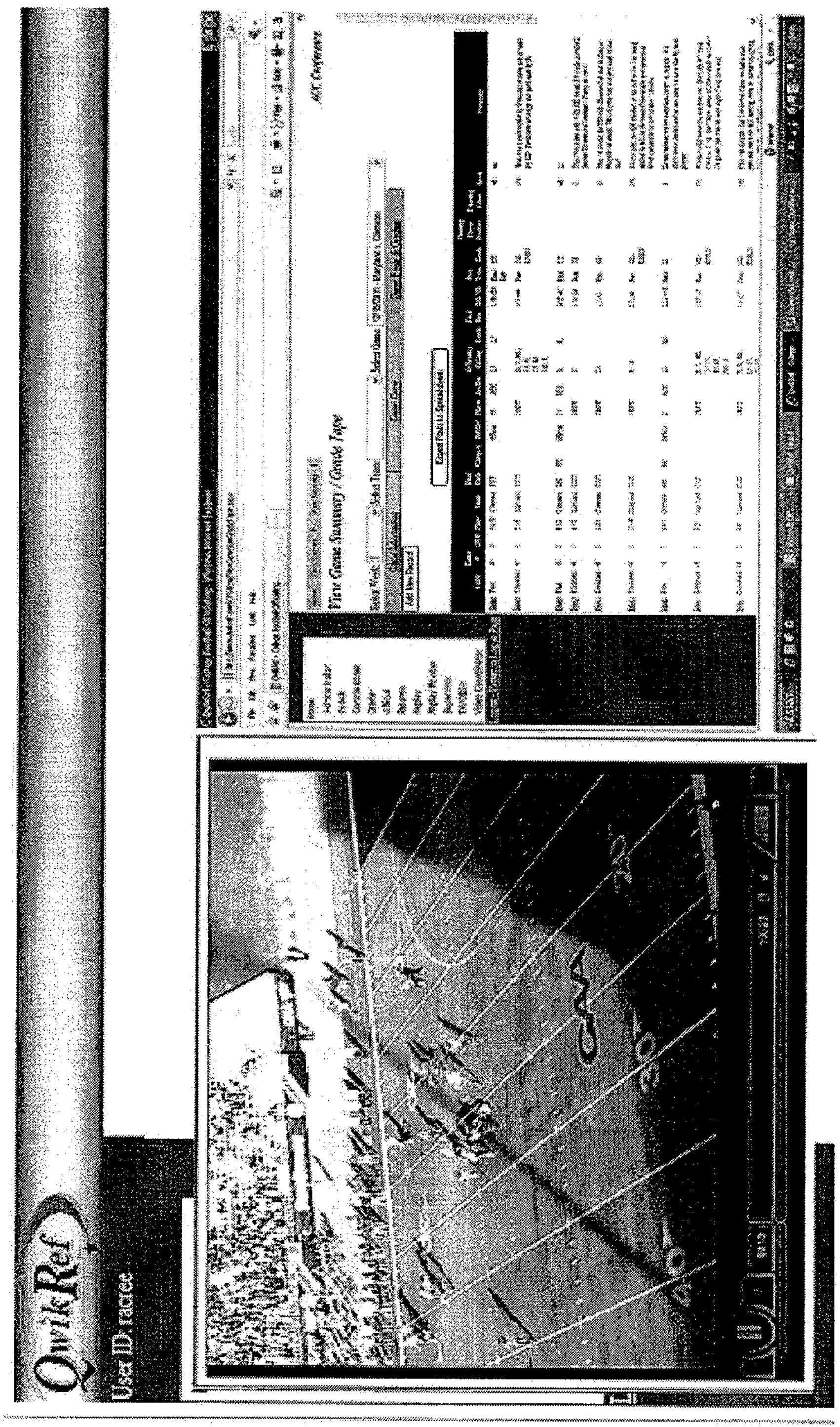

FIG. 164 is a screen shot showing a split screen aspect incorporating data and the corresponding video for the data in accordance with an embodiment of the present invention.

Figure 165:
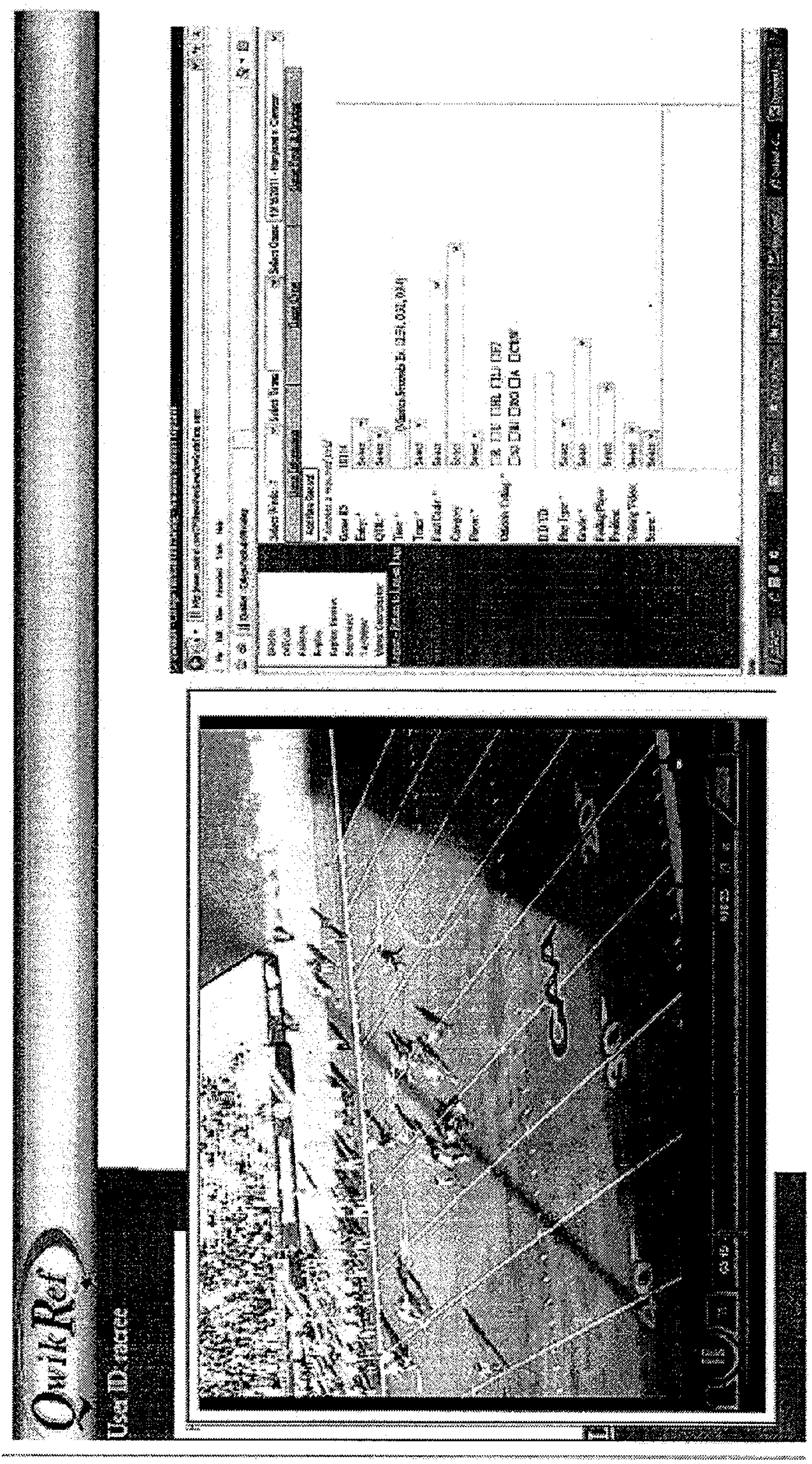

FIG. 165 is a screen shot showing another split screen aspect incorporating data and the corresponding video for the data in accordance with an embodiment of the present invention.

Figure 166:
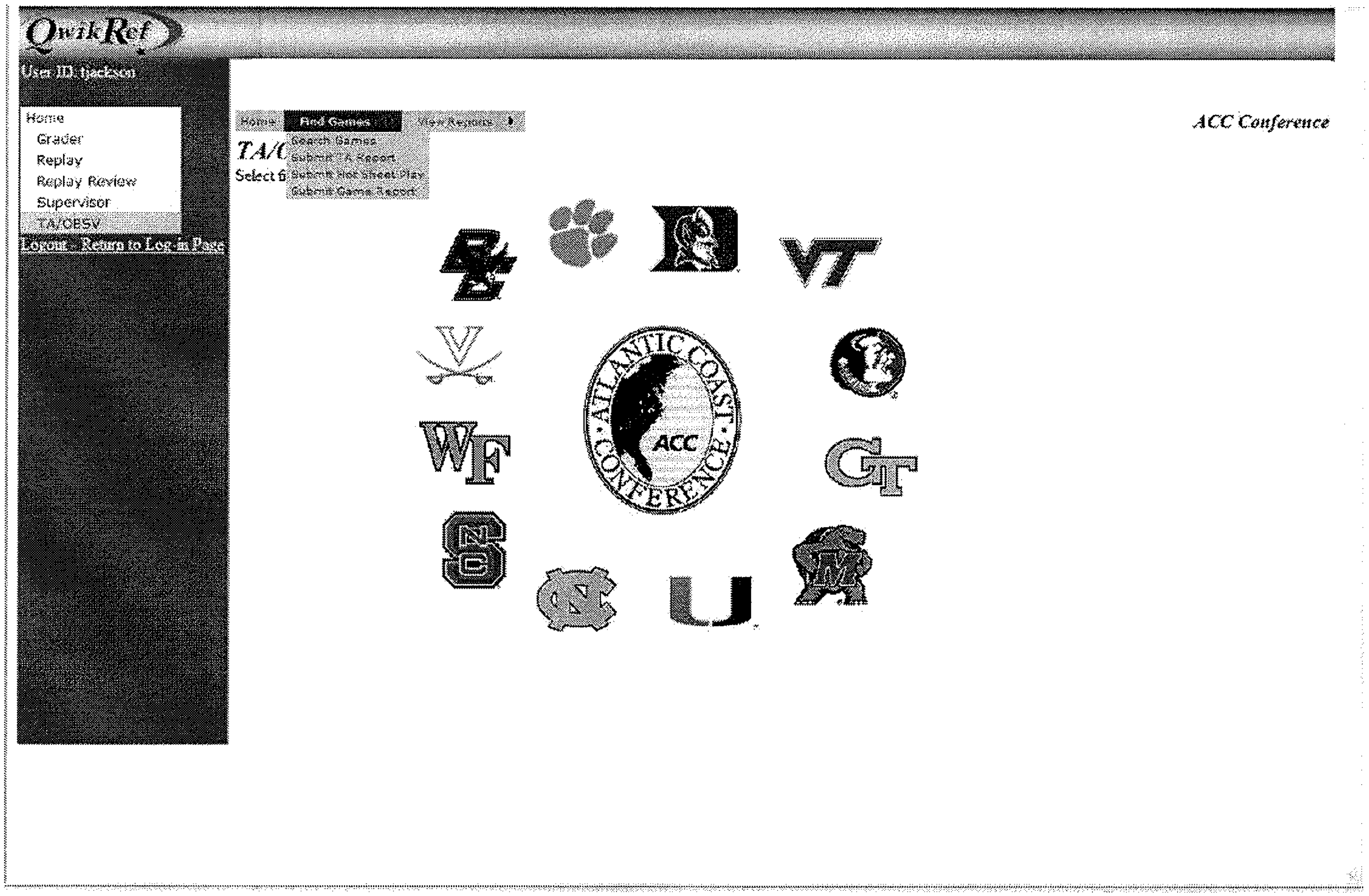

FIG. 166 is a screen shot of TA/Observer permission navigation page from which an Atlantic Coast Conference TA enters his TA Reports and views other reports in accordance with an embodiment of the present invention.

Figure 167:
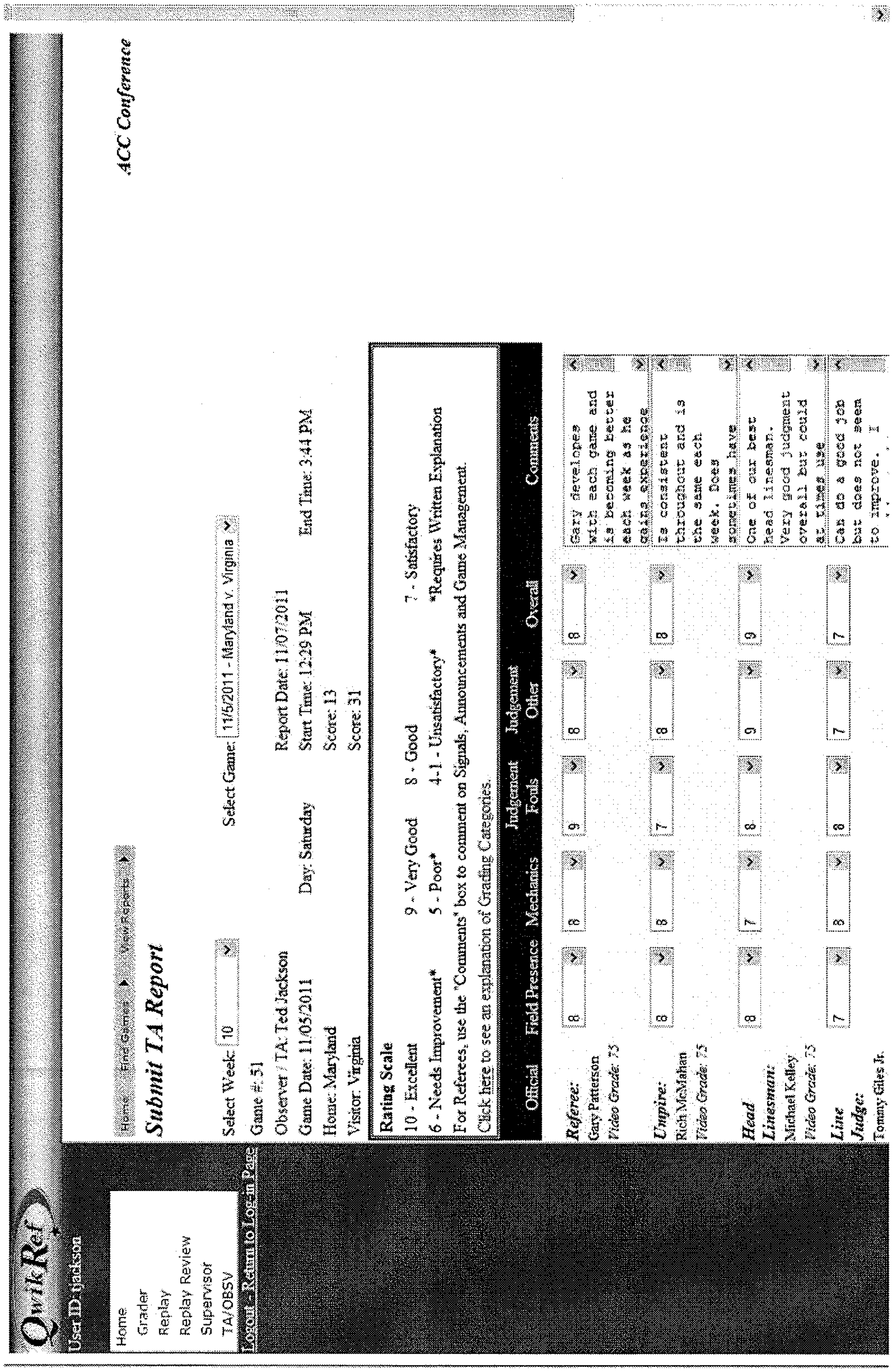

FIG. 167 is a screen shot of TA/Observer permission, find games, submit TA Report page for the 11/5 Maryland v Virginia game where the TA enters subjective evaluations and comments for each game official and the crew in accordance with an embodiment of the present invention.

Figure 168:
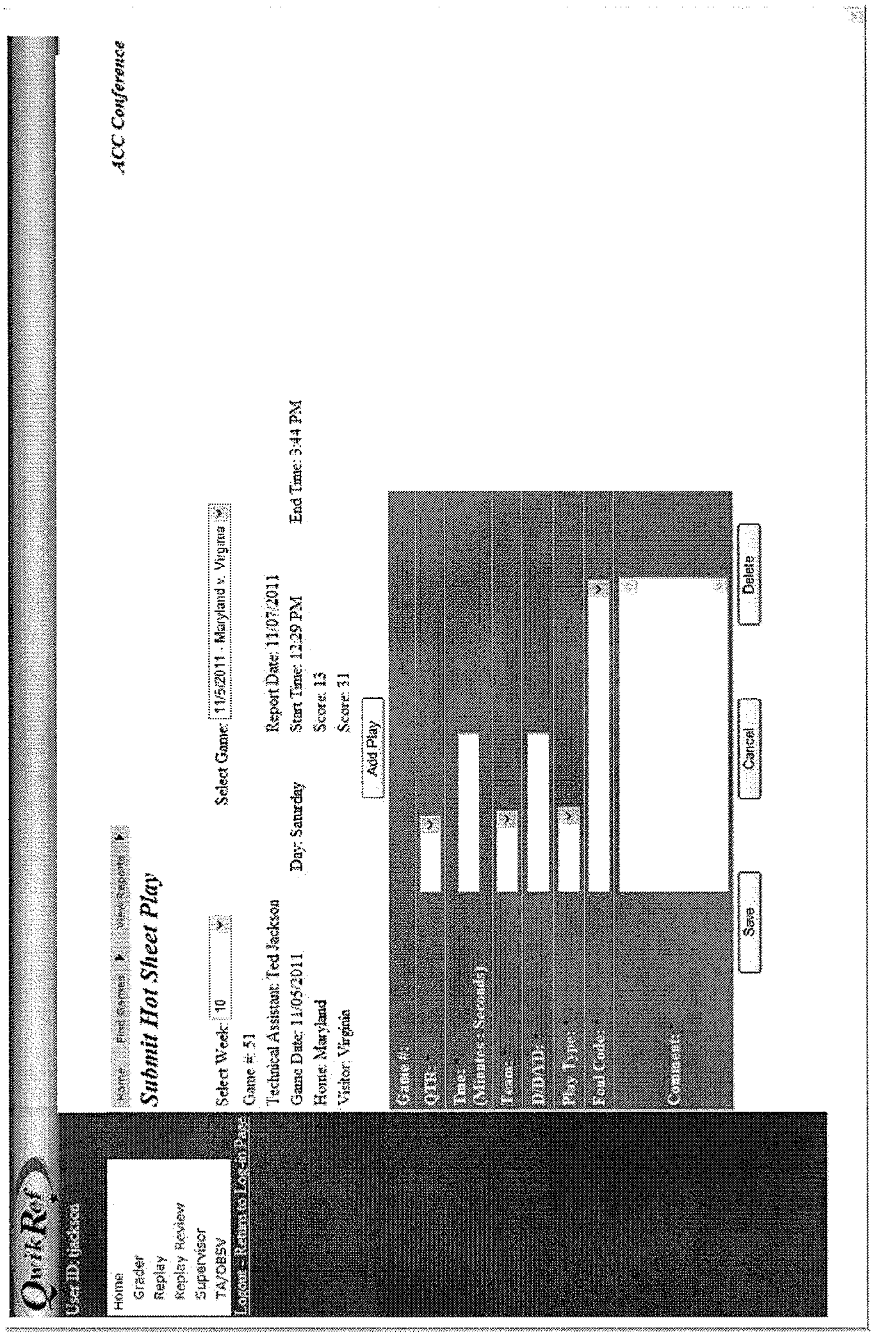

FIG. 168 is a screen shot of TA/Observer permission, find games, submit hot sheet play for a user to enter plays that the Coordinator should look at, in accordance with an embodiment of the present invention.

Figure 169:
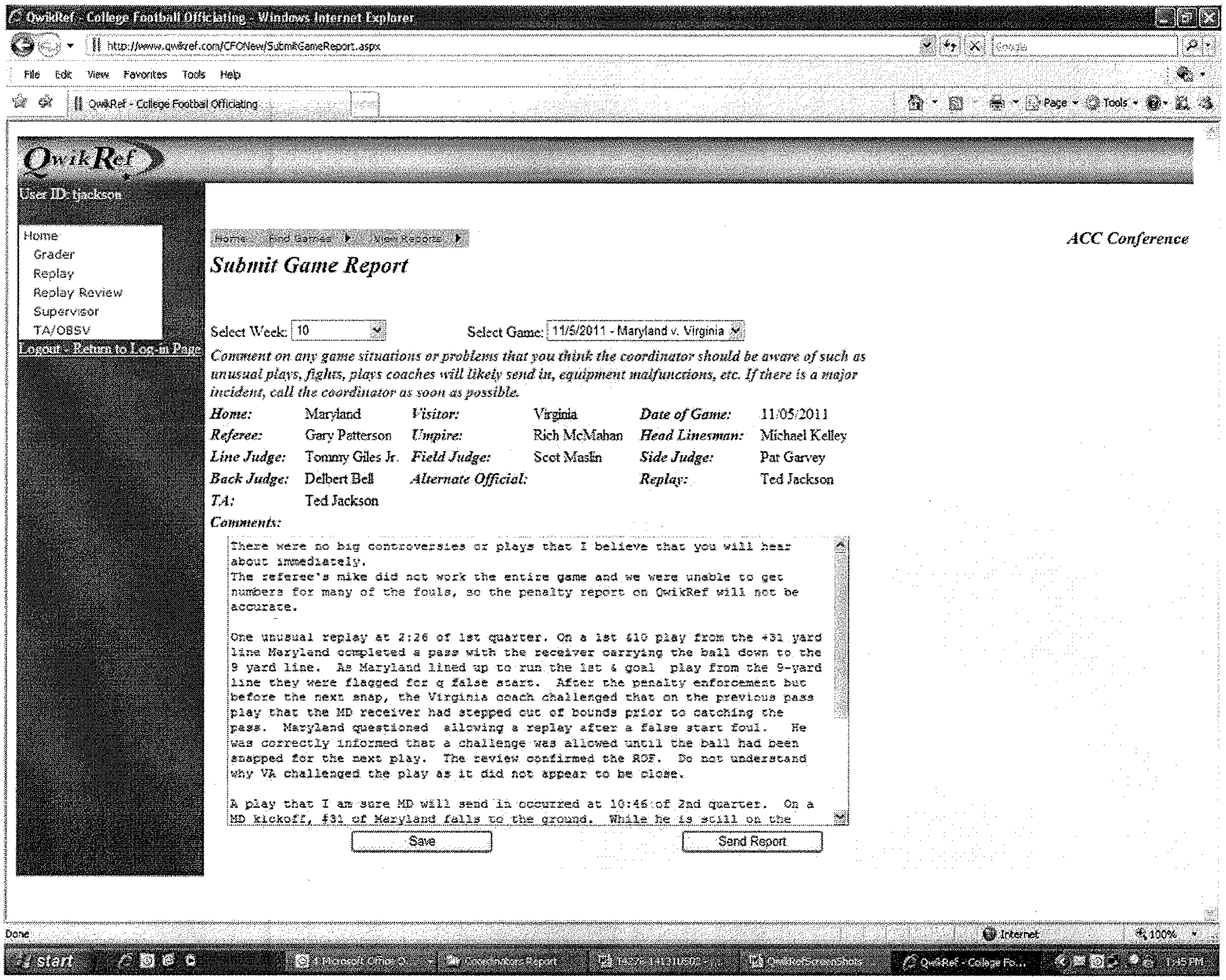

FIG. 169 is a screen shot of TA/Observer permission, find games, submit Game Report with the TA's report data entered and showing the Email alert button for transmitting the report via Email to the Coordinator of Officials, in accordance with an embodiment of the present invention.

Figure 170:
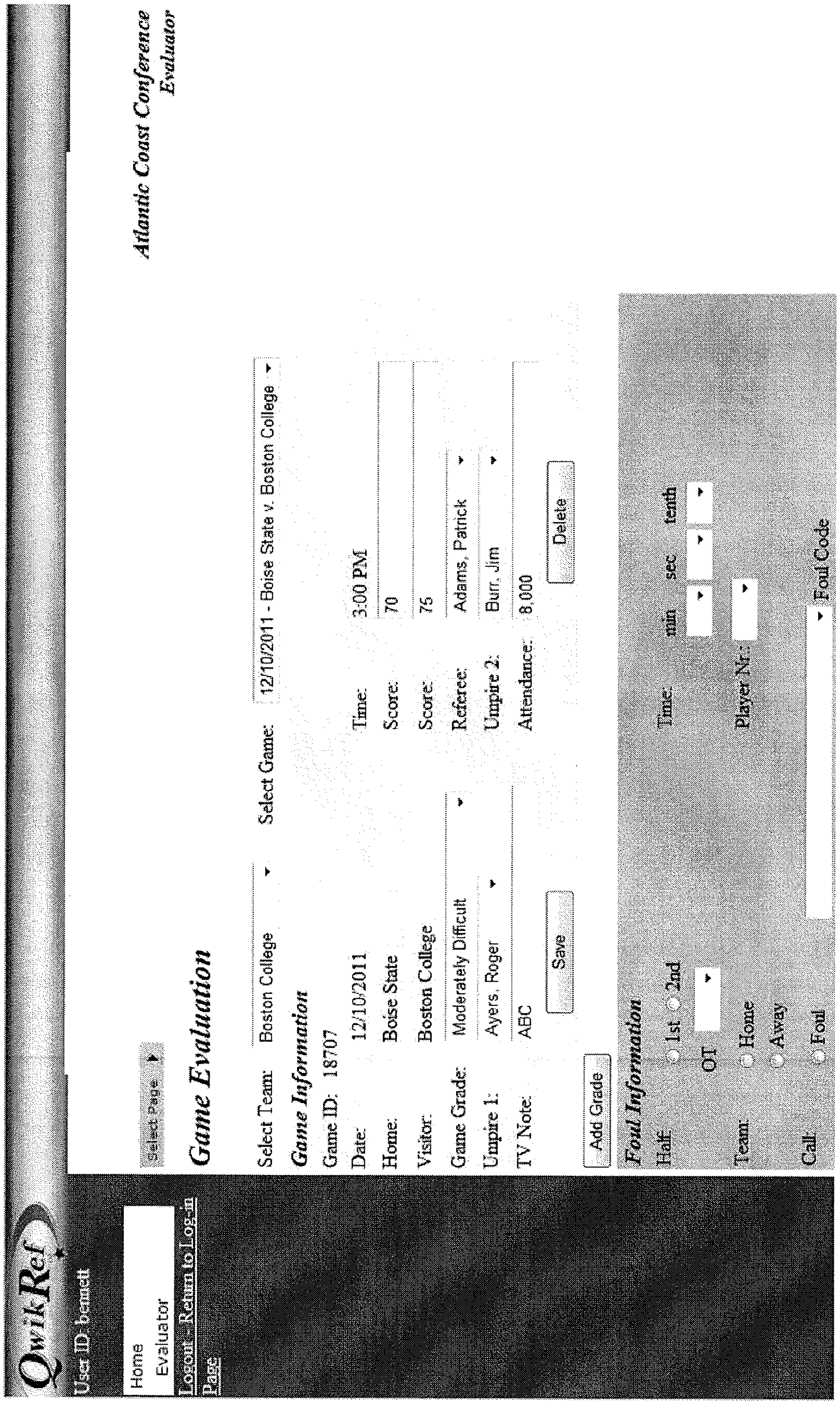

FIG. 170 is a screen shot showing a basketball application, evaluator permission, game evaluation page.

Figure 171:
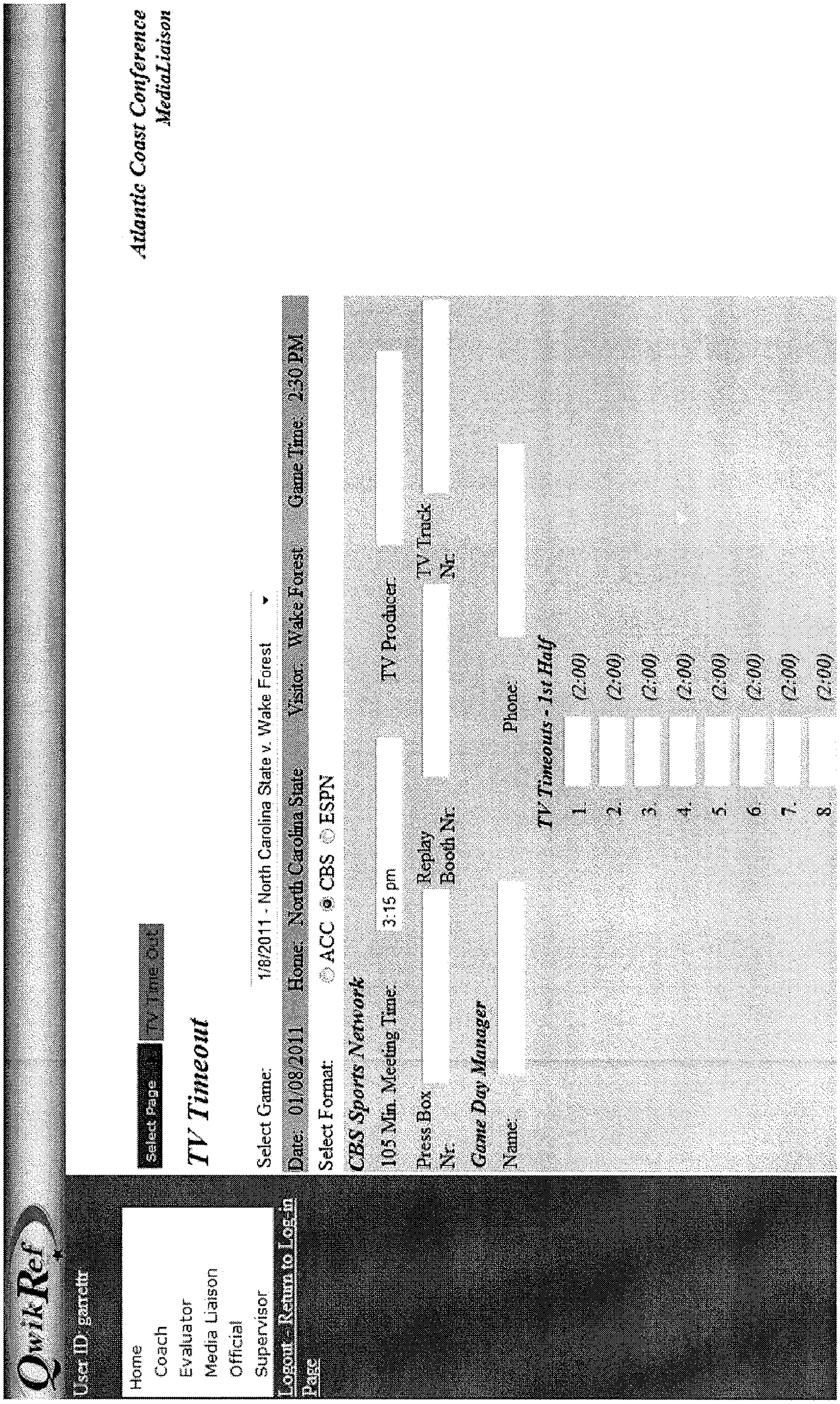

FIG. 171 is a screen shot showing a basketball application, media liaison permission, TV timeout page.

Figure 172:
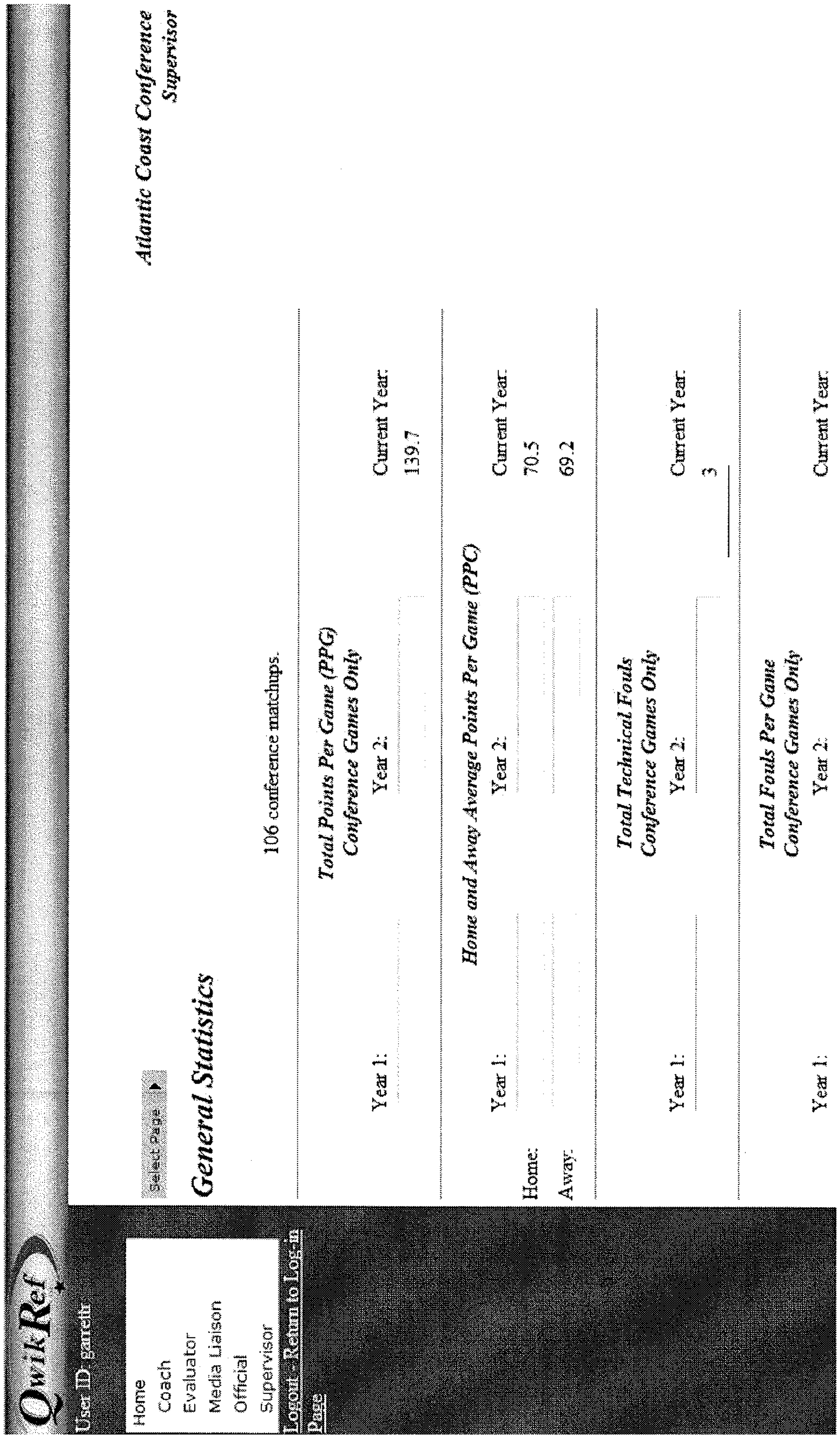

FIG. 172 is a screen shot showing a basketball application, supervisor permission, general statistics report.

Figure 173:
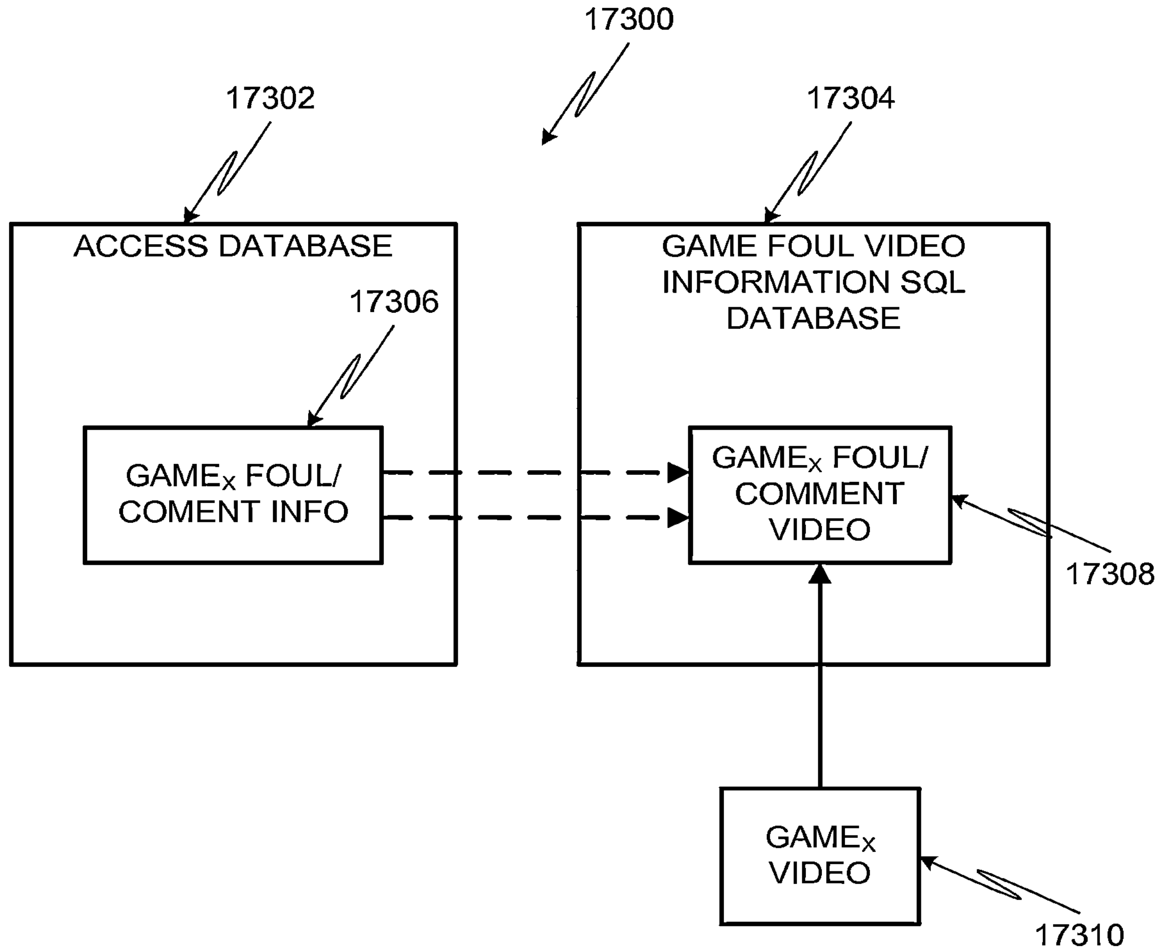

FIG. 173 is a block diagram of an exemplary embodiment of a system for connecting video clips in an online web-based database to game information stored in a separate online web-based database.

Figure 174:
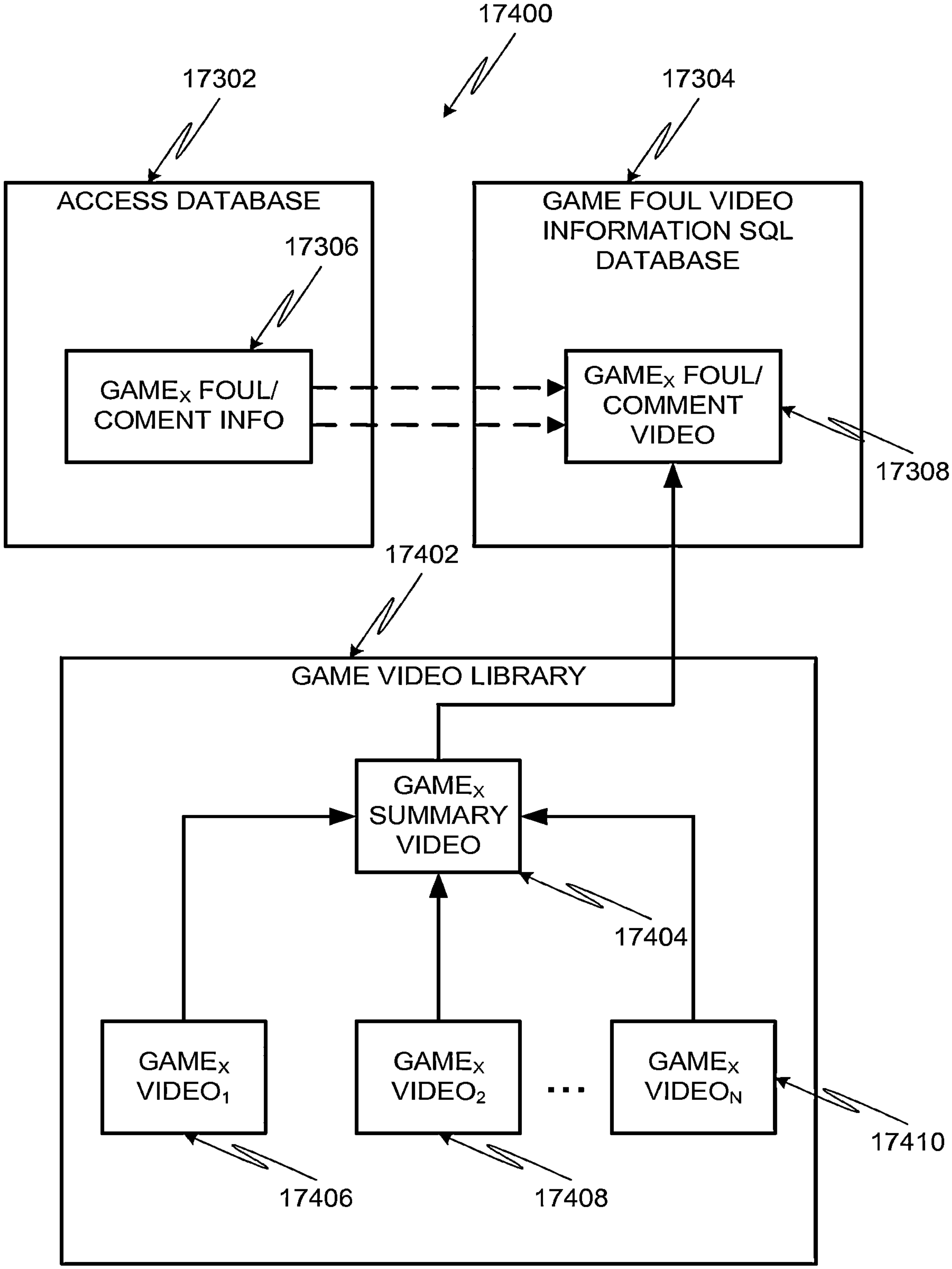

FIG. 174 is a block diagram of an exemplary embodiment of a system for connecting video clips in an online web-based database to game information stored in a separate online web-based database.

Figure 175:
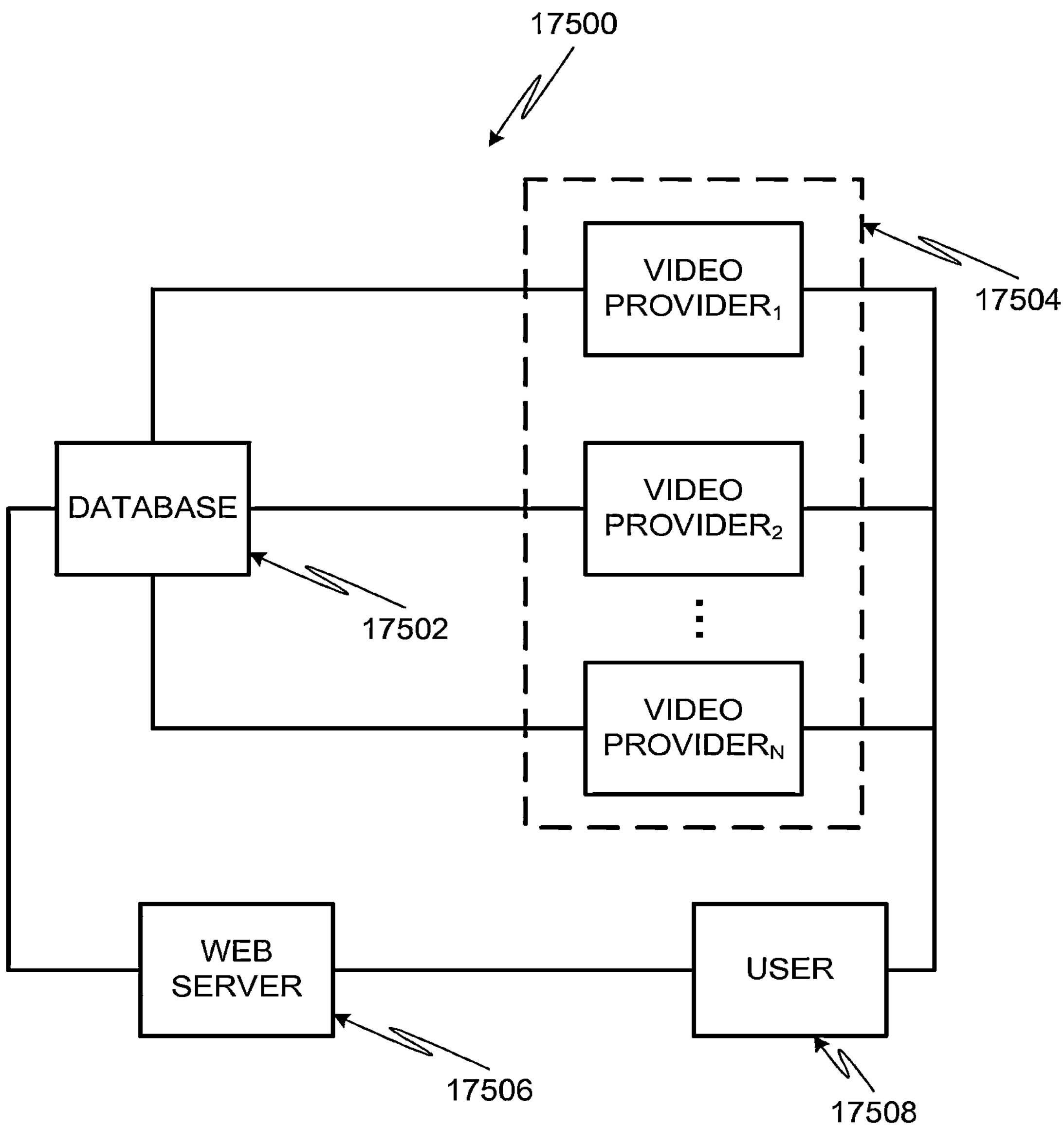

FIG. 175 is a block diagram of an exemplary embodiment of a system for connecting video clips in a plurality of third party online web-based video provider systems to game information stored in a separate online web-based database.

Figure 176:
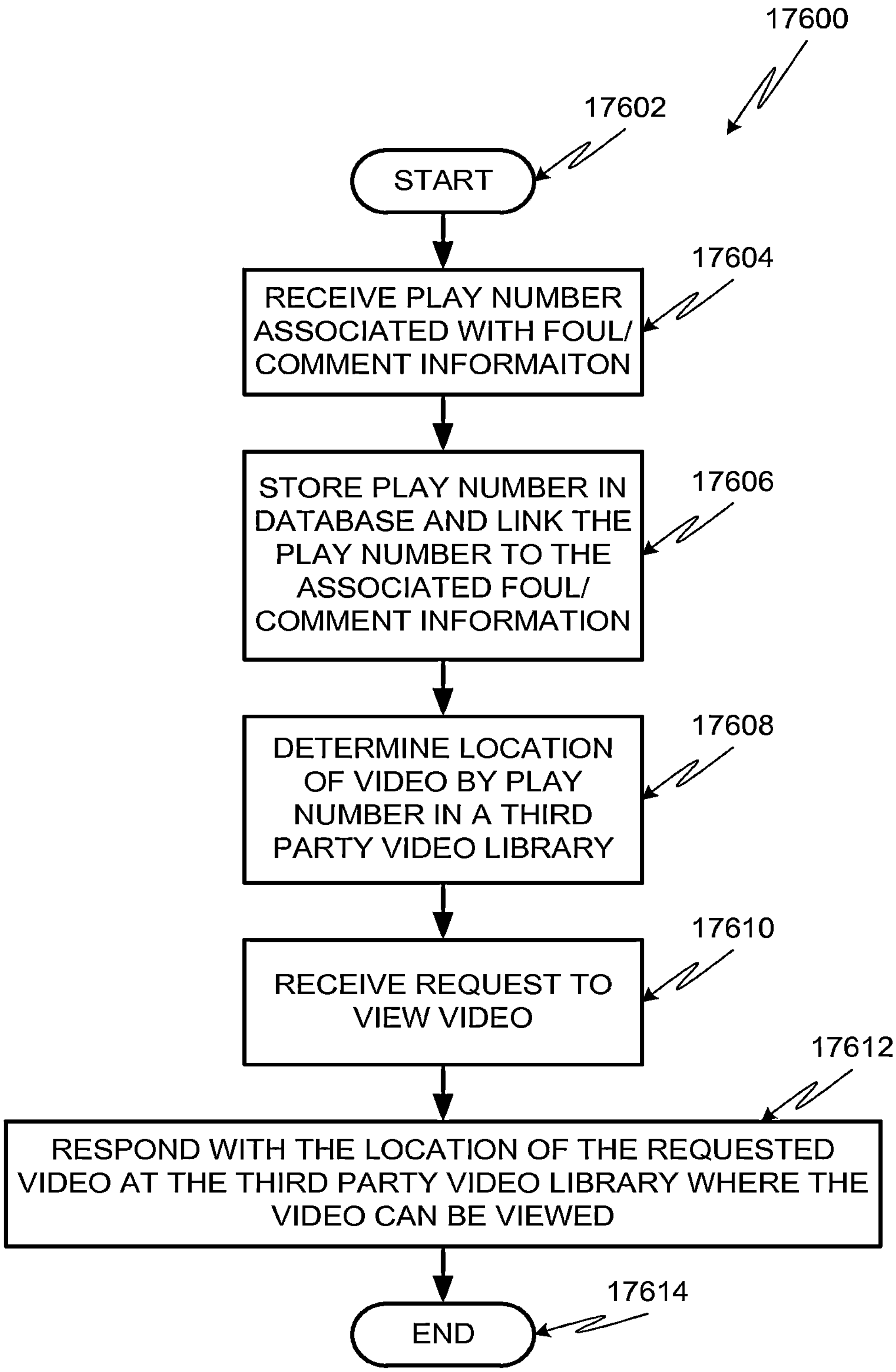

FIG. 176 is a flowchart showing an exemplary method for connecting video clips in an online web-based system to game information stored in a separate online web-based database.

Figure 177:
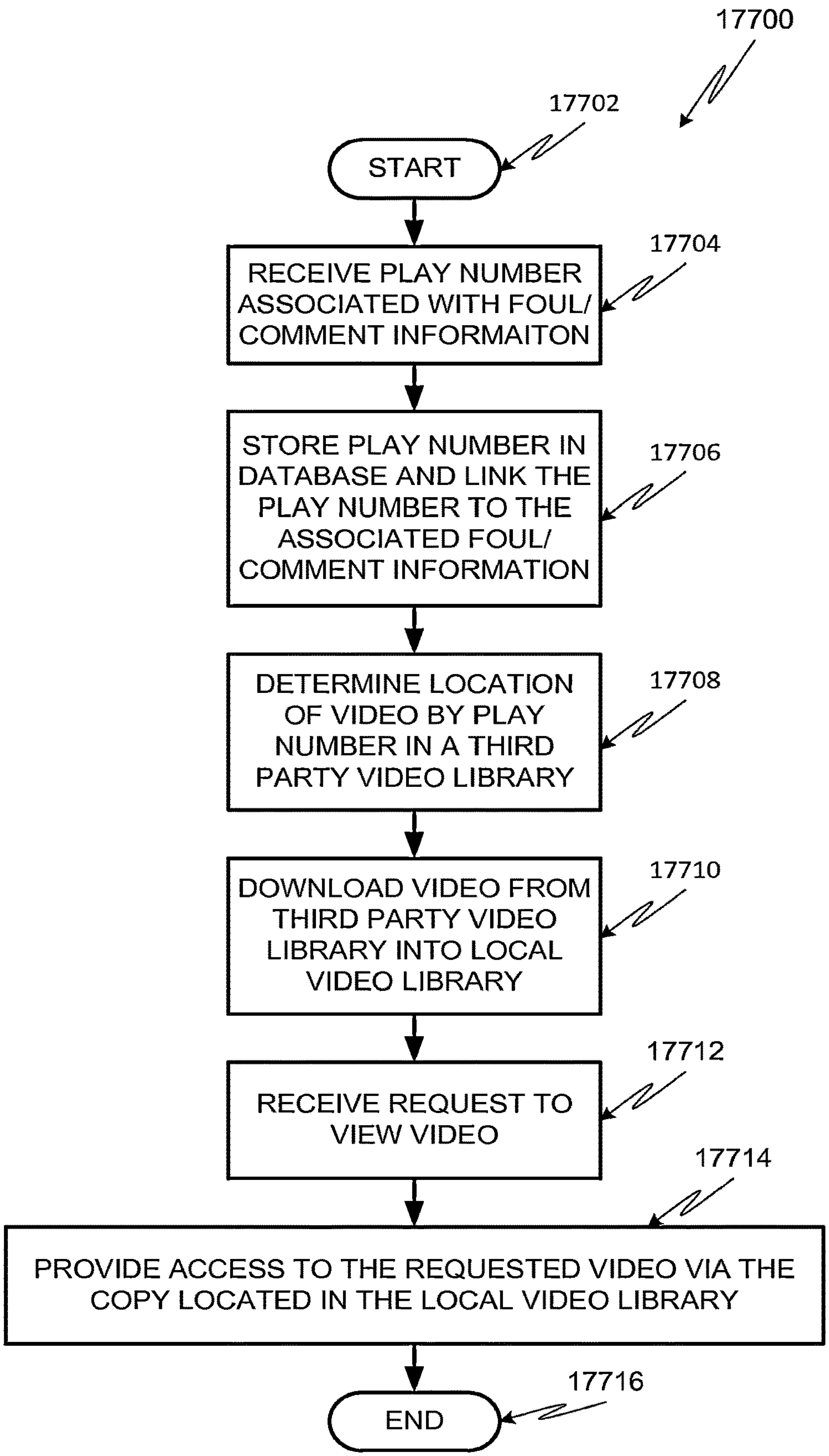

FIG. 177 is a flowchart showing an exemplary method for connecting video clips in an online web-based system to game information stored in a separate online web-based database.

Figure 178:
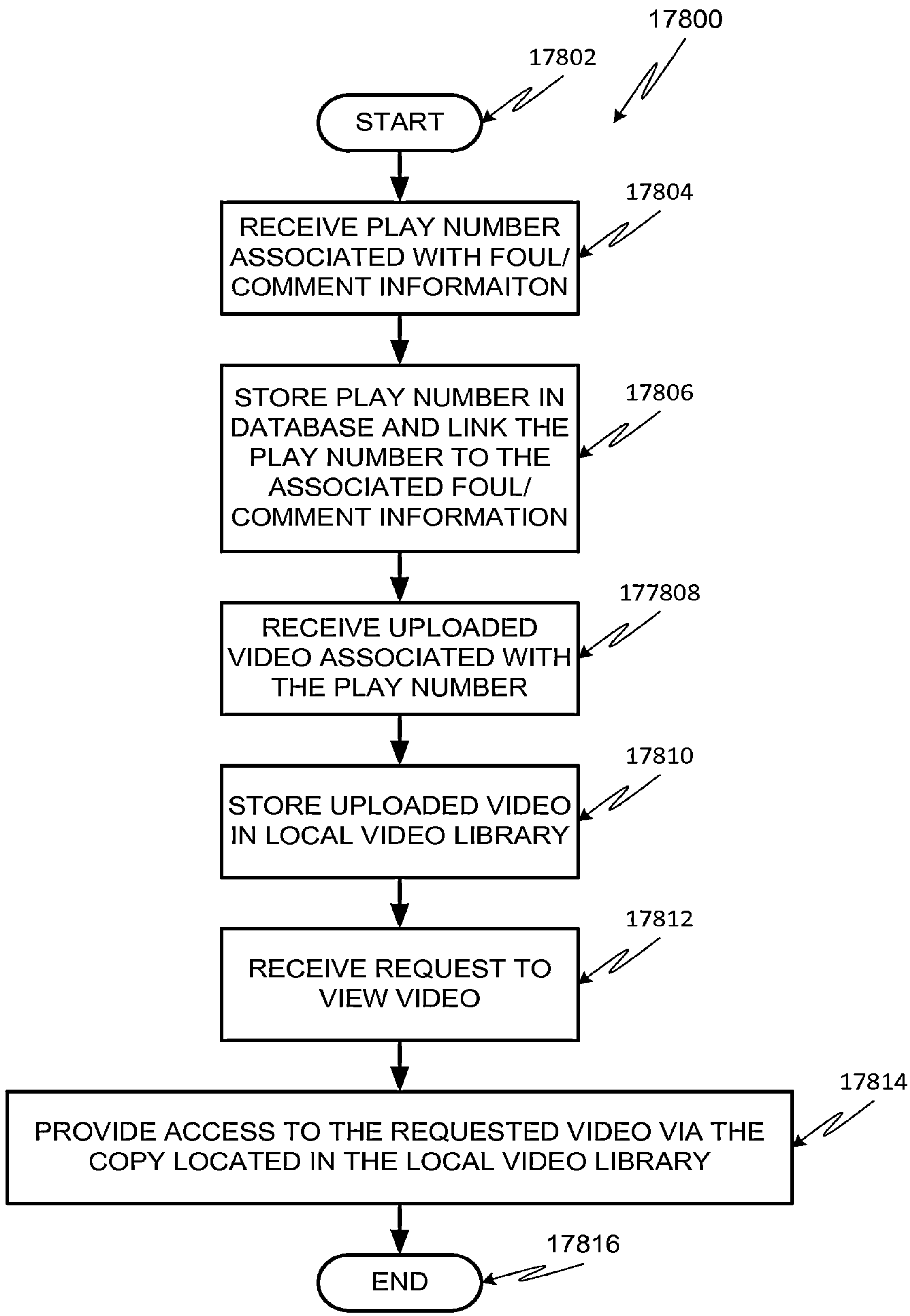

FIG. 178 is a flowchart showing an exemplary method for connecting video clips in an online web-based system to game information stored in a separate online web-based database.

DETAILED DESCRIPTION

Embodiments of the present invention are directed generally to a system and method for reviewing, analyzing, assessing, and evaluating performance. In particular, embodiments of the present invention relate to a system and method for reviewing, assessing, and evaluating performances of an official or group of officials at an event or events. As used herein, the phrase "various embodiments" is intended to mean an embodiment, at least one embodiment, some embodiments, and/or all embodiments without limitation.

Figure 1:
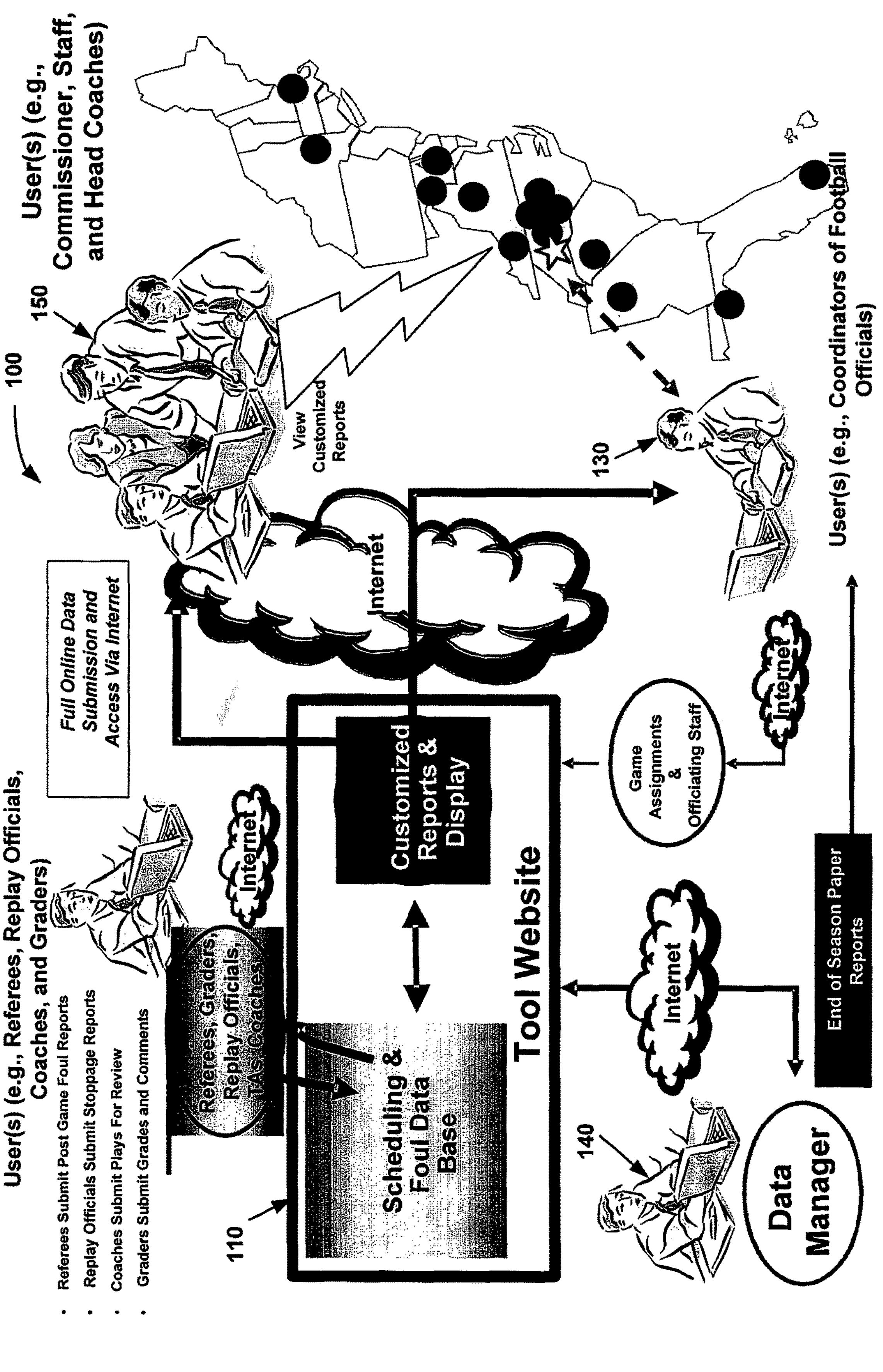
FIG. 1 is system diagram showing the Web-based computer software tool program for evaluating and reviewing a referee's performance during a football game or games implemented as a website, in accordance with an embodiment of the present invention.

FIG. 1 is a system diagram showing the Web-based computer software tool program/database for evaluating, analyzing, assessing, and reviewing a referee's performance during a football game or games implemented as a website, in accordance with an embodiment of the present invention. In FIG. 1 a website 110 having implemented therein a computer software tool program, including a database 112 for storing all of the game and official grading information and a reporting component/module 114 to prepare and display customized reports based on the data in database 112. Website 110 is shown as having a variety of users being able to connect thereto. For example, a first user 120 may be a referee, a replay official, a technical assistant (TA), an observer, a coach, and/or a grader, each of whom can have their own separate access to the website 110; and a second user 130 who may be a coordinator or supervisor of football officials, with the appropriate access to the website 110 to be able to review the data, grades and evaluation entered into the database 112 and the reports that can be generated by the reporting component/module 114. Similarly, a third user 140 may be a data manager/supervisor who is responsible for, but not limited to, maintaining the website 110 and preparing and providing end of season paper reports; and a fourth user 150 who may be a League Commissioner, Commissioner's Staff, and Head Coaches who are responsible for their respective organizations and can view a variety of customized reports from the website 110.

The system and method implemented in the website 110 can be used for collecting, assessing, analyzing, and reporting data relating to an official's (e.g, a referee's) performance and/or conduct for a specified event or events. In various embodiments, the data may relate to penalties called and enforced by an official in a football game. Further, the data may include replay information from a replay official, subjective assessments from a technical advisor, and/or an evaluation from a coach. The system and method may also allow for review, evaluation, and grading of an official's (e.g., on field/court or replay official) performance and/or conduct based on the collected data. The system and method may also allow for a submission indicating a specific performance and/or conduct to be reviewed. For example, the system and method may provide for a request to review a specific play or call which is submitted by a specific team or a coach. The coach can be a coach from a team involved in the game to be reviewed and/or a coach from a team not involved in the game.

Figure 2:
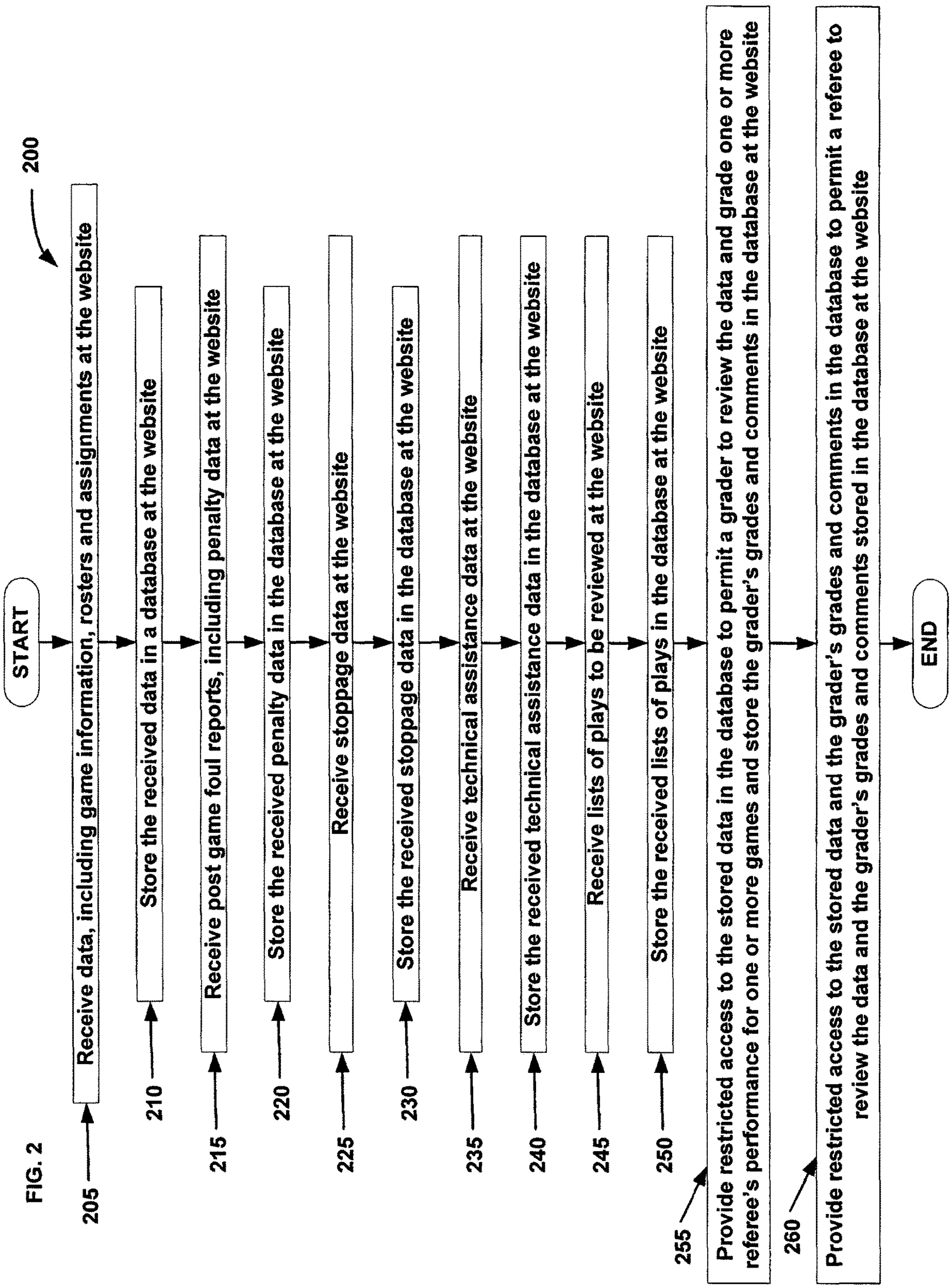
FIG. 2 is a flow diagram of how various users can use the program shown in FIG. 1, in accordance with an embodiment of the present invention.
Figure 3:
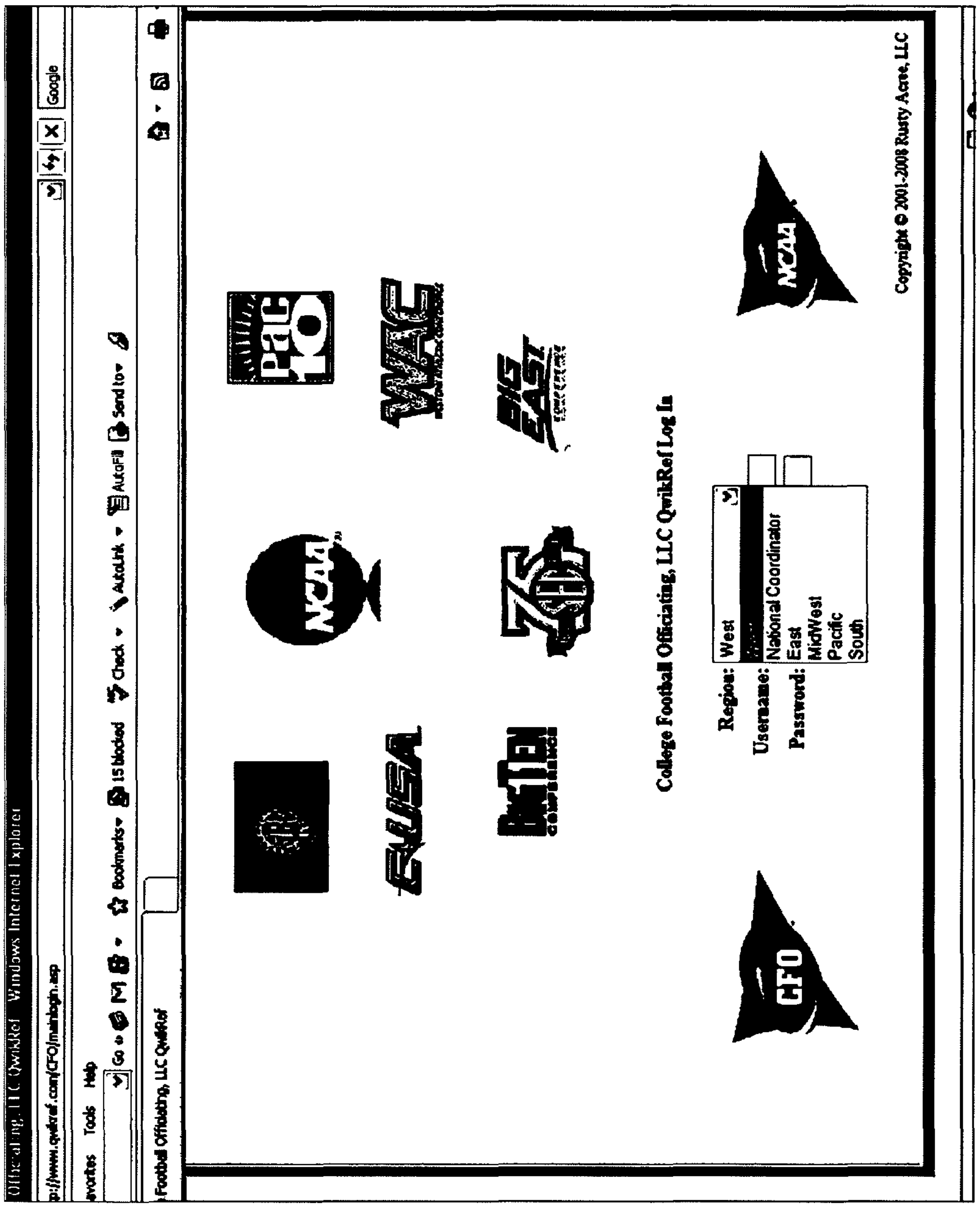
FIG. 3 is a screen shot of a general login page with a variety of different regions displayed, in accordance with an embodiment of the present invention.
Figure 4:
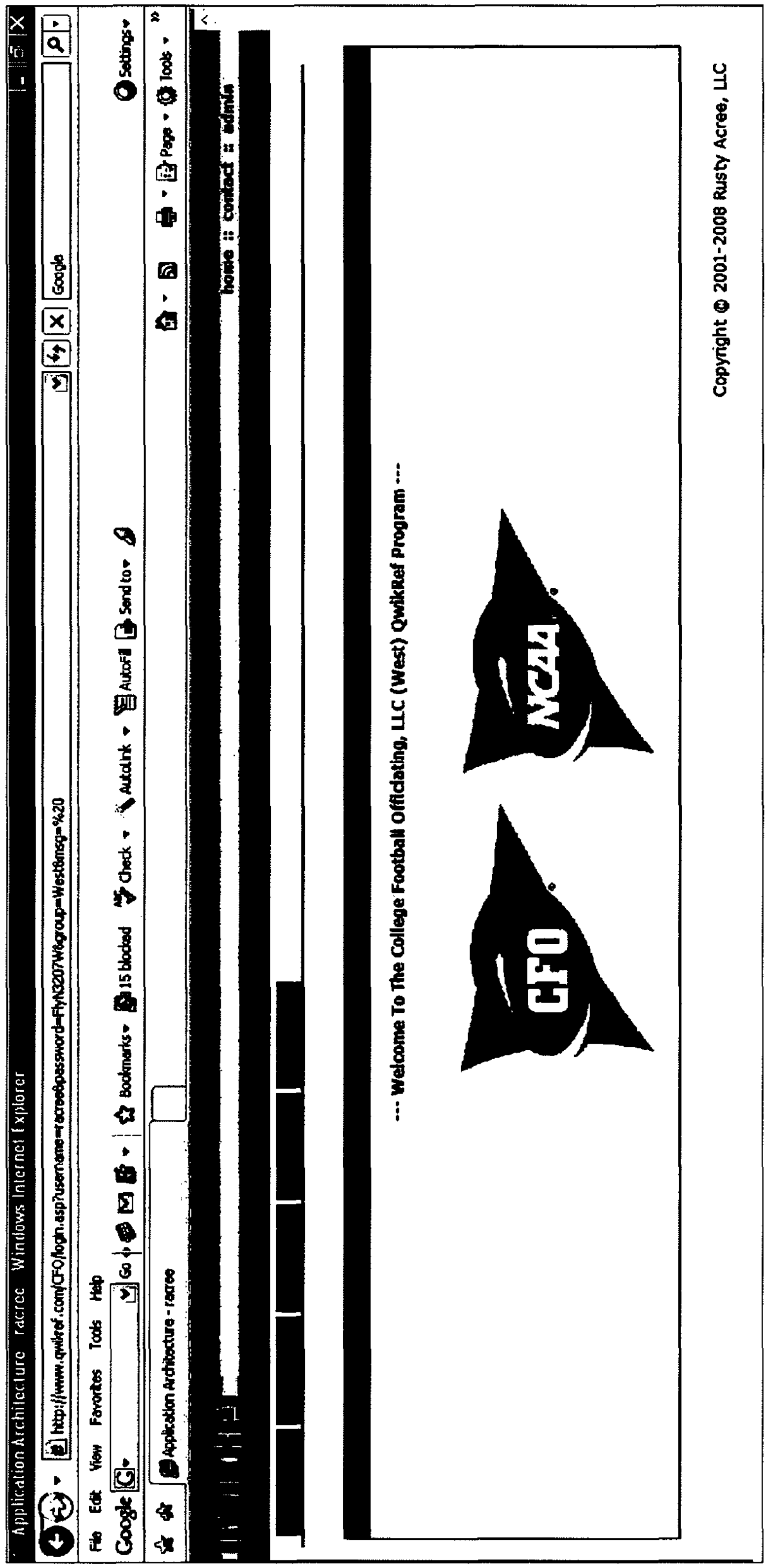
FIG. 4 is a screen shot of a supervisor permission welcome screen that is displayed after a supervisor logins in to the system, in accordance with an embodiment of the present invention.
Figure 5:
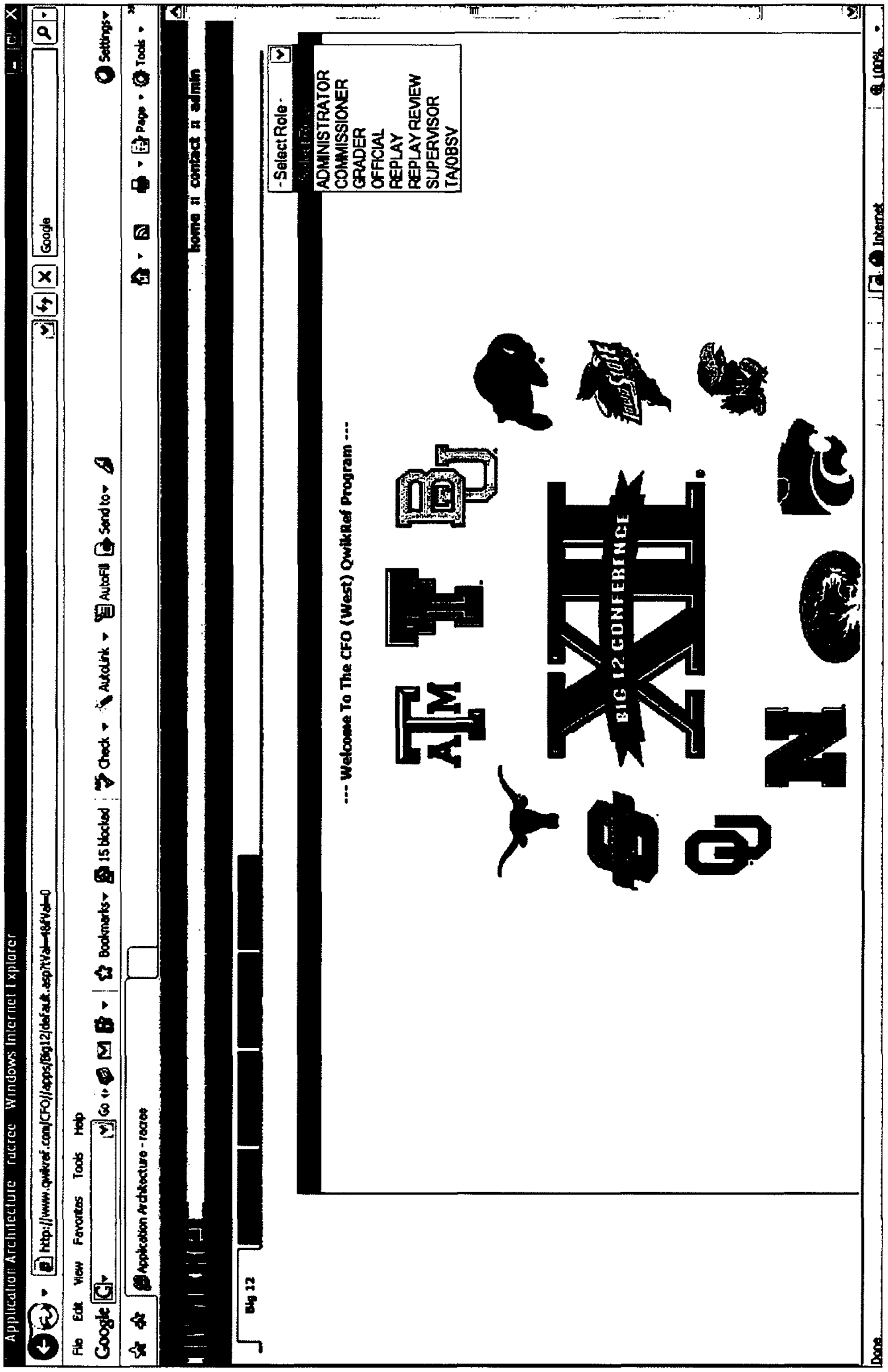
FIG. 5 is a screen shot of a Big 12 tab welcome page showing a list of the roles/people that can login to the system displayed, in accordance with an embodiment of the present invention.
Figure 6:
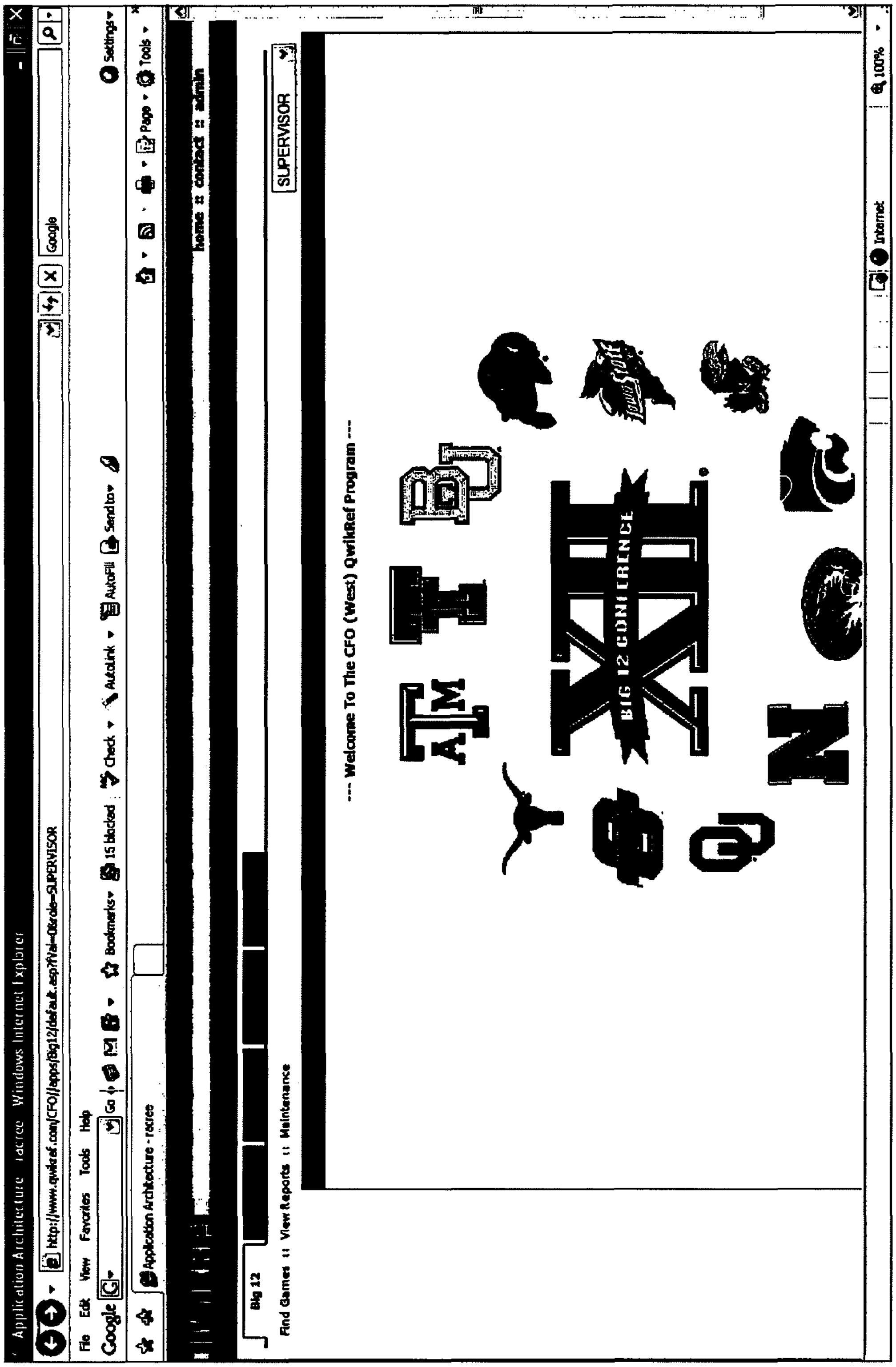
FIG. 6 is a screen shot of a supervisor permission navigation page that is displayed after selecting the supervisor role in FIG. 5, in accordance with an embodiment of the present invention.
Figure 7:
FIG. 7 is a screen shot of a supervisor permission, find games, menu page that is displayed after selecting the find games option directly under the Big 12 tab displayed, in accordance with an embodiment of the present invention.
Figure 8:
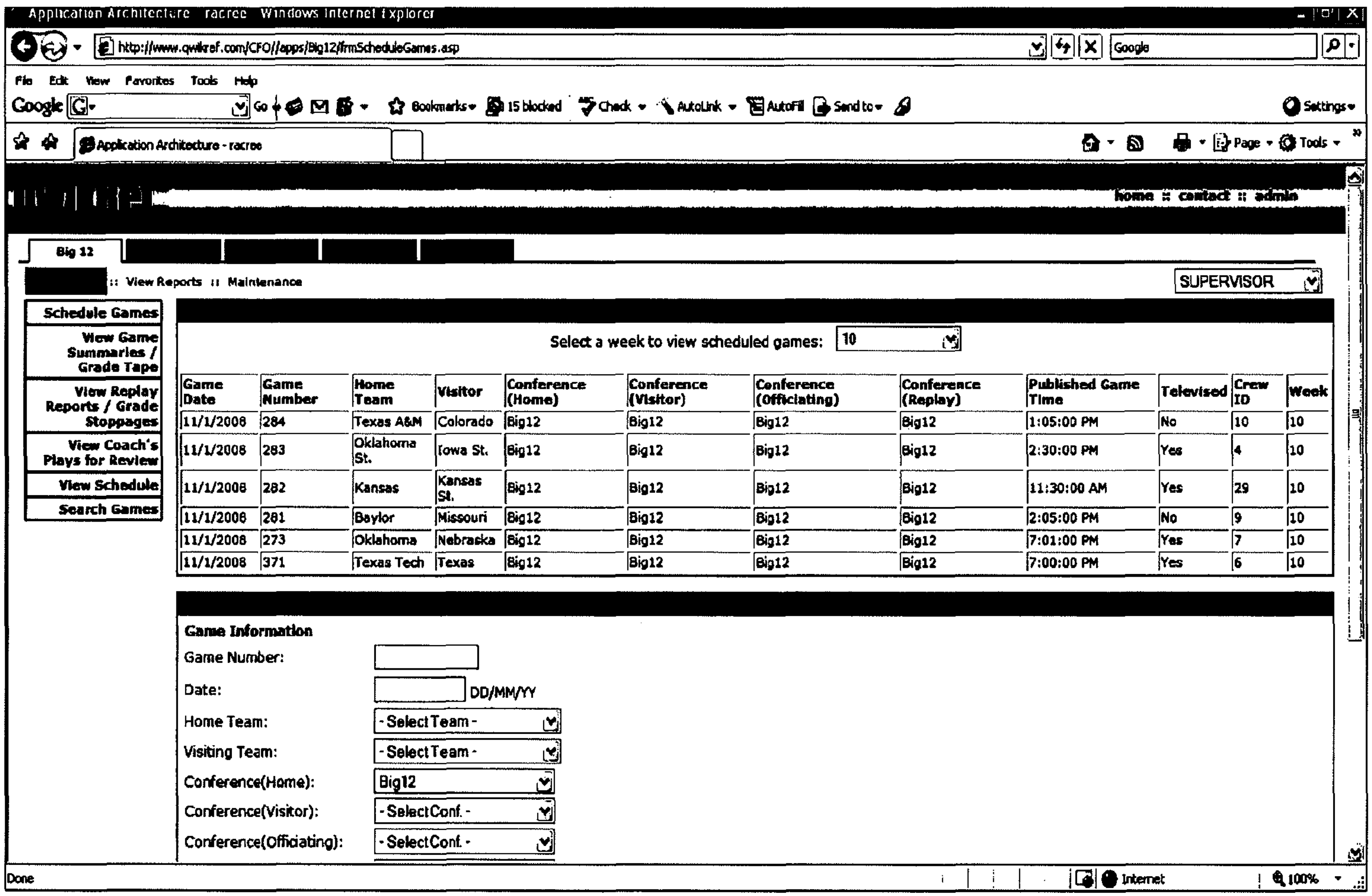
FIG. 8 is a screen shot of a supervisor permission, find games, schedule games page that is displayed after selecting the schedule games option directly under the find games option, in accordance with an embodiment of the present invention.
Figure 9:
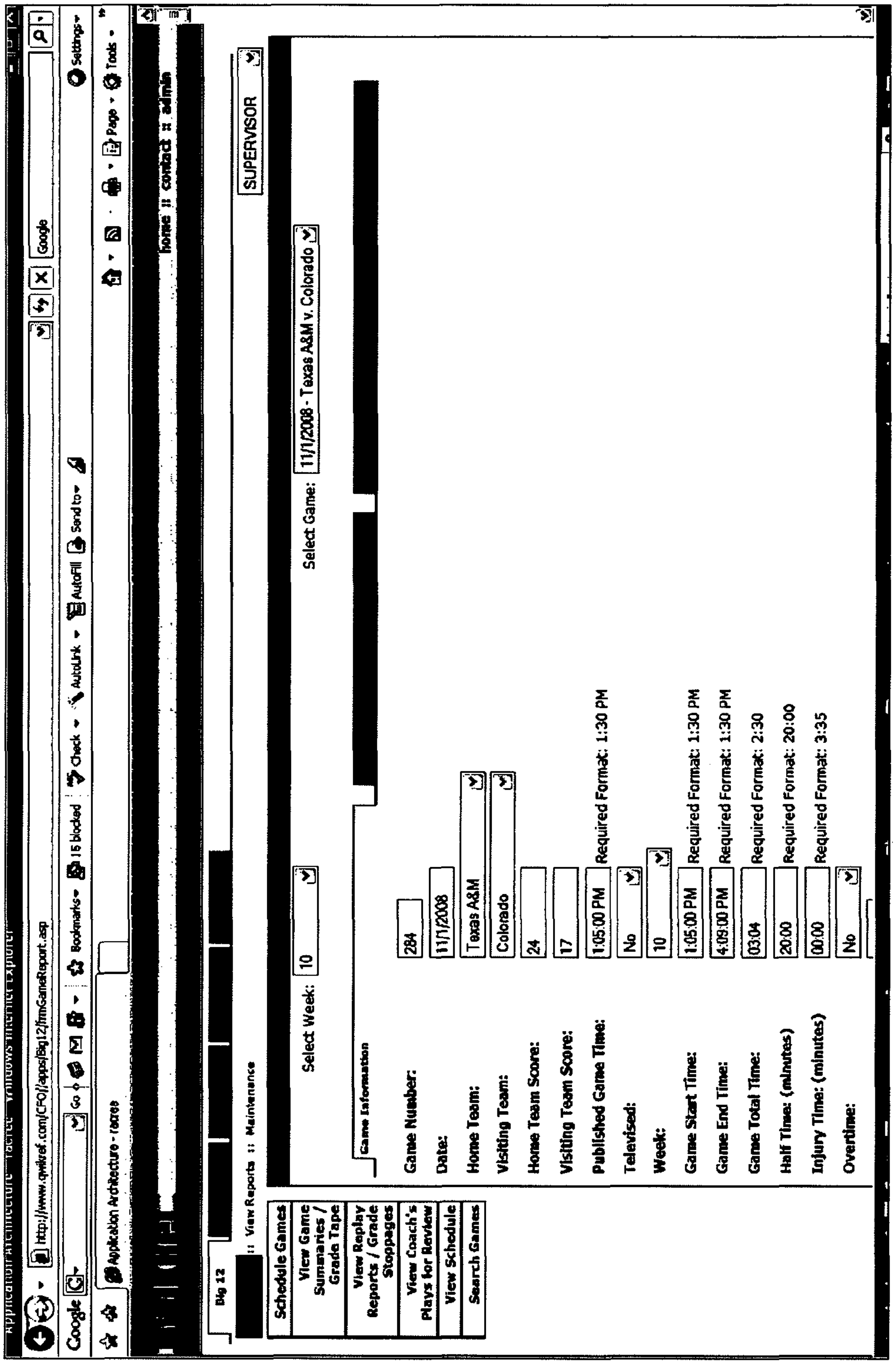
FIG. 9 is a screen shot of a supervisor permission, find games, view game summaries/grade tape game information page that is displayed after selecting the view game information tab directly under a select week selection box, in accordance with an embodiment of the present invention.
Figure 10:
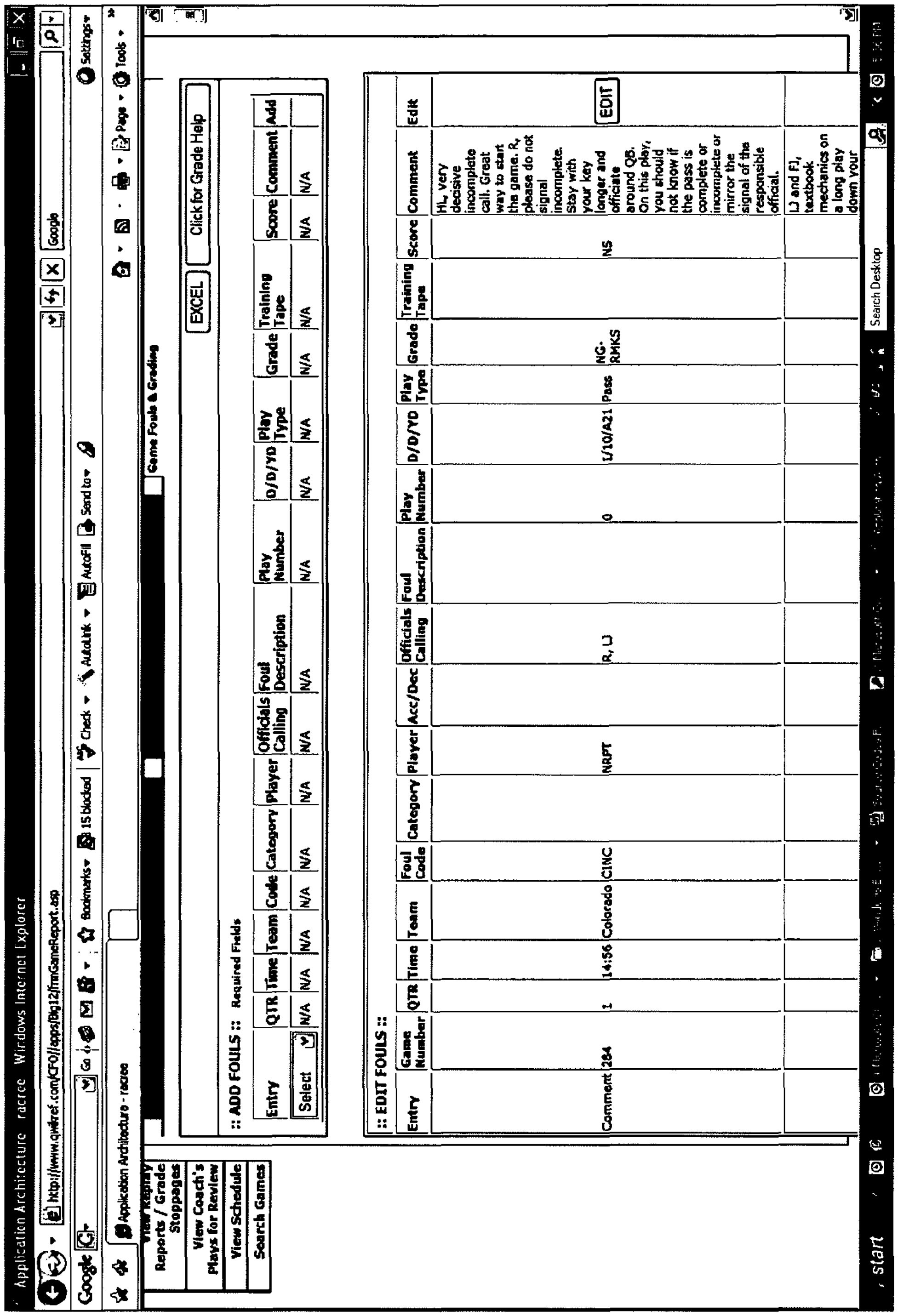
FIG. 10 is a screen shot of a supervisor permission, find games, view game summaries/game fouls & grading tab that is displayed after selecting the view game fouls & grading tab on the far right, in accordance with an embodiment of the present invention.
Figure 11:
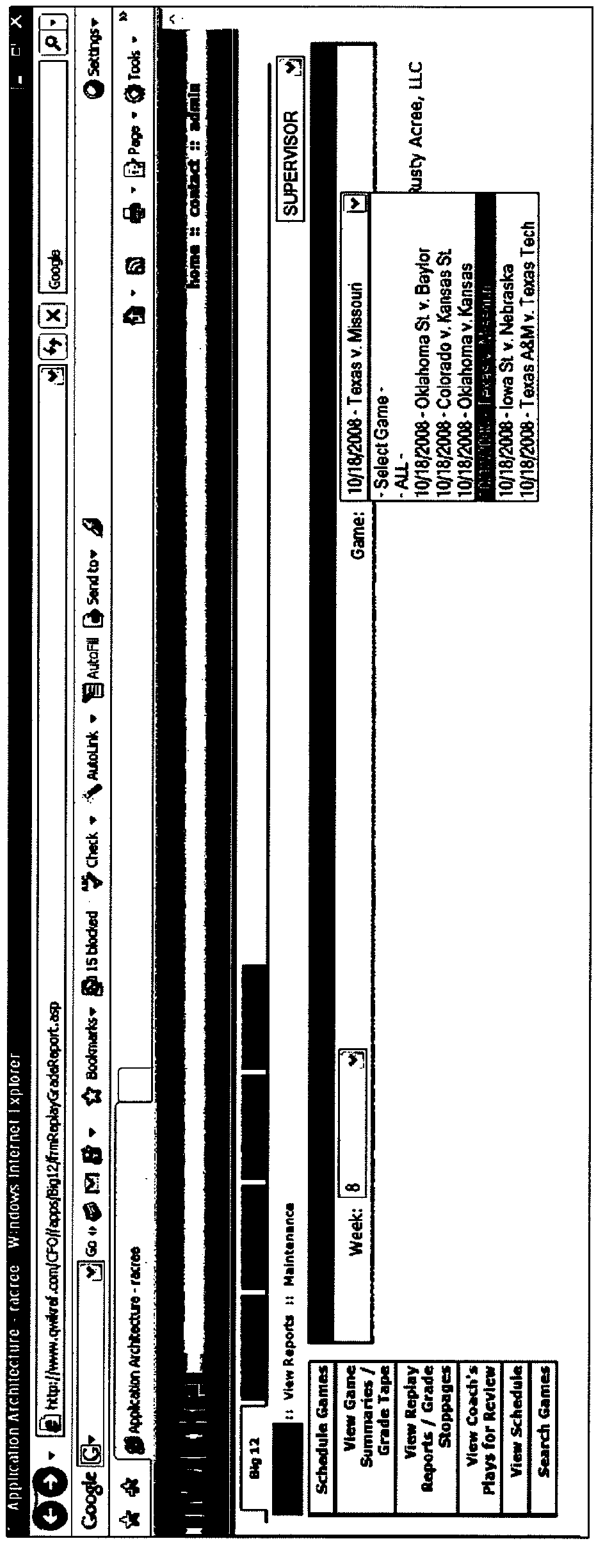
FIG. 11 is a screen shot of a supervisor permission, find games, view replay reports/grade stoppages that is displayed after selecting the view replay reports/grade stoppages option directly under the view game summaries/grade tape option, in accordance with an embodiment of the present invention.
Figure 12:
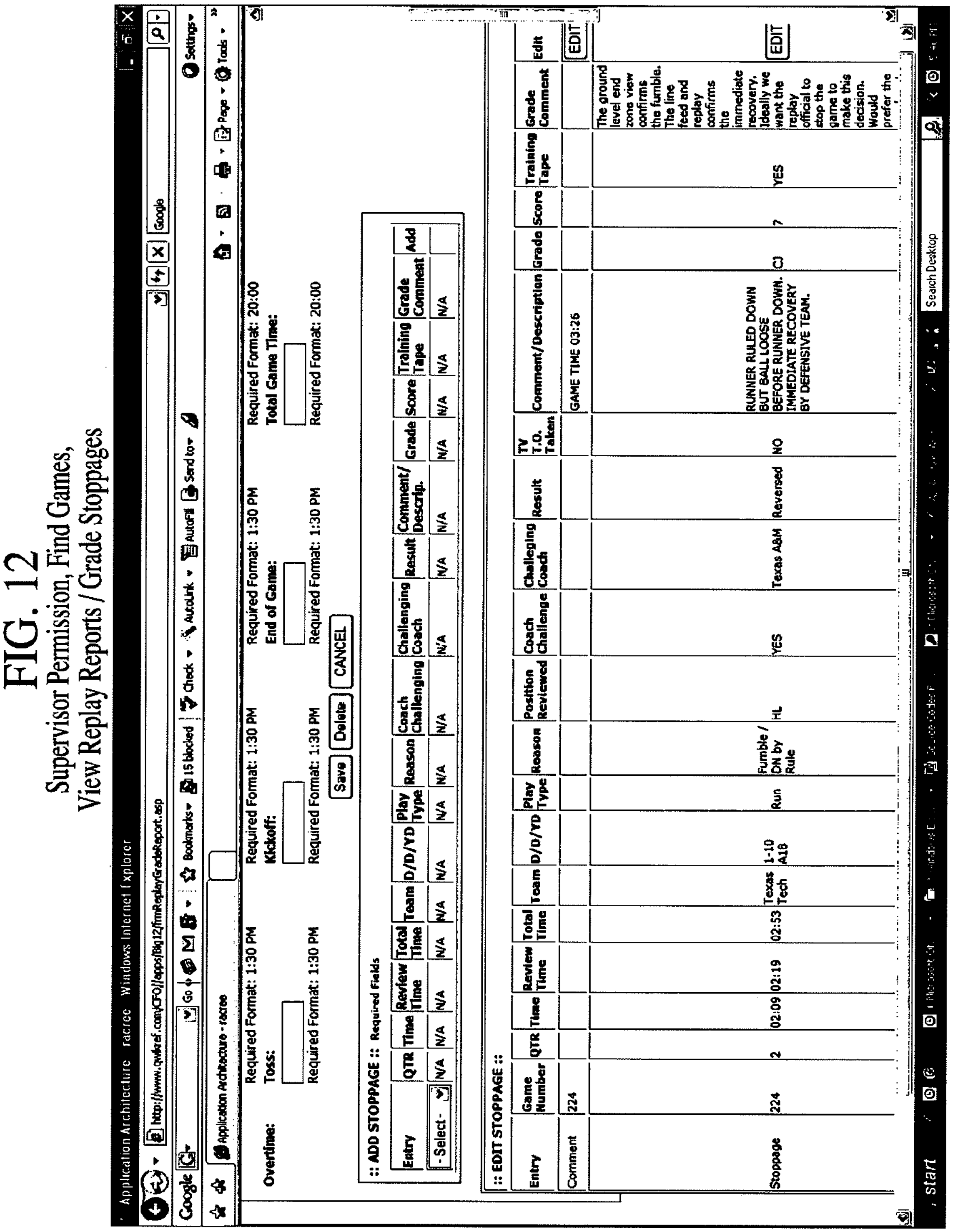
FIG. 12 is a screen shot of the supervisor permission, find games, view replay reports/grade stoppages from FIG. 11 that is displayed after selecting the 10/18/2008 Texas v. Missouri game from the drop down menu in FIG. 11, in accordance with an embodiment of the present invention.
Figure 13:
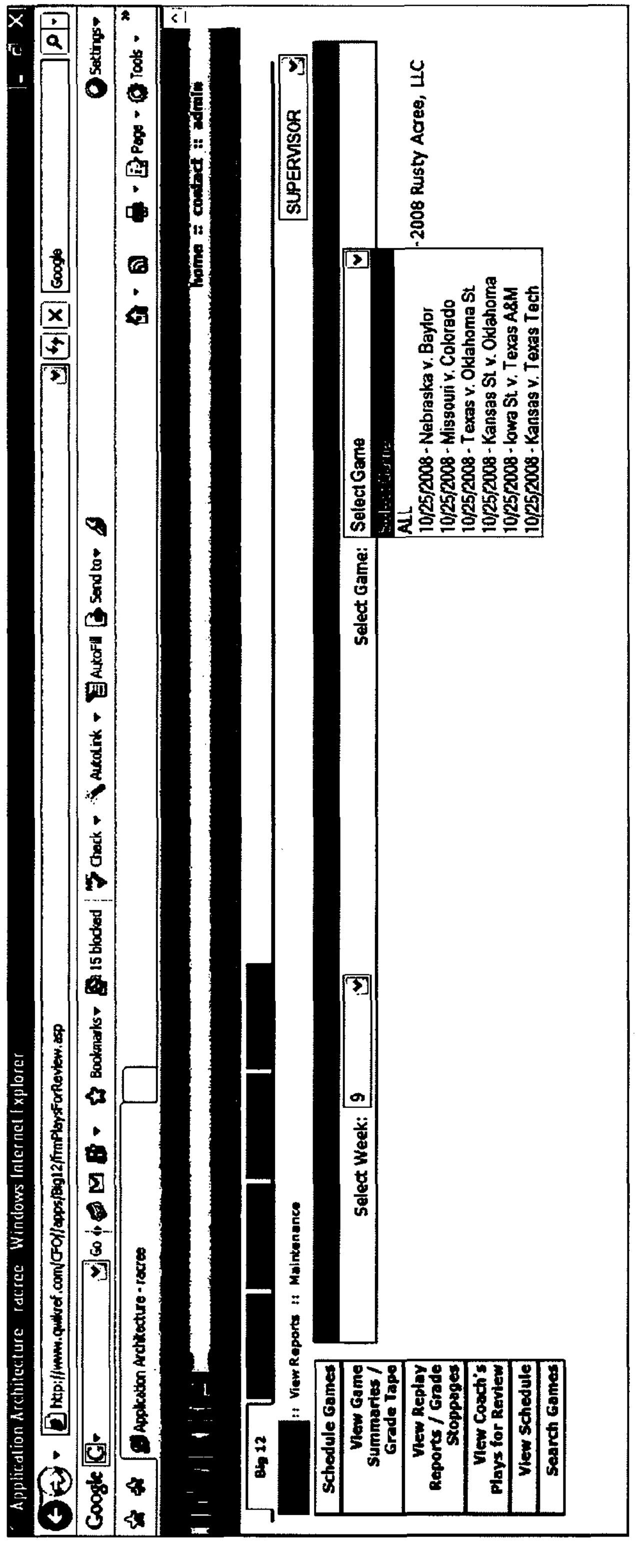
FIG. 13 is a screen shot of a supervisor permission, find games, view coach's plays for review that is displayed after selecting the view coach's plays for review option directly under the view replay reports/grade stoppages option, in accordance with an embodiment of the present invention.
Figure 14:
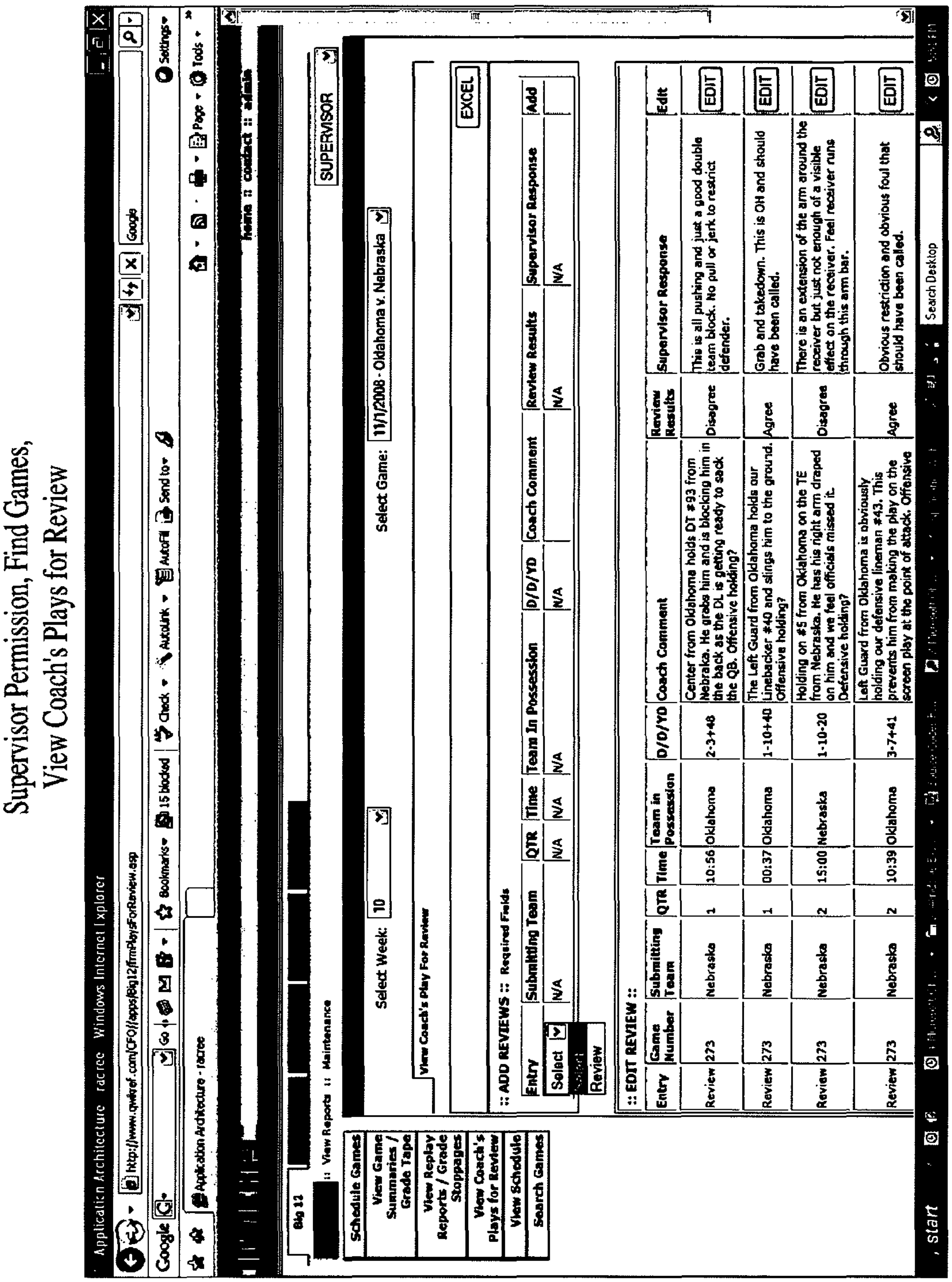
FIG. 14 is a screen shot of a supervisor permission, find games, view coach's plays for review from FIG. 12 that is displayed after selecting the 11/1/2008 Oklahoma v. Nebraska game from the drop down menu in FIG. 12, in accordance with an embodiment of the present invention.
Figure 15:
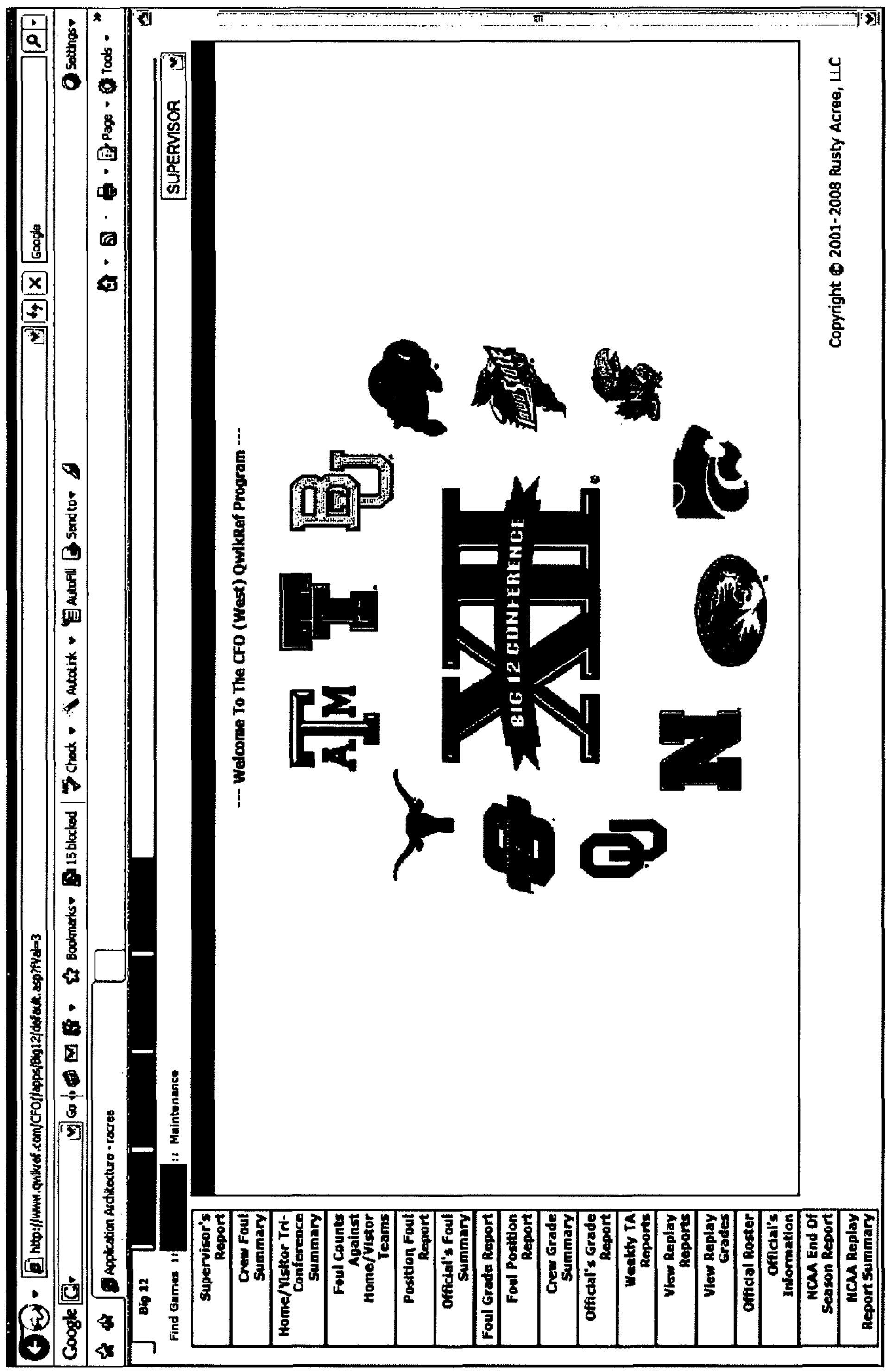
FIG. 15 is a screen shot of a supervisor permission, view reports, menu page after selecting the view reports option to the right of the find games option, in accordance with an embodiment of the present invention.
Figure 16:
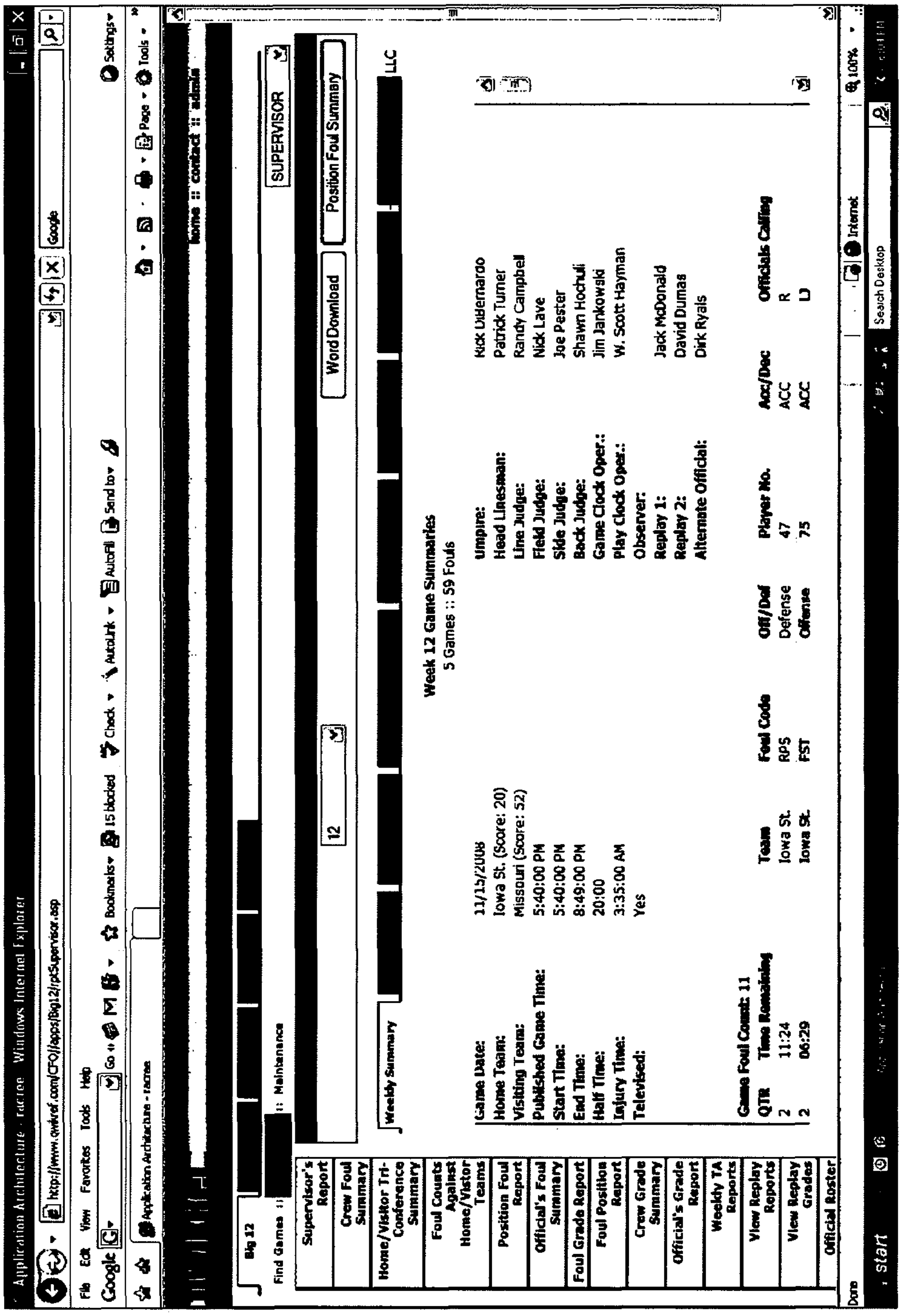
FIG. 16 is a screen shot of a supervisor permission, view reports, supervisor's report weekly summary tab, in accordance with an embodiment of the present invention.
Figure 17:
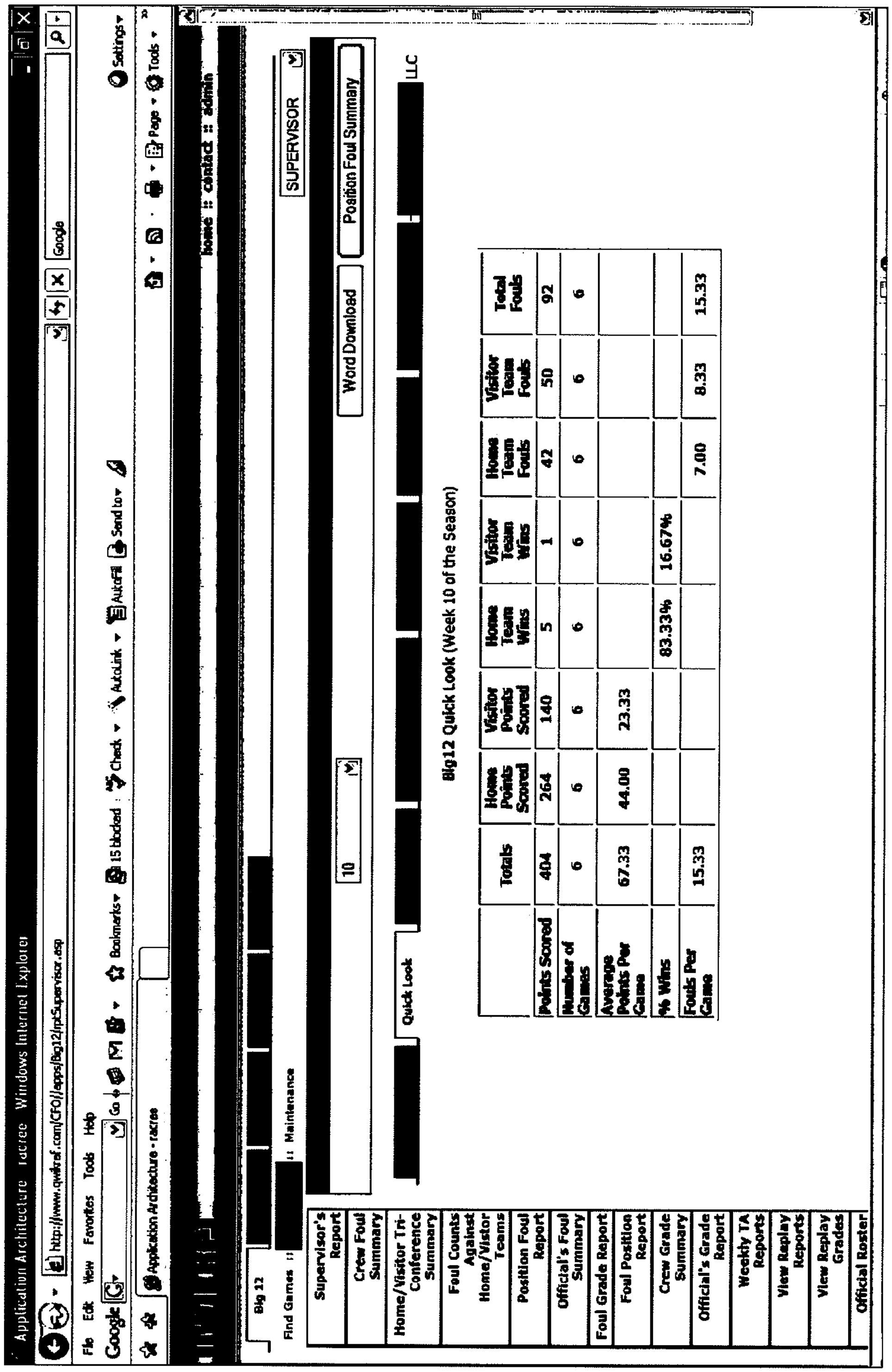
FIG. 17 is a screen shot of a supervisor permission, view reports, supervisor's report qwik look tab, in accordance with an embodiment of the present invention.
Figure 18:
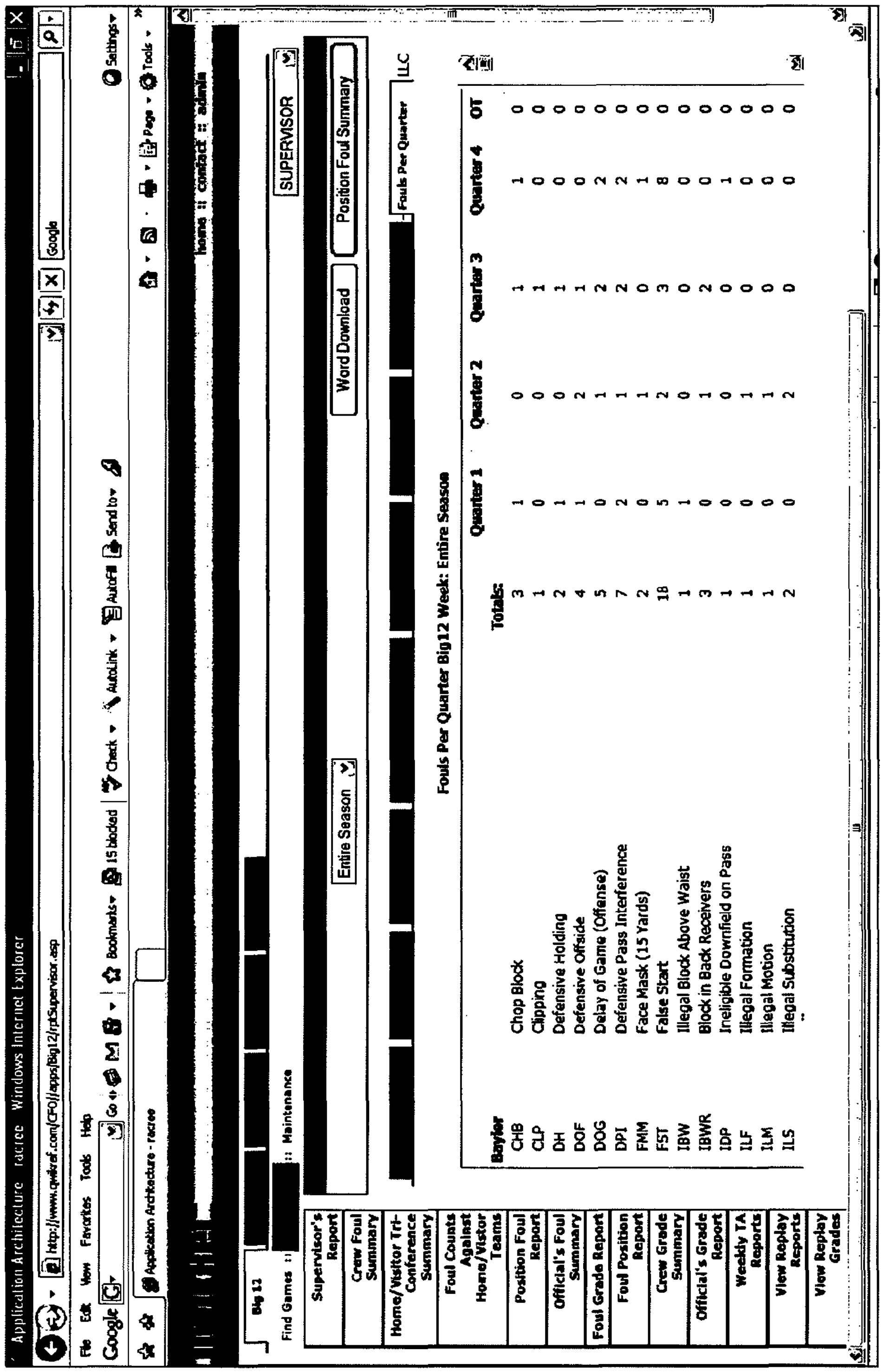
FIG. 18 is a screen shot of a supervisor permission, view reports, supervisor's report fouls for quarter tab, in accordance with an embodiment of the present invention.
Figure 19:
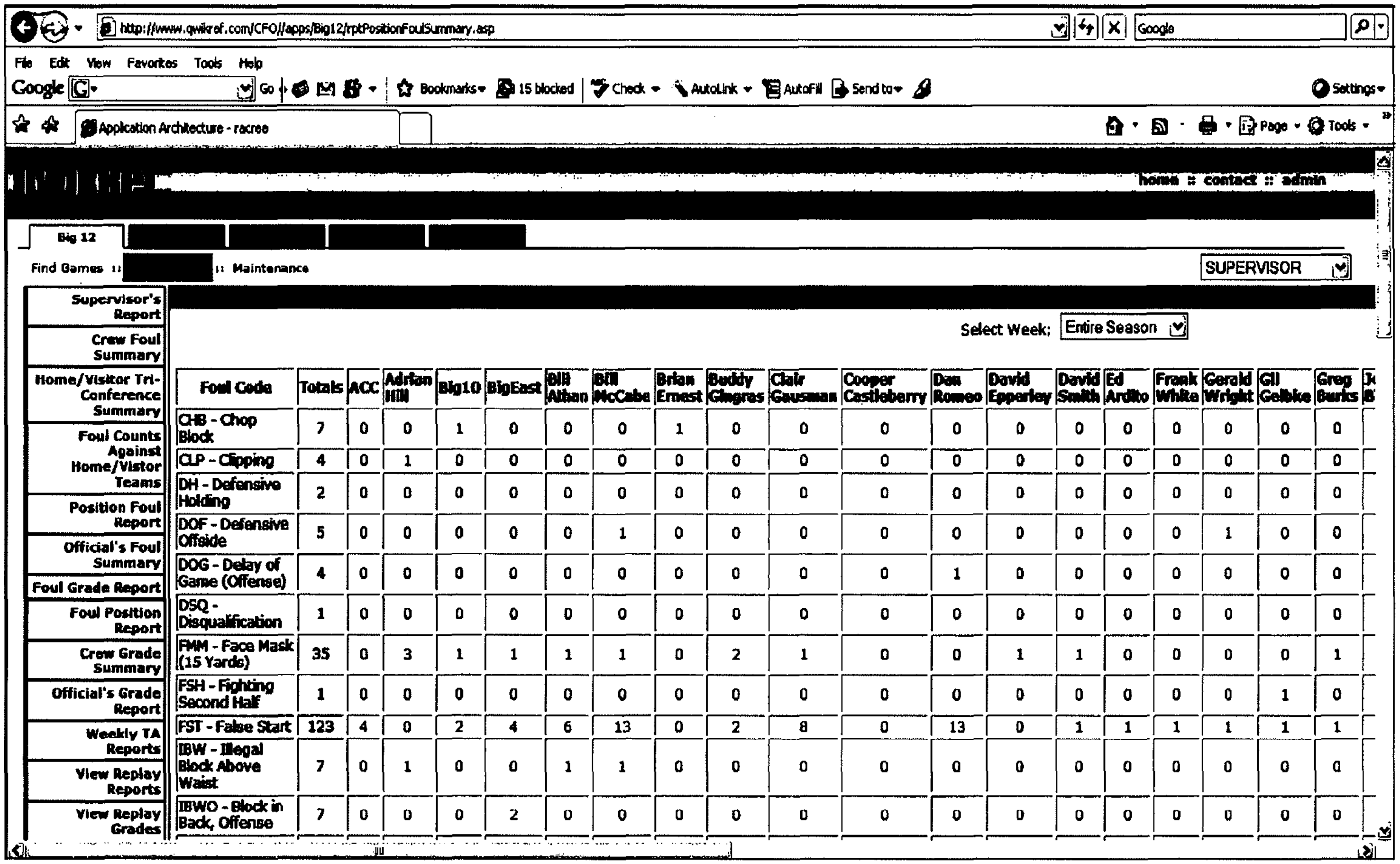
FIG. 19 is a screen shot of a supervisor permission, view reports, position foul report that provides details on the fouls that were called and which officials made the call, in accordance with an embodiment of the present invention.
Figure 20:
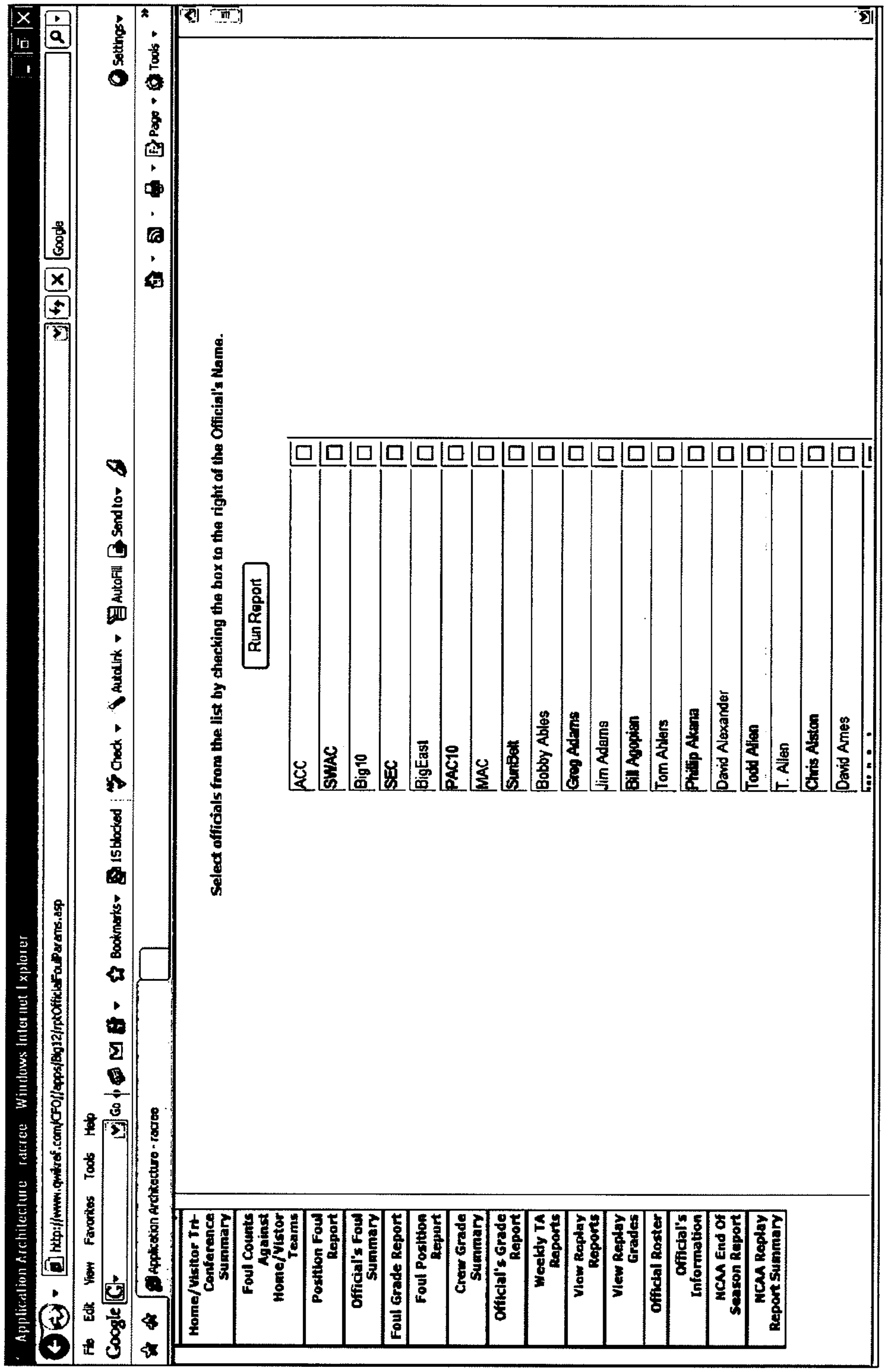
FIG. 20 is a screen shot of a supervisor permission, view reports, officials foul summary display that provides details on the fouls that were called by each official, in accordance with an embodiment of the present invention.
Figure 21:
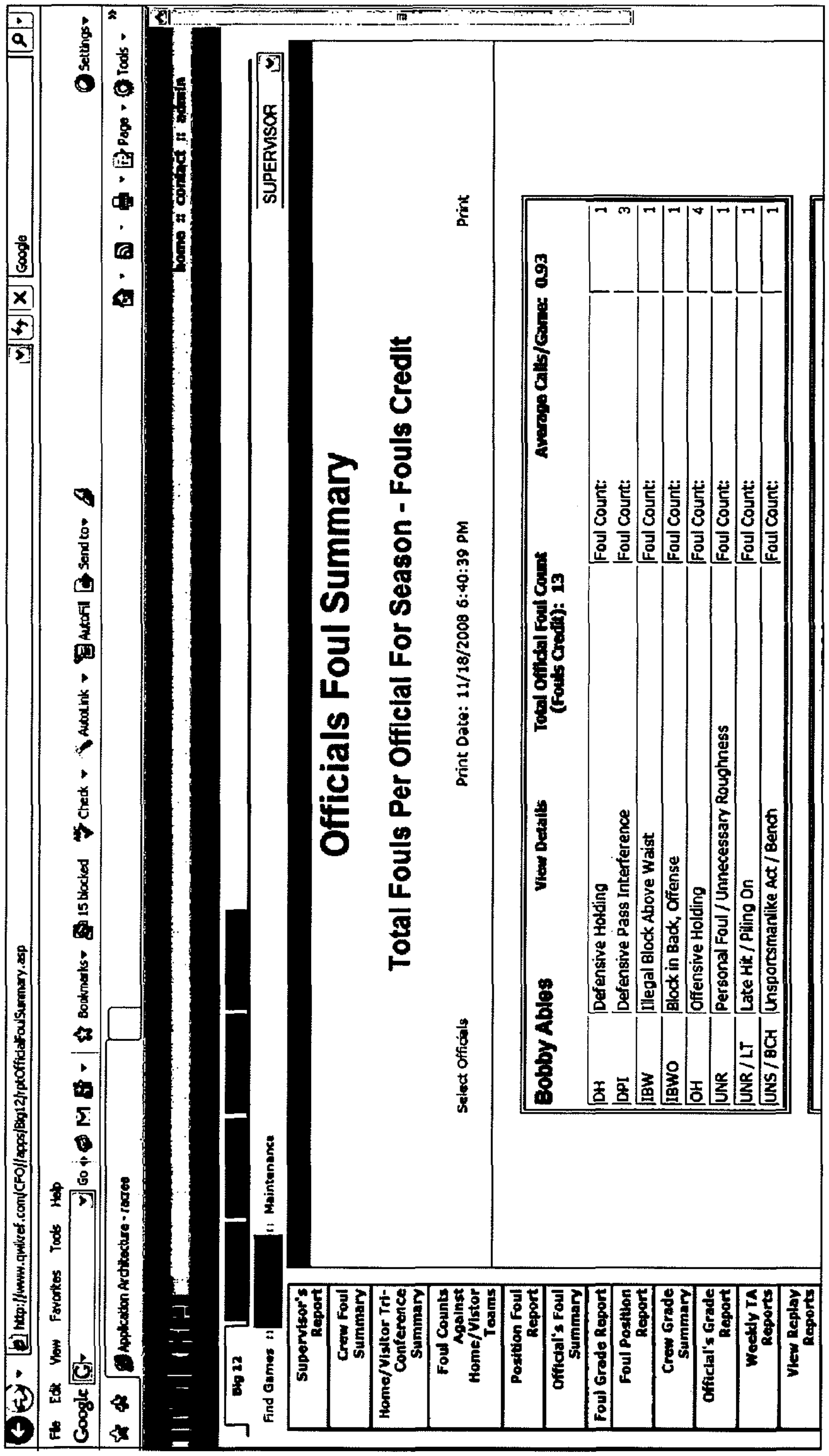
FIG. 21 is a screen shot of a supervisor permission, view reports, officials foul summary, specific official display that provides details on the fouls that were called by a specific official, in accordance with an embodiment of the present invention.
Figure 22:
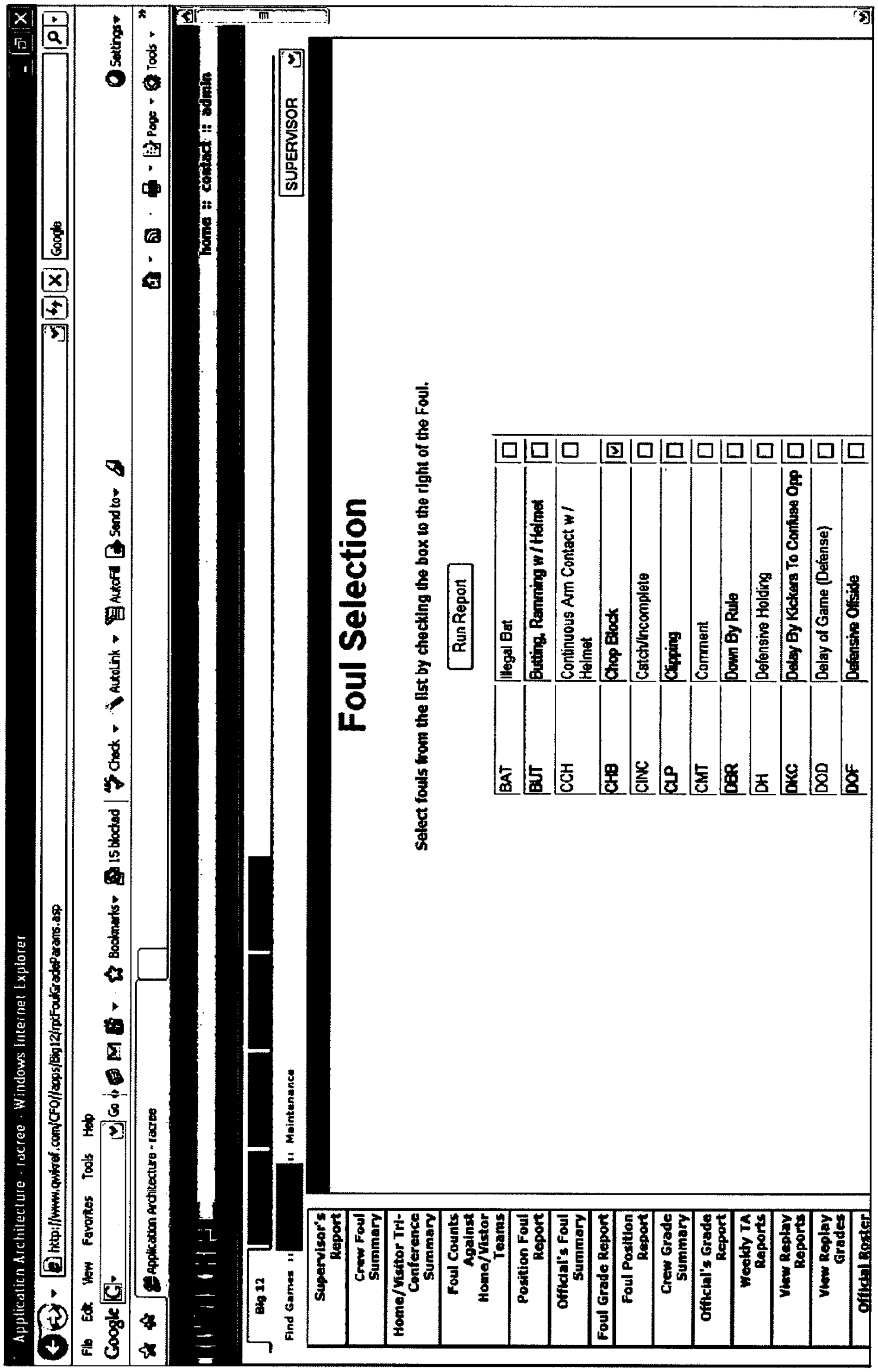
FIG. 22 is a screen shot of a supervisor permission, view reports, foul grade report that provides details on the different types of fouls that were called by all of the officials, in accordance with an embodiment of the present invention.
Figure 23:
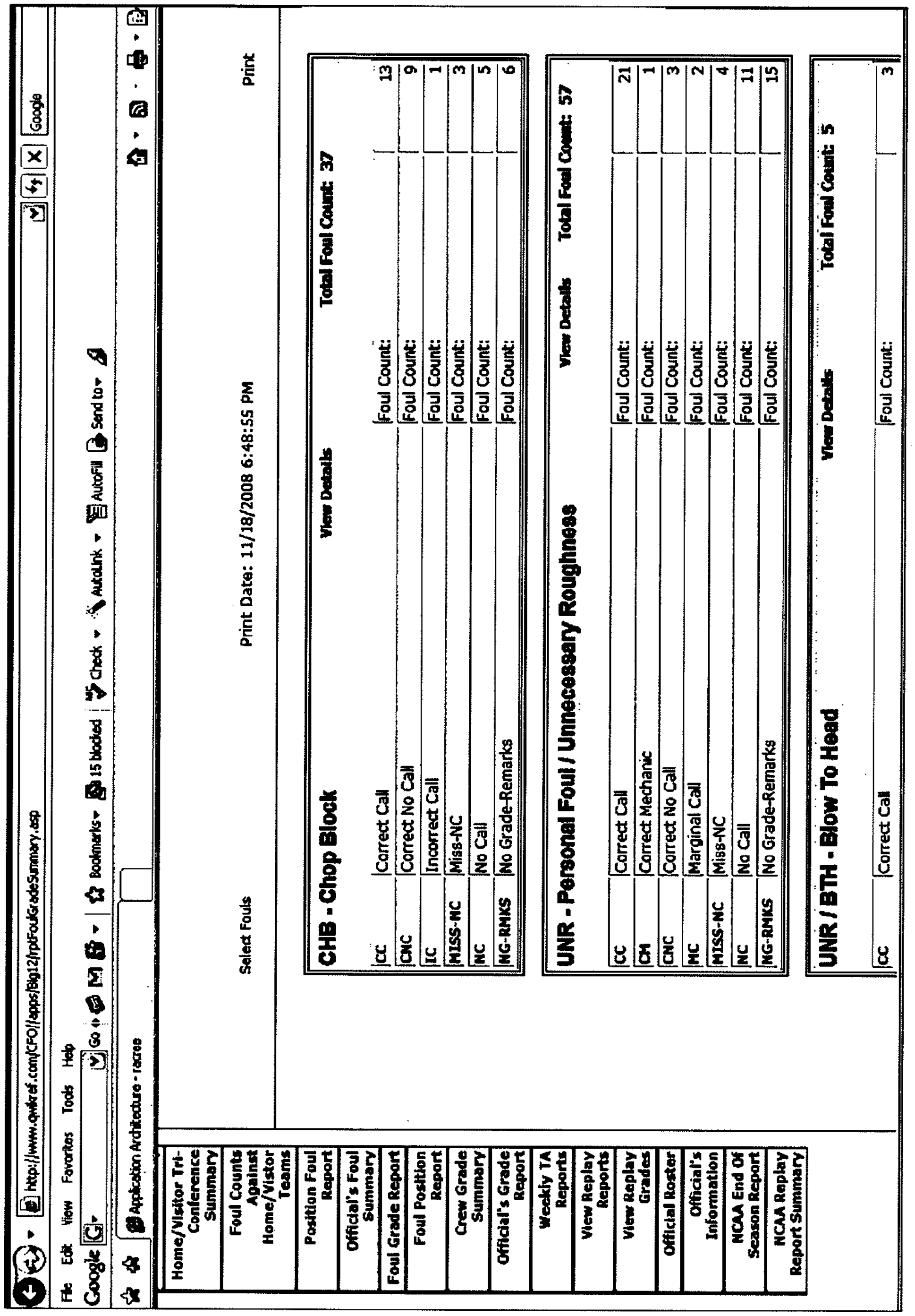
FIG. 23 is a screen shot of a supervisor permission, view reports, foul grade report, fouls checked display that provides information on the fouls checked by the user in FIG. 22, in accordance with an embodiment of the present invention.
Figure 24:
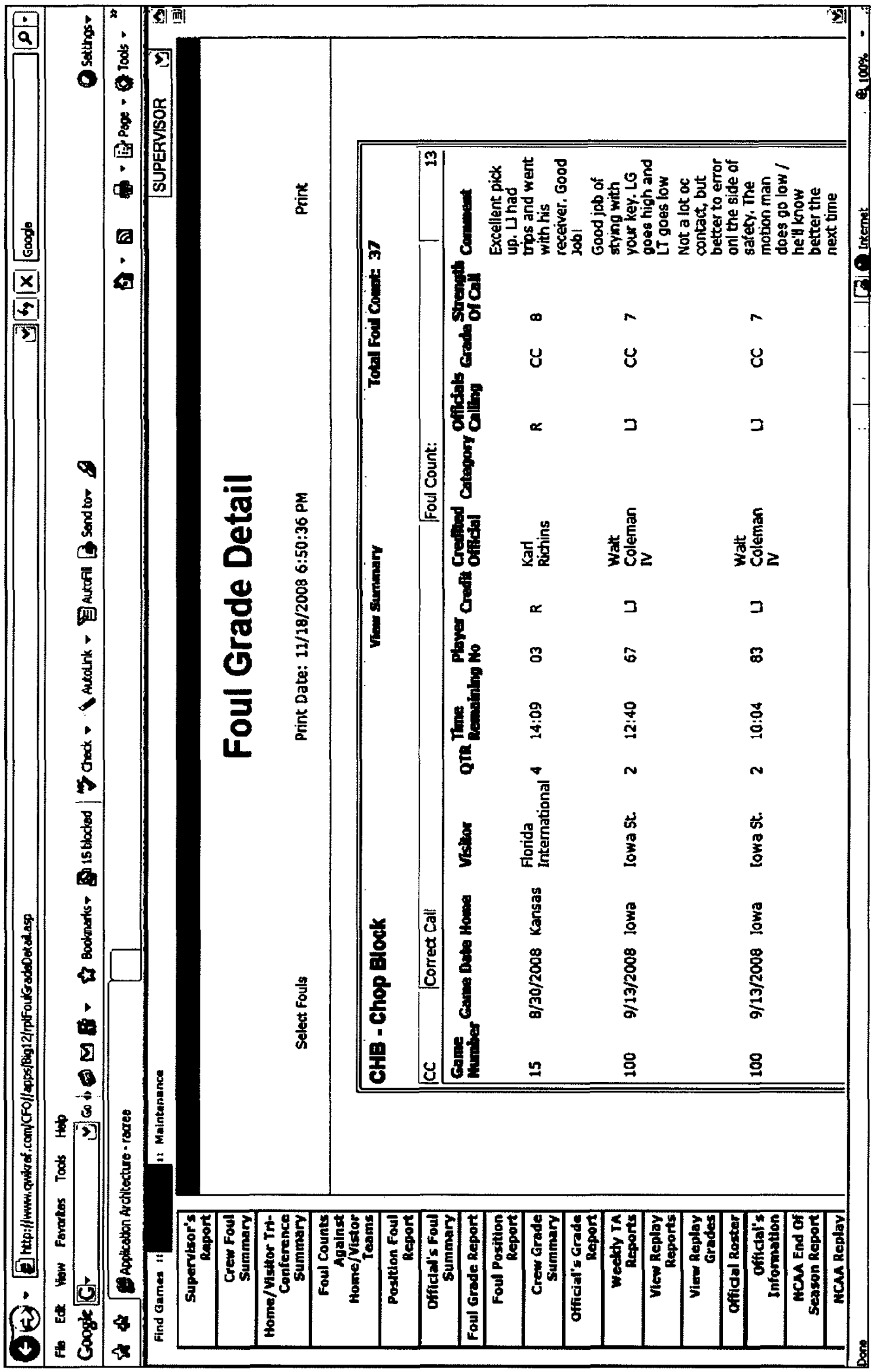
FIG. 24 is a screen shot of a supervisor permission, view reports, foul grade report, fouls checked, view details display that provides details on a selected foul after the user selects a view detail option associated with a specific foul, in accordance with an embodiment of the present invention.
Figure 25:
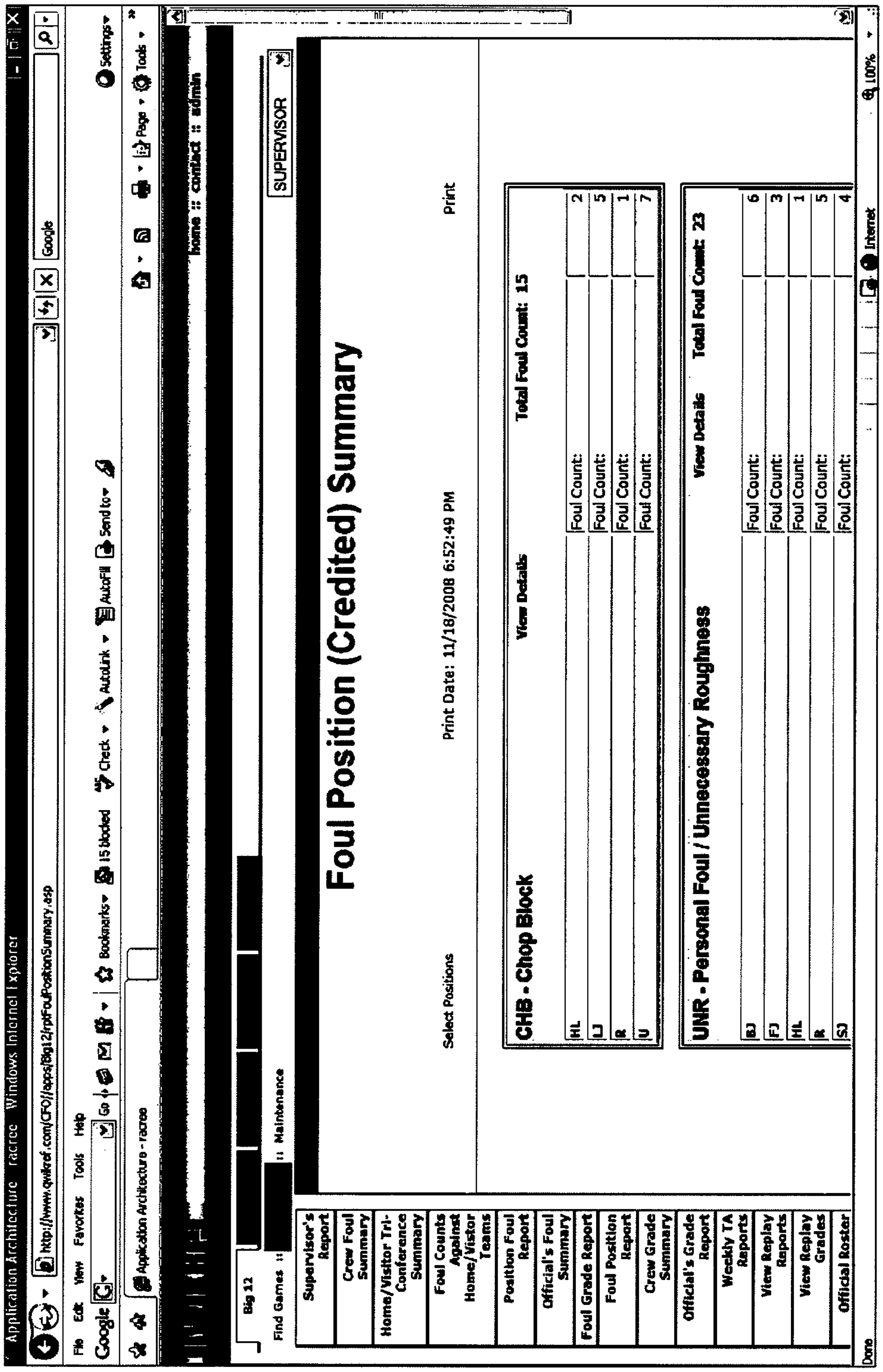
FIG. 25 is a screen shot of a supervisor permission, view reports, foul position report display that provides details on selected fouls by official position, in accordance with an embodiment of the present invention.
Figure 26:
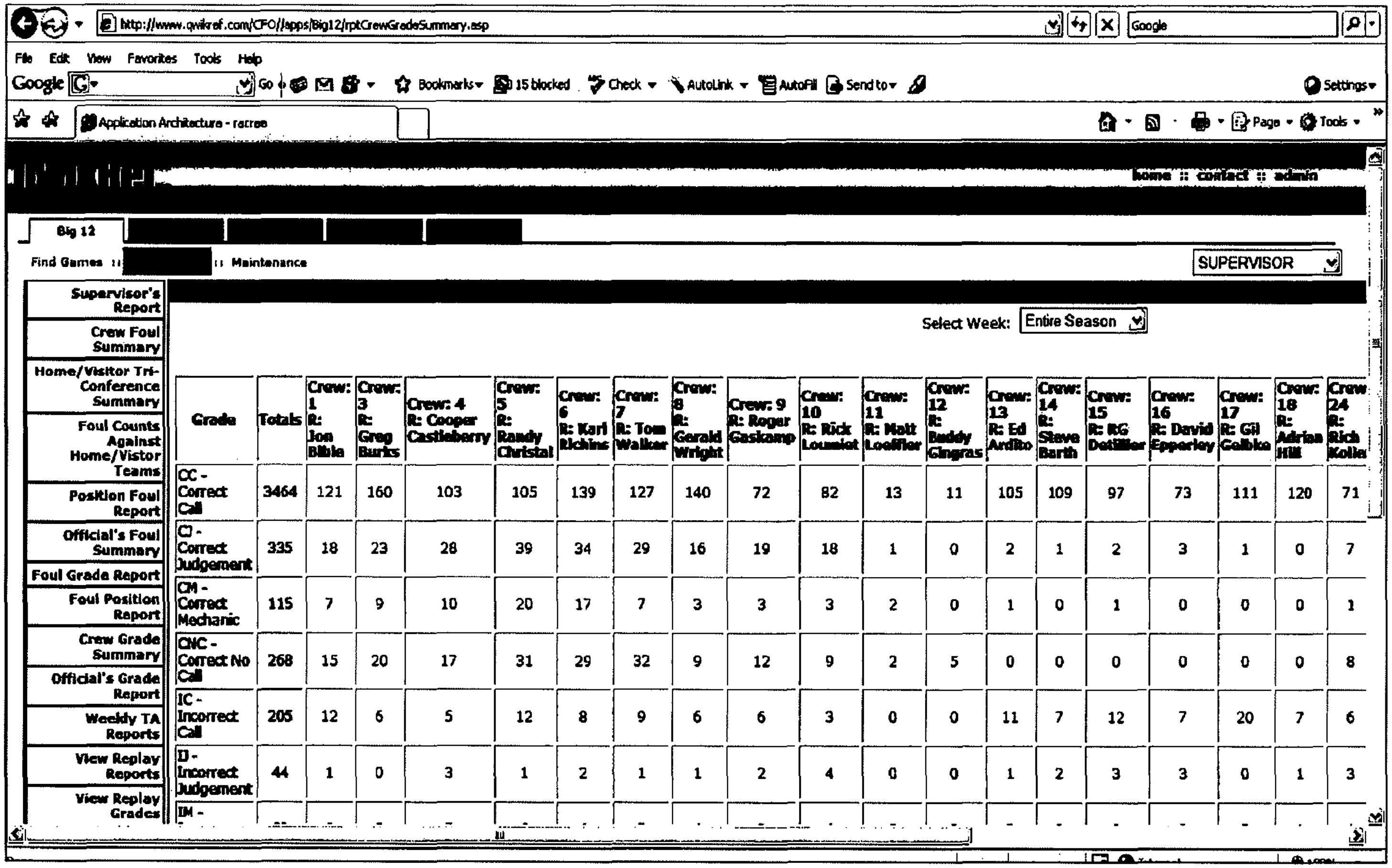
FIG. 26 is a screen shot of a supervisor permission, view reports, crew grade summary report display that provides details on the grades for each crew of officials over the year, in accordance with an embodiment of the present invention.
Figure 27:
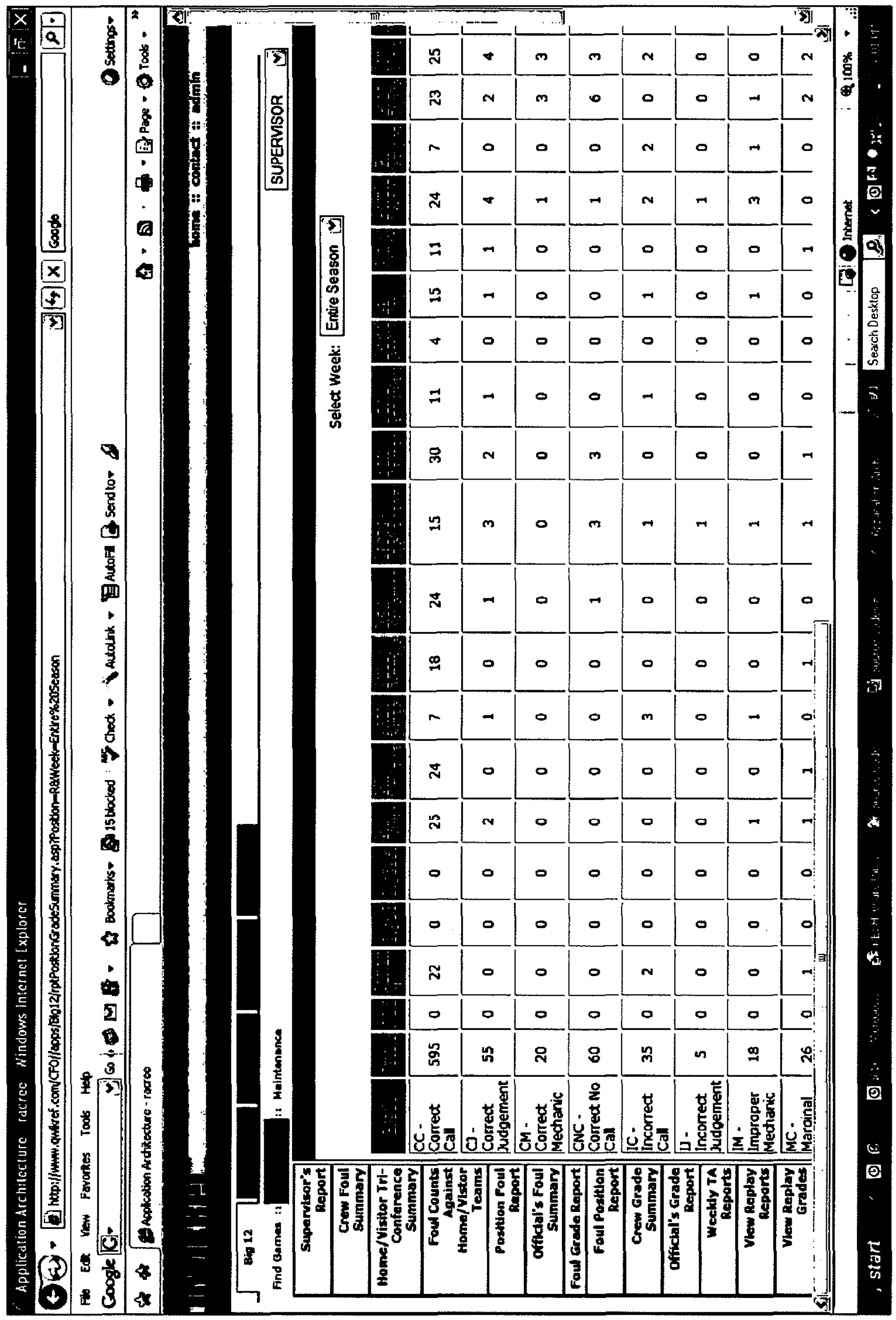
FIG. 27 is a screen shot of a supervisor permission, view reports, crew grade summary, referee report display that provides details on the grades for each referee over the year, in accordance with an embodiment of the present invention.
Figure 28:
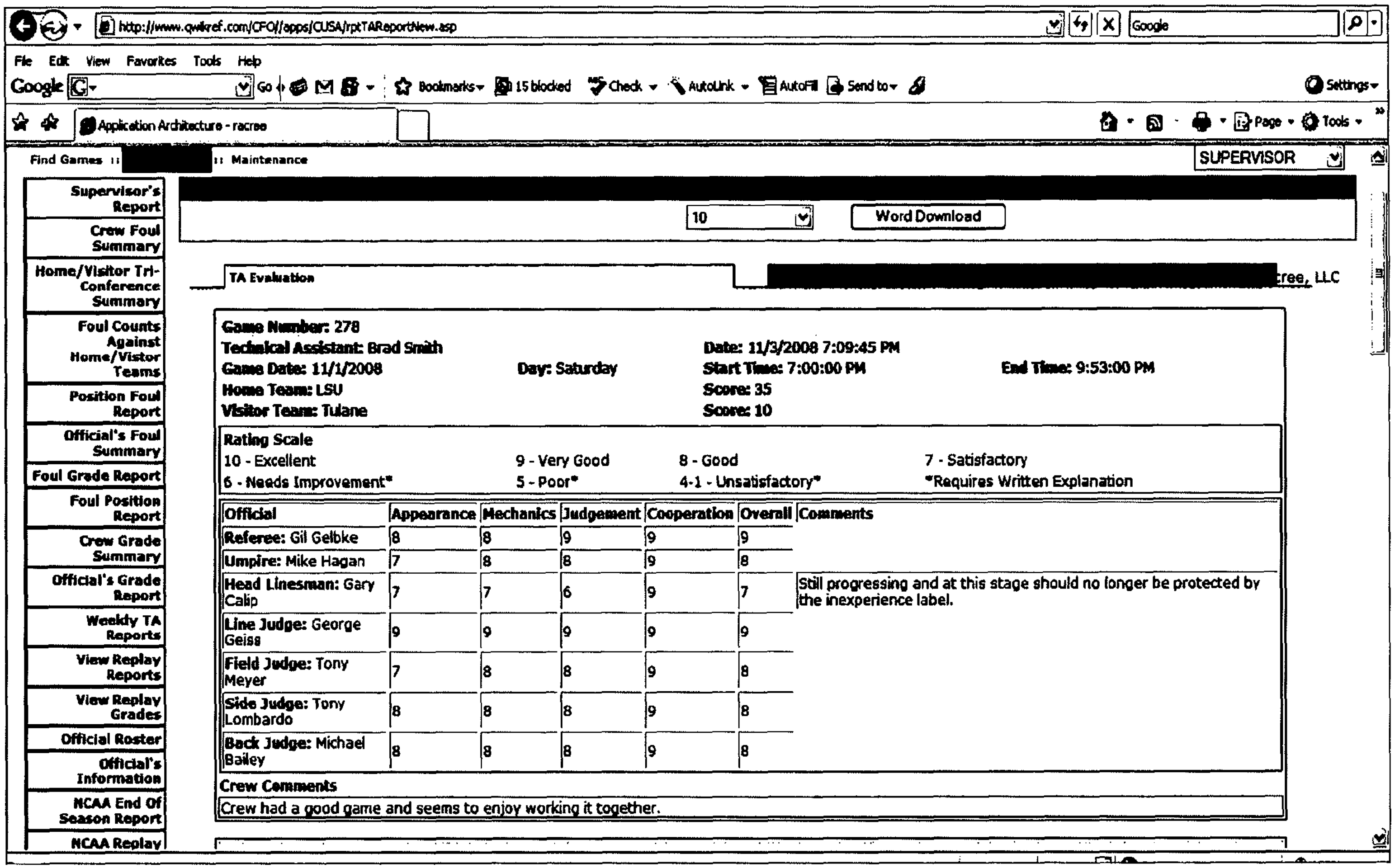
FIG. 28 is a screen shot of a supervisor permission, view reports, weekly TA report display that provides the technical assistant's evaluation of each member of the crew of officials for a specific game, in accordance with an embodiment of the present invention.
Figure 29:
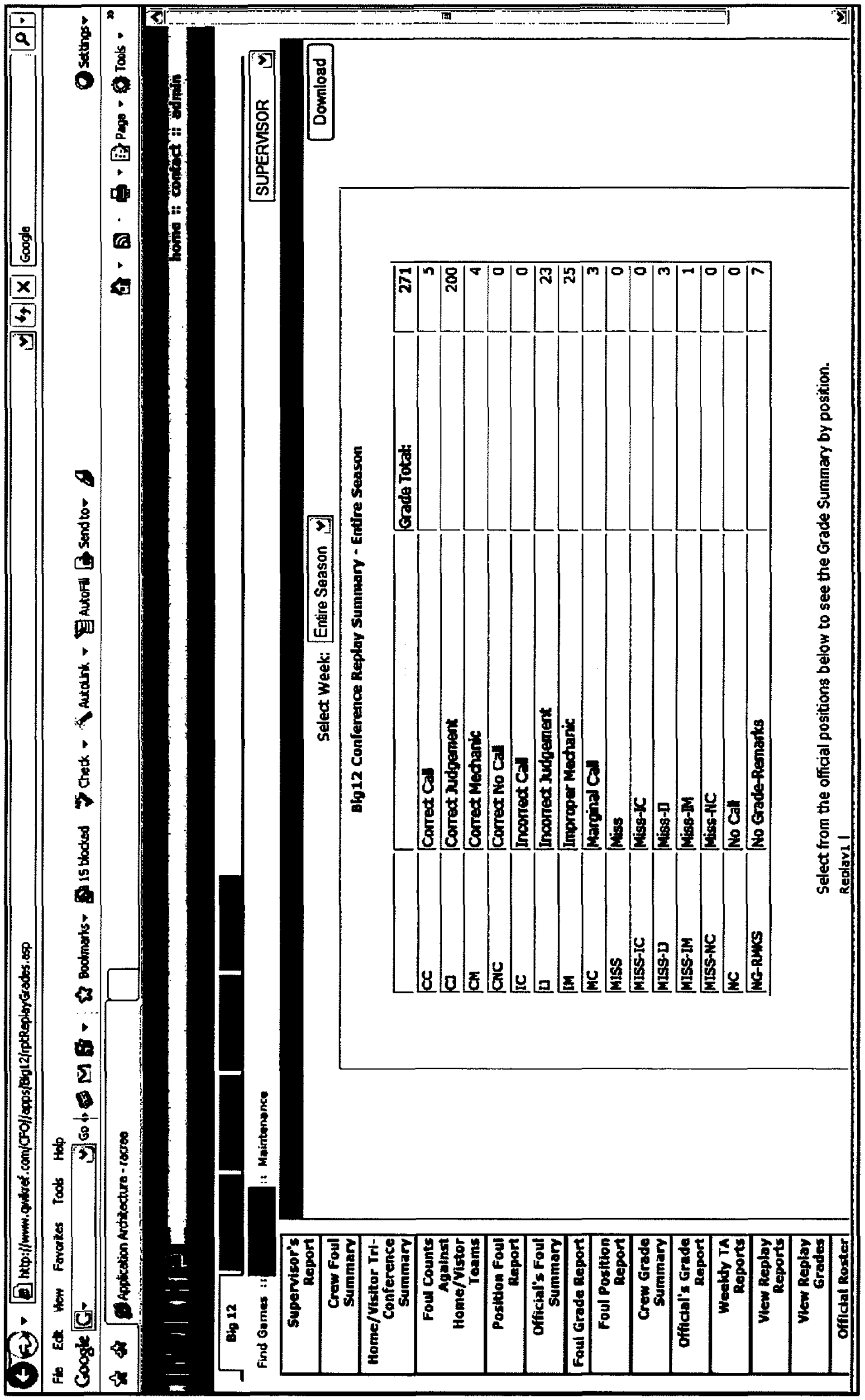
FIG. 29 is a screen shot of a supervisor permission, view reports, view replay grades summary display that provides a conference replay summary for the entire season, in accordance with an embodiment of the present invention.
Figure 30:
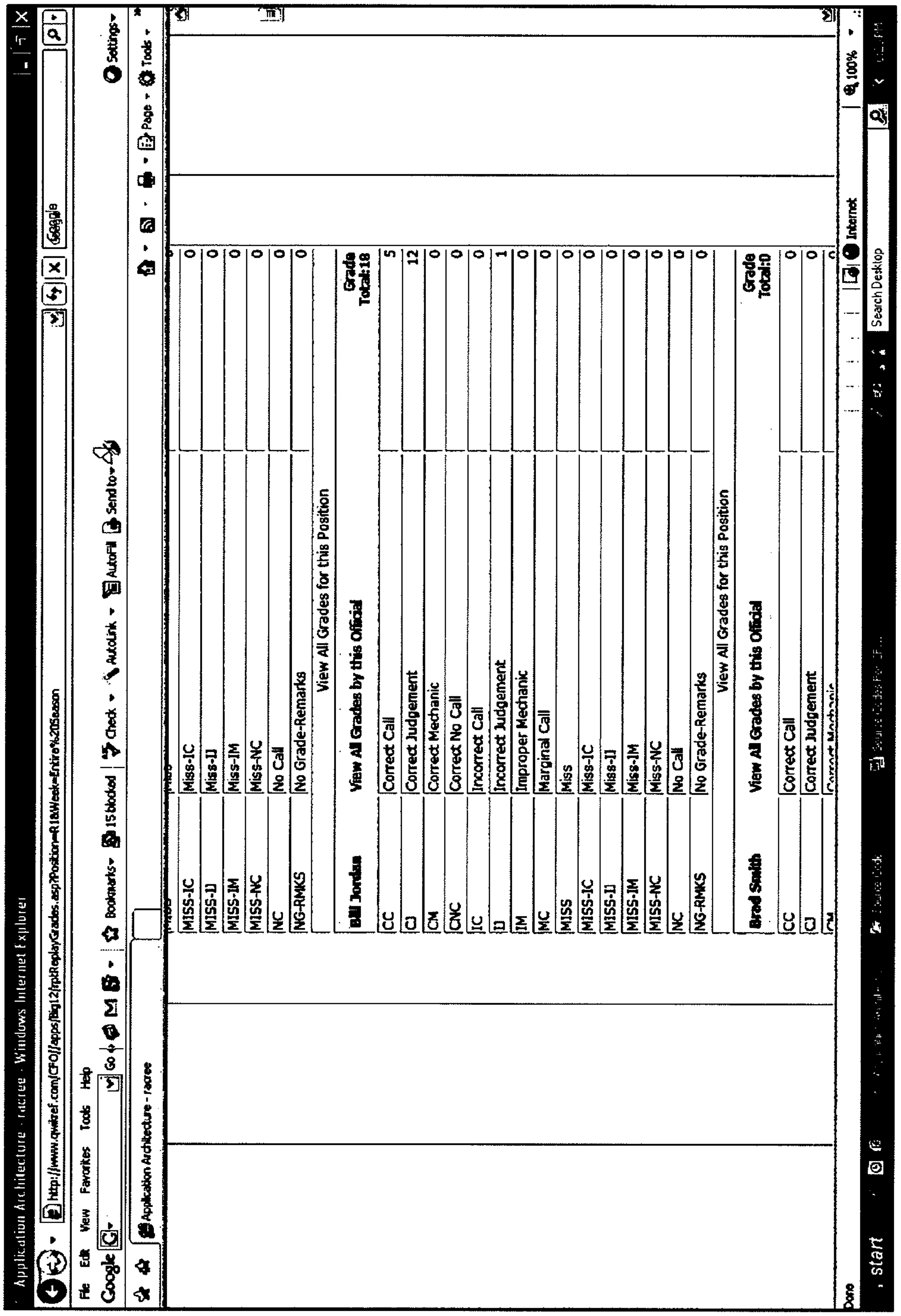
FIG. 30 is a screen shot of a supervisor permission, view reports, view replay grades, replay 1 display that provides a replay summary by individual official for the entire season, in accordance with an embodiment of the present invention.
Figure 31:
FIG. 31 is a screen shot of a grader permission, find games, view game summaries/grade tape display that permits the grader to grade each call by official, in accordance with an embodiment of the present invention.
Figure 32:
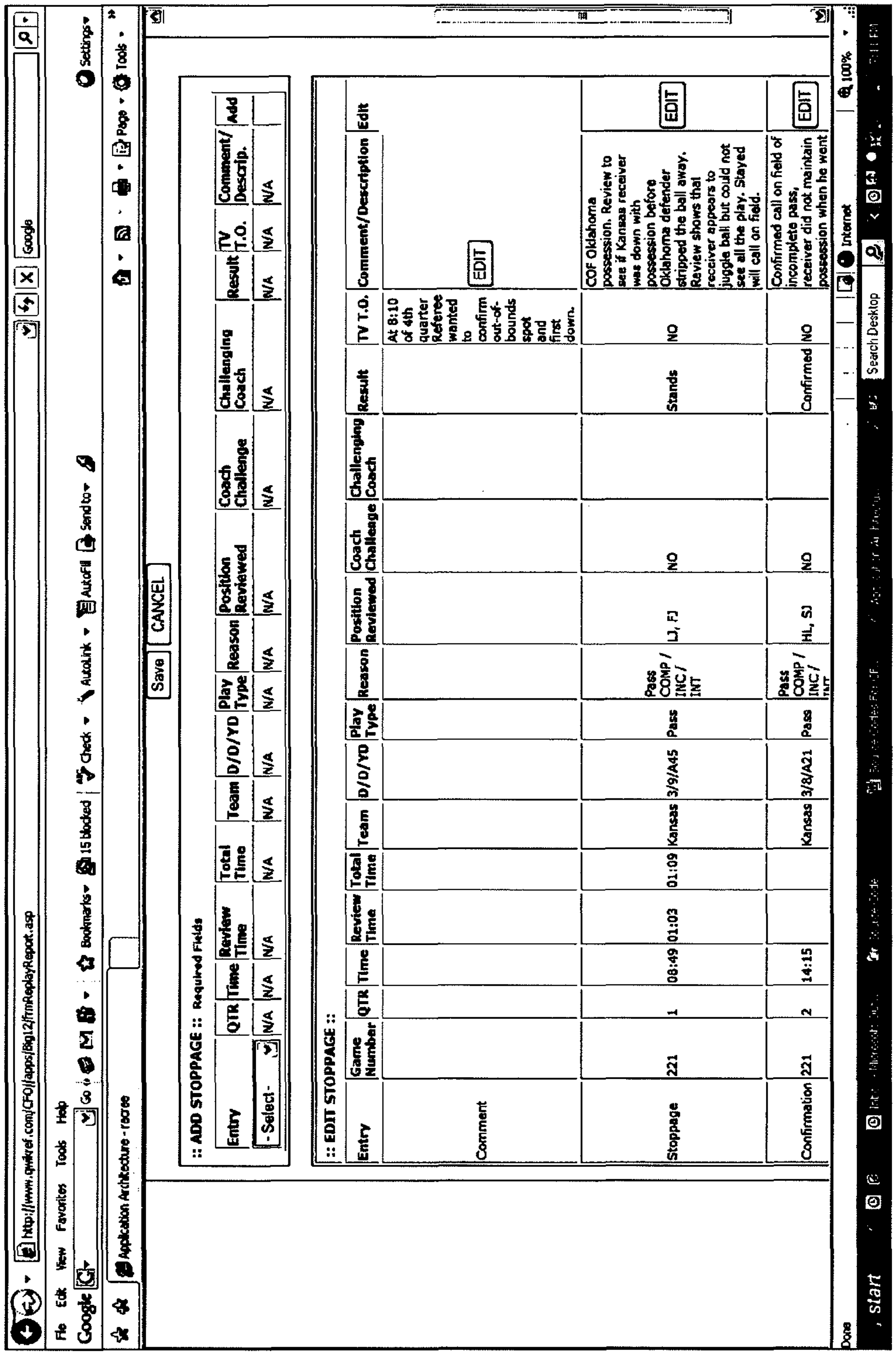
FIG. 32 is a screen shot of a replay permission, find games, submit replay report display that permits the user to add comments on the replay call, in accordance with an embodiment of the present invention.
Figure 33:
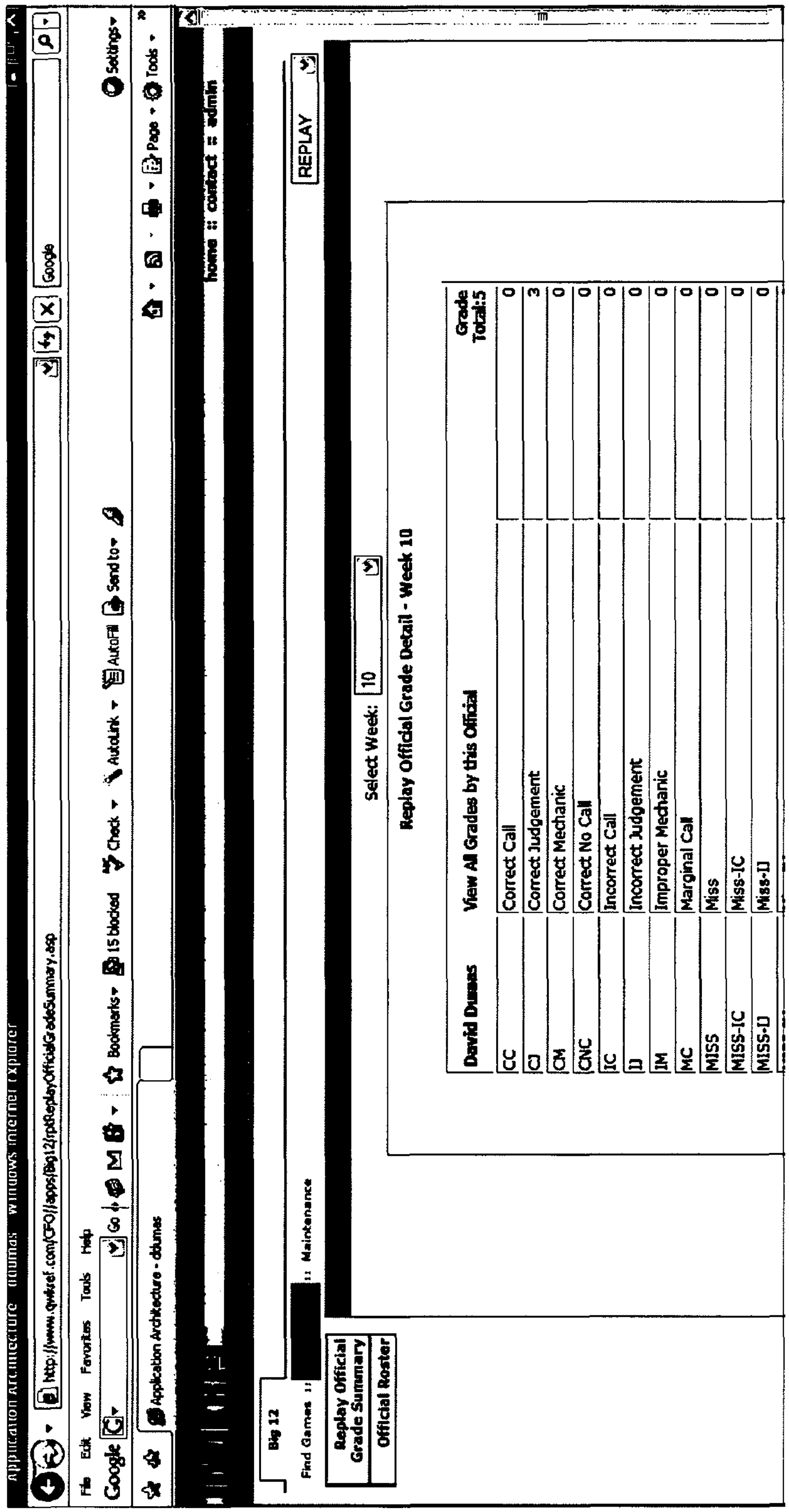
FIG. 33 is a screen shot of a replay permission, view reports, replay official grade summary display that shows the grades given to the replay official for a given week's game, in accordance with an embodiment of the present invention.
Figure 34:
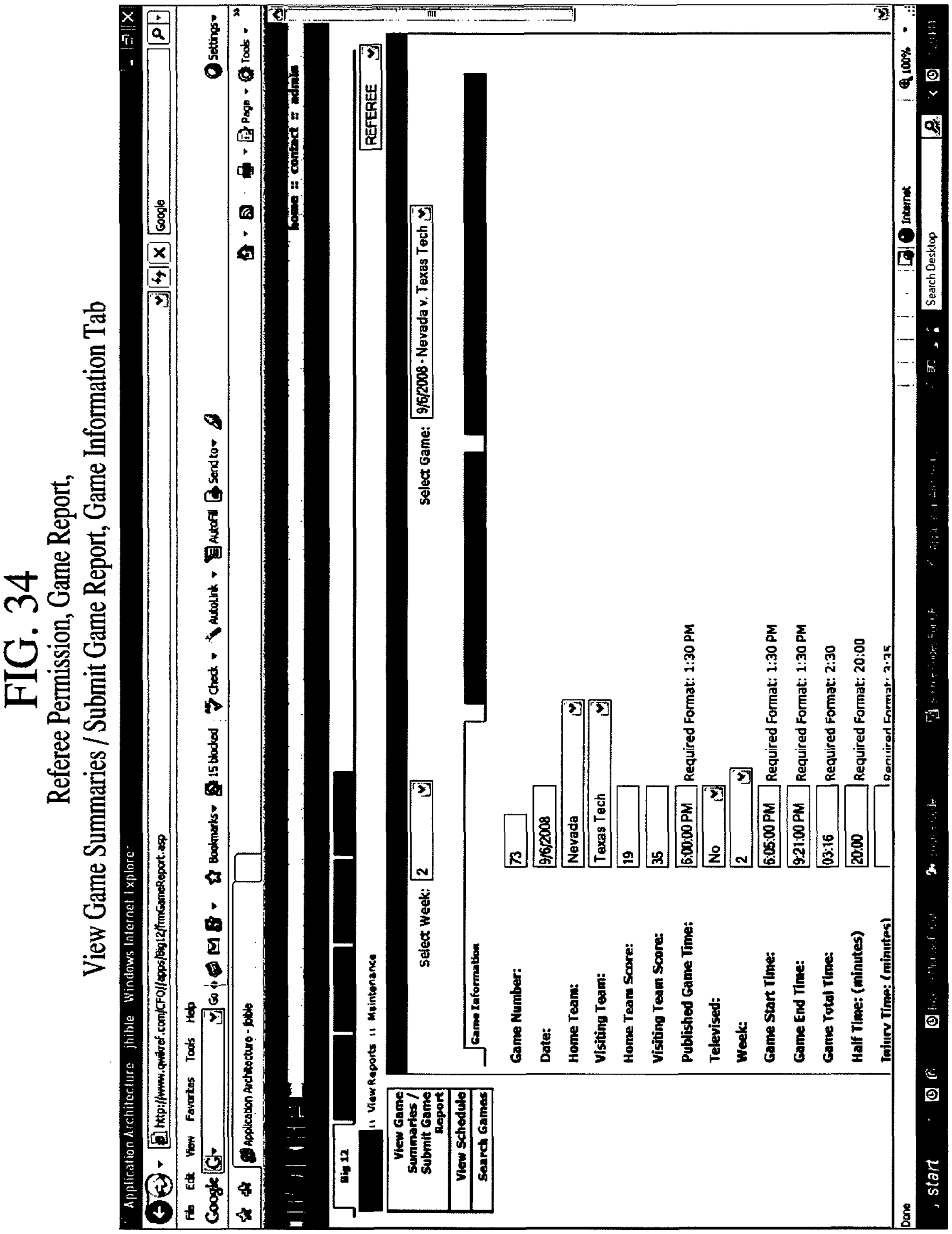
FIG. 34 is a screen shot of a referee permission, game report, view game summaries/submit game report, game information tab display, in accordance with an embodiment of the present invention.
Figure 35:
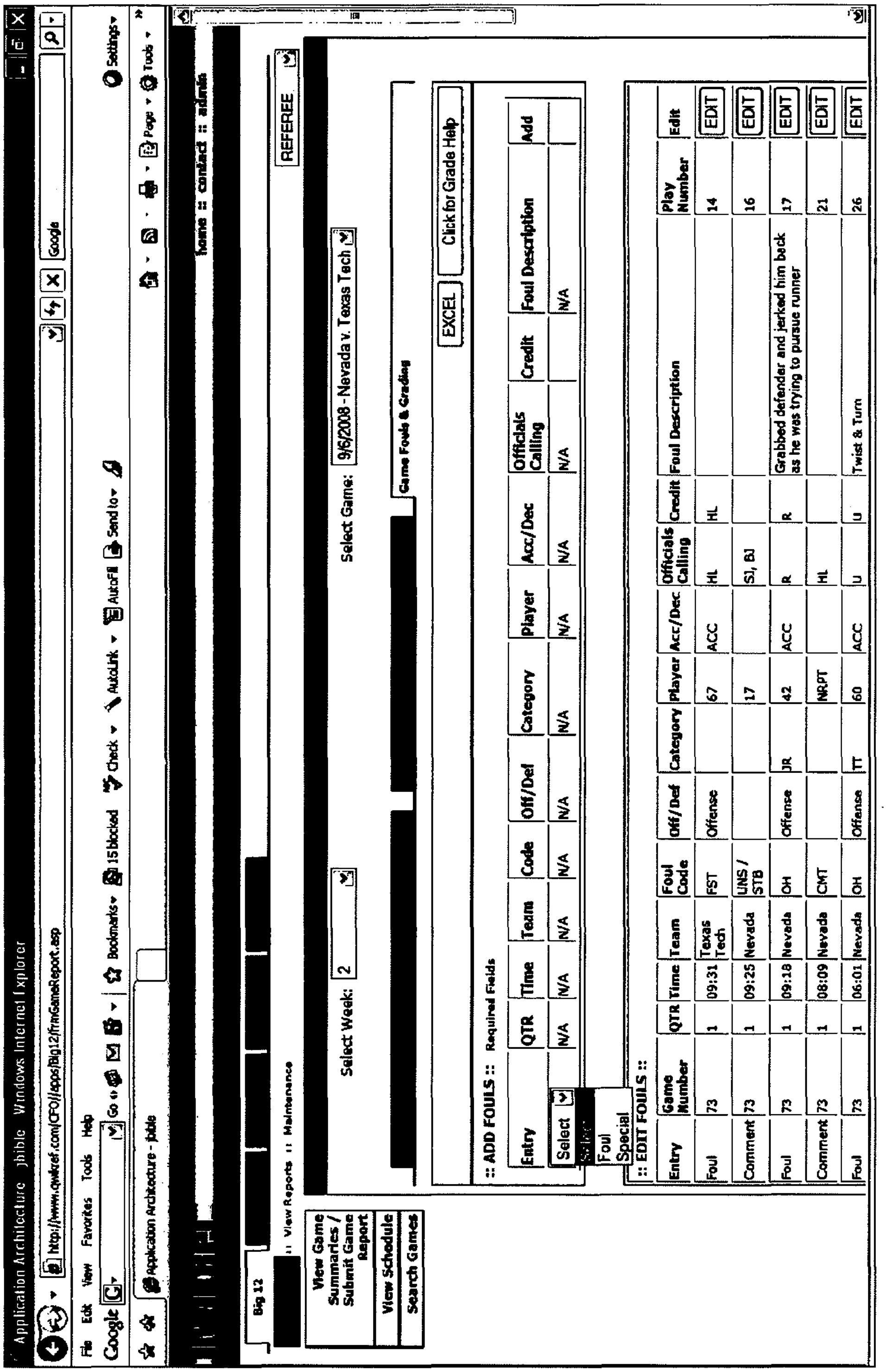
FIG. 35 is a screen shot of a referee permission, game report, view game summaries/submit game report, game foul summary tab display, in accordance with an embodiment of the present invention.
Figure 36:
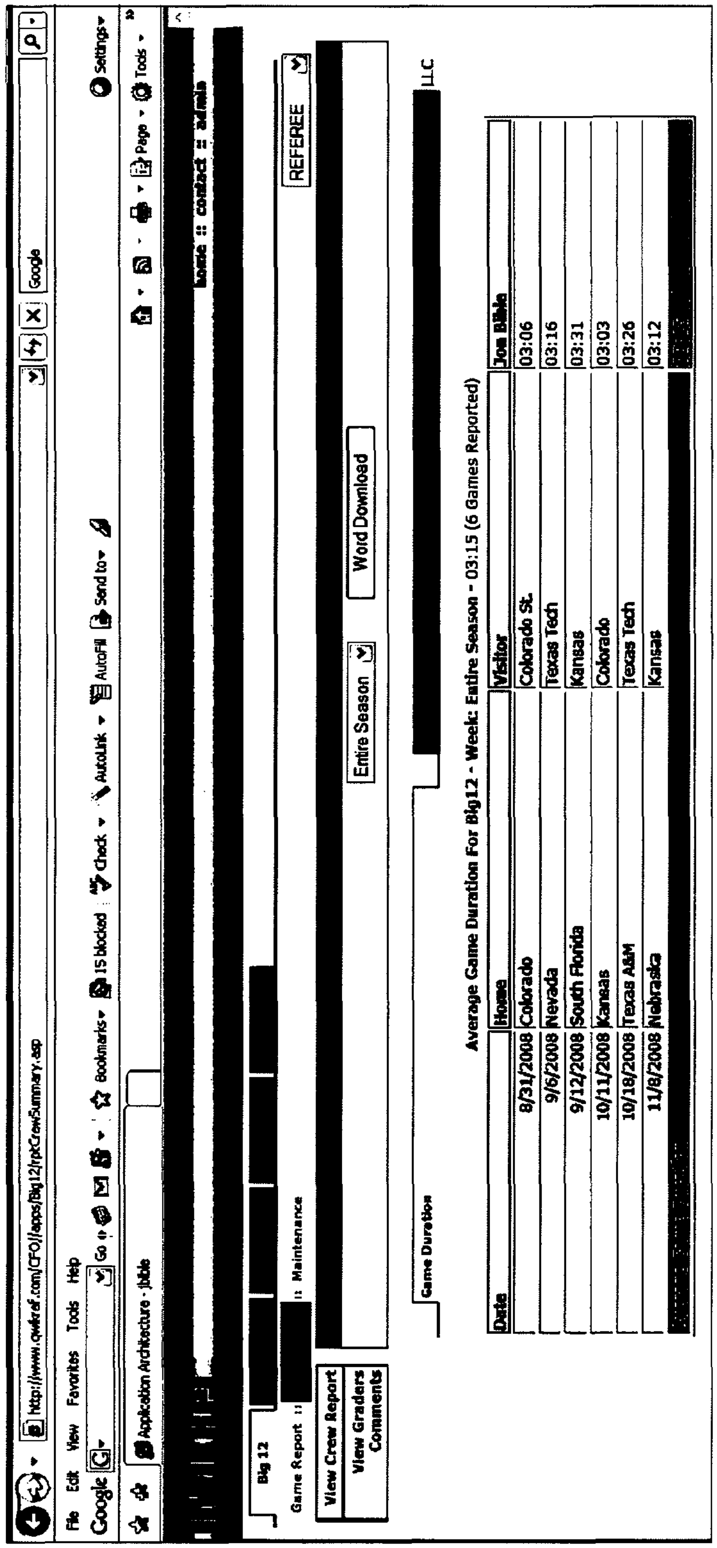
FIG. 36 is a screen shot of a referee permission, view reports, view crew report, crew foul summary tab display, in accordance with an embodiment of the present invention.
Figure 37:
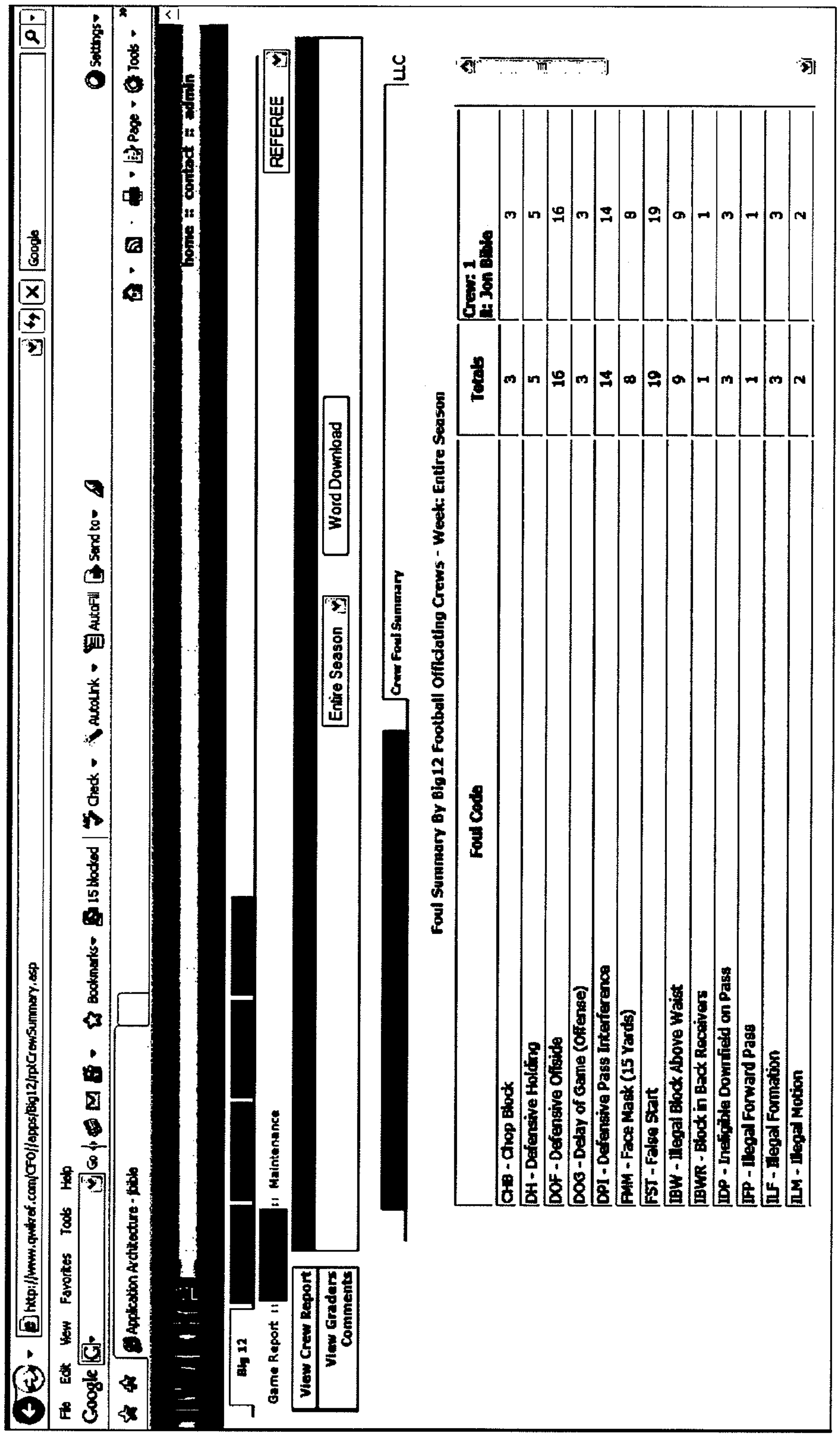
FIG. 37 is a screen shot of a referee permission, view reports, view crew report, crew foul summary tab display, in accordance with an embodiment of the present invention.
Figure 39:
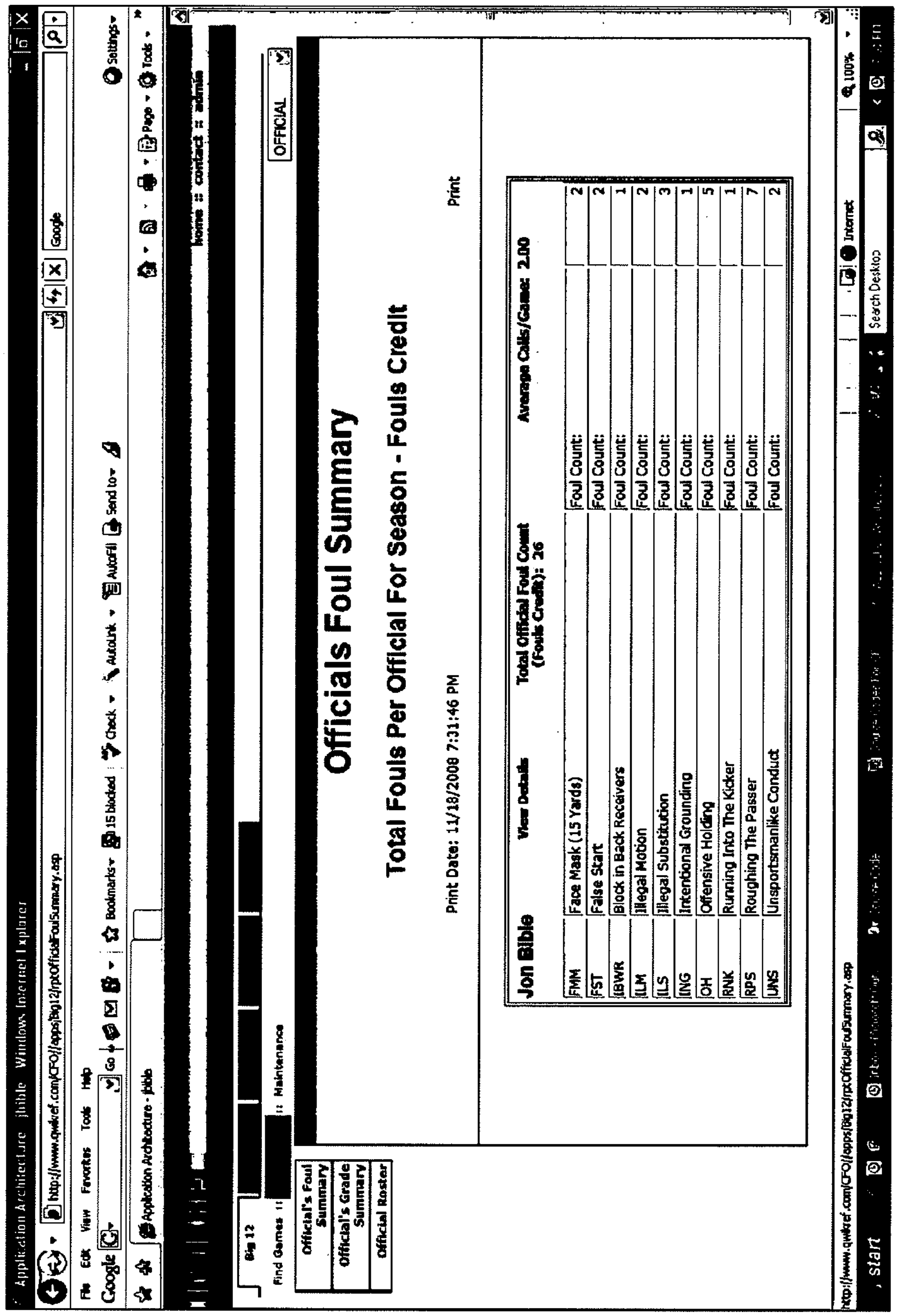
FIG. 39 is a screen shot of an officials permission, view reports, officials foul summary display, in accordance with an embodiment of the present invention.
Figure 40:
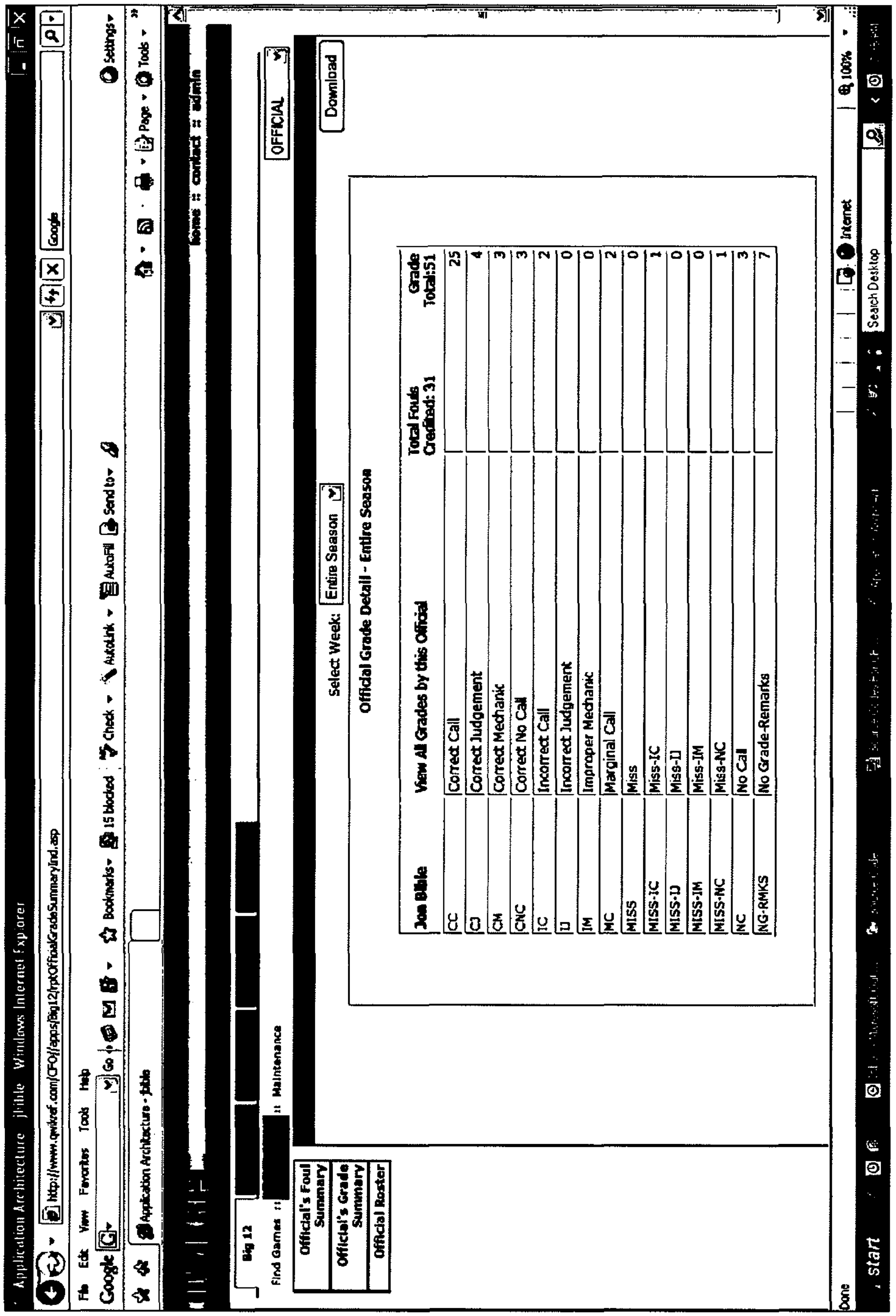
FIG. 40 is a screen shot of an officials permission, view reports, officials grade summary display, in accordance with an embodiment of the present invention.
Figure 41:
FIG. 41 is a screen shot of a coach permission, view reports, coach's report, quick look display, in accordance with an embodiment of the present invention.
Figure 42:
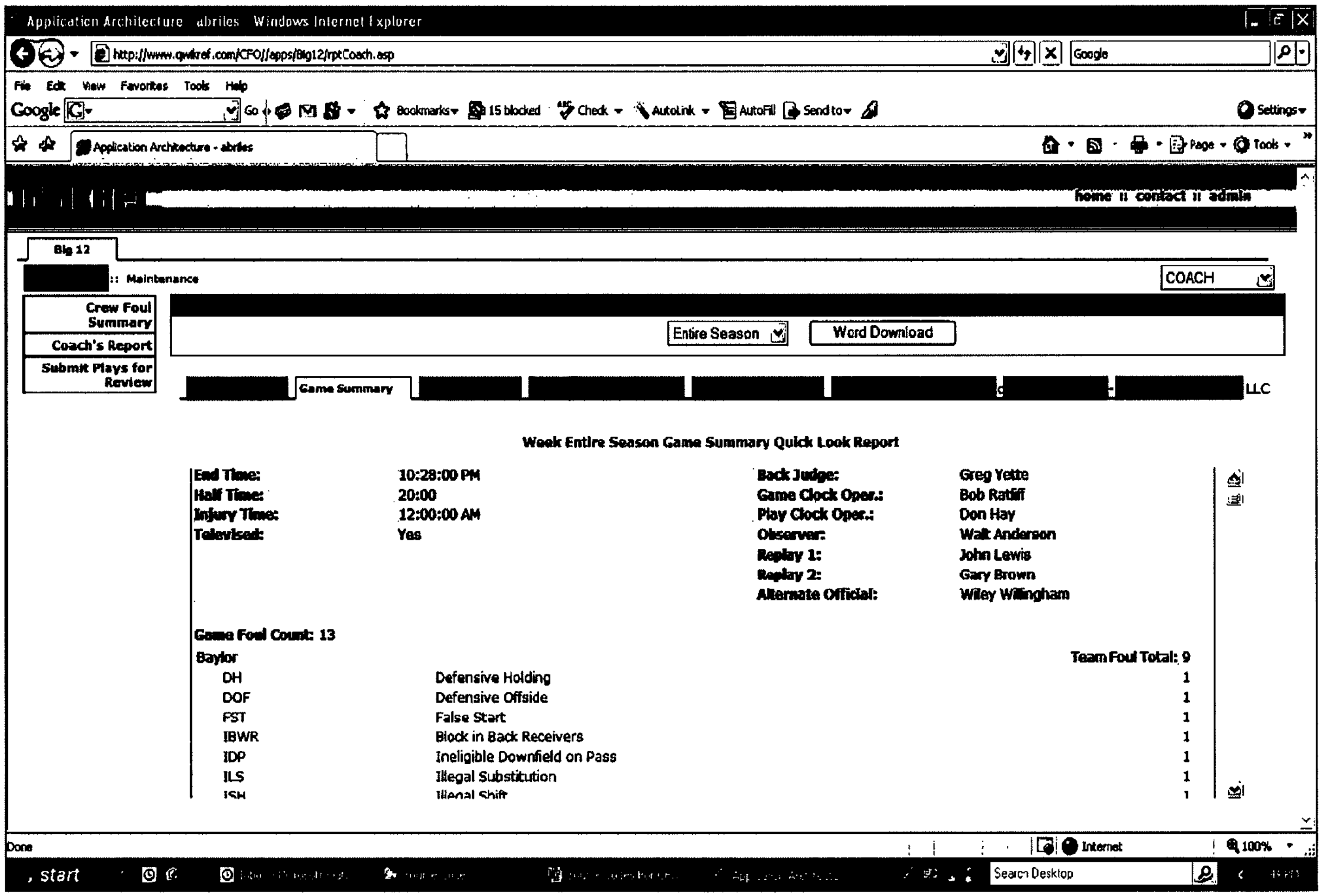
FIG. 42 is a screen shot of a coach permission, view reports, coach's report, game summary display, in accordance with an embodiment of the present invention.
Figure 43:
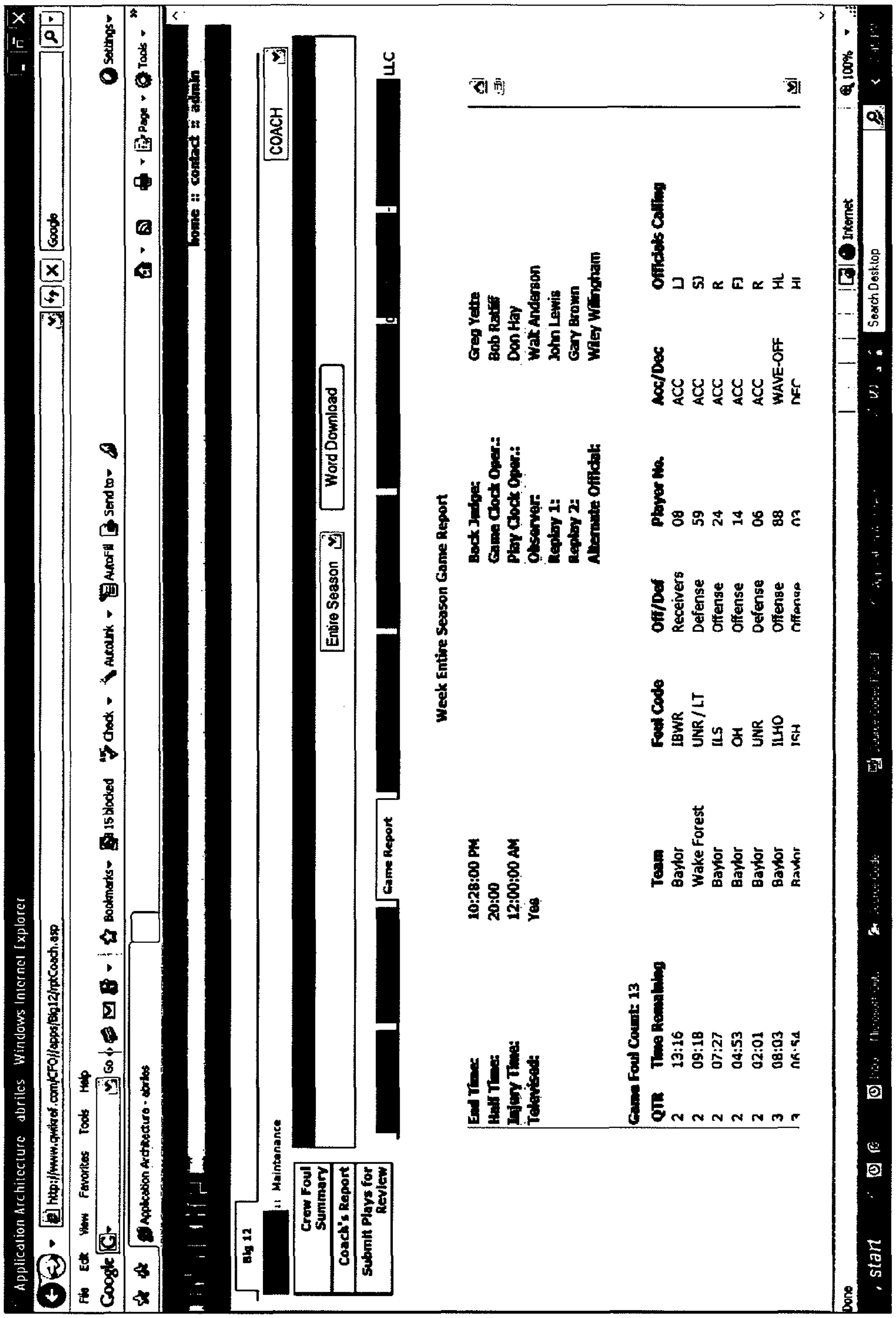
FIG. 43 is a screen shot of a coach permission, view reports, coach's report, game report, in accordance with an embodiment of the present invention.
Figure 44:
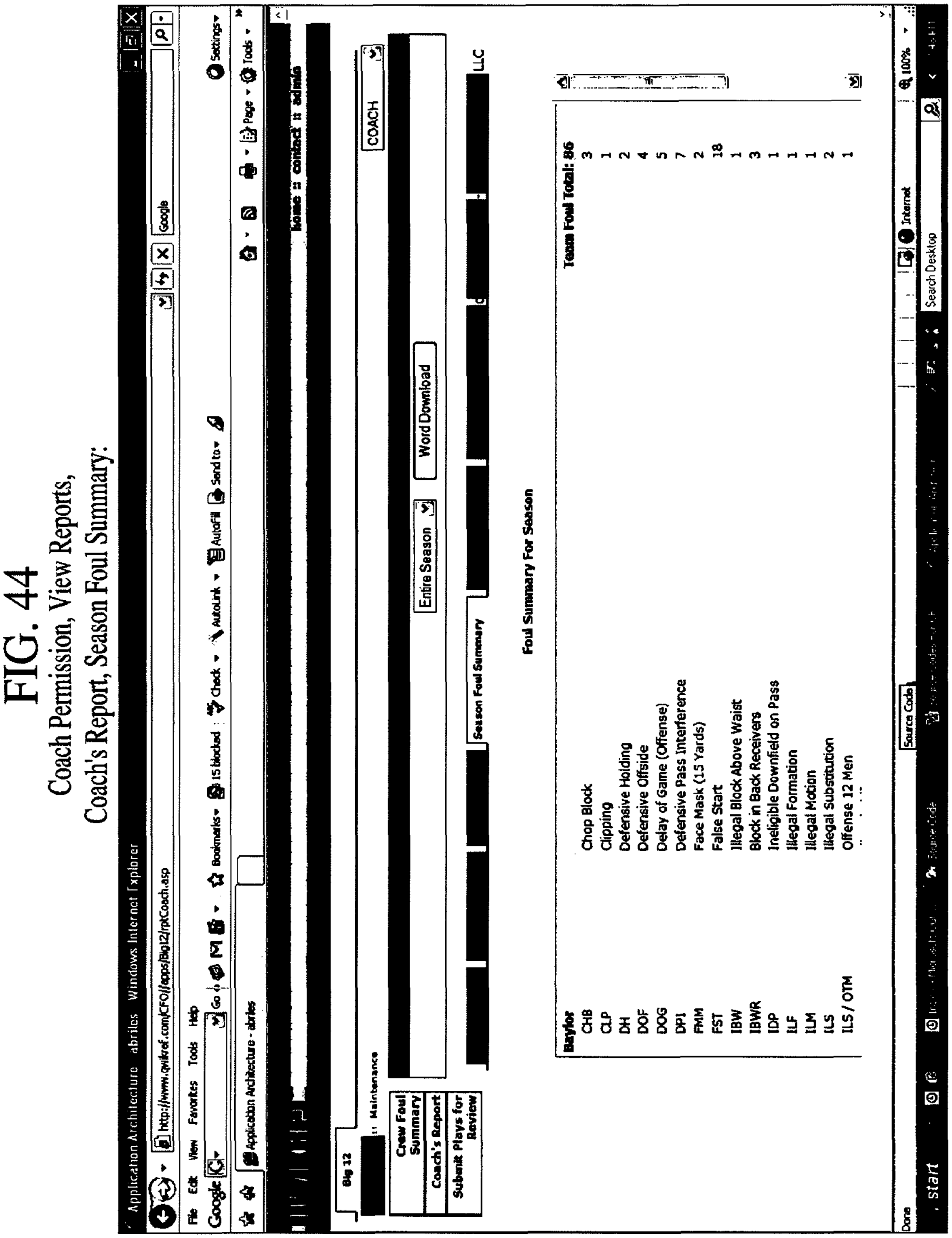
FIG. 44 is a screen shot of a coach permission, view reports, coach's report, season foul summary display, in accordance with an embodiment of the present invention.
Figure 45:
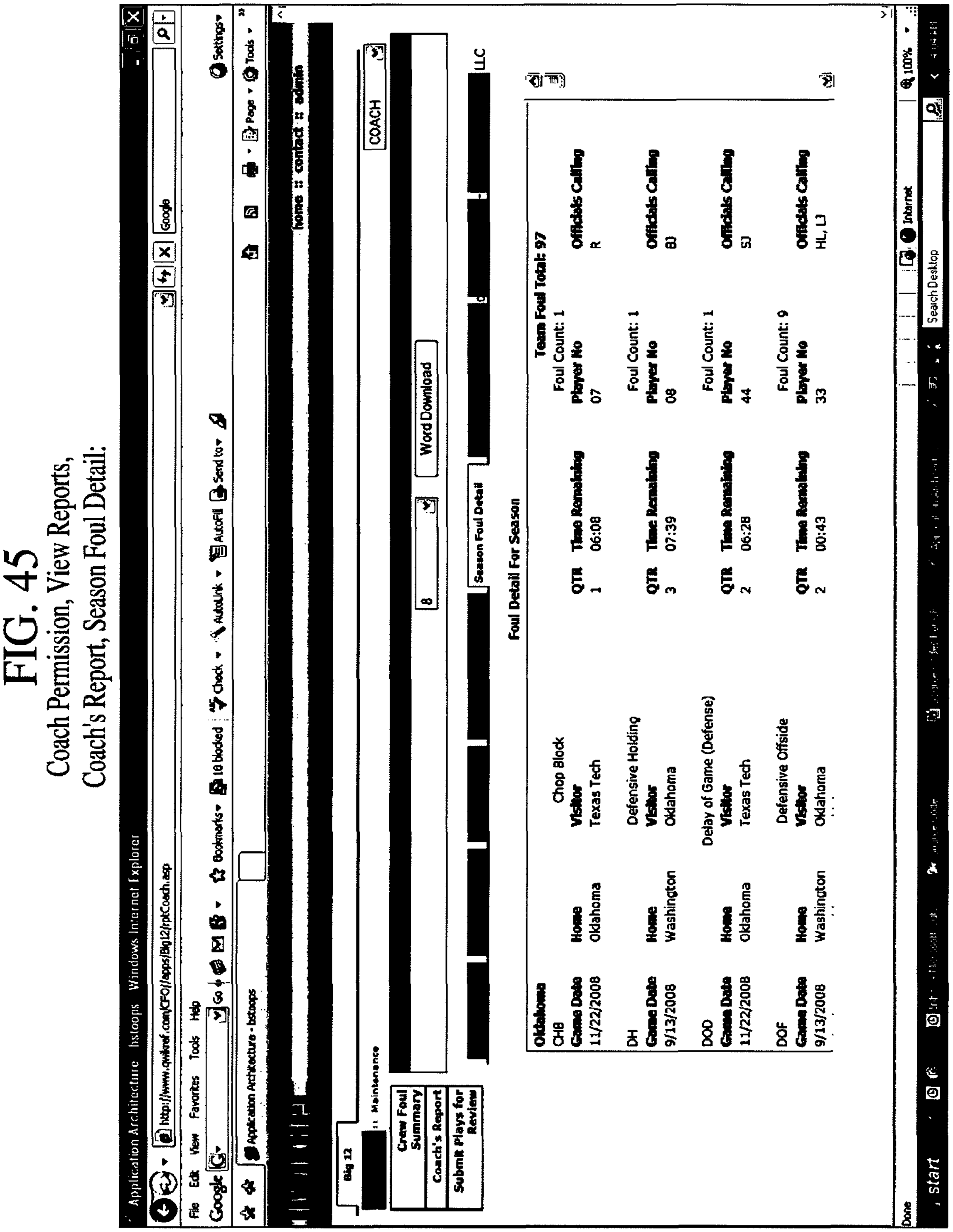
FIG. 45 is a screen shot of a coach permission, view reports, coach's report, season foul detail display, in accordance with an embodiment of the present invention.
Figure 46:
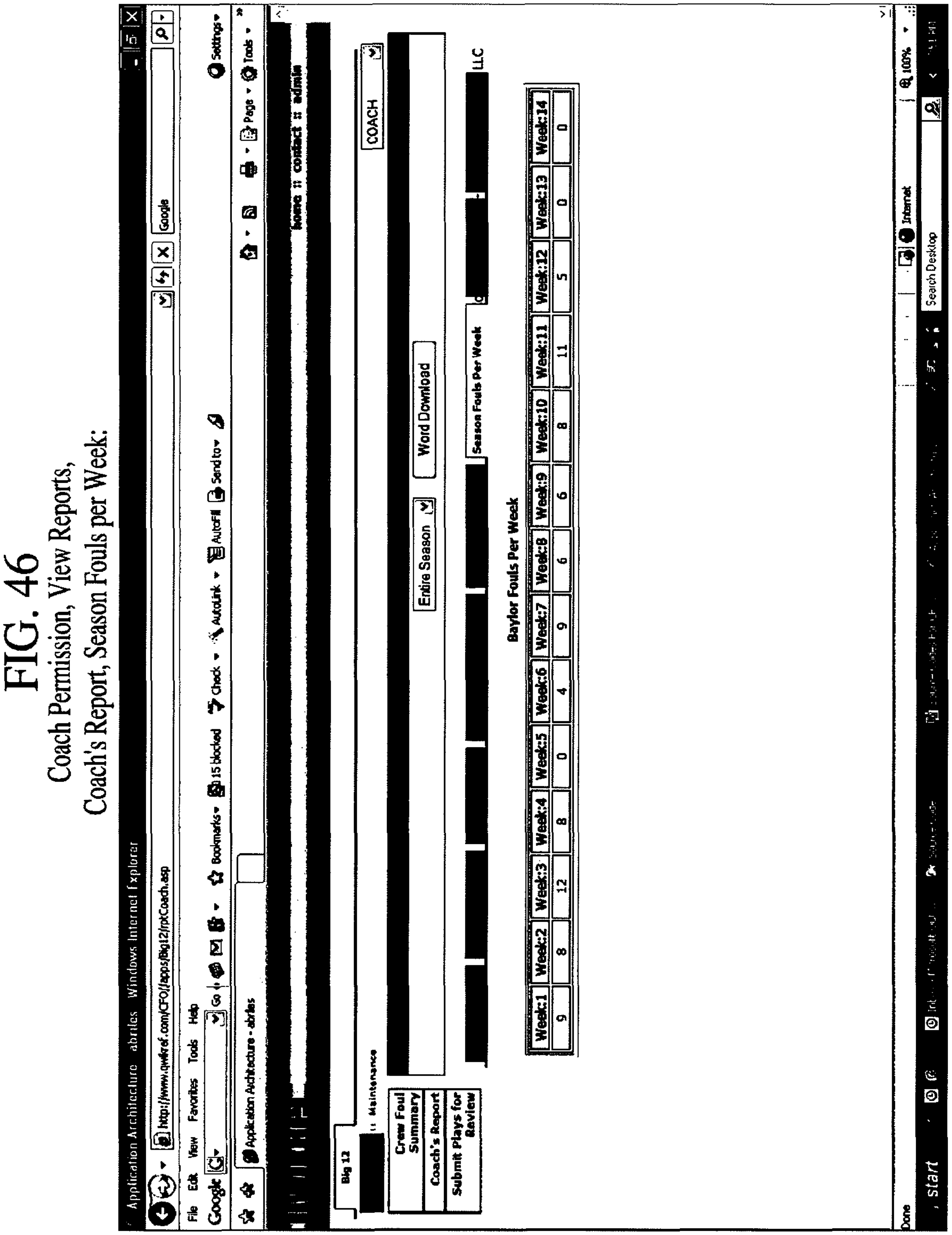
FIG. 46 is a screen shot of a coach permission, view reports, coach's report, season fouls per week display, in accordance with an embodiment of the present invention.
Figure 47:
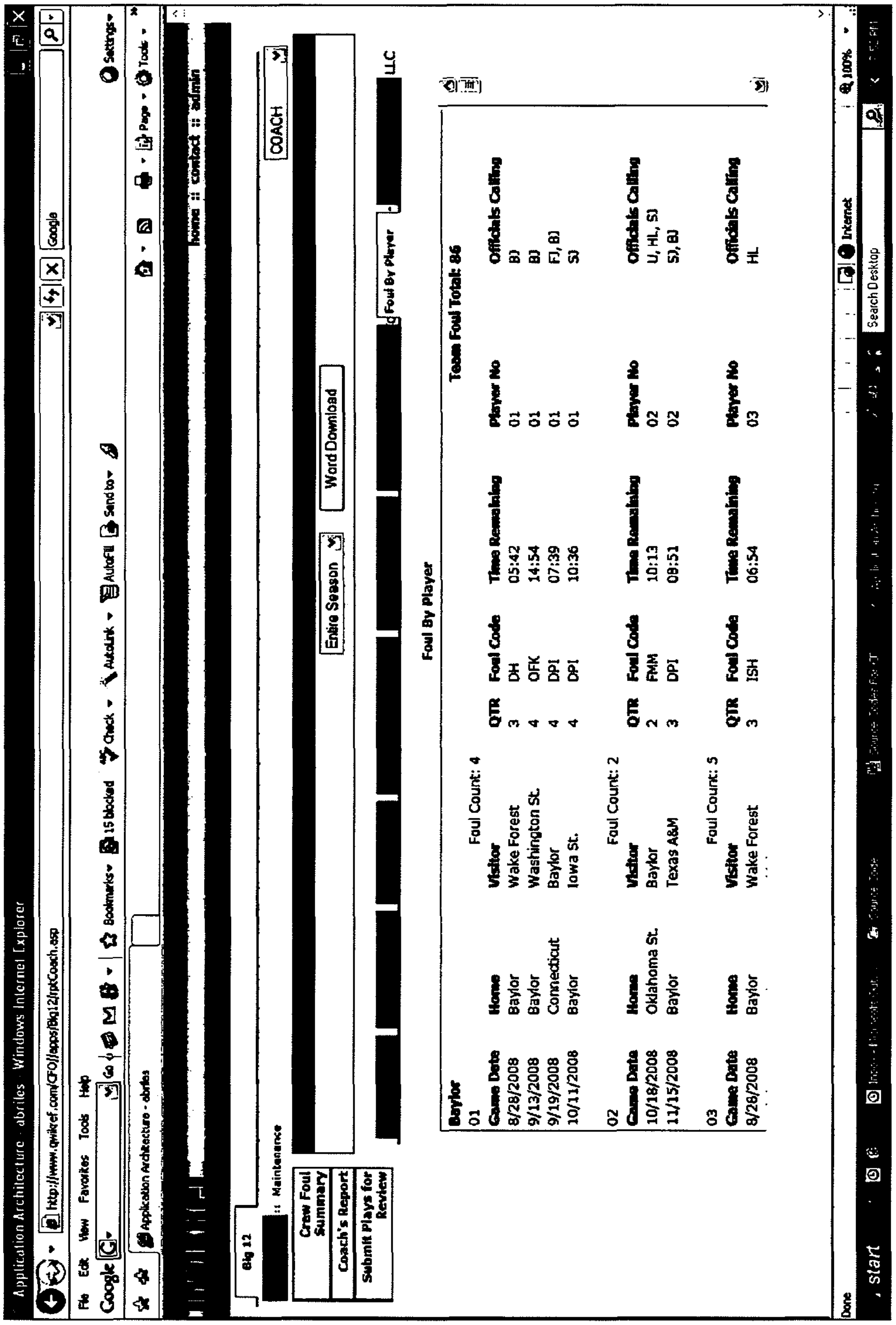
FIG. 47 is a screen shot of a coach permission, view reports, coach's report, fouls by player display, in accordance with an embodiment of the present invention.
Figure 48:
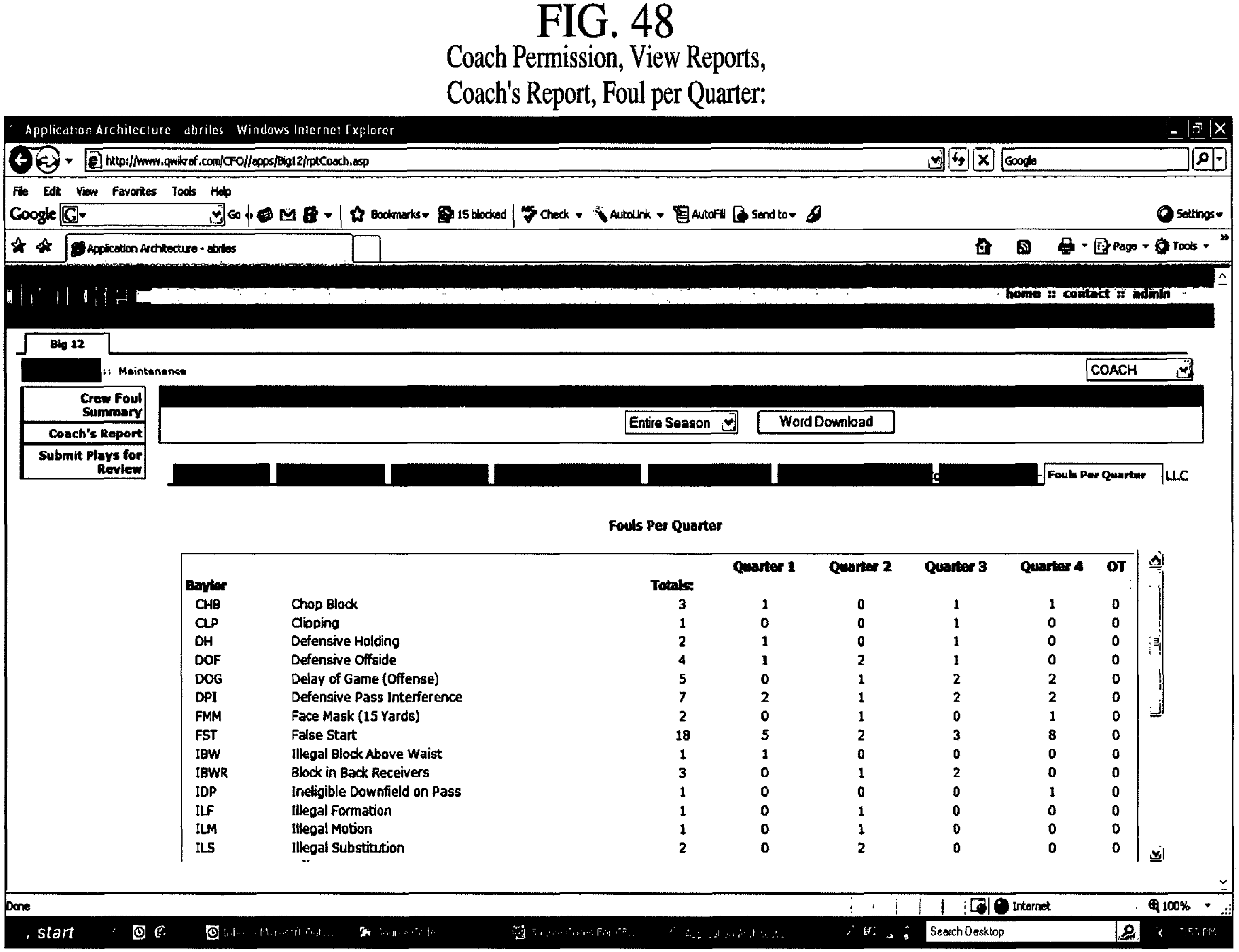
FIG. 48 is a screen shot of a coach permission, view reports, coach's report, fouls per quarter display, in accordance with an embodiment of the present invention.
Figure 49:
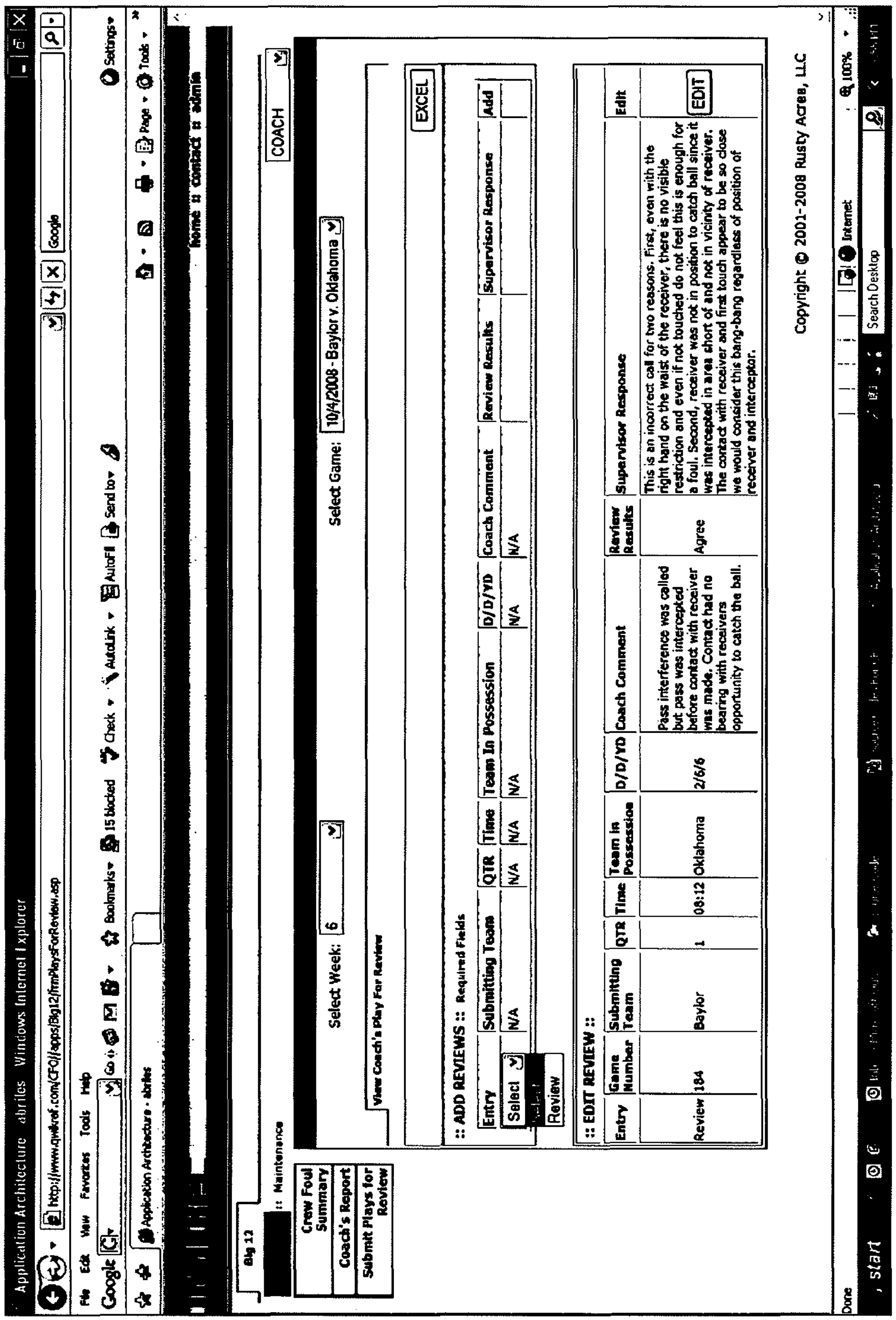
FIG. 49 is a screen shot of a coach permission, view reports, submit plays for review display, in accordance with an embodiment of the present invention.
Figure 50:
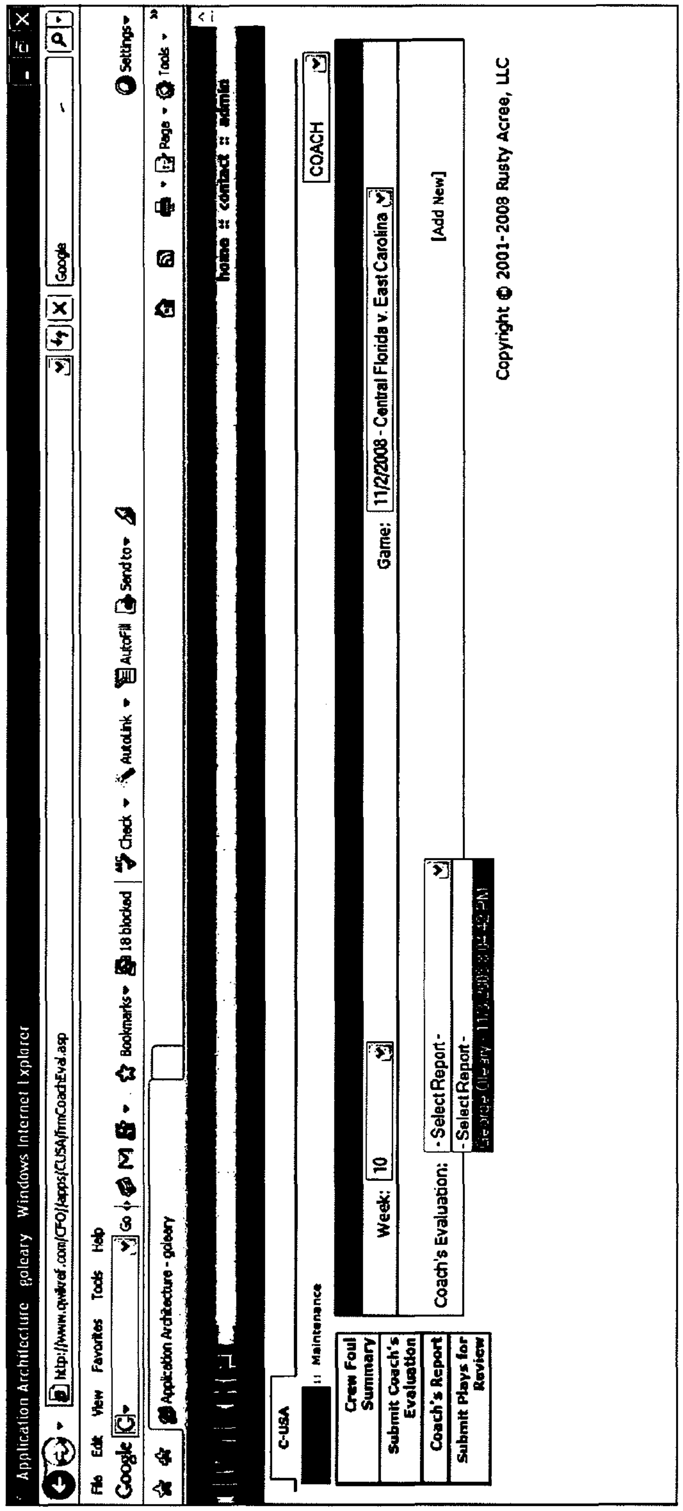
FIG. 50 is a screen shot of a coach permission, view reports, coach's report, submit officials evaluation display, in accordance with an embodiment of the present invention.
Figure 51:
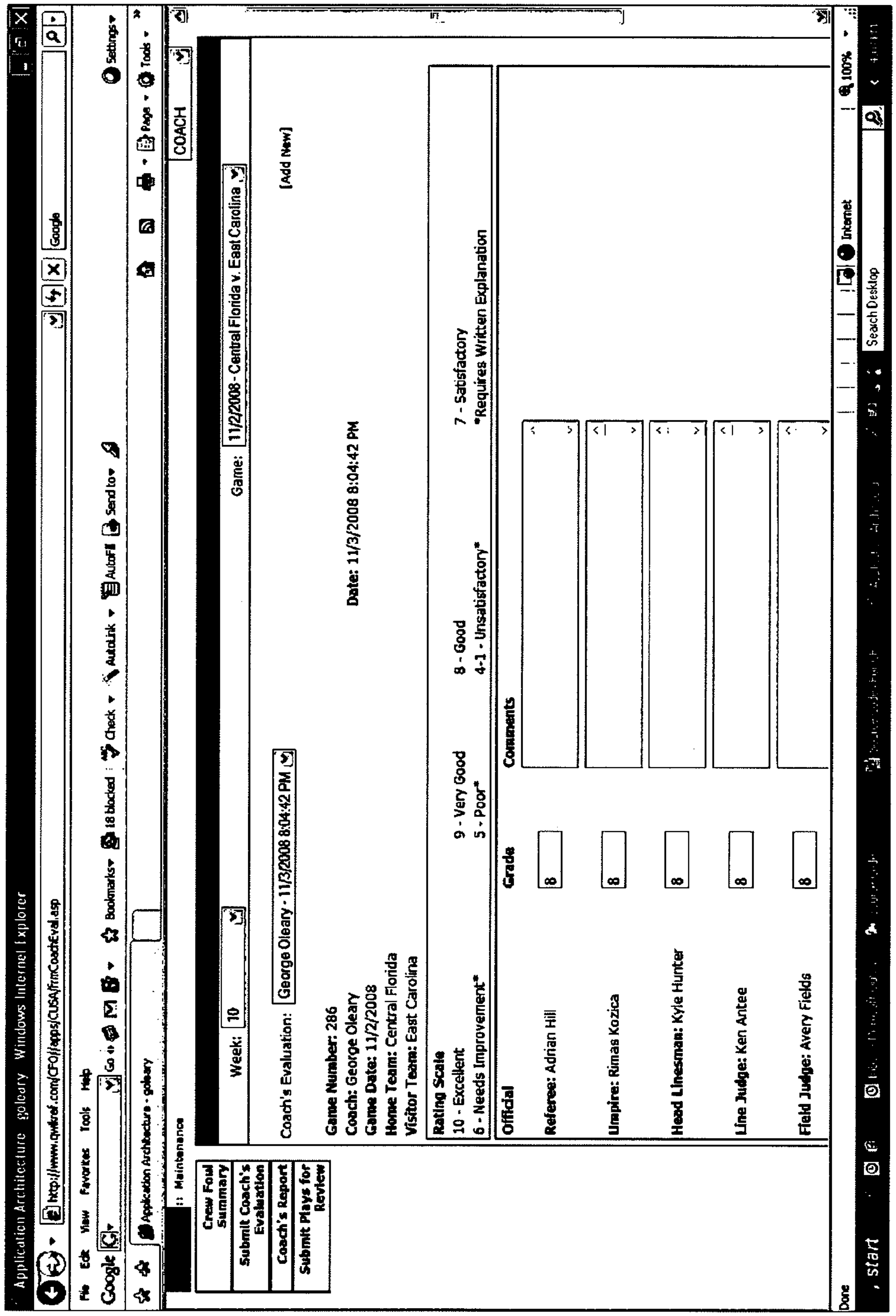
FIG. 51 is a screen shot of a coach permission, view reports, coach's report, submit officials evaluation display, in accordance with an embodiment of the present invention.
Figure 52:
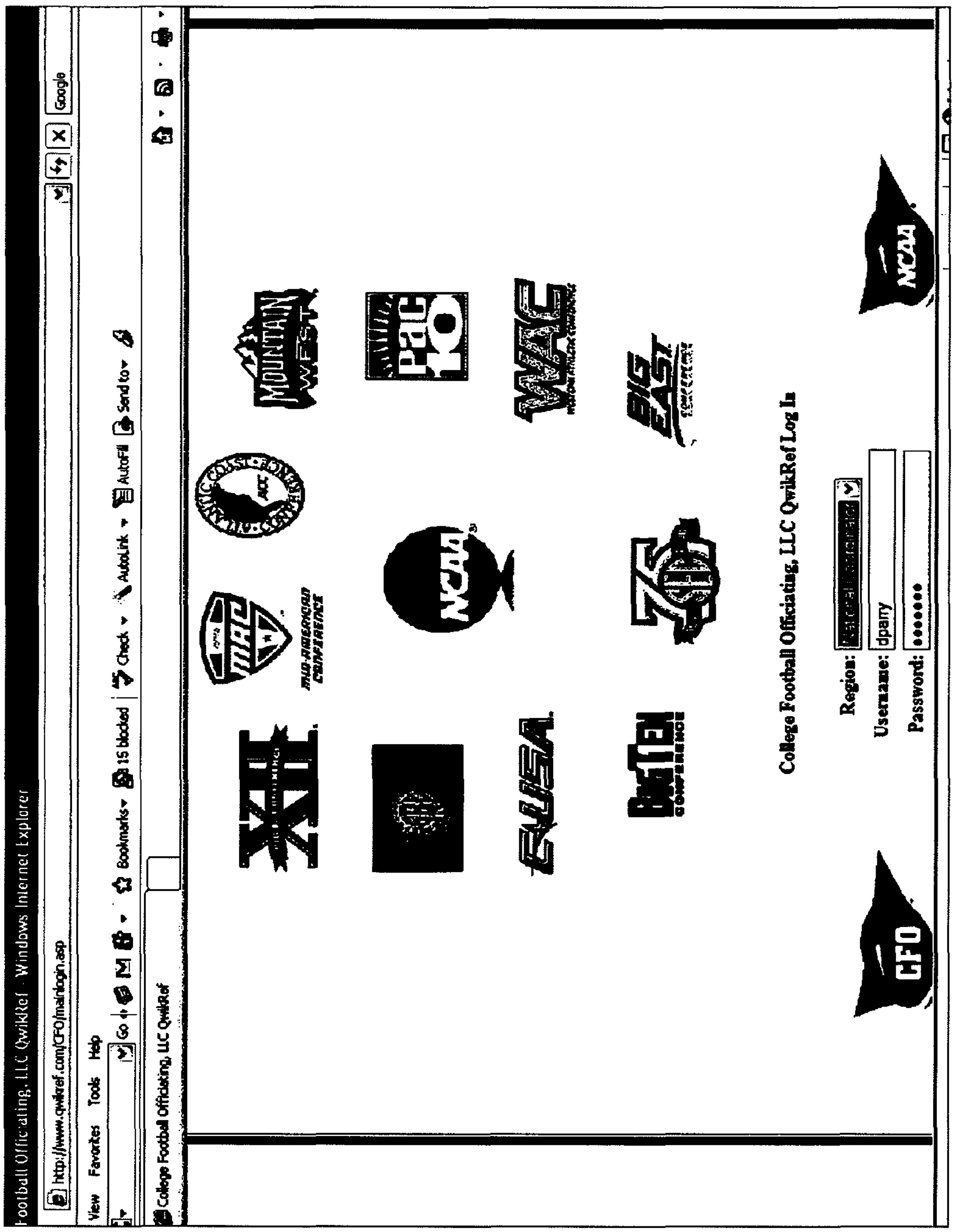
FIG. 52 is a screen shot of a login page for a national coordinator, in accordance with an embodiment of the present invention.
Figure 53:
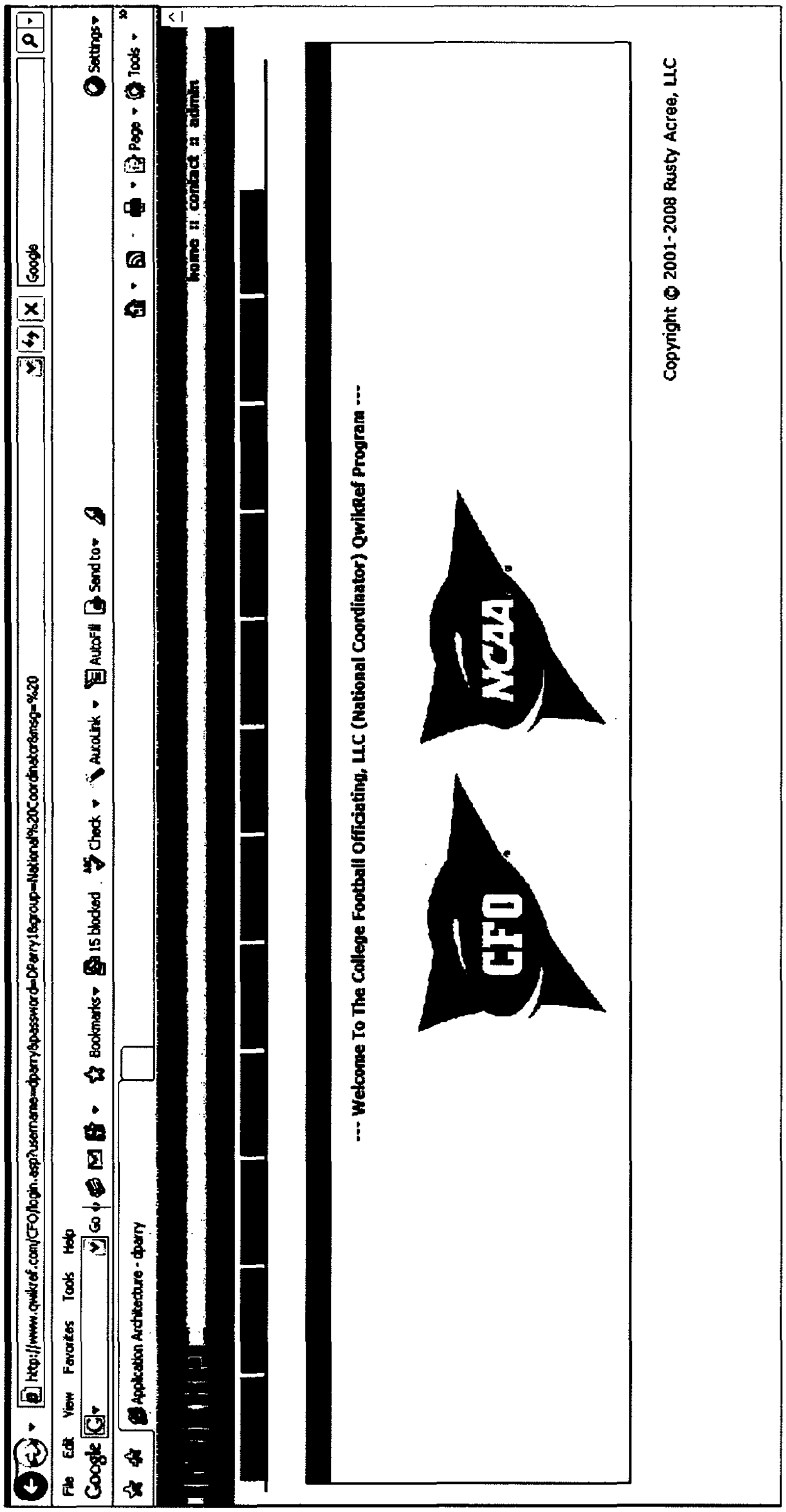
FIG. 53 is a screen shot of a national coordinator welcome screen, in accordance with an embodiment of the present invention.
Figure 54:
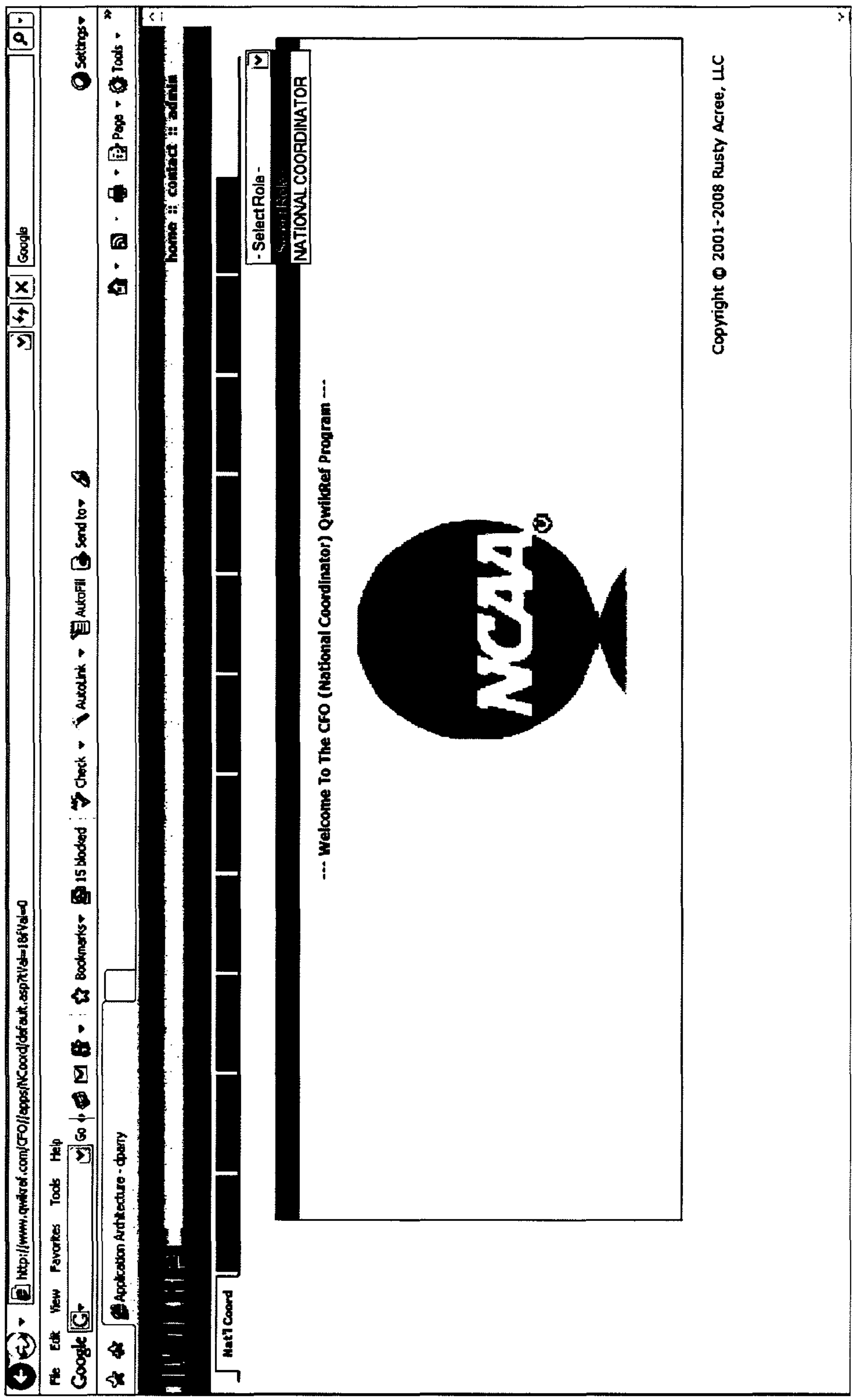
FIG. 54 is a screen shot of a national coordinator tab welcome page with national coordinator role highlighted, in accordance with an embodiment of the present invention.
Figure 55:
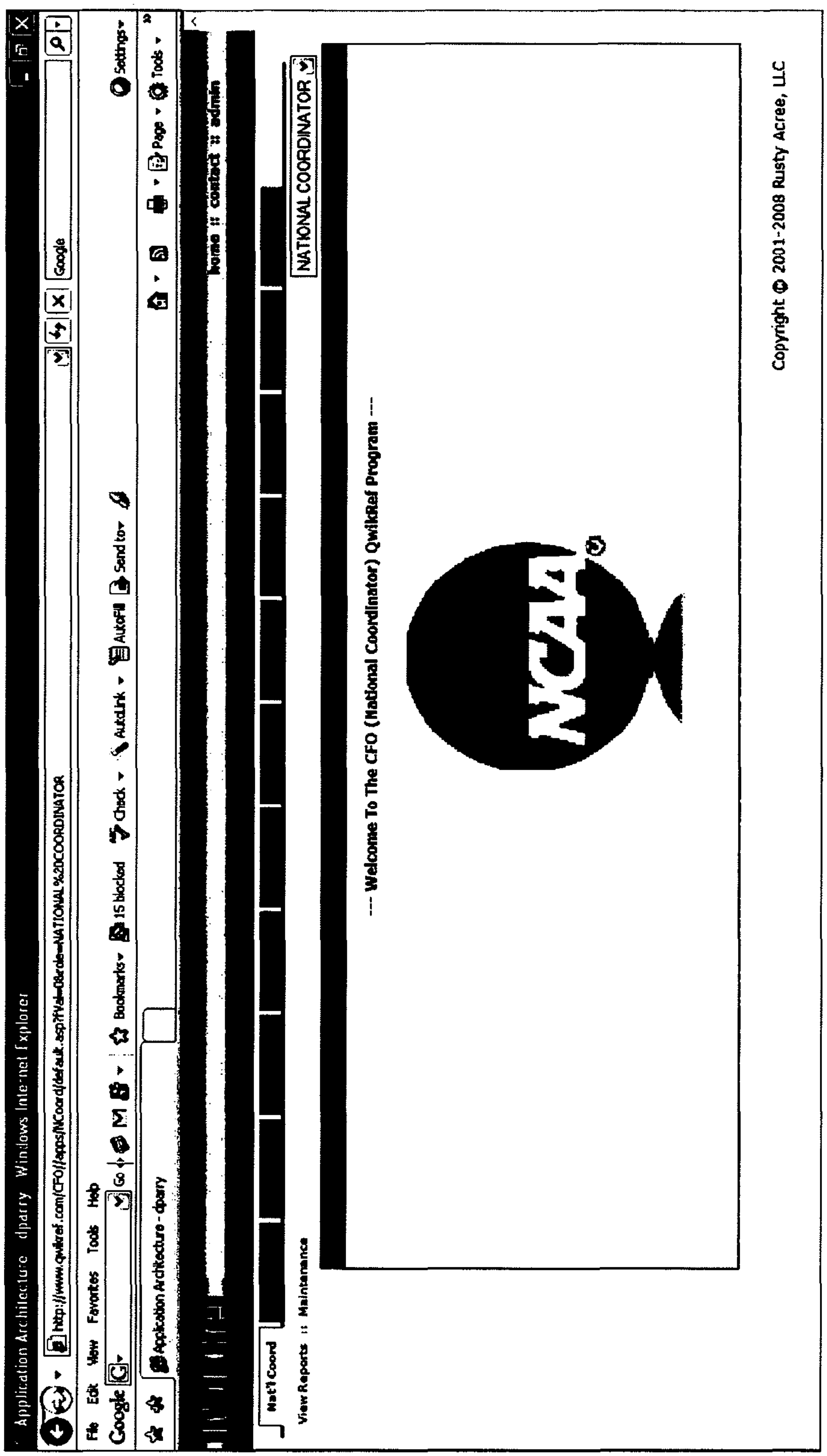
FIG. 55 is a screen shot of a national coordinator navigation page, in accordance with an embodiment of the present invention.
Figure 56:
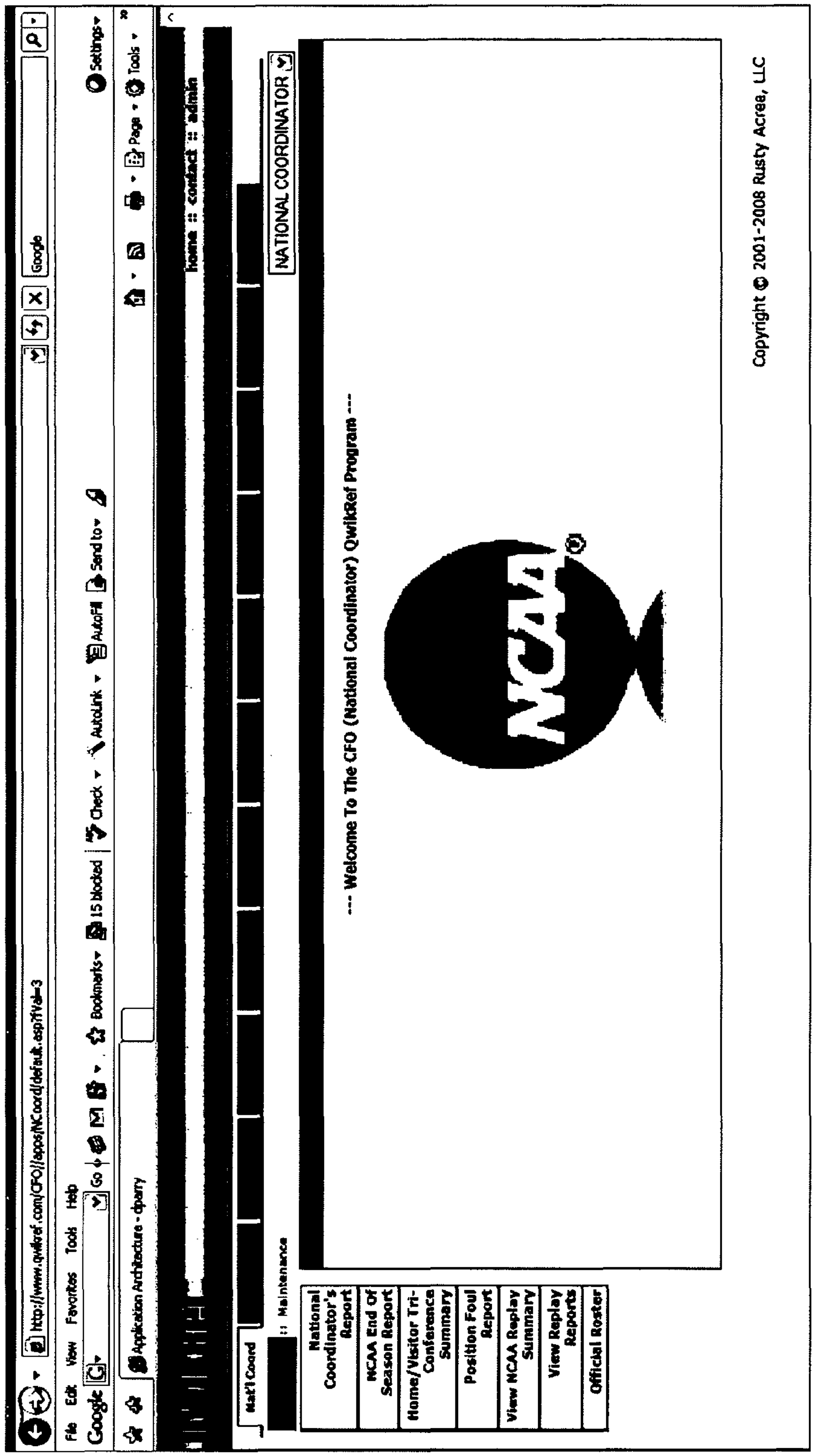
FIG. 56 is a screen shot of a national coordinator menu page, in accordance with an embodiment of the present invention.
Figure 57:
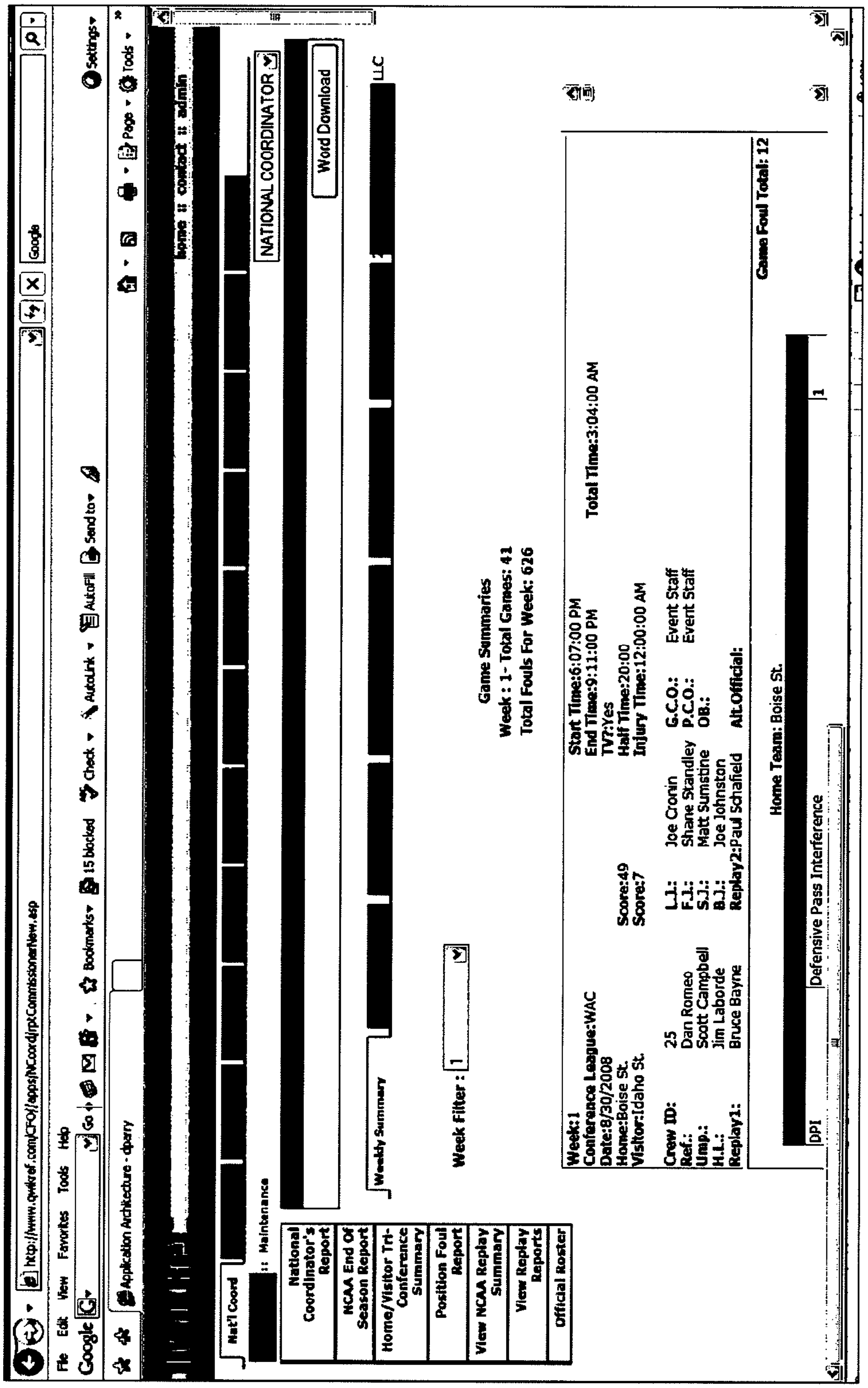
FIG. 57 is a screen shot of a national coordinator's report, weekly summary tab, in accordance with an embodiment of the present invention.
Figure 58:
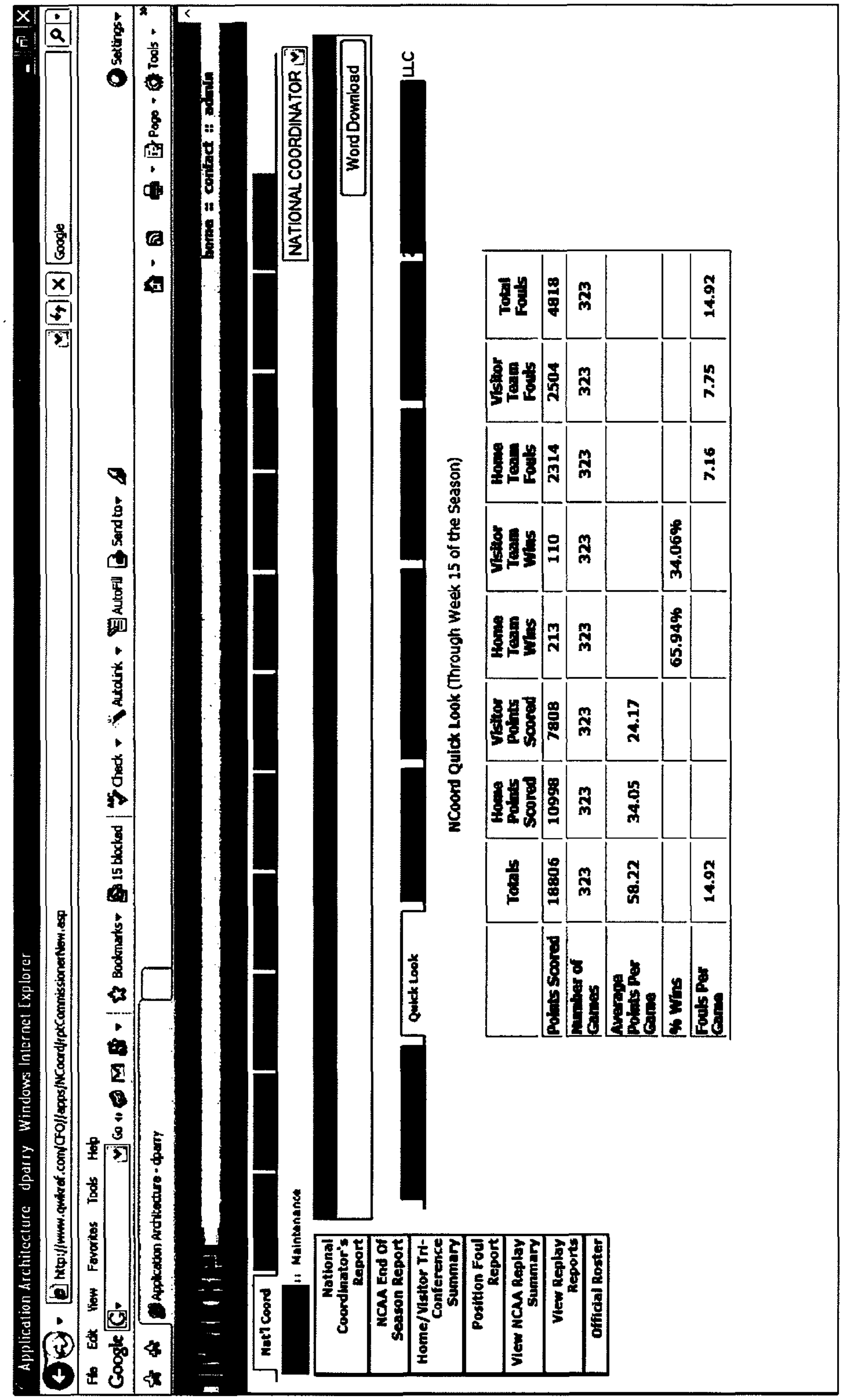
FIG. 58 is a screen shot of a national coordinator's report, quick look tab, in accordance with an embodiment of the present invention.
Figure 59:
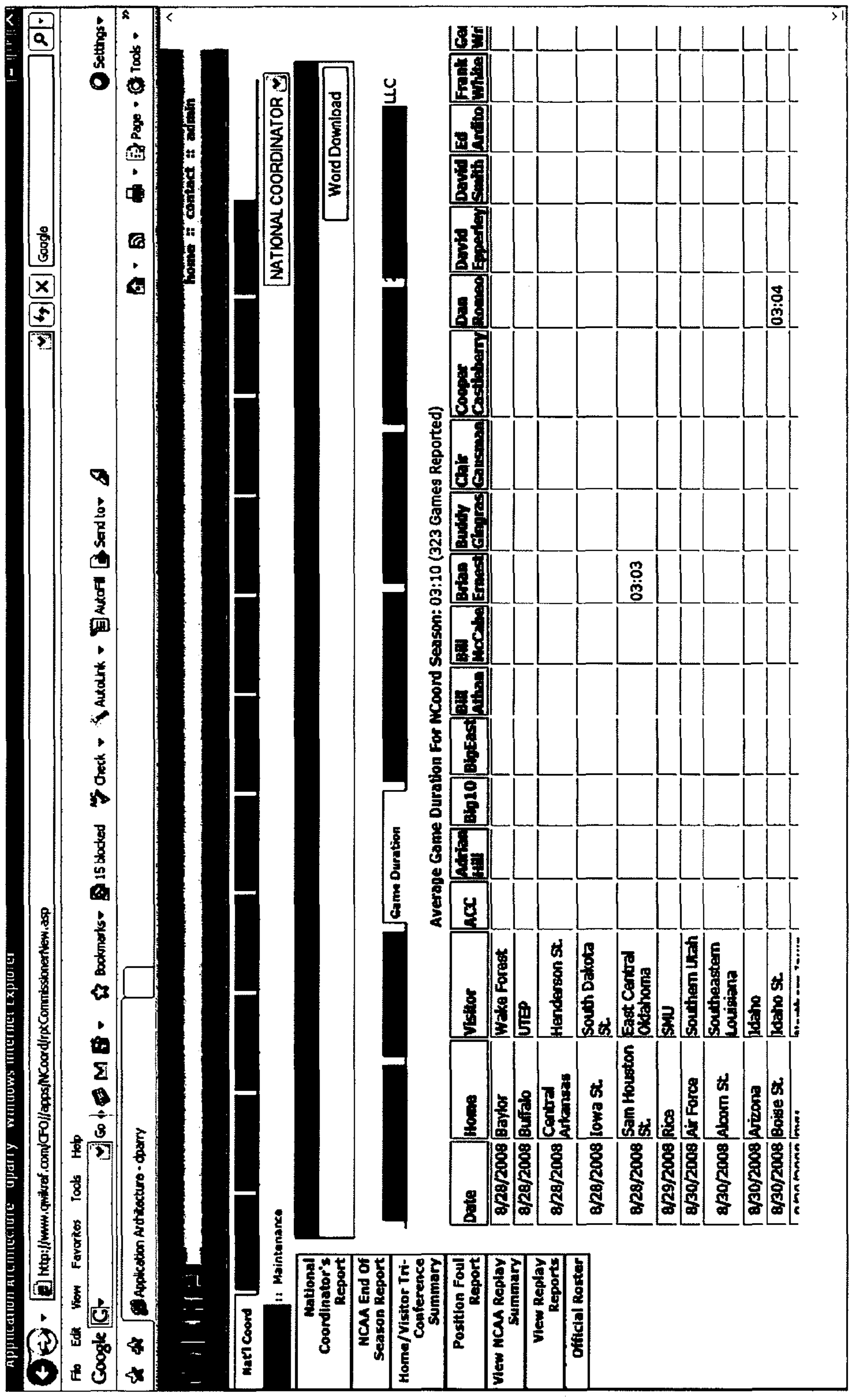
FIG. 59 is a screen shot of a national coordinator's report, game duration tab, in accordance with an embodiment of the present invention.
Figure 60:
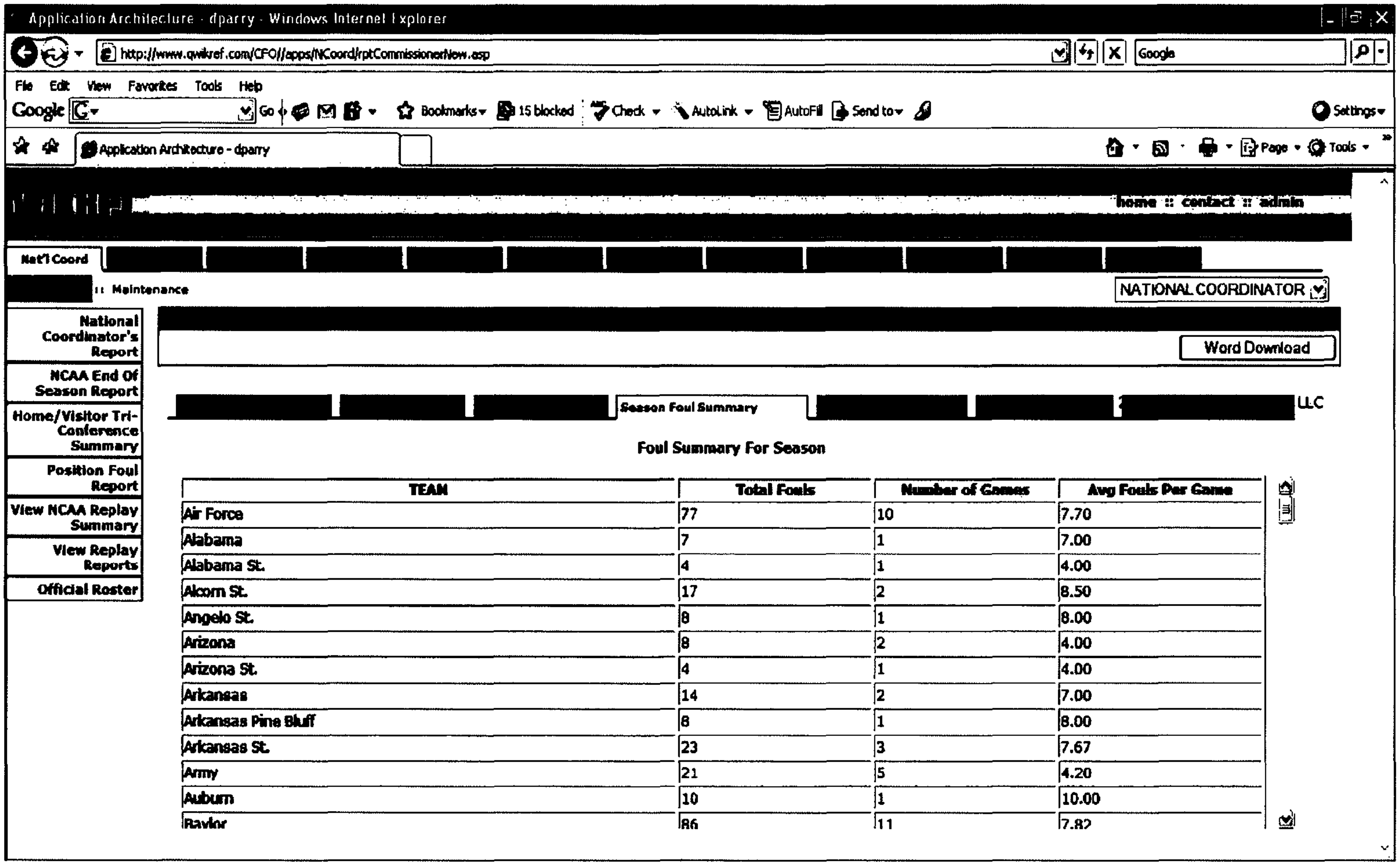
FIG. 60 is a screen shot of a national coordinator's report, season foul summary tab, in accordance with an embodiment of the present invention.
Figure 62:
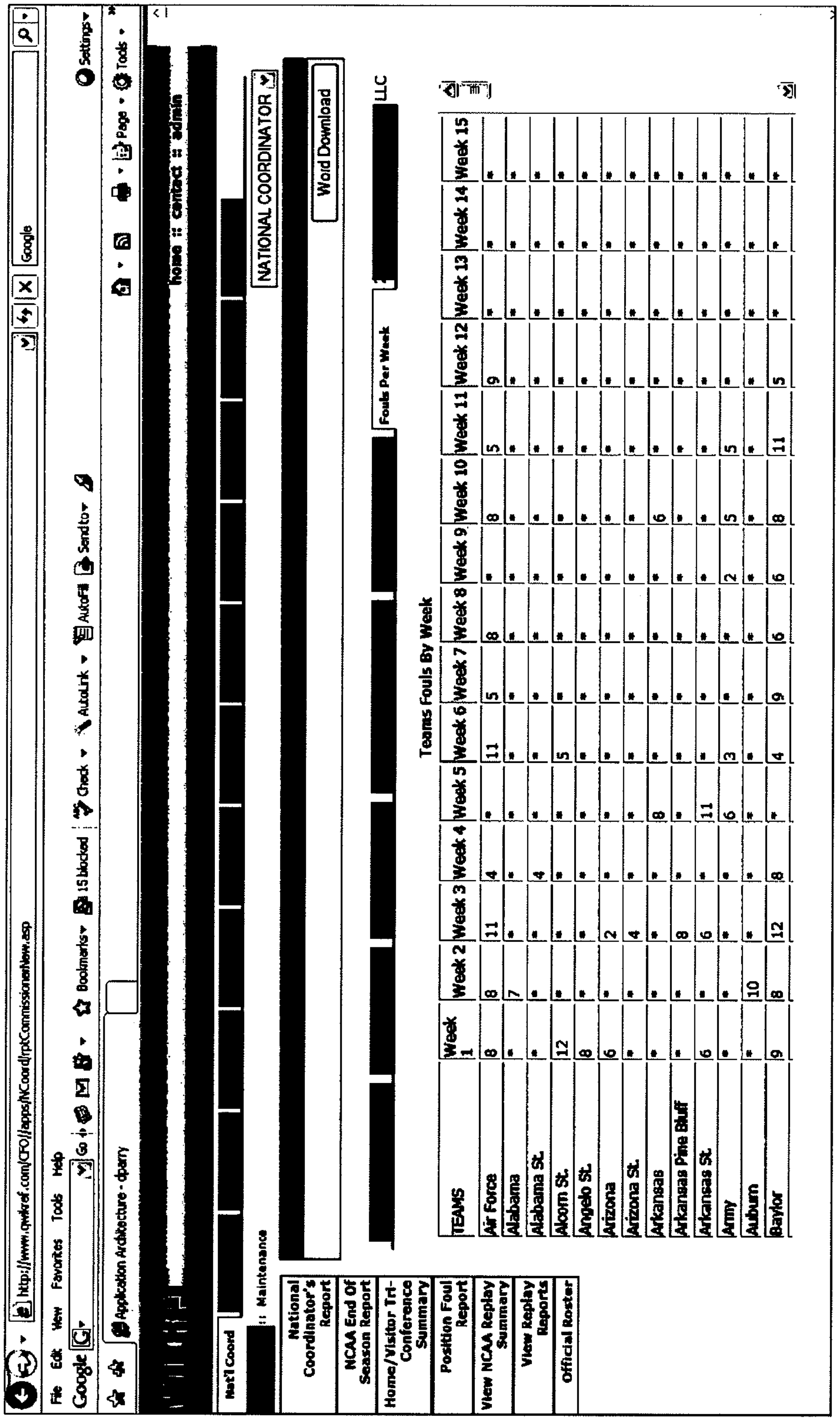
FIG. 62 is a screen shot of a national coordinator's report, fouls per week tab, in accordance with an embodiment of the present invention.
Figure 63:
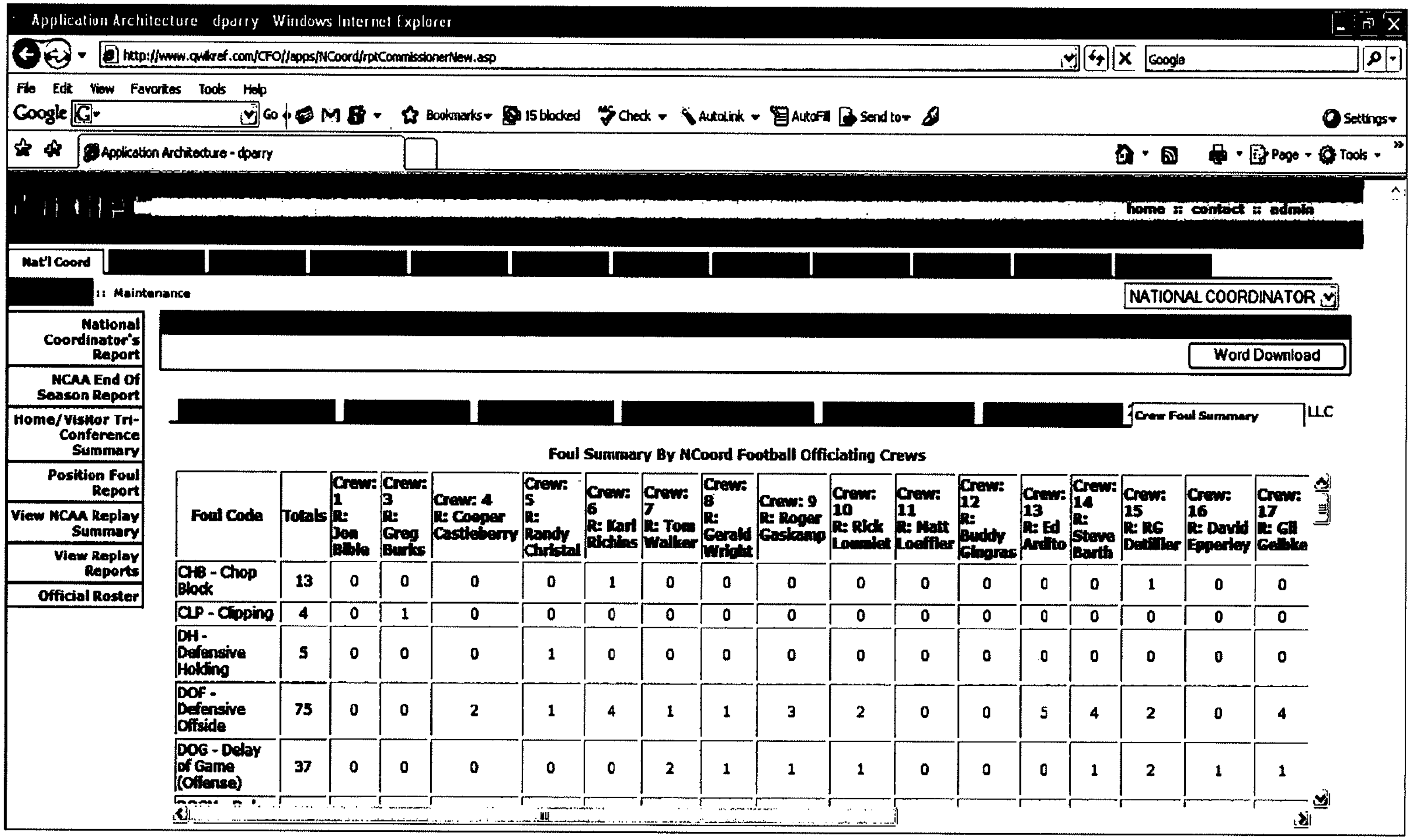
FIG. 63 is a screen shot of a national coordinator's report, crew foul summary tab, in accordance with an embodiment of the present invention.
Figure 64:
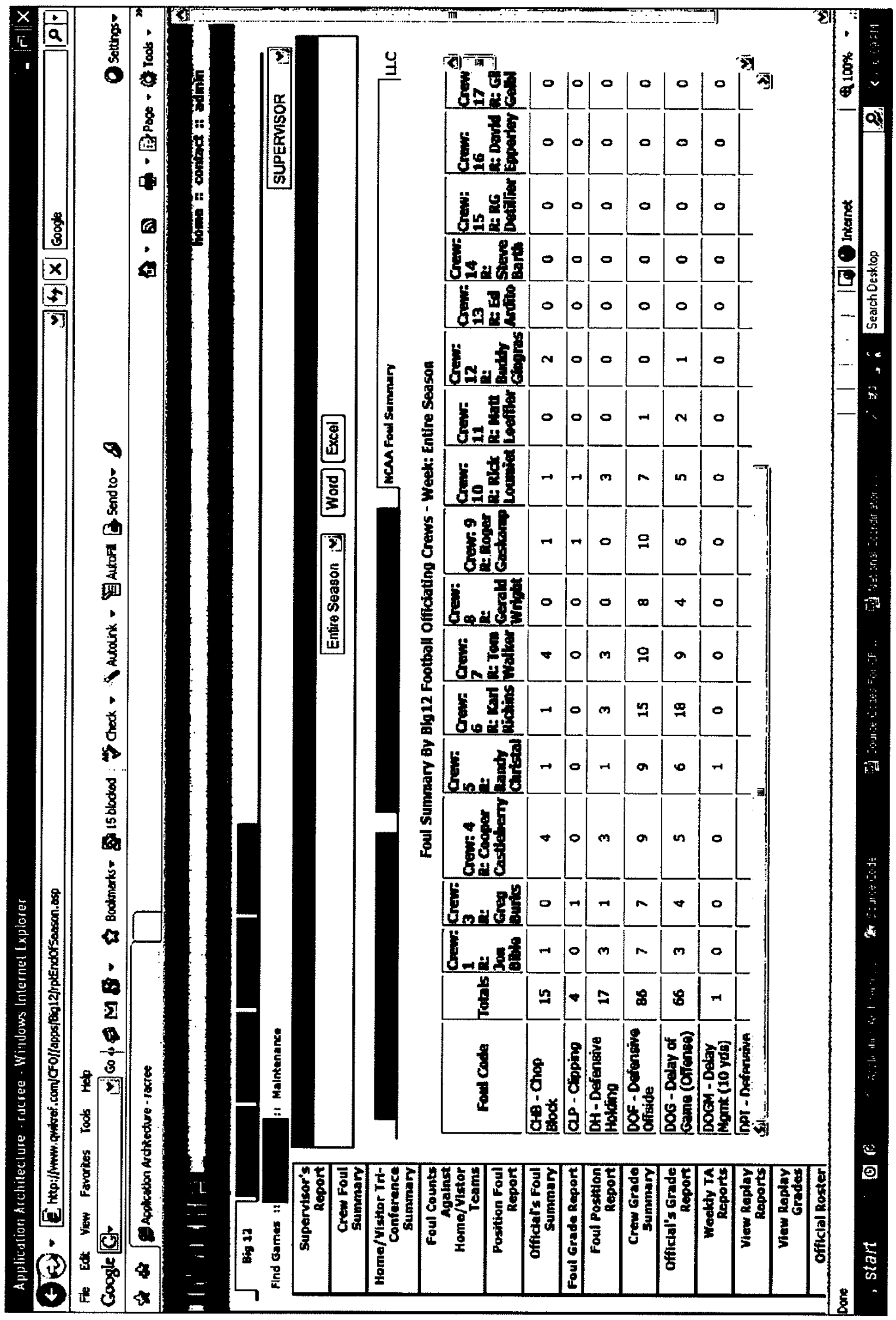
FIG. 64 is a screen shot of a national coordinator's report, NCAA end of season report, in accordance with an embodiment of the present invention.
Figure 65:
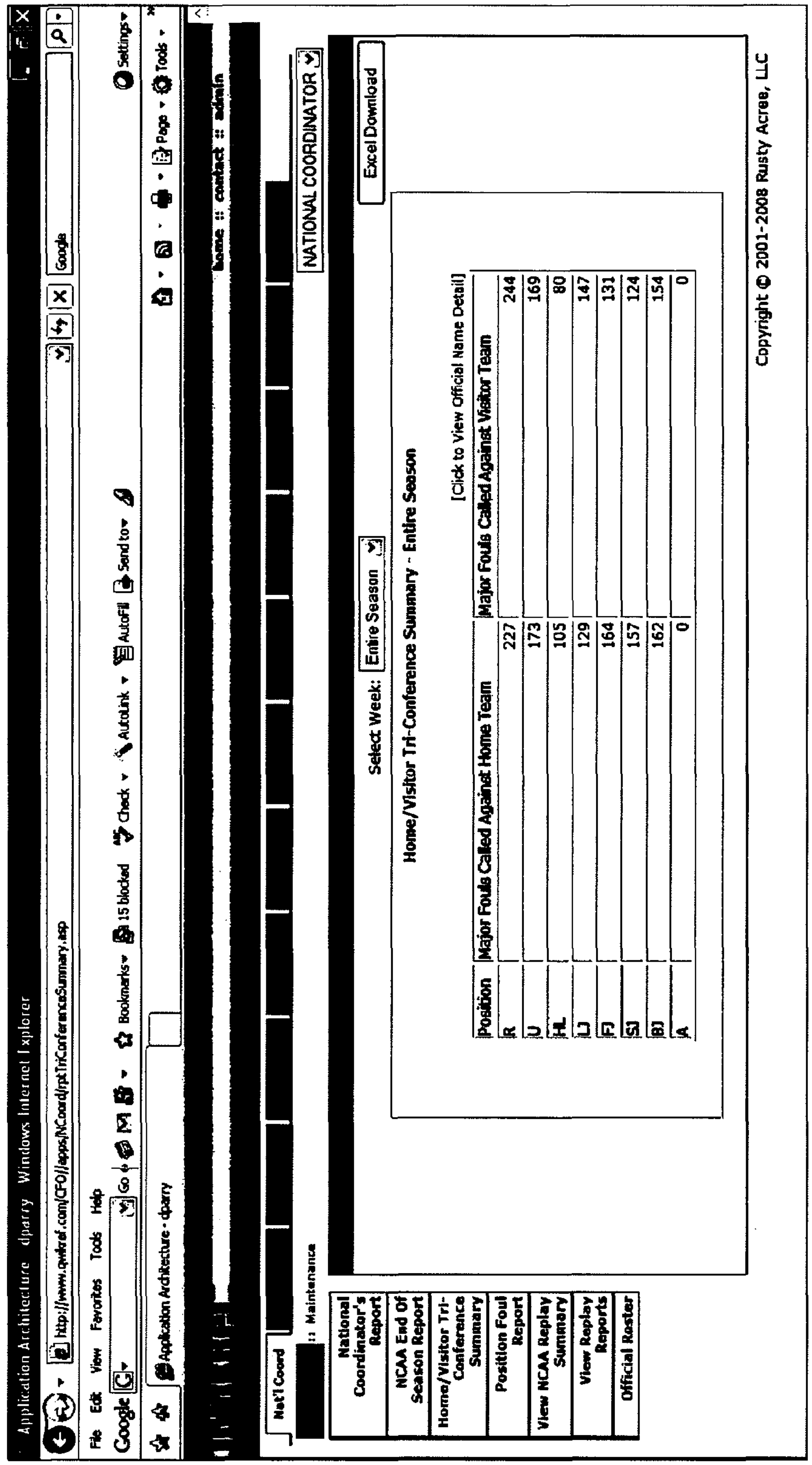
FIG. 65 is a screen shot of a national coordinator's report, home visitor triconference summary display, in accordance with an embodiment of the present invention.
Figure 66:
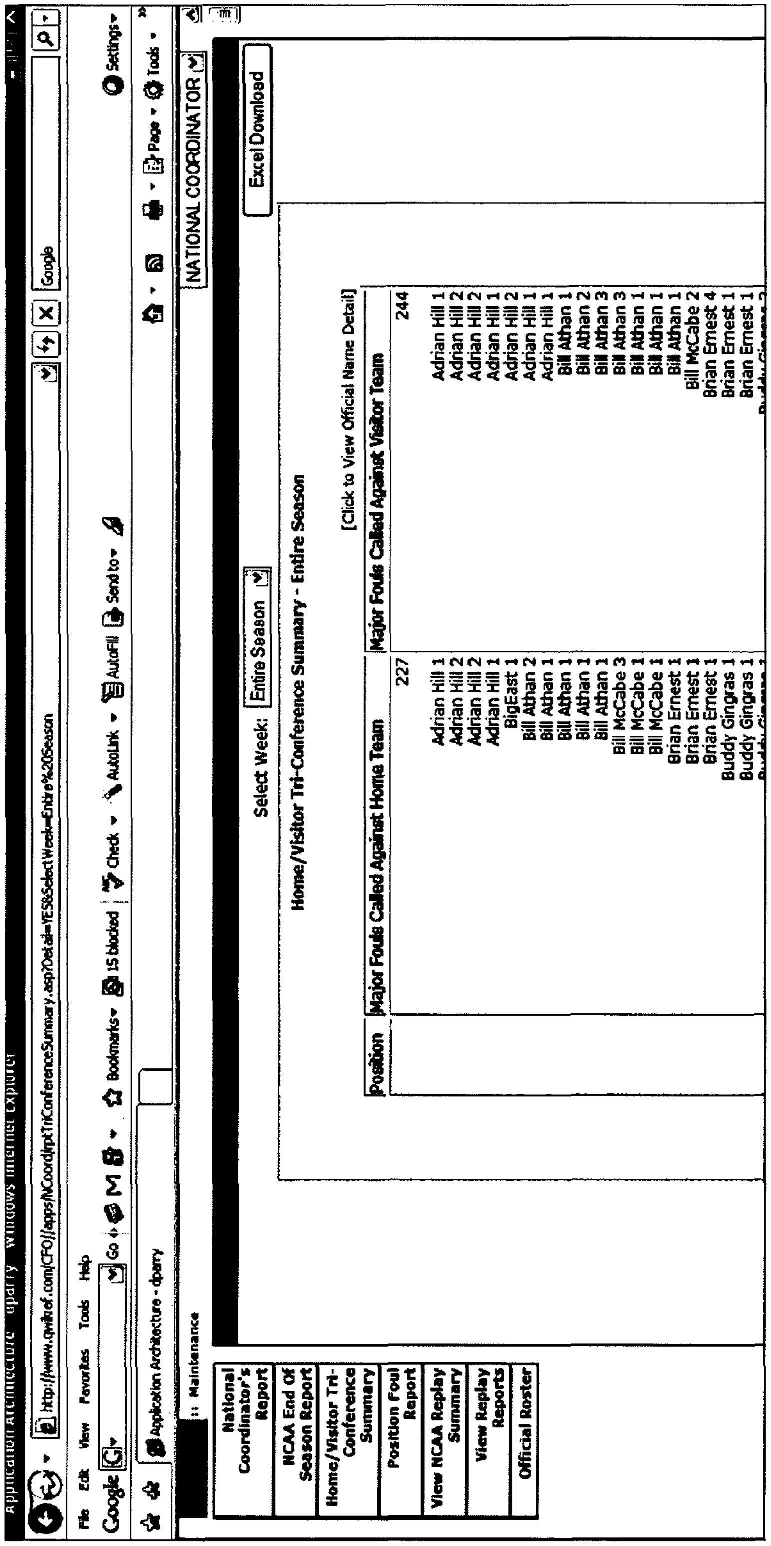
FIG. 66 is a screen shot of a national coordinator's report, home visitor triconference summary, click to view official detail display, in accordance with an embodiment of the present invention.
Figure 70:
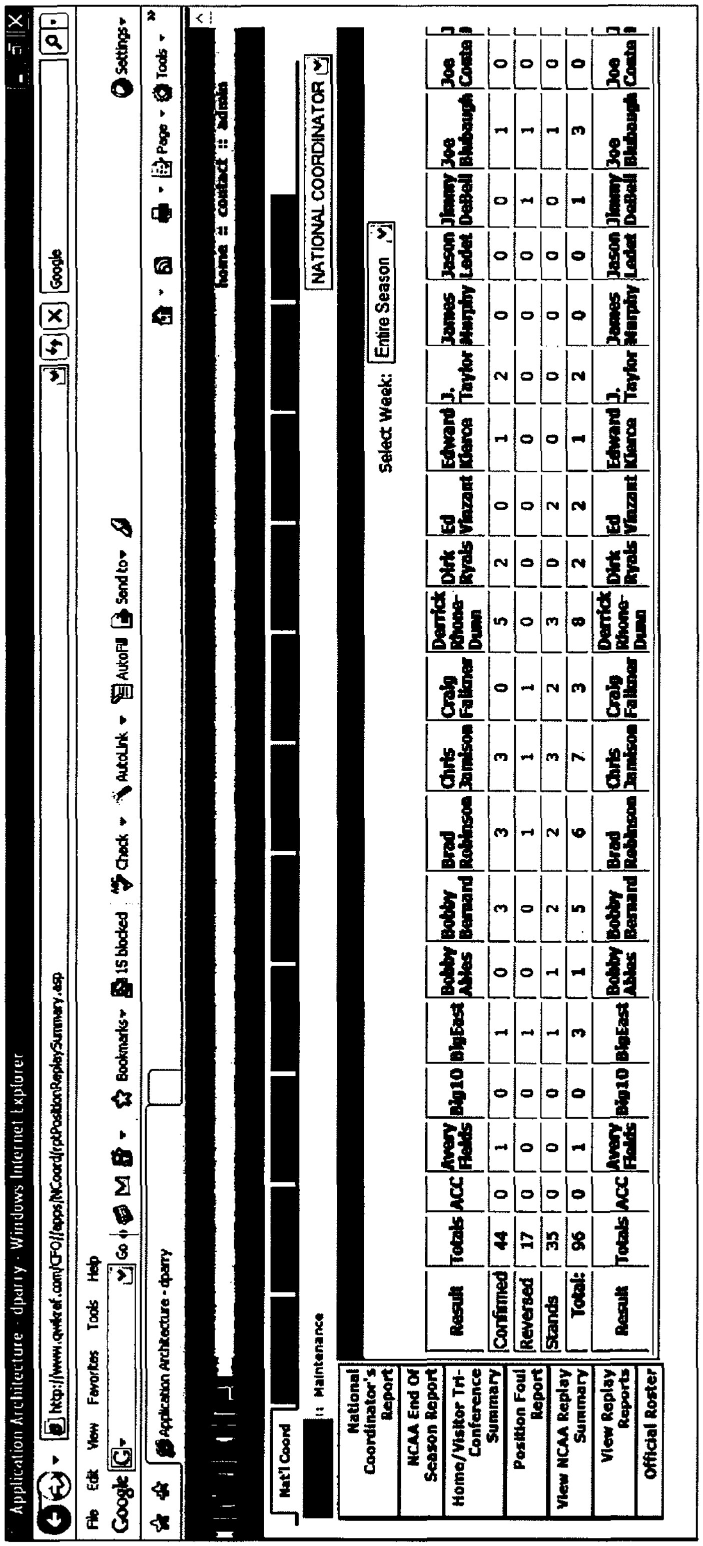
FIG. 70 is a screen shot of a national coordinator's report, view replay reports, view replay positions reviewed, field judge display, in accordance with an embodiment of the present invention.
Figure 72:
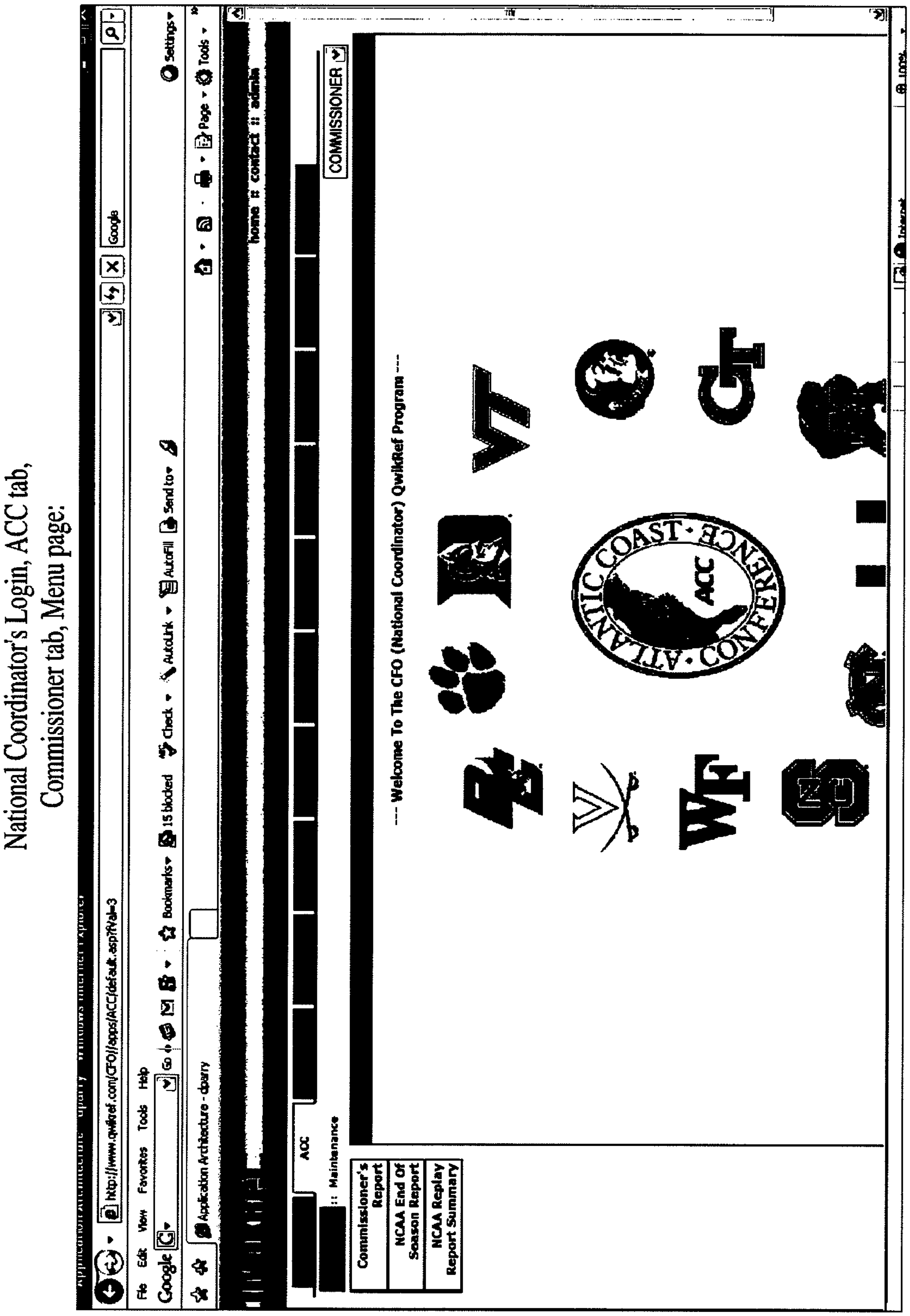
FIG. 72 is a screen shot of a national coordinator's login, ACC tab, commissioner tab, menu page summary display, in accordance with an embodiment of the present invention.
Figure 73:
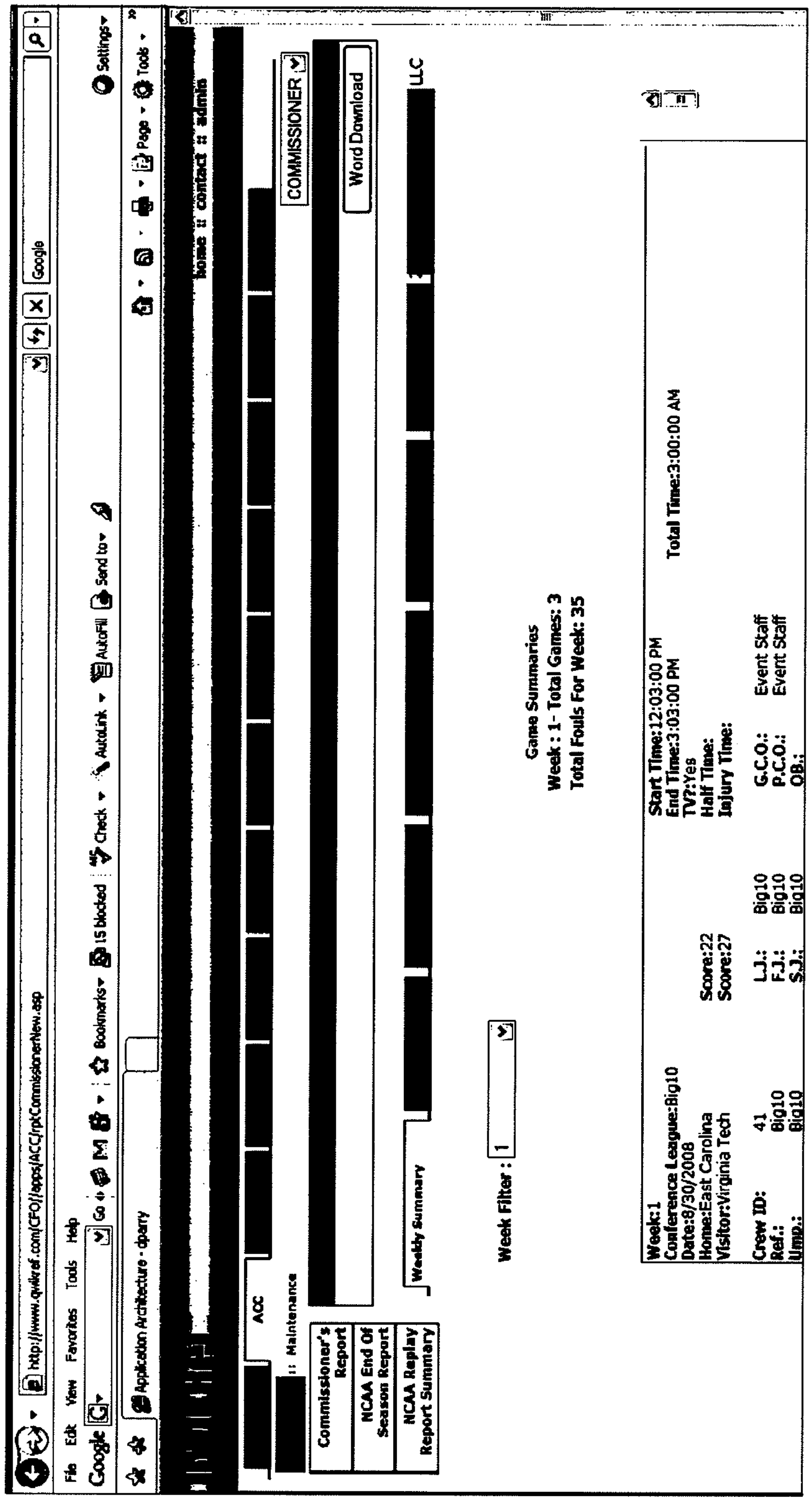
FIG. 73 is a screen shot of a national coordinator's login, ACC tab, commissioner tab, commissioner's report summary display, in accordance with an embodiment of the present invention.

FIG. 2 is a flow diagram of how various users can use the program shown in FIG. 1, in accordance with an embodiment of the present invention. In FIG. 2, the website 110 may receive 205 data, including game information, rosters and assignments at the website, generally from the coordinator of football officials 130 and store 210 the received data in the database 112 at the website 110. The website 110 can also receive 215 post game foul reports, including penalty data and store 220 the received penalty data in the database 112 at the website 110. In general, this information usually is supplied by users 120 who are referees. The website 110 can also receive 225 and store 230 stoppage reports in the database 112 related to instant replay review of a play, and these reports can are usually supplied by users 120 who are replay officials. The website 110 may further receive 235 related technical assistance data from one or more technical assistants assigned to help the referees and other officials. The technical assistance data may be stored 240 in the database 112 for later use. The website may still further receive 245 a list or lists of plays/calls, usually from the coaches of the teams involved in the game (or even from a coach from a team not involved in the game), that are to be reviewed for correctness, and the lists may be stored 250 in the database 112.

In FIG. 2, a grader may be permitted to access 255 the website 110 and database 112 to review the data and provide grades and comments on one or more referee's performance for one or more games and store the grades and comments in the database 112. Likewise, the one or more referee's whose performance was graded and commented on may be permitted to access 260 the website 110 and database 112 to review their individual grades and comments. In general, each referee will only be given restricted access to review the grades and comments specifically about their performance and/or the entire crew of referees that worked a given game together. The website can allow the coordinator to enter responses 255 to the lists 250 and also to send an alert (e.g., via Email, text message, a tweet, an instant message, etc.) to alert a coach or the like that his or her plays have been reviewed.

Referring to FIG. 1, the coordinator of officials user 120 and the commissioner/staff/head coach users 150 may access the website 110 to review customized reports about each game in their conference. For example, the commissioner and the commissioner's staff of the Big 12 can only access information on the games that involve Big 12 teams, while the head coaches may only access information on the games in which his school played.

The system and method can be customized and tailored based on, for example, the user or users who will be accessing the data and/or entering data. Data, such as, but not limited to, penalty data, may be compiled and used to perform penalty analysis. The penalty analysis may be used to determine whether an official or group of officials' performance and/or conduct was adequate and appropriate during a given play or when a certain penalty was called. For example, a grader may review a play in which a penalty was called by the officiating crew. This may be facilitated by providing some sort of a dynamic link, for example, but not limited to, a hyperlink to a video clip of the actual play, so the grader may review the actual play. The dynamic link may be generated, for example, according to FIGS. 173-178, and their accompanying detailed description. In embodiments, selection of the video hyperlink (e.g., clicking on or otherwise selecting) may cause the video to be displayed in a same or different section(s), window(s), or screen(s) as the section, window, or screen associated with the hyperlink For instance, the video may be displayed in a pop-up window provided in non-overlapping fashion with a data input or review section, window, or screen. Optionally or alternatively, the section, screen, or window may be provided such that it overlaps a portion of a data input or review section, window, or screen.

Thus, a user may be able to input and/or review data relating to a particular play, for instance, while at the same time watching the play in the video section, window, or screen. Multiple videos may be provided, for instance, with different camera angles, fields of vision, magnification, zoom, lengths of video clip, etc. Videos from multiple camera angles may be provided. As such, optionally, multiple screens, windows, or sections may be employed to show videos of a same play. For example, in some embodiments, the multiple videos can be combined into the game/event summary video 17404, as described in more detail below.

Alternatively, only one video may be shown or displayed at a time. Each of the videos may be controlled by the grader, for instance to pause, stop, play, zoom, expand view, fast-forward, reverse, replay, slow motion, change angle, field of view, view a next or previous play, etc. Furthermore, embodiments are not limited to hyperlinks, and videos and their corresponding sections/windows/screens can be activated by any suitable means, such as a drop-down window, a voice command, navigation to a particular screen or section, etc. In general, all camera angles may be provided, either separately, or in a single file. Optionally, multiple screens, windows, or sections may be employed to show different camera angles of a same play. Additional description of how linking to the video may be accomplished is provided subsequently herein. Additionally, in embodiments, instead of or in addition to video, a sequence of still shots may be provided, either at the same time or individually for the user to view. In some embodiments, Reports including data and/or results of analysis may be generated based on the data inputted by users. The reports also can be specifically tailored for requirements, needs, and/or desires of a specific coordinator or supervisor of officials. For example, reports may be customized and tailored to a specific conference, official, team, game, week, season, etc. Moreover, report or reports can be generated at any suitable frequency. For example, the report or reports can be automatically generated on a weekly, monthly, end-of-season basis, etc.

A system according to various embodiments of the present invention can include a storage apparatus, a processing apparatus, and an interface apparatus. The system may also include a means for transmission which facilitates the transmission of data to and from the storage apparatus. In various embodiments, the system and method may be implemented in one or more computer programs. Furthermore, in embodiments of the present invention, the program may be an interactive, web-based program.

The storage apparatus can be any suitable storage apparatus, including, but not limited to, a server, a database, a lookup table, etc. Furthermore, the storage apparatus can include any suitable number or combination of servers, databases, lookup tables, etc. The storage apparatus can be in communication with the processing apparatus and/or to the interface apparatus. In various embodiments, the storage apparatus may be coupled to the processing apparatus and/or to the interface apparatus via the means for transmission. The means for transmission can be any suitable means by which data can be transmitted to and from one or more of the processing apparatus and the interface apparatus, including, but not limited to, email, texts, instant messaging, etc. In various embodiments, the storage apparatus may include a first storage portion and a second storage portion, whereby the first storage portion stores video data and the second storage portion stores data other than video data. Furthermore, the first storage portion and the second storage portion may be located remote from each other. For example, the first storage portion may be a video server, which stores video data in video files, that is located at a first location, and the second storage portion may be a data server that stores non-video data and that is located at a second location, different from the first location. The storage apparatus may also include a storage portion, which may be either the first or second storage portions, that can be used by the processing apparatus to compile data, process requests for data, process and facilitate the entry of data, and provide data and/or information in response to a request.

The processing apparatus can be any suitable apparatus for processing data, including, but not limited to, a program residing on a server, a processor, a computer, a personal computer, etc. For example, the processing apparatus may comprise a web application residing on a server or may comprise a client-side program. In various embodiments, the processing apparatus can be in communication with the storage apparatus and/or the interface apparatus. The processing apparatus can receive commands to access data and commands to store data. Based on a command to access, the processing apparatus can compile the data so that it can be presented to a user or users. In various embodiments, the data is presented via the interface apparatus.

The interface apparatus can be any suitable apparatus configured to access and/or input data. Further, the interface apparatus can be accessed via any suitable means. For example, the interface apparatus can be a webpage that can be accessed via the Internet. Access to the interface apparatus can be by any suitable means and by any suitable number of means. For example, access via the Internet can be by any suitable device, including, but not limited to, a computer, a personal computer, a lap top, a hand-held computing device, such as a PDA, cell phone, etc. In various embodiments, access may be granted based on the entry and verification of a username and password.

In operation, the interface apparatus can allow entry of data, as well as access to data. The inputted data can be stored in the storage apparatus. Conversely, data stored in the storage apparatus can be accessed using the interface apparatus. Data may be input to the interface apparatus using any suitable means and by any suitable person. In various embodiments, the data can be entered using a personal computer, a lap top computer, a hand-held computer (e.g., a PDA), a cell phone, etc. In various embodiments, once the data has been entered, it can be accessed or viewed, simultaneously or substantially simultaneously with its input. Suitable persons who can enter data may be, but are not limited to, an official (including a referee and equivalents), a commissioner, a supervisor, a coach (or his staff), a grader, a coordinator, a replay official, technical advisor/observer, and an administrator.

According to various embodiments of the present invention, the method can include receiving data, storing the data, accessing the data, analyzing and evaluating the data, and providing grading and/or comments based on the analysis and evaluation. The method may also include a step of submitting a request for a specific conduct and/or performance to be analyzed and evaluated. In various embodiments, the interface apparatus can receive the data, and the data can be entered by any suitable person by any suitable means. Further, the data can be any suitable data, including, but not limited to, game information, rosters, and assignments of persons in the rosters. Data may also include penalty data, which can be entered by an official, replay stoppage data, which can be entered by a replay official, evaluator/grader data and technical assistance data. The received data can be stored in the storage apparatus and accessed, either later or at substantially the same time it is entered, by a user using the interface apparatus.

More specifically, for example, in the football context, the method may include the steps of receiving data, which can be entered by a coordinator before a game, and storing this data in the storage apparatus; receiving data, which can be entered by referees during or after a game, and storing this data in the storage apparatus; receiving data, which can be entered by a replay official, relating to stoppage time in the game due to replay review, and storing this data in the storage apparatus; and receiving data, which can be entered by a technical advisor, and storing this data in the storage apparatus. The data inputted by an official, such as a referee, can be inputted by any suitable means and at any suitable time. In various embodiments, the data can be inputted after the game. Alternatively, the data can be inputted during the game, in real time. Moreover, if the officials, or other persons assisting the officials, are going to enter the data after the game, the data may be captured manually (i.e., by writing) during the game, and entered via a personal computer, hand-held computer (e.g., PDA), cell phone, etc. after the game. Alternatively, if the officials are entered data during the game, the data may be entered during the game using a computing apparatus, including, but not limited to, a personal computer, hand-held computer (PDA), etc.

The method may also include submitting plays to be reviewed; accessing the stored data; analyzing and evaluating the accessed data; and providing grades and/or comments for the analyzed and evaluated data. In various embodiments, a coach may submit plays to be reviewed. In addition to the play or plays to be reviewed, the coach (or even a commissioner) may also submit questions and/or comments, as well as enter an evaluation of an official and/or officiating crew. Responses to the coach's or commissioner's questions may be made in the same way the plays are graded. The aforementioned data can be entered by any suitable person by any suitable means. Typically, the Coordinator or Supervisor of Officials enters responses to the coach's questions. As noted above, entry and access is real time or substantially real time. As such, data can be viewed by coordinators, officials, coaches, supervisors, and commissioners as soon as entered.

The data entered before a game can include, but is not limited to, game information, rosters, crew assignments, and game assignments. The data received by referees can include, but is not limited to, penalty data, which may be in the form of a penalty summary report. Further, penalty data can include, but is not limited to, penalty indicia, a penalty description, a penalty code, in what game the penalty was called, what quarter and time in the game the penalty was called, whether the penalty was on the offense or defense, the player or players, whether the penalty was accepted, declined, offset or waved off, the official who made the call, the official to whom the penalty is credited, etc. The data received by a replay official can include, but is not limited to, the reason for stoppage, the time the stoppage occurred, the result of whether the call by the official was confirmed, overturned or stands by the replay official, review time, total time, whether or not the stoppage was a result of the Coach Challenge, if TV went to a TV timeout during the stoppage and text description of why the ruling on the field was either confirmed, reversed or stands. Subsequently, a score, a grade, a comment can be entered by an evaluator to evaluate and access the replay official's performance for each stoppage or confirmation. The data received by the technical advisor may be, but is not limited to, an evaluation of each official, as well as an evaluation for the overall officiating crew.

The data may be configured for viewing in any suitable format and any suitable manner The processing apparatus may compile data such that it is grouped and/or configured as information. For example, the data may be compiled or configured to be viewed in a table format.

The system and method may also allow for on-line/web-based scheduling and data submission, grading, replay, and report generation. The data may be input using any suitable means and by any suitable person. In various embodiments, the data may be entered using a personal computer, a lap top computer, a hand-held personal computer (e.g., a PDA), a telephone, etc. The system may allow for full online data submission and data access via the Internet. The system may require a user to provide a previously determined user name and associated password. All users have proprietary access and permissions determined by an administrator or a coordinator. A user can log in by entering his or her associated user name and password.

After logging in, a user can have access to data and can enter data. In various embodiments, the user can select a specific group in which to access information or for which to enter data. For example, a user can select a specific conference, team, official, etc. to access information and/or enter data. A user can select the group by any suitable means including, but not limited to, clicking on the particular group or selecting the particular group from a drop down menu.

Once a specific group is selected, the user may be presented with a choice to select an even more specific grouping or to view an appropriate page for displaying information and data for entry and/or access. Various data and information may be supplied based on each selection and/or page. For example, when a user selects a specific team, information about that team may be supplied to the user.

The user may also be presented with a choice for selecting the user's particular role. For example, a user's particular role can include an administrator, a commissioner, a grader, an official, replay official, replay review, technical assistant (TA), or a supervisor. As another example, when a user selects a specific role, information related to the user's role is provided to the user. Further, once a more specific selection is entered, the user may be prompted for more information. For example, a user who has entered the role of supervisor when scheduling a game may be prompted to enter one or more of a date, a home team, a visiting team, a conference of the home team, a conference of the away team, a conference of the officiating crew, the published game time, whether the game was televised, a crew identifier, and a week in which the game was played. Additionally, as a further example of a person and type of data input, coaches can submit plays for review and can submit evaluations of officials. Another example is that, after the game, officials can log in to the website and enter the data from their penalty summary report. Additionally, the system and method may allow for an official to submit data regarding the amount of time a game was stopped for reviewing calls/decisions of officials. For example, the amount of time may be the amount of time a game was stopped for replay review. Other examples include a replay official can submit replay reports of game stoppages online, a technical assistant can submit crew evaluations and game reports to a coordinator, coaches can submit plays for review online for the coordinator to review and respond to privately online, and coaches can submit evaluations of officials on-line.

After inputting information regarding data to be accessed, the system may search in the storage apparatus for data meeting the criteria entered by the user. If there is a match in the storage apparatus, the system can display data and information that matches the data inputted by the user. In various embodiments, the displayed data can include, but is not limited to including, a penalty summary, a position summary, a crew summary, and/or game summary. As noted above, the data can be presented in any suitable format, on any suitable visual apparatus. For example, the data may be presented to a user via a webpage that can be viewed on the user's computer, laptop computer, cell phone, etc. In various embodiments, once the data has been entered, it can be accessed, or viewed, simultaneously or substantially simultaneously with its input.

Based on the data input relating to an official's conduct, the performance and/or conduct of an official can be evaluated and graded, and comments can be provided, if desired. Grades and comments can be accessed immediately. For example, referees and officials can immediately see online the comments and grades entered by graders. Moreover, the system and method may allow for on-line compilation of grades and/or remarks. The grades and/or remarks may relate to the performance of an official or group of officials based on a singular event or based on a group of events. For example, the grades and/or remarks can be based on an official's performance for one play, a group of officials' performance for one play, an official's performance for an entire game (group of plays), a group of officials' performance for an entire game (group of plays), one official's performance for an entire season, a group of officials' performance for an entire season, etc.

Data and/or information provided by the interface apparatus can be presented in any suitable format and by any suitable means. For example, the data may be presented in a table, with indicia representing various pieces of data and/or information. The indicia may be configured to provide a user with additional information. For example, an indicia relating to a penalty or foul may allow a user to obtain additional information related to the penalty or foul. The indicia may be configured such that it is coupled to a link that, when accessed, provides the user with additional information. In various embodiments that link may be a hyperlink that links the user to a video file of the play in which the penalty was called and assessed. In such embodiments the link may be generated, for example, according to FIGS. 173-178, and their accompanying detailed description. Of course a video file may be "activated" or otherwise played by any suitable means, such as via a drop down menu, a voice command, navigation to a particular screen or section, etc. Alternatively, or in addition to, a button may be provided to access additional information. The video file can be any suitable format, and can be stored in any suitable storage apparatus, including, but not limited to, a server, a data base, etc. For example, the video file can be stored locally and/or at a third party video provider, as described in FIGS. 173-178, and their accompanying detailed description.

Figure 74:
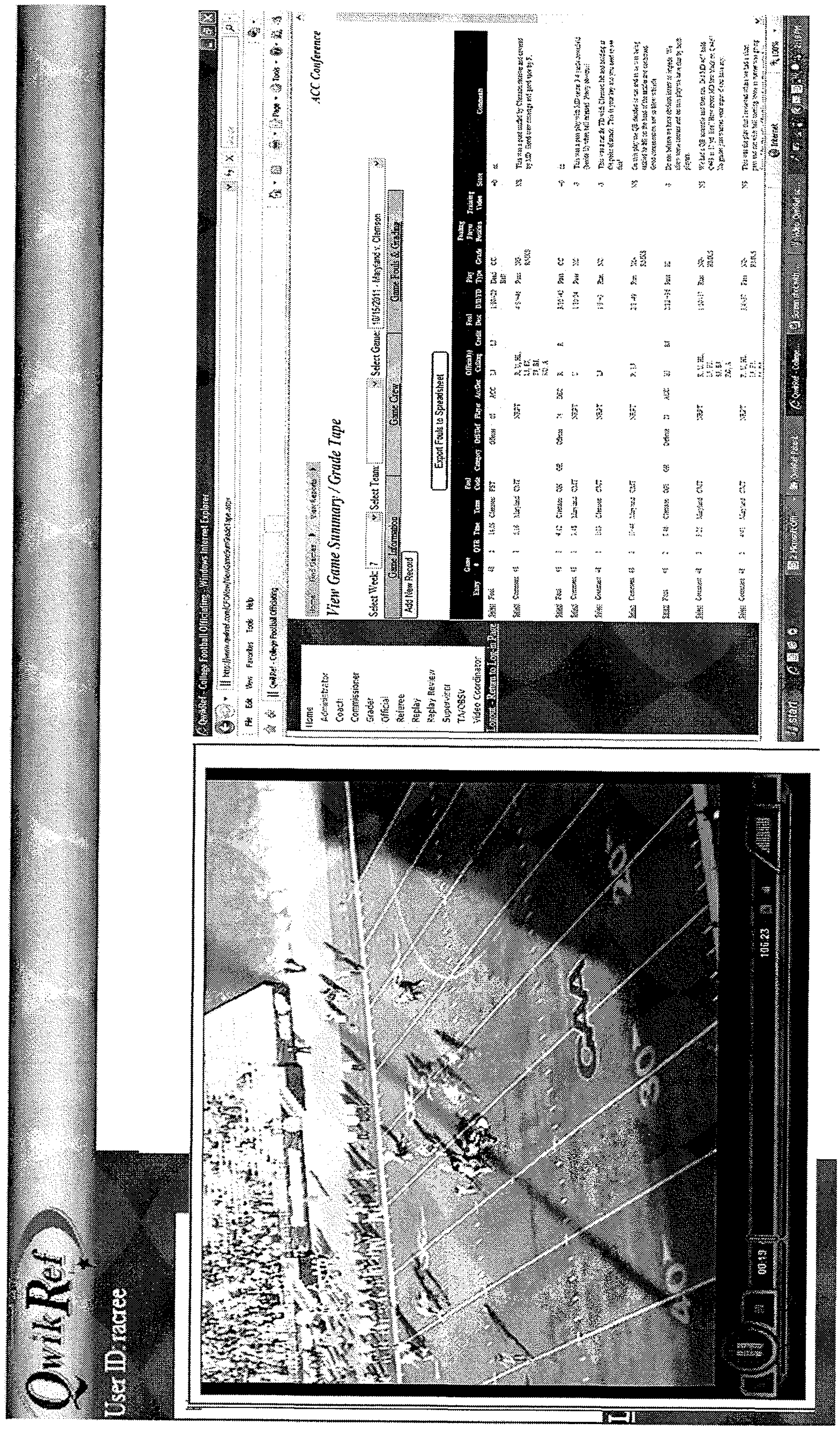
FIG. 74 is a screen shot showing a split screen aspect in accordance with an embodiment of the present invention.
Figure 75:
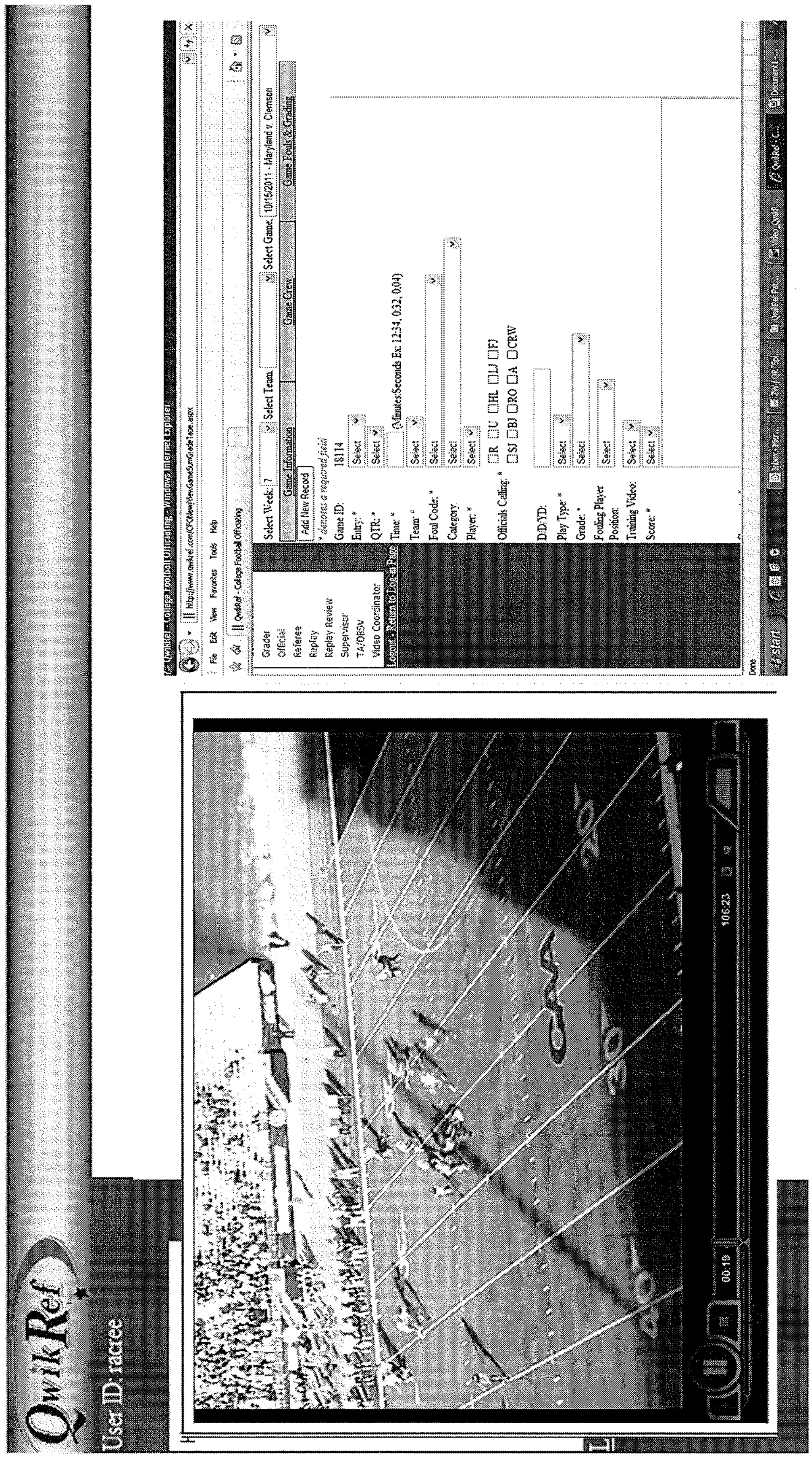
FIG. 75 is a screen shot showing another split screen aspect in accordance with an embodiment of the present invention.

In various embodiments, the system and method can allow for video review. Thus, a grader may, while watching video of a play, evaluate and submit grades and/or comments based on the official or officials' performance. For instance, a grader may watch a play in one window, section, or screen and evaluate and submit grades and/or comments in another window, section, or screen (e.g., on two separate monitors or in a split-screen format of one monitor). Each penalty/infraction/foul may be linked to a video or videos, with indicia for the penalty being coupled to a hyperlink, whereby a video or videos associated with the play relating to that specific penalty can be accessed and viewed. Some embodiments in which such penalty/infraction/foul are linked to a video or videos are described in FIGS. 173-178, and their accompanying detailed description. The insertion of hyperlinks to video files for each play may facilitate review of plays and the performance of officials, as well as may facilitate grading and evaluating performance. For example, each video may be displayed in a pop-up window provided in non-overlapping fashion with a data input or review section, window, or screen. Optionally or alternatively, the section, screen, or window may be provided such that it overlaps a portion of a data input or review section, window, or screen. Thus, a user may be able to input and/or review data relating to a particular play, for instance, while at the same time watching the play in the video section, window, or screen. FIGS. 74 and 75, for instance, show a split-screen configuration, whereby a video window is displayed beside different data input or review windows.

Multiple videos may be provided, for instance, with different camera angles, fields of vision, magnification, zoom, lengths of video clip, etc. Videos from multiple camera angles may be provided. As such, optionally, multiple screens, windows, or sections may be employed to show videos of a same play. Alternatively, only one video may be shown or displayed at a time. Each of the videos may be controlled by the grader, for instance to pause, stop, play, zoom, expanded view, fast-forward, reverse, replay, slow motion, change angle, field of view, view a next or previous play, etc. Additional play or game information may also be provided, such as play clock, game clock, field position of play; penalty, foul, or infraction data (e.g., a value associated with the penalty, the call on the field), etc. Additionally, in embodiments, instead of or in addition to video, a sequence of still shots may be provided, either at the same time or individually for the grader to view.

Each video file for each play may contain video portions for each camera angle associated with the play. A video file associated with a particular play may be part of the video file for the entire game. Moreover, the video file for the entire game may be parsed such that each individual play is identified. Further, each individual play may be further parsed such that different camera angle recordings for the particular play can be identified. Hyperlinks or other means to access the video(s) as described herein may be added to the video file by any suitable means and by any suitable person. In various embodiments, a video administrator parses the full video file into individual plays, where each play may be accessed by an associated hyperlink Additionally, a coach may add a hyperlink, or at least identify that hyperlink, to a particular video file for a particular play when requesting review of a particular play. Also, a grader may add a hyperlink to a particular video file in which there should have been a penalty, but a penalty was not called.

A hyperlink, for instance, may point to a video file in the storage apparatus. Additionally, the hyperlink may point directly and/or indirectly to additional hyperlinks. The additional hyperlinks may provide access to video files of different camera angles for a particular play. Clicking on the link may allow a video or videos of the play to be accessed by a user or users. In various embodiments, the video or videos may be viewed on a visual display or displays. The video link may provide a link to a video file that may be stored locally or remotely on, for example, a video server. FIGS. 173-178, for instance, show various locations where the video file may be stored. In various embodiments, the video file may include one video corresponding to the play. The video file can also include a plurality of videos for each play. For example, each of the videos may represent a different characteristic, including, but not limited to, camera angle, field of vision, magnification, zoom, length of video clip, etc. For example, each video file may contain as many as four to eight different videos, representing each camera characteristic available. In some embodiments, the multiple videos can be combined into a game/event summary video 17404, as described in more detail below.

In all cases above, the hyperlink can be identified by a separate indicia or by making any suitable indicia on any of the data and information provided by the interface apparatus "hot," whereby clicking on the indicia will provide access to the video file. Accordingly, the system and method may facilitate identification and selection of plays for generation of training tapes for distribution to officiating staff. The training tapes may identify particular types of fouls and group them accordingly.

Based on evaluating and grading, each official, each crew, team, conference, etc. can be ranked, with the results of the ranking being available for display and printing. The system and method can compile the data and generate a report. In various embodiments, the report can be generated so that it is viewable online. The report can also be downloaded and/or printed. Numerous reports may be generated immediately for all users.

An example of a report can be the Weekly Commissioner's Report, which may include, but is not limited to including, one or more of a conference summary "Quick Look," top level game summaries, a game duration report, a season foul summary, foul descriptions by team report, a fouls per week report, and a fouls per crew report. Another example of a report can be the Coordinator's Weekly Report, which can include, but is not limited to including, one or more of a conference summary "Quick Rep," a game foul reports for the week, a game duration report, a composite foul summary for the season, foul descriptions by team, a crew summary report, an officials' position report, officials' grades, replay officials' reports, coaches' plays for review, and foul summaries for fouls called against home and visitor teams. Another example of a report can be the Crew Chiefs and Officials Weekly Reports, which can include, but are not limited to including, one or more of crew summary reports, officials' position reports, and officials' grades. Yet another example of a report can be the Coaches Weekly Report, which can include, but is not limited to including, one or more of a conference summary "Quick Rep," a game summary "Quick Look," a game foul report, crew summary reports, a top level foul summary for the season, a detailed foul summary for the season, a weekly foul summary, fouls by players, and fouls per quarter. Another example of a report can be the End of Season Report, which can include a summary of one or more of the criteria capture in the aforementioned reports. Any of the aforementioned reports may be customized and tailored based on the specific user or users.

Figure 76:
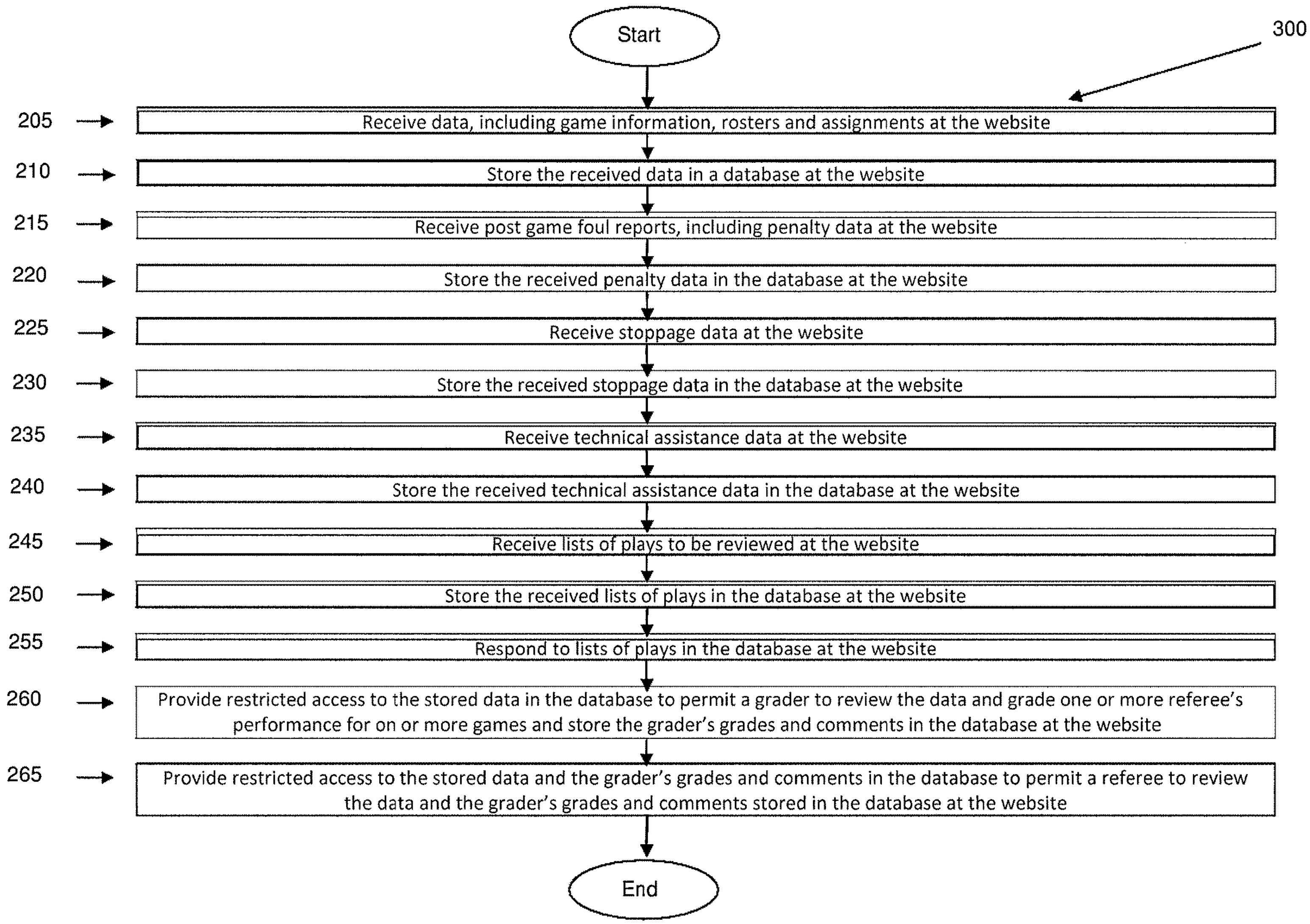
FIG. 76 is a flow diagram of how various users can use the program shown in FIG. 1, in accordance with an embodiment of the present invention.
Figure 77:
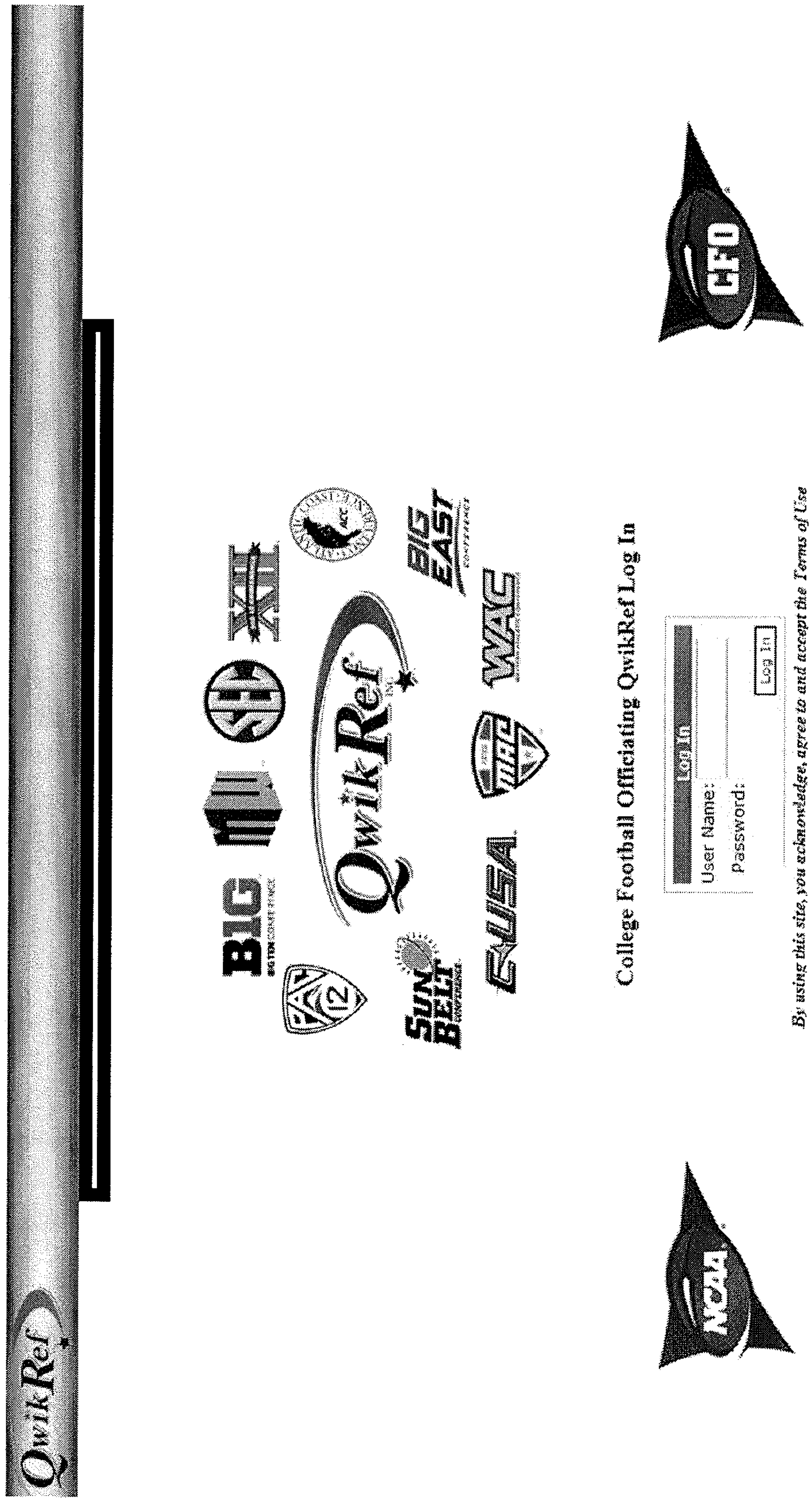
FIG. 77 is a screen shot of a general login page with a variety of different regions displayed, in accordance with an embodiment of the present invention.
Figure 78:
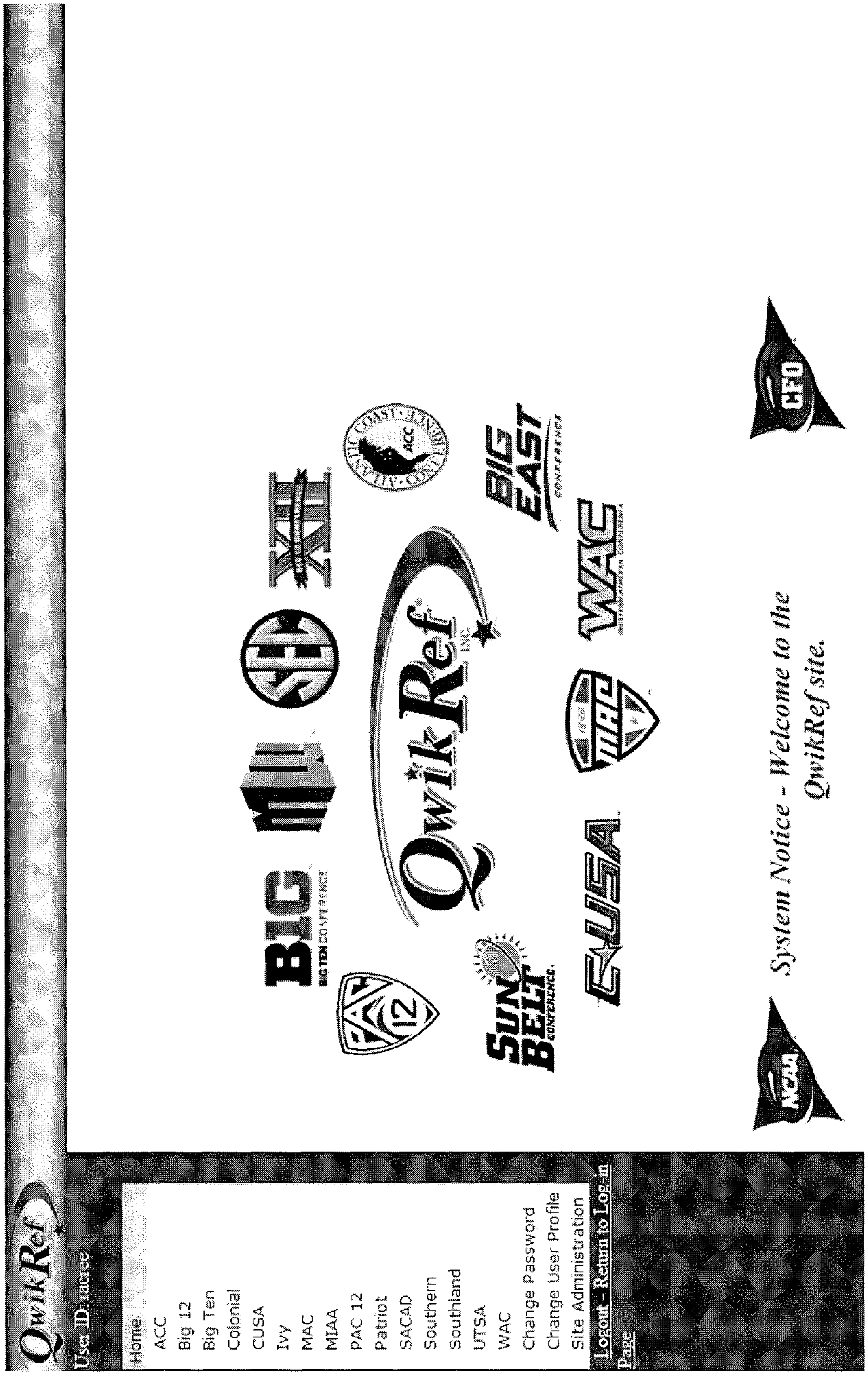
FIG. 78 is a screen shot of the welcome screen that is displayed after a user logins in to the system, in accordance with an embodiment of the present invention.
Figure 79:
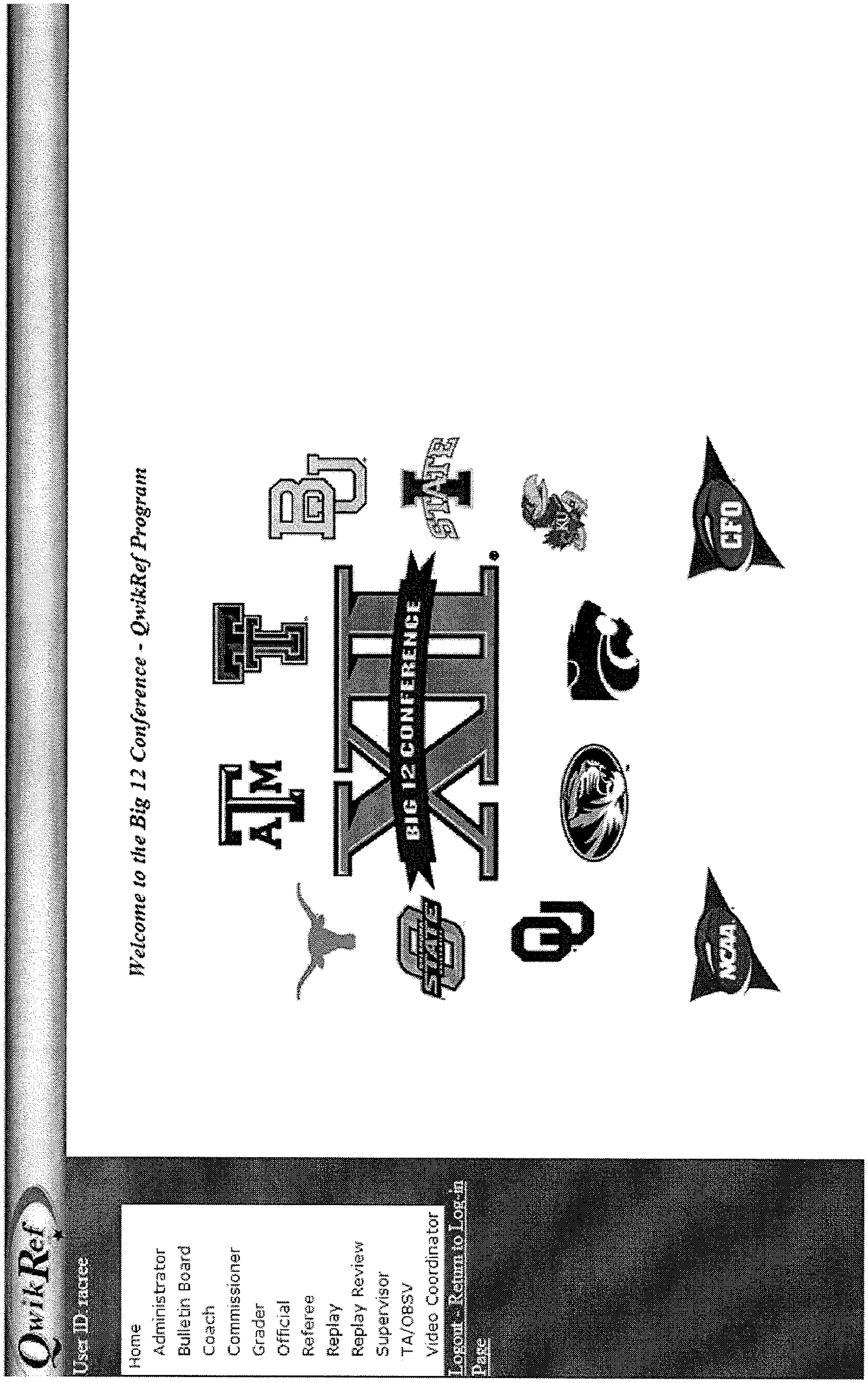
FIG. 79 is a screen shot of a Big 12 tab welcome page showing a list of the roles/people that can login to the system displayed, in accordance with an embodiment of the present invention.
Figure 80:
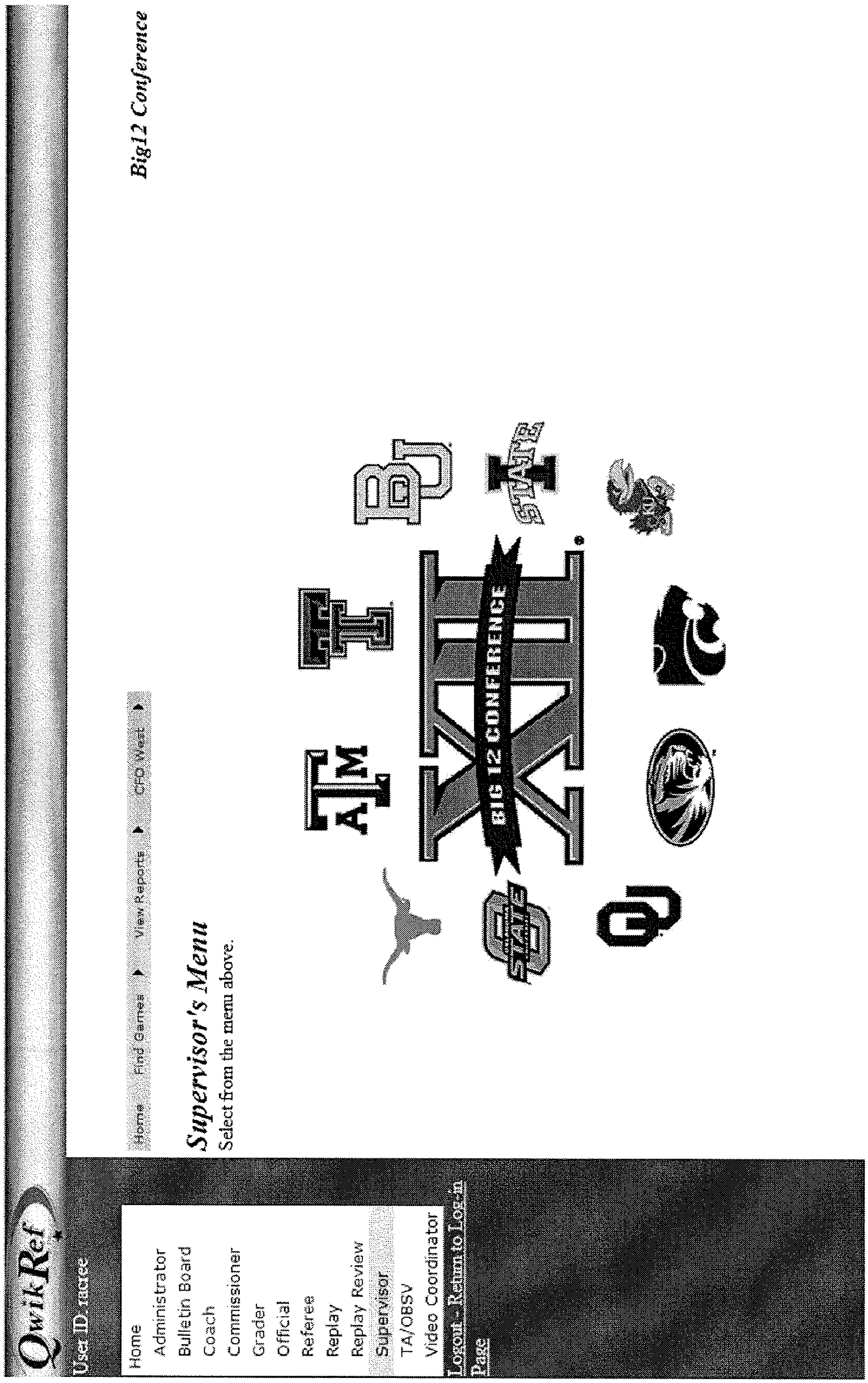
FIG. 80 is a screen shot of a supervisor permission navigation page that is displayed after selecting the supervisor role in FIG. 5, in accordance with an embodiment of the present invention.
Figure 81:
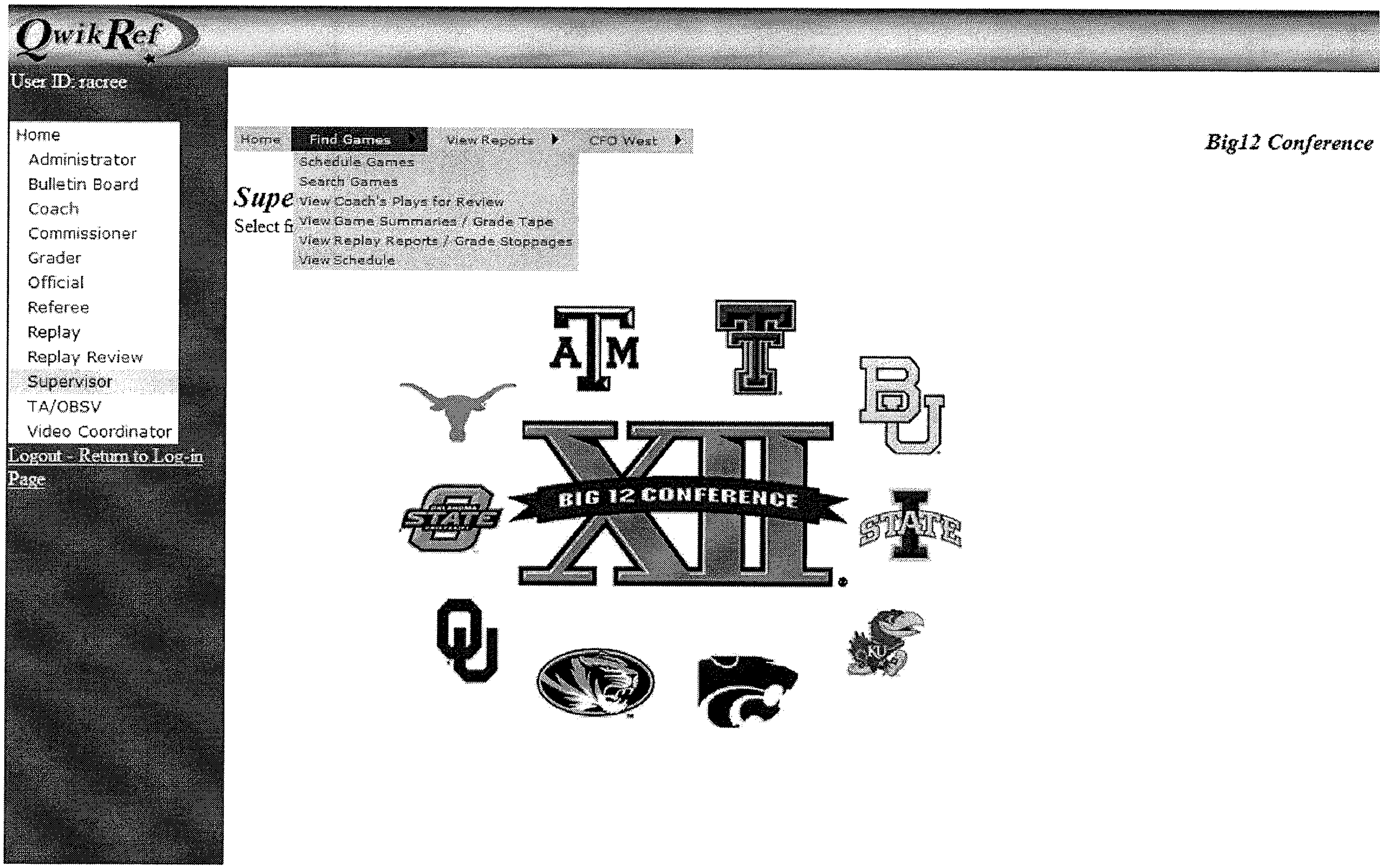
FIG. 81 is a screen shot of supervisor permission, find games, menu page that is displayed after selecting the find games option directly under the Big 12 tab displayed, in accordance with an embodiment of the present invention. The Find Games sub-menu is open from which the user can select specific functions.
Figure 83:
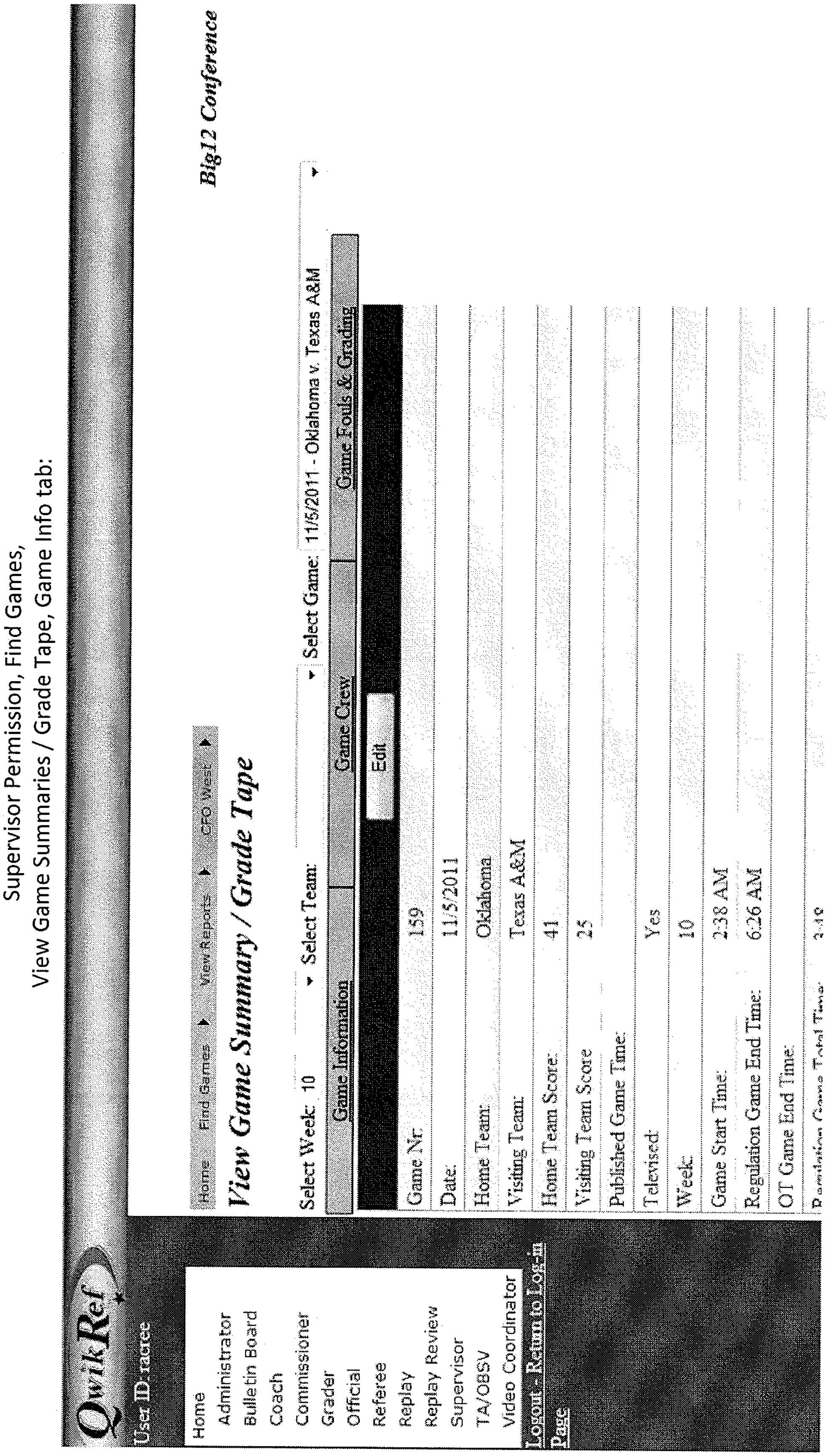
FIG. 83 is a screen shot of a supervisor permission, find games, view game summaries/grade tape game information page that is displayed after selecting the view game information tab directly under a select week selection box, in accordance with an embodiment of the present invention.
Figure 84:
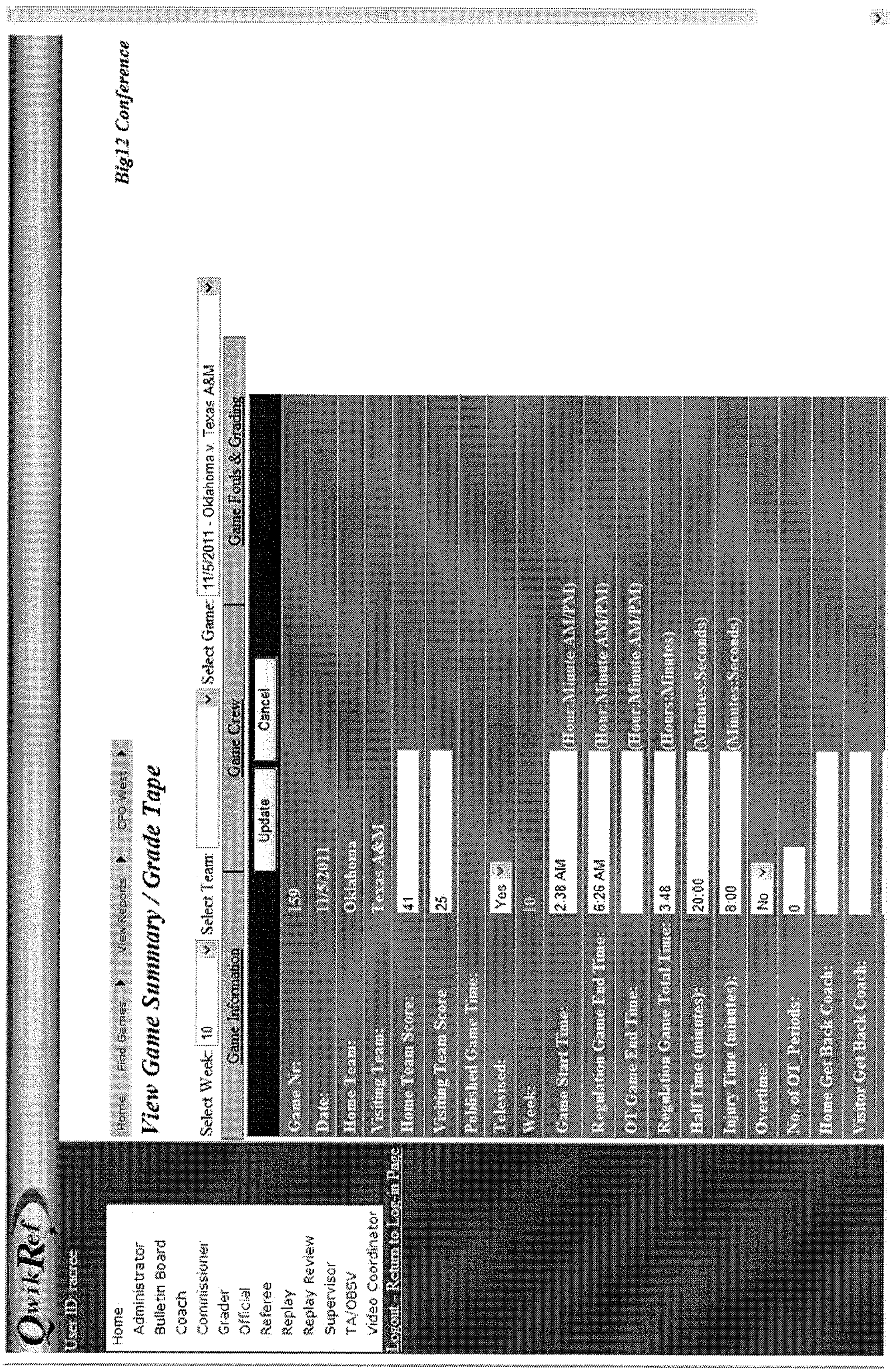
FIG. 84 is a screen shot of supervisor permission, find games, view game summaries/grade tape page that is displayed after clicking the "Edit" button in FIG. 83. It is on this page that the user enters game data.
Figure 85:
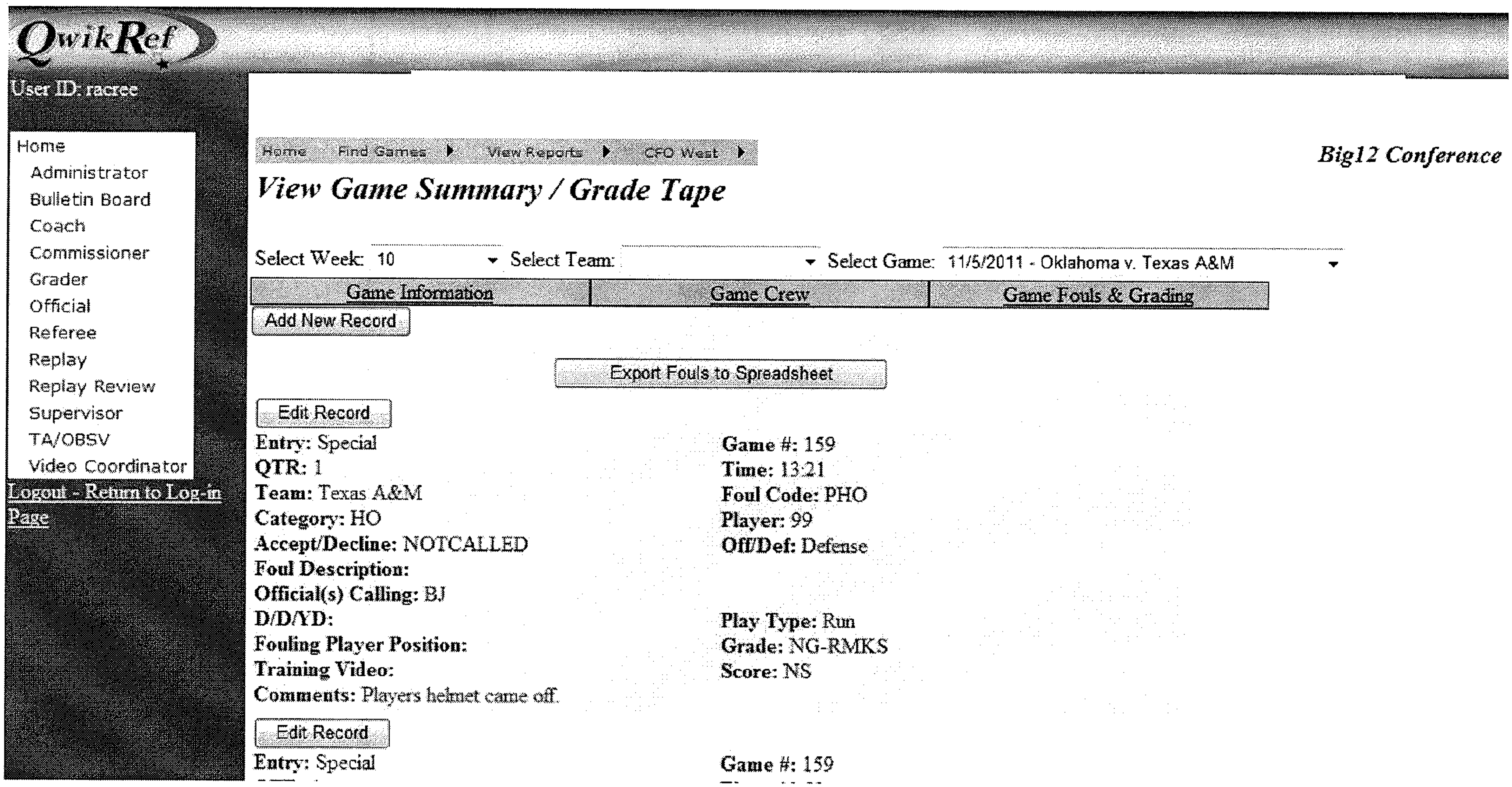
FIG. 85 is a screen shot of supervisor permission, find games, view game summaries/game fouls & grading tab that is displayed after selecting the view game fouls & grading tab on the far right, in accordance with an embodiment of the present invention.
Figure 86:
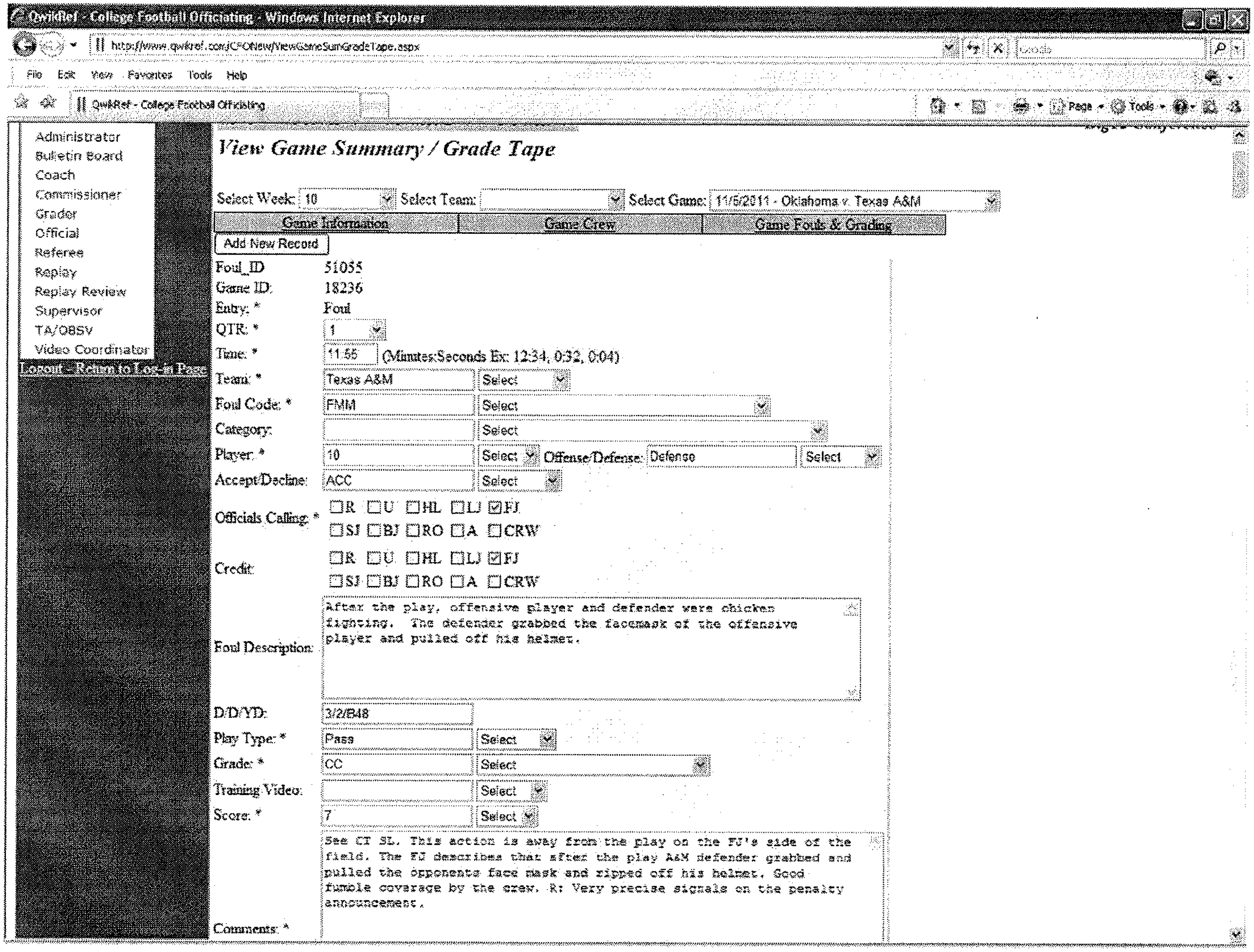
FIG. 86 is a screen shot of supervisor permission, find games, view game summaries/game fouls & grading tab that is displayed after selecting the Edit Record in FIG. 10 which opens the page to enter and/or edit grades and comments on a record, in accordance with an embodiment of the present invention.
Figure 87:
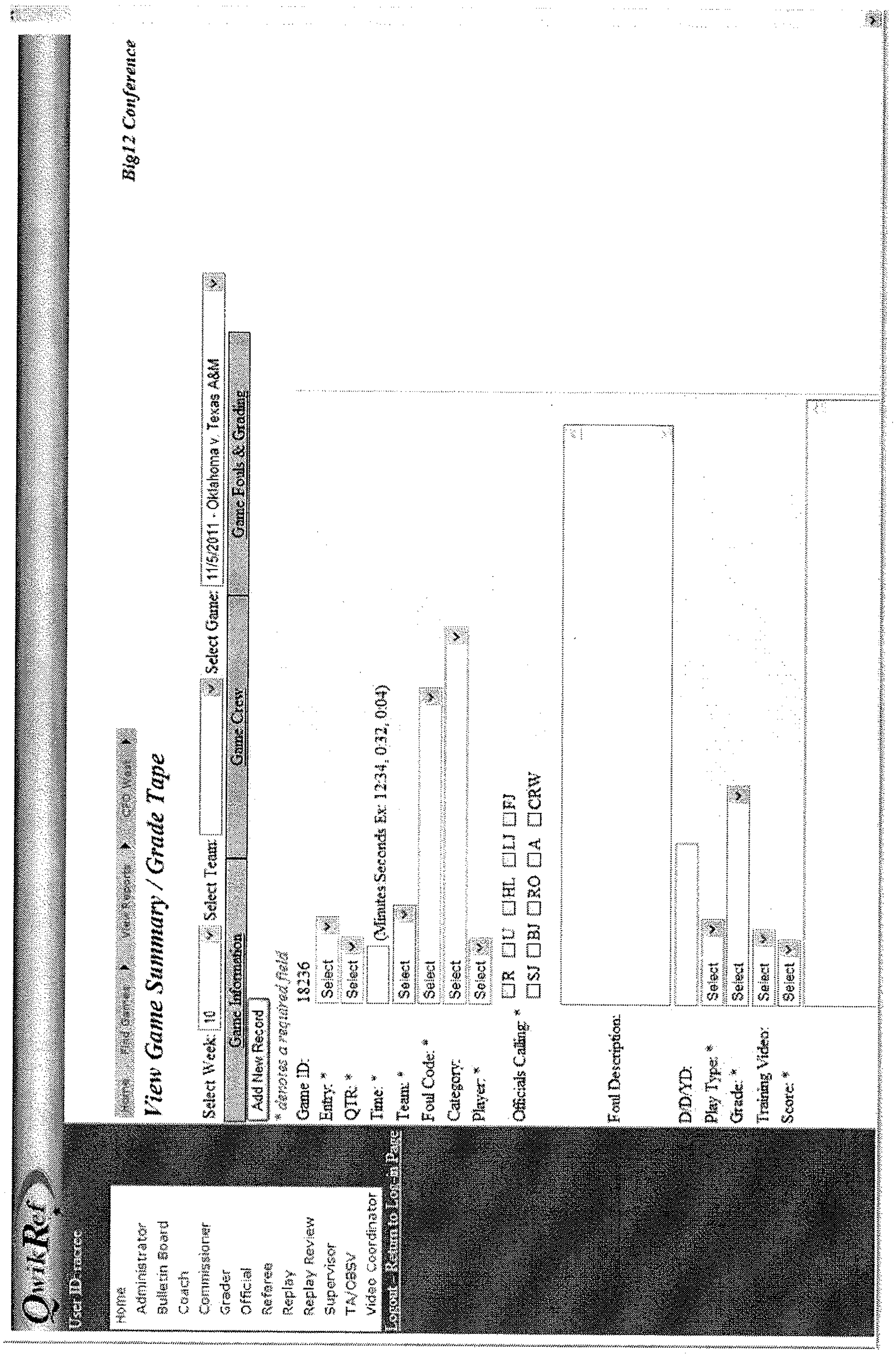
FIG. 87 is a screen shot of supervisor permission, find games, view game summaries/game fouls & grading tab that is displayed after selecting the Add New Record in FIG. 10 which opens the page to enter a new record for the user to enter grades and comments on a play, in accordance with an embodiment of the present invention.
Figure 88:
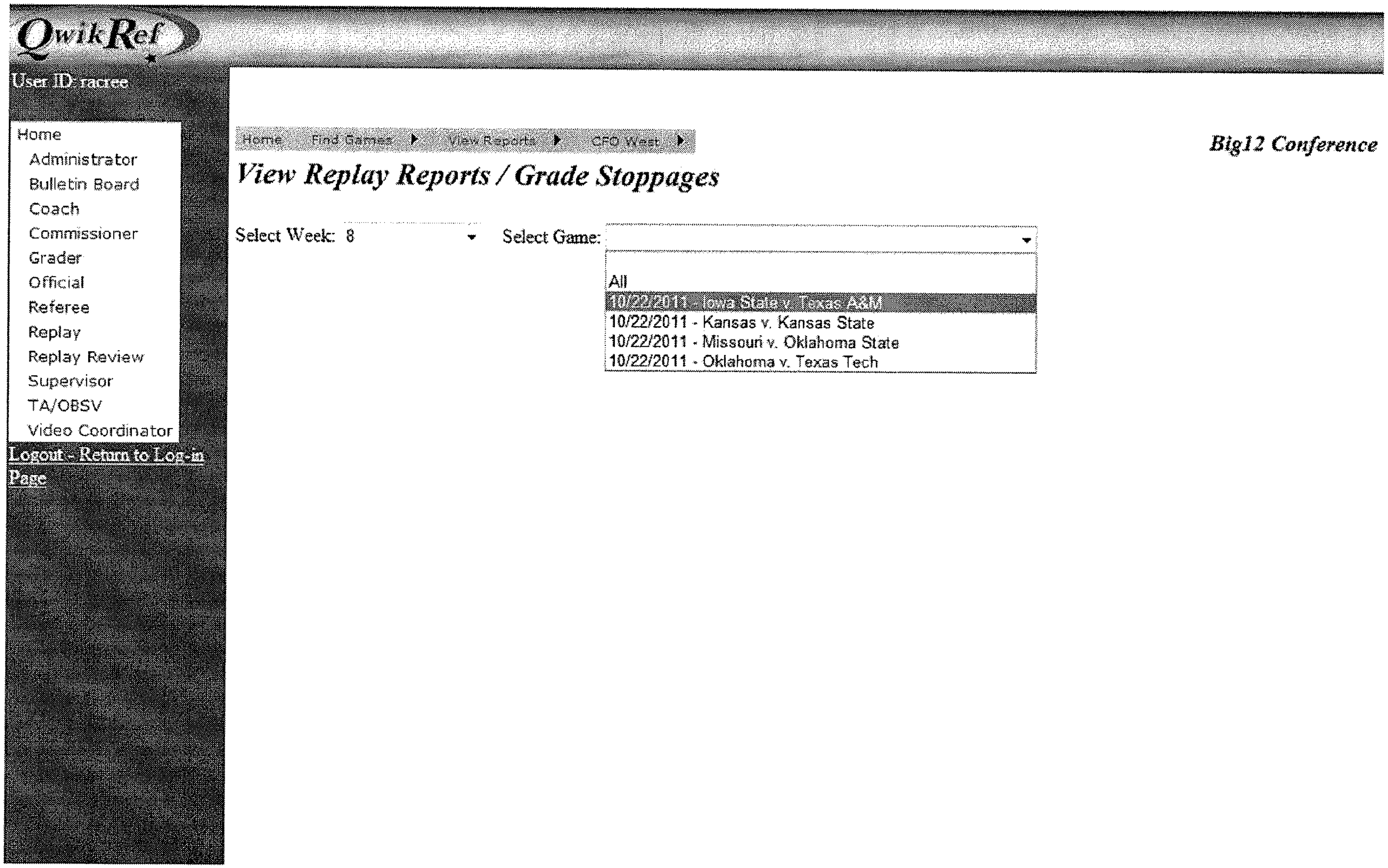
FIG. 88 is a screen shot of supervisor permission, find games, view replay reports/grade stoppages that is displayed after selecting the view replay reports/grade stoppages option directly under the view game summaries/grade tape option, in accordance with an embodiment of the present invention.
Figure 89:
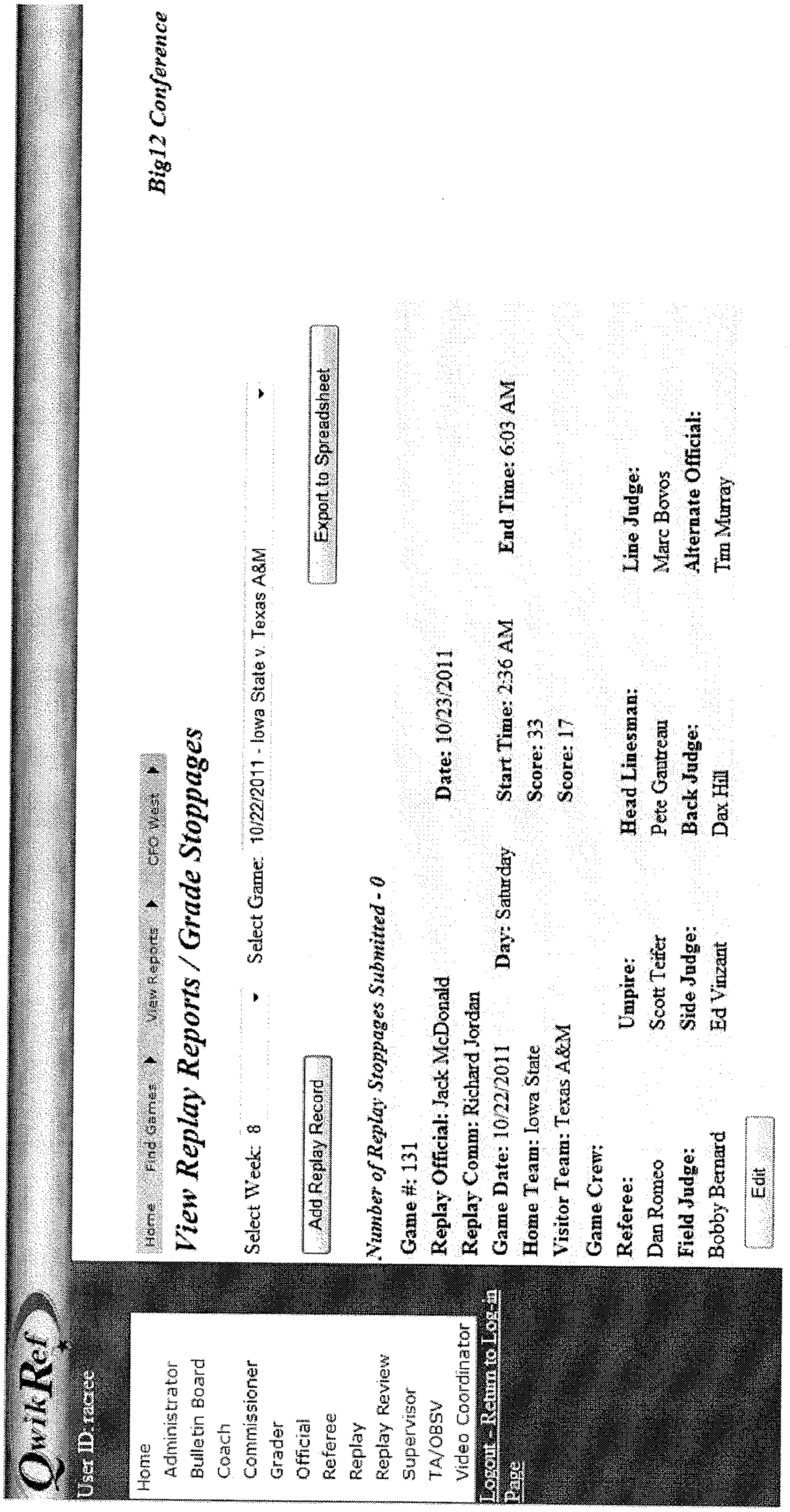
FIG. 89 is a screen shot of the supervisor permission, find games, view replay reports/grade stoppages from FIG. 88 that is displayed after selecting the 10/22/2011—Iowa State v. Texas A&M game from the drop down menu in FIG. 88, in accordance with an embodiment of the present invention.
Figure 90:
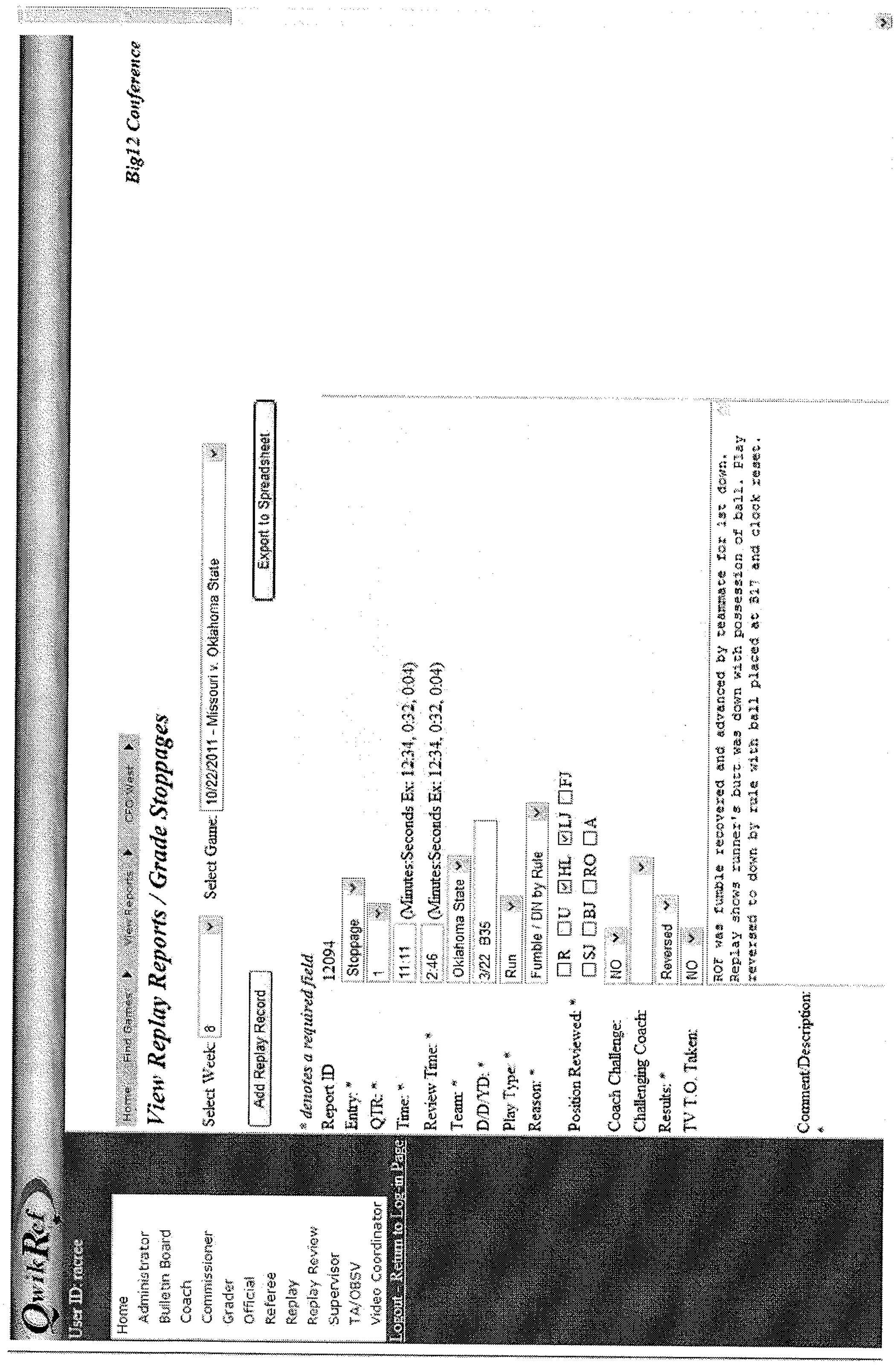
FIG. 90 is a screen shot of the supervisor permission, find games, view replay reports/grade stoppages from FIG. 89 that is displayed after selecting the 10/22/2011—Missouri v. Oklahoma State game from the drop down menu in FIG. 89 and selecting the Edit button in FIG. 89, which opens the page to allow the user enter/edit grades and comments on a replay stoppage, in accordance with an embodiment of the present invention.
Figure 91:
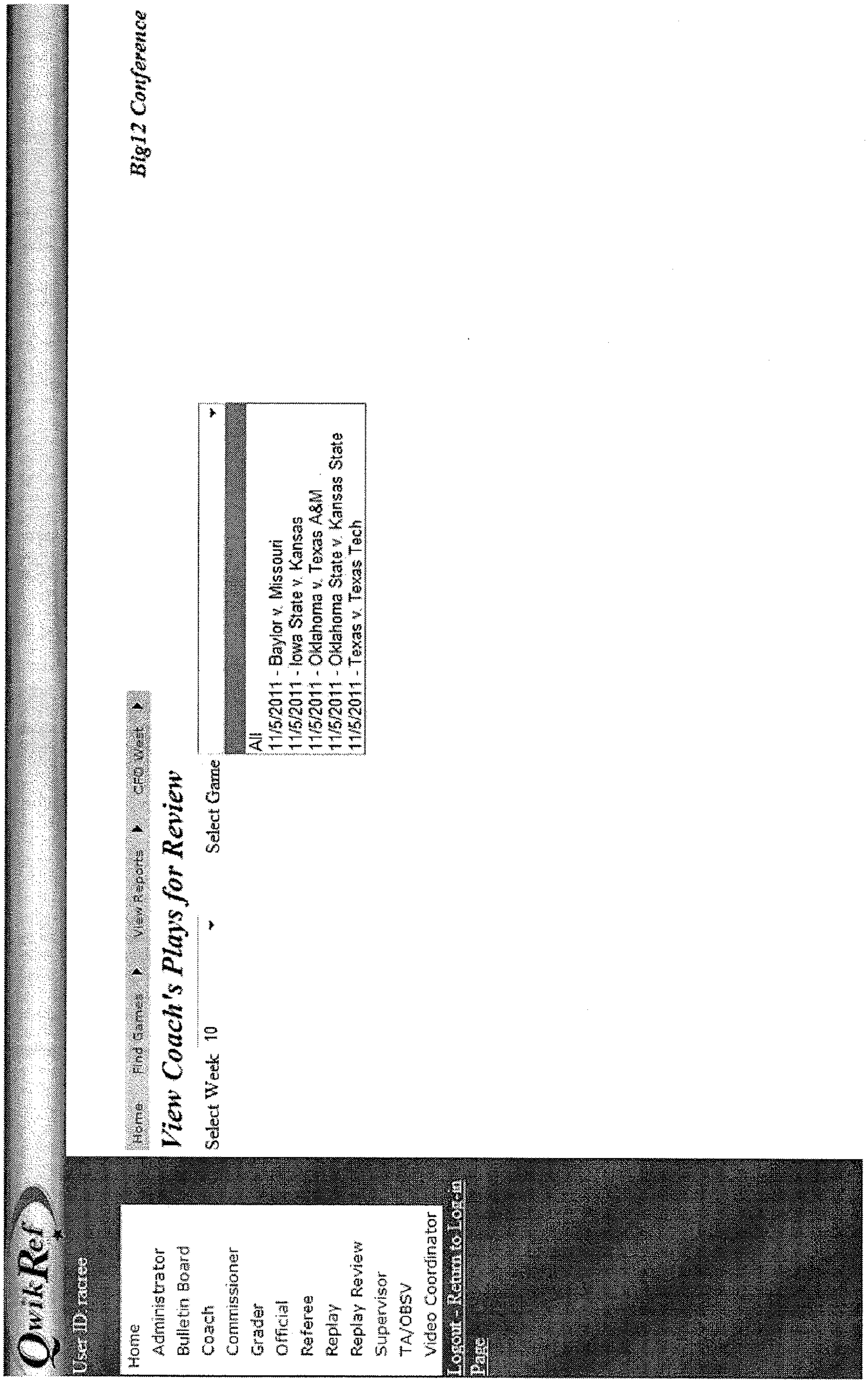
FIG. 91 is a screen shot of supervisor permission, find games, view coach's plays for review that is displayed after selecting the view coach's plays for review option directly above the view game summary/grade tape option, in accordance with an embodiment of the present invention.
Figure 92:
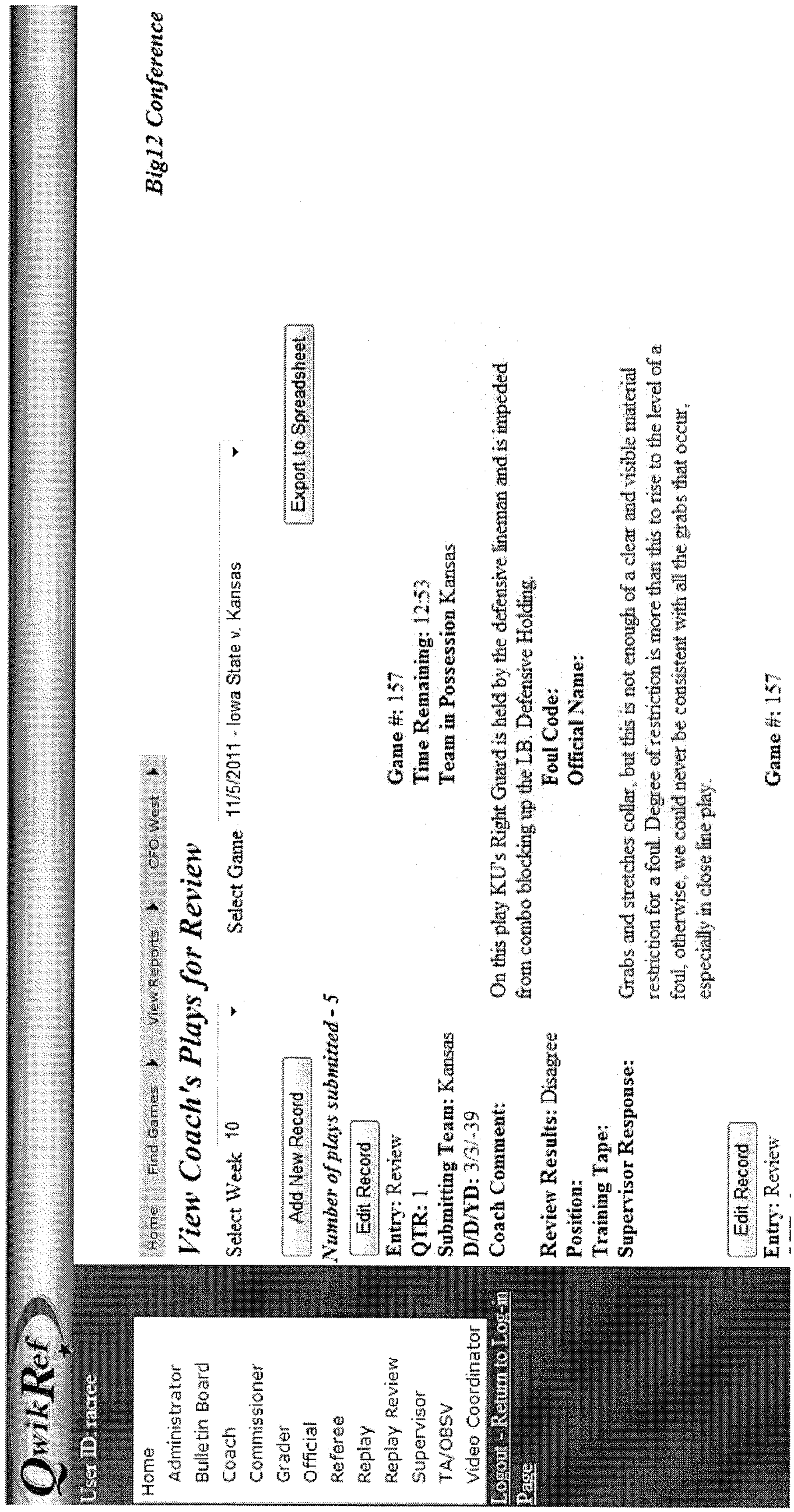
FIG. 92 is a screen shot of a supervisor permission, find games, view coach's plays for review from FIG. 91 that is displayed after selecting the 11/5/2011—Iowa State v. Kansas game from the drop down menu in FIG. 91, in accordance with an embodiment of the present invention.
Figure 93:
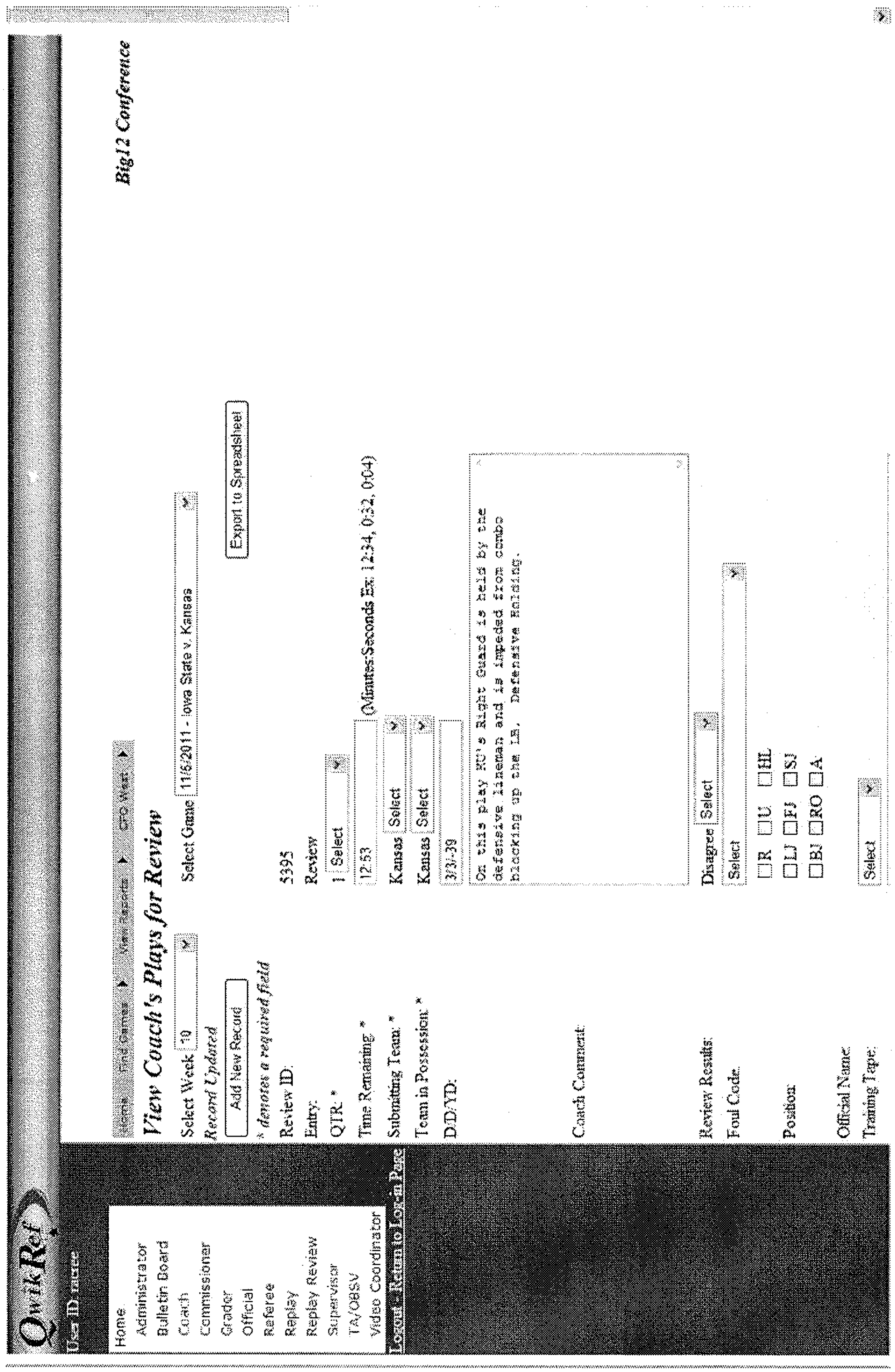
FIG. 93 is a screen shot of supervisor permission, find games, view coach's plays for review from FIG. 92 for the Big 12 Conference that is displayed after selecting the 11/5/2011—Iowa State v. Kansas game from the drop down menu in FIG. 91 and selecting the Edit Record button in FIG. 92 to allow the user to open the data entry screen for responding to a Coach's entry of a play for review, including identifying the position of the official involved in the review, the name of the official involved in the play and the foul type involved in the play, in accordance with an embodiment of the present invention.
Figure 95:
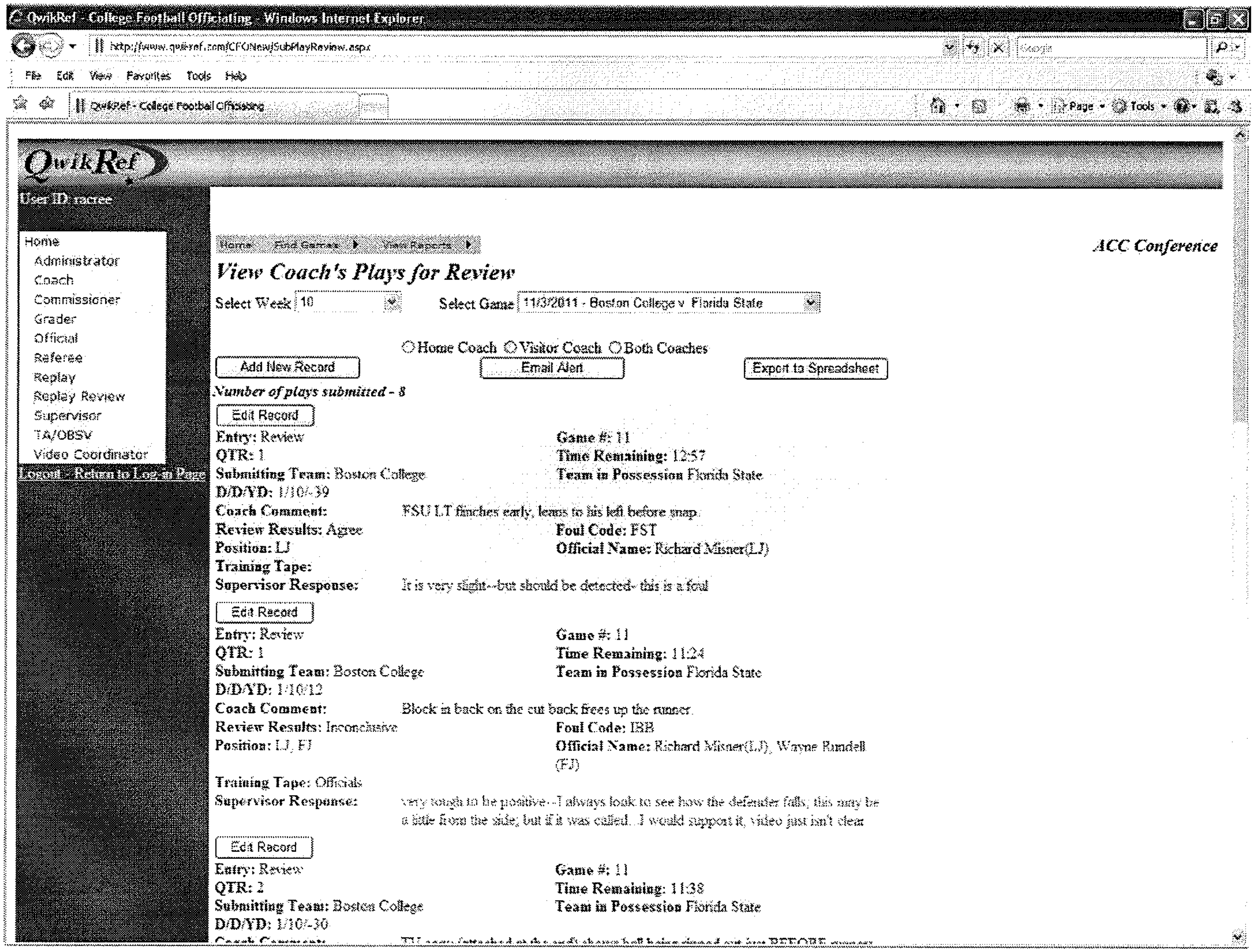
FIG. 95 is a screen shot of supervisor permission, find games, view coach's plays for review from FIG. 92 that is displayed after selecting the 11/3/2011—Boston College v. Florida State game from the drop down menu in the corresponding FIG. 91 shot for the Atlantic Coast Conference that shows the Email alert button for initiating an Email alert to Coach that responses for his plays for review have been entered, in accordance with an embodiment of the present invention.
Figure 96:
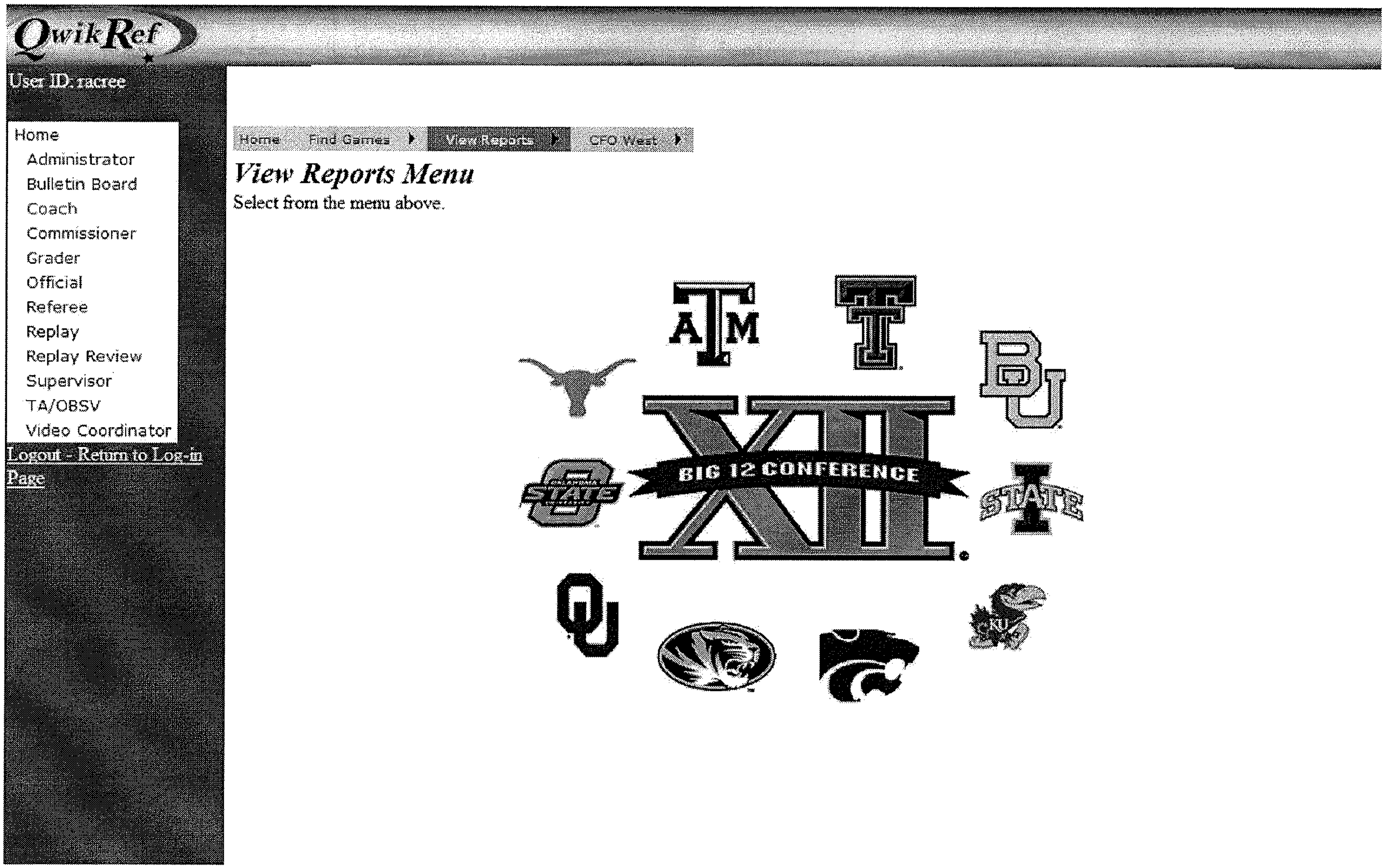
FIG. 96 is a screen shot of supervisor permission, view reports, menu page after selecting the view reports option to the right of the find games option, in accordance with an embodiment of the present invention.
Figure 97:
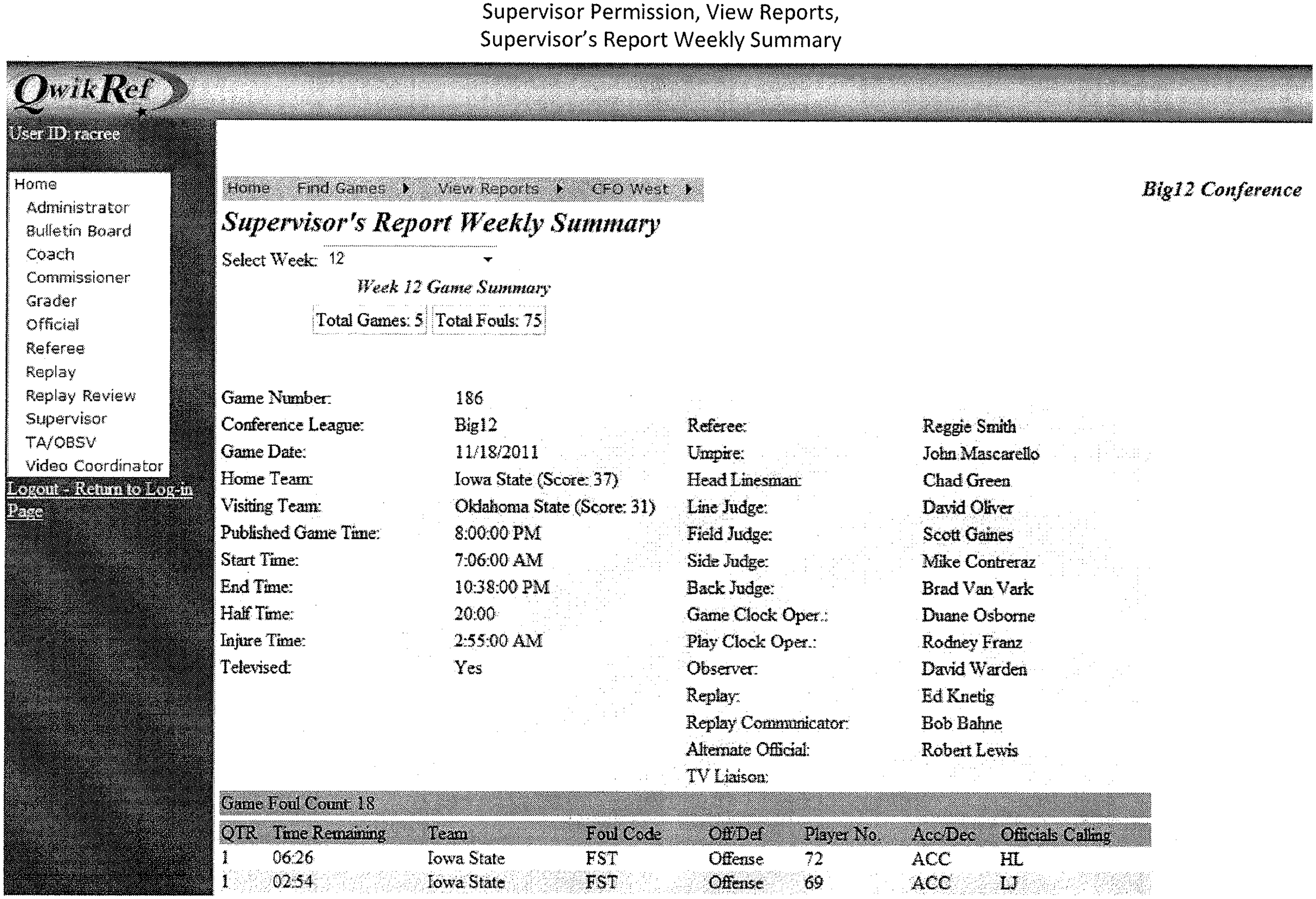
FIG. 97 is a screen shot of supervisor permission, view reports, supervisor's report weekly summary, in accordance with an embodiment of the present invention.
Figure 101:
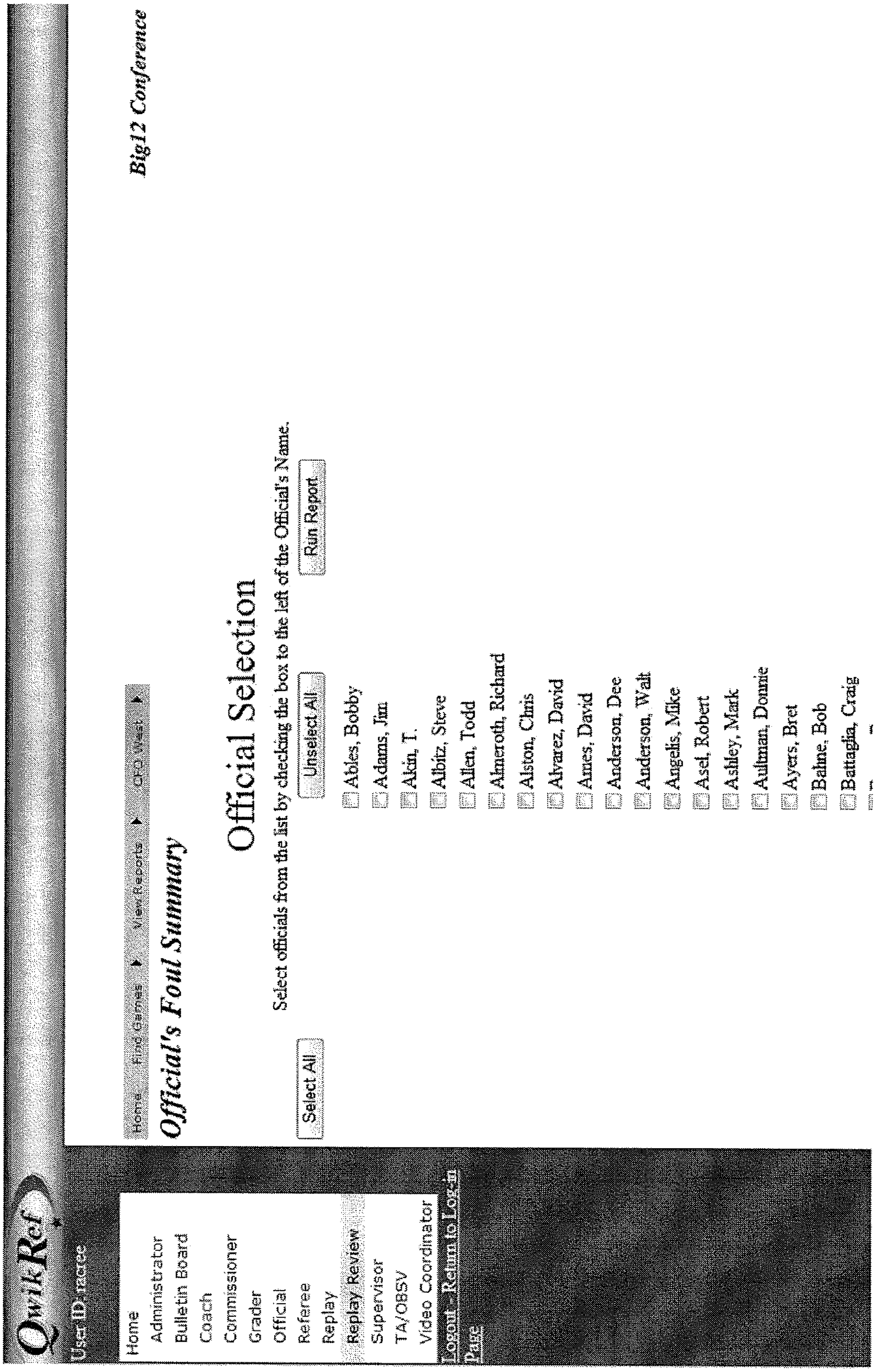
FIG. 101 is a screen shot of supervisor permission, view reports, officials foul summary display that provides details on the fouls that were called by each official, in accordance with an embodiment of the present invention.
Figure 102:
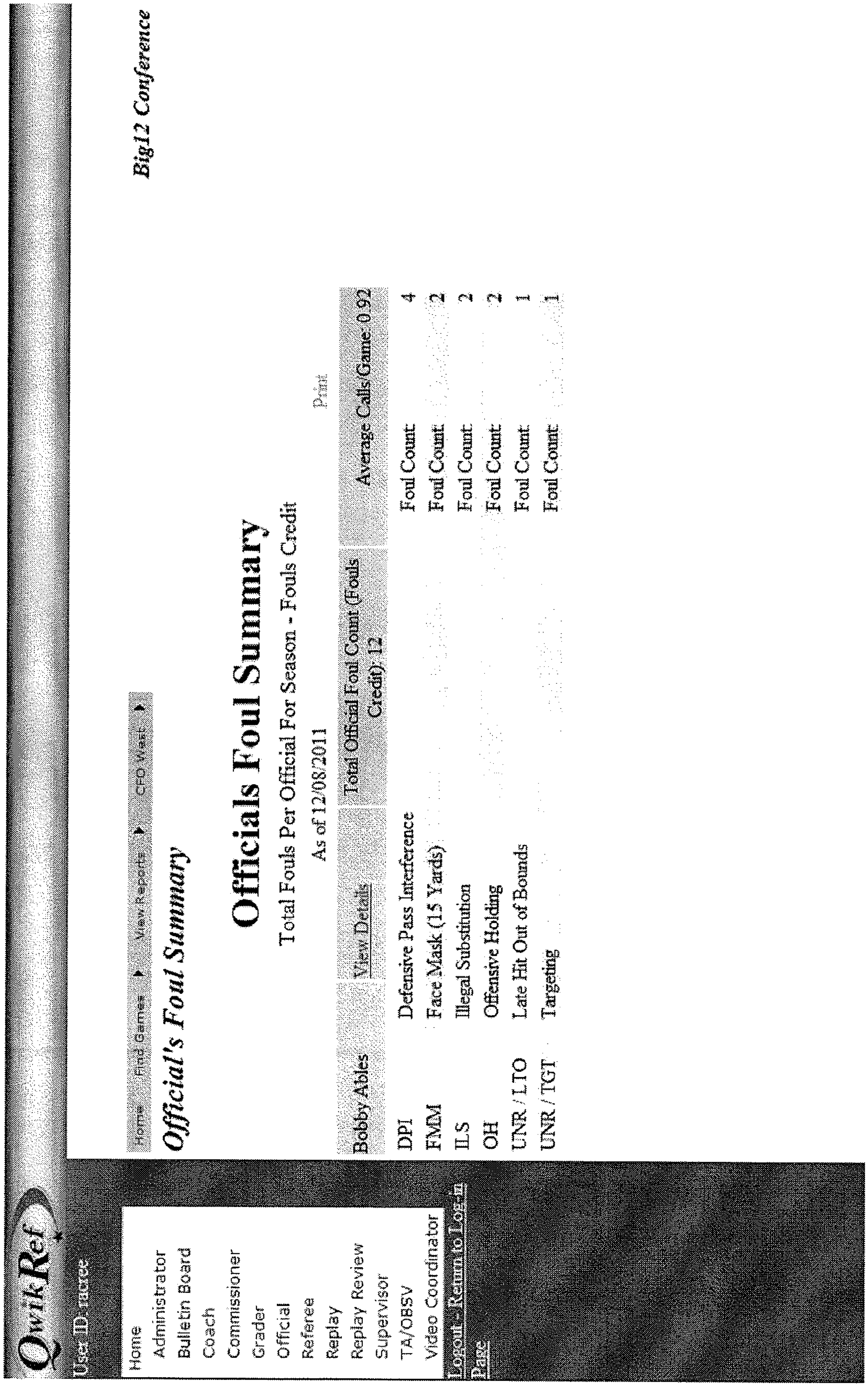
FIG. 102 is a screen shot of supervisor permission, view reports, officials foul summary, specific official display that provides details on the fouls that were called by a specific official, in accordance with an embodiment of the present invention.
Figure 103:
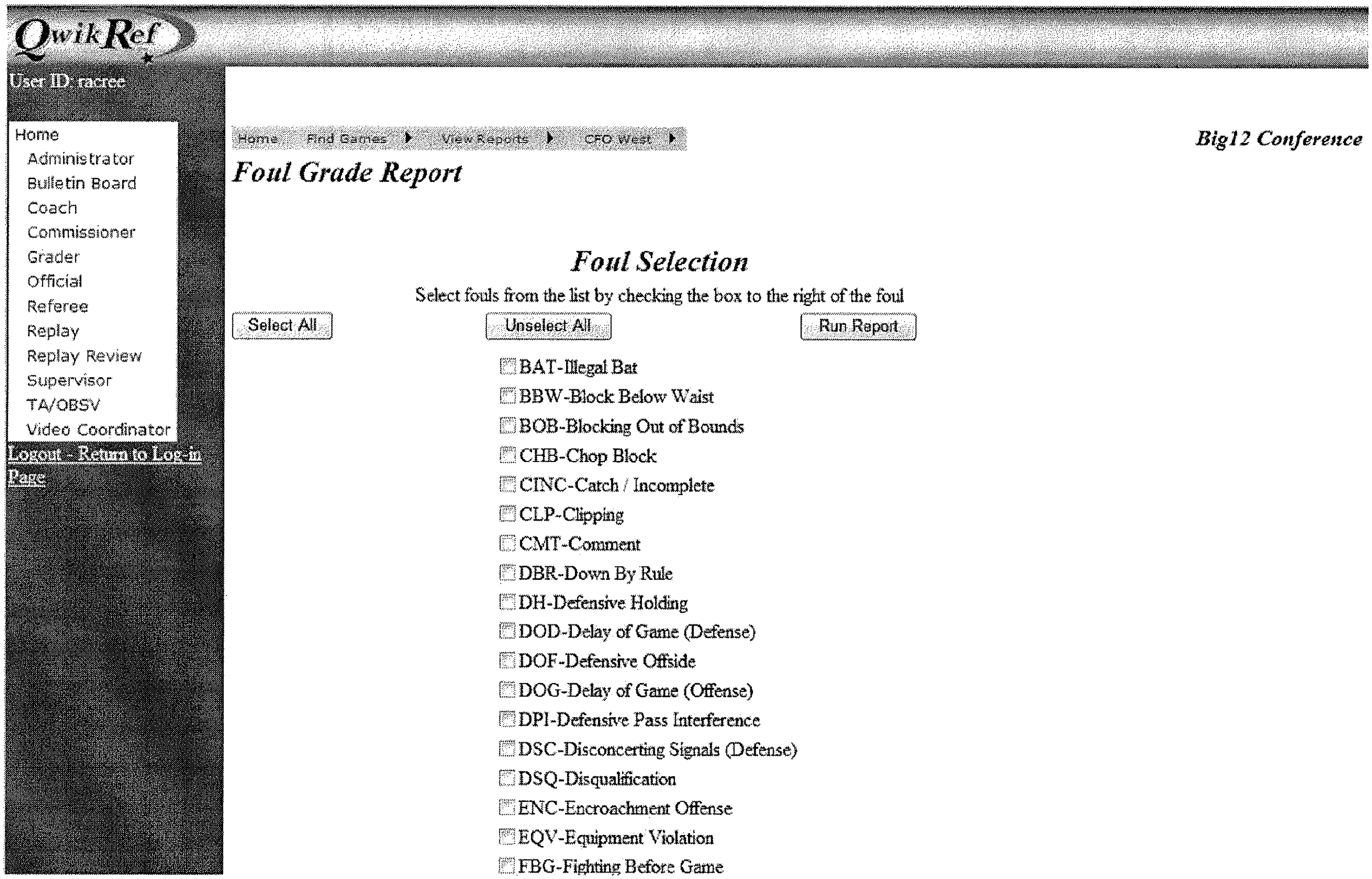
FIG. 103 is a screen shot of supervisor permission, view reports, foul grade report that provides details on the different types of fouls that were called by all of the officials, in accordance with an embodiment of the present invention.
Figure 104:
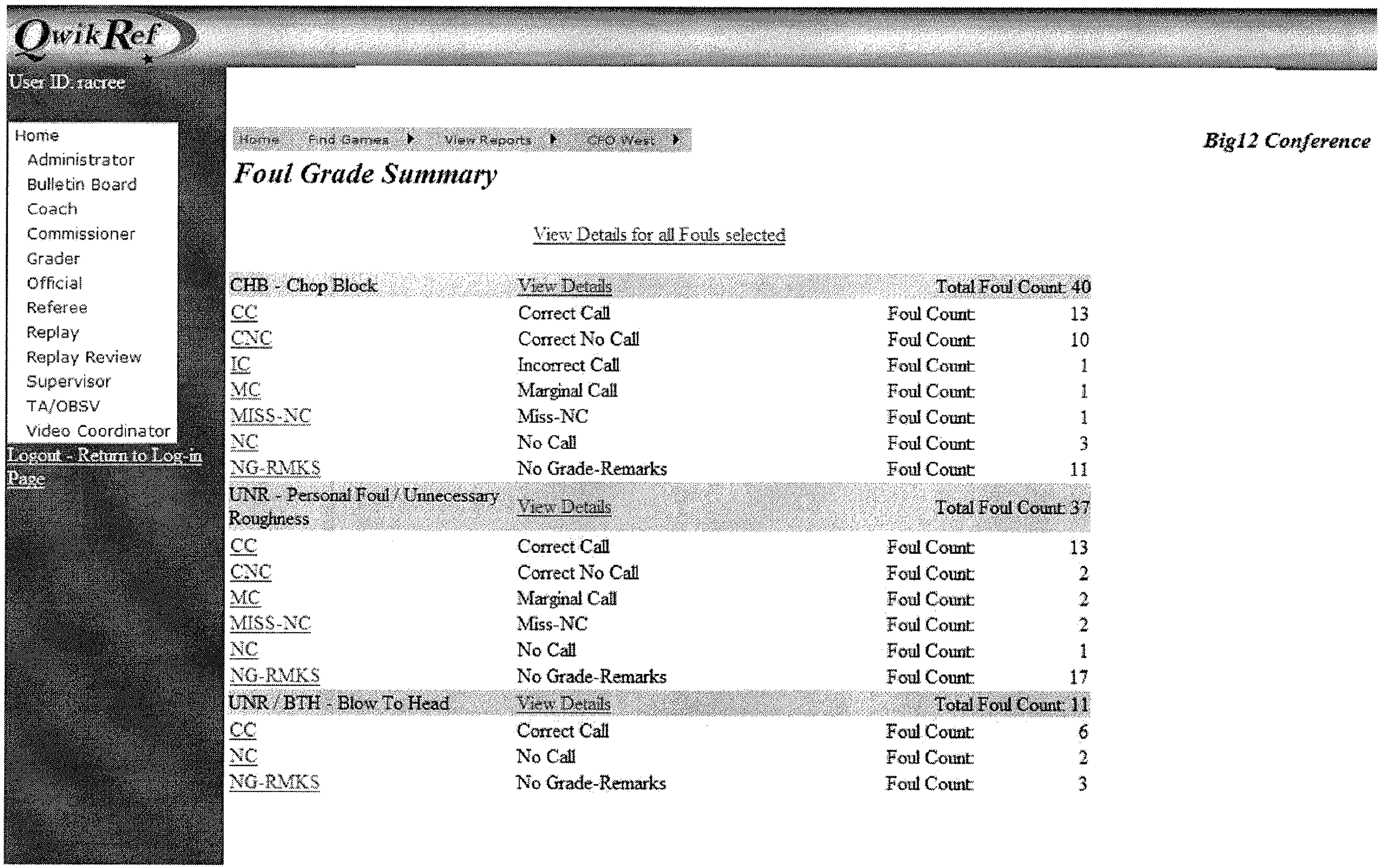
FIG. 104 is a screen shot of supervisor permission, view reports, foul grade report, fouls checked display that provides information on the fouls checked by the user in FIG. 103, in accordance with an embodiment of the present invention.
Figure 105:
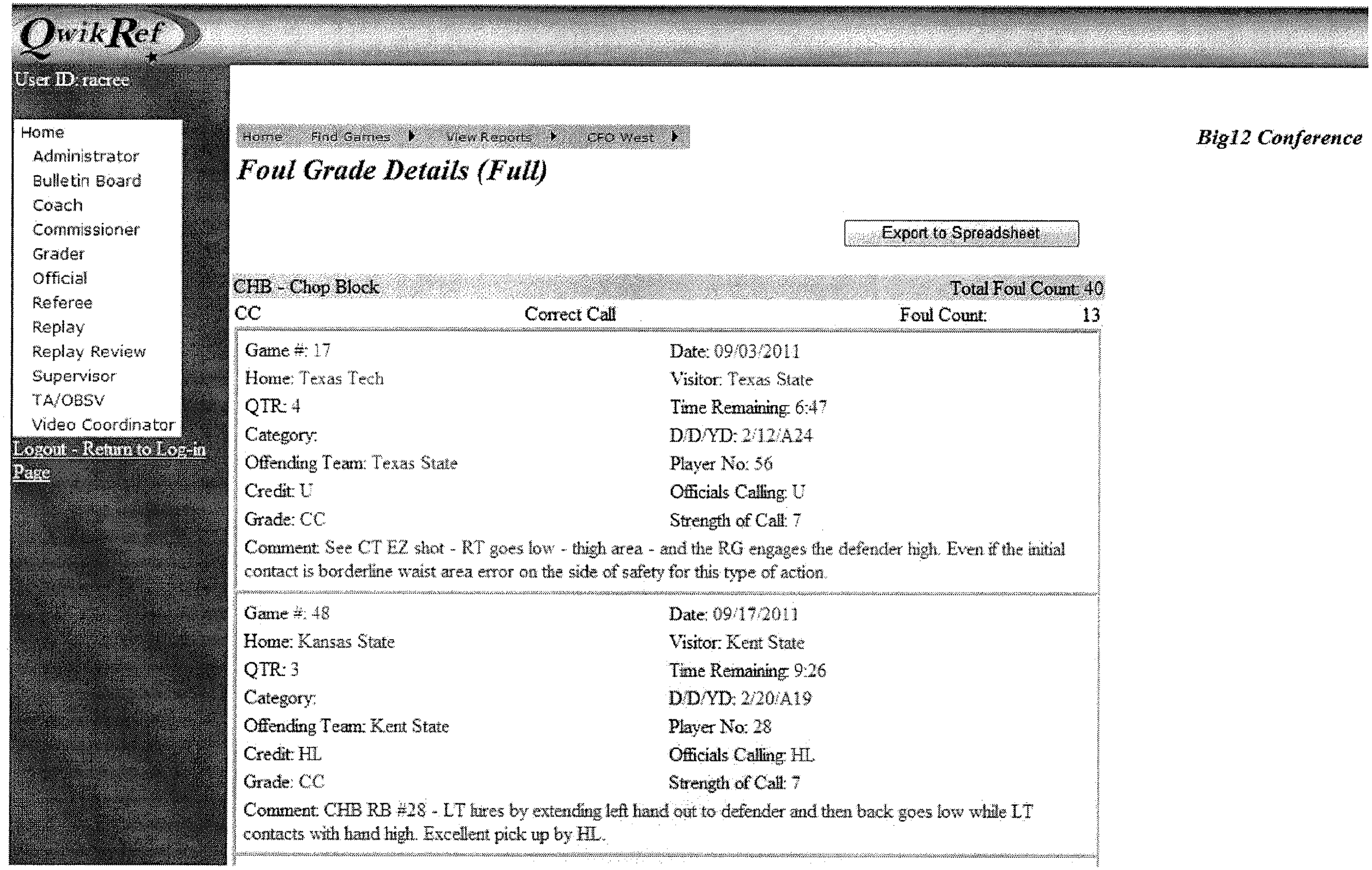
FIG. 105 is a screen shot of supervisor permission, view reports, foul grade report, fouls checked, view details display that provides details on a selected foul after the user selects a view detail option associated with a specific foul, in accordance with an embodiment of the present invention.
Figure 106:
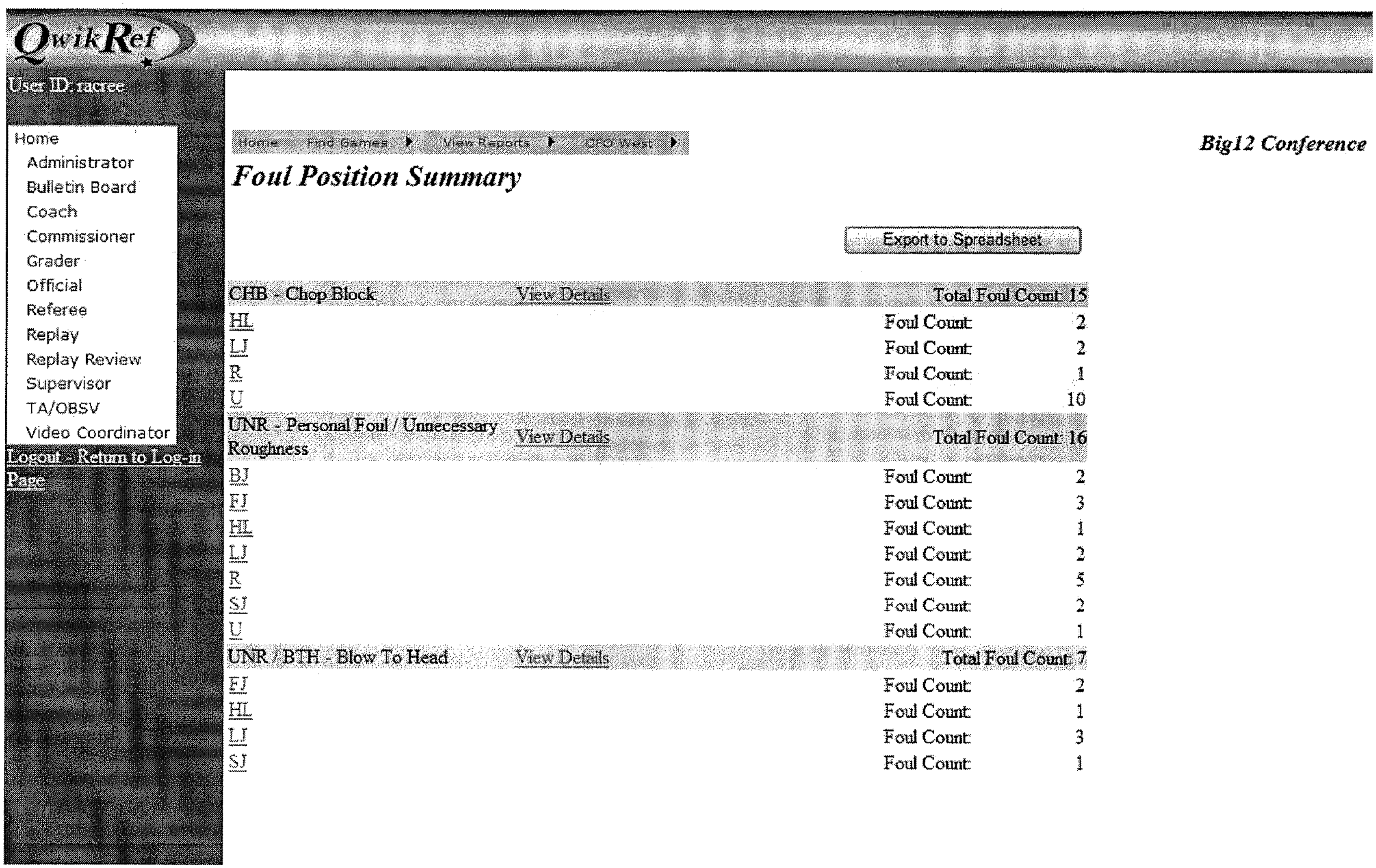
FIG. 106 is a screen shot of supervisor permission, view reports, foul position report display that provides details on selected fouls by official position, in accordance with an embodiment of the present invention.
Figure 109:
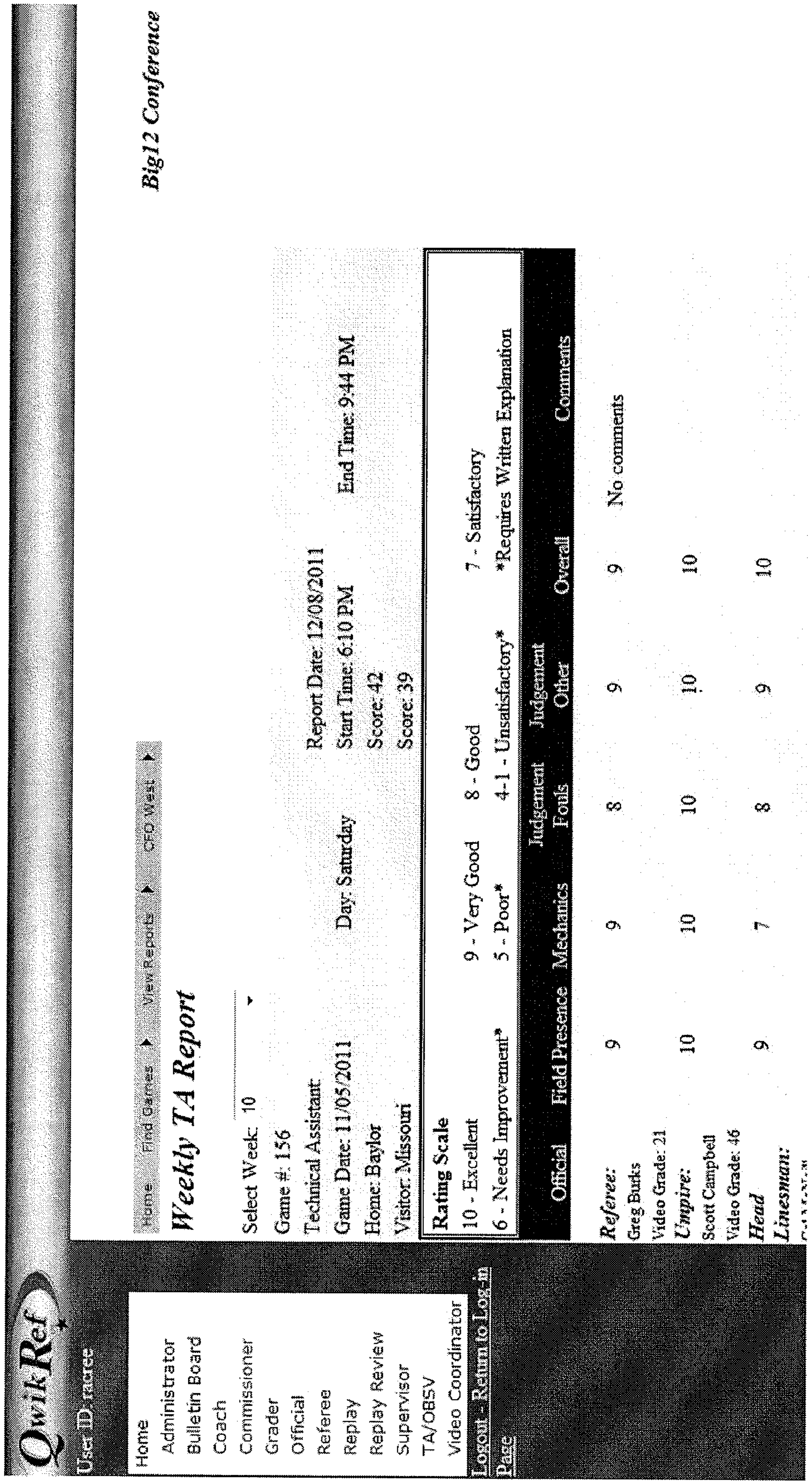
FIG. 109 is a screen shot of supervisor permission, view reports, weekly TA report display that provides the technical assistant's evaluation of each member of the crew of officials for a specific game, in accordance with an embodiment of the present invention.
Figure 110:
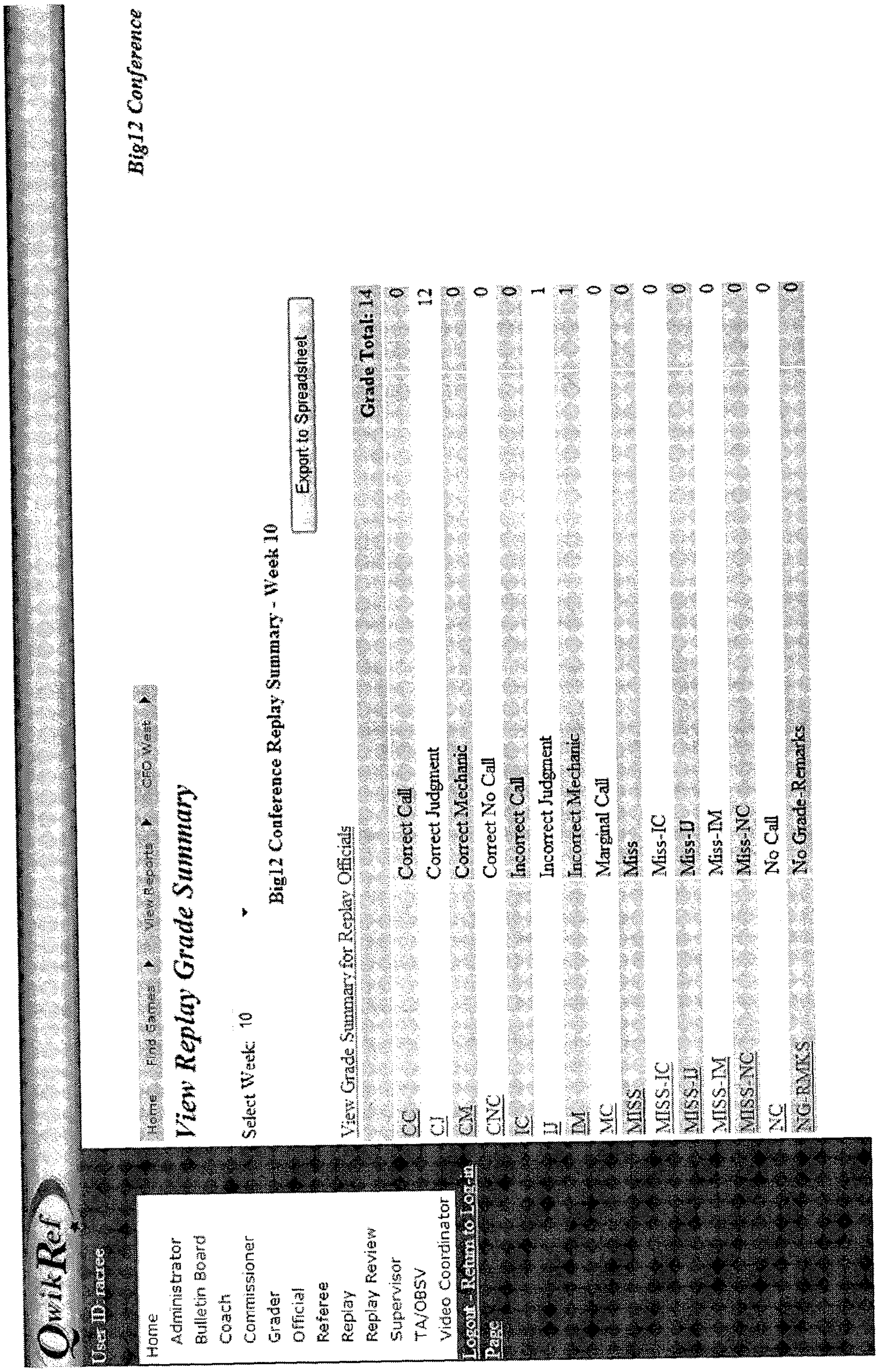
FIG. 110 is a screen shot of supervisor permission, view reports, view replay grades summary display that provides a conference replay summary for the entire season, in accordance with an embodiment of the present invention.
Figure 111:
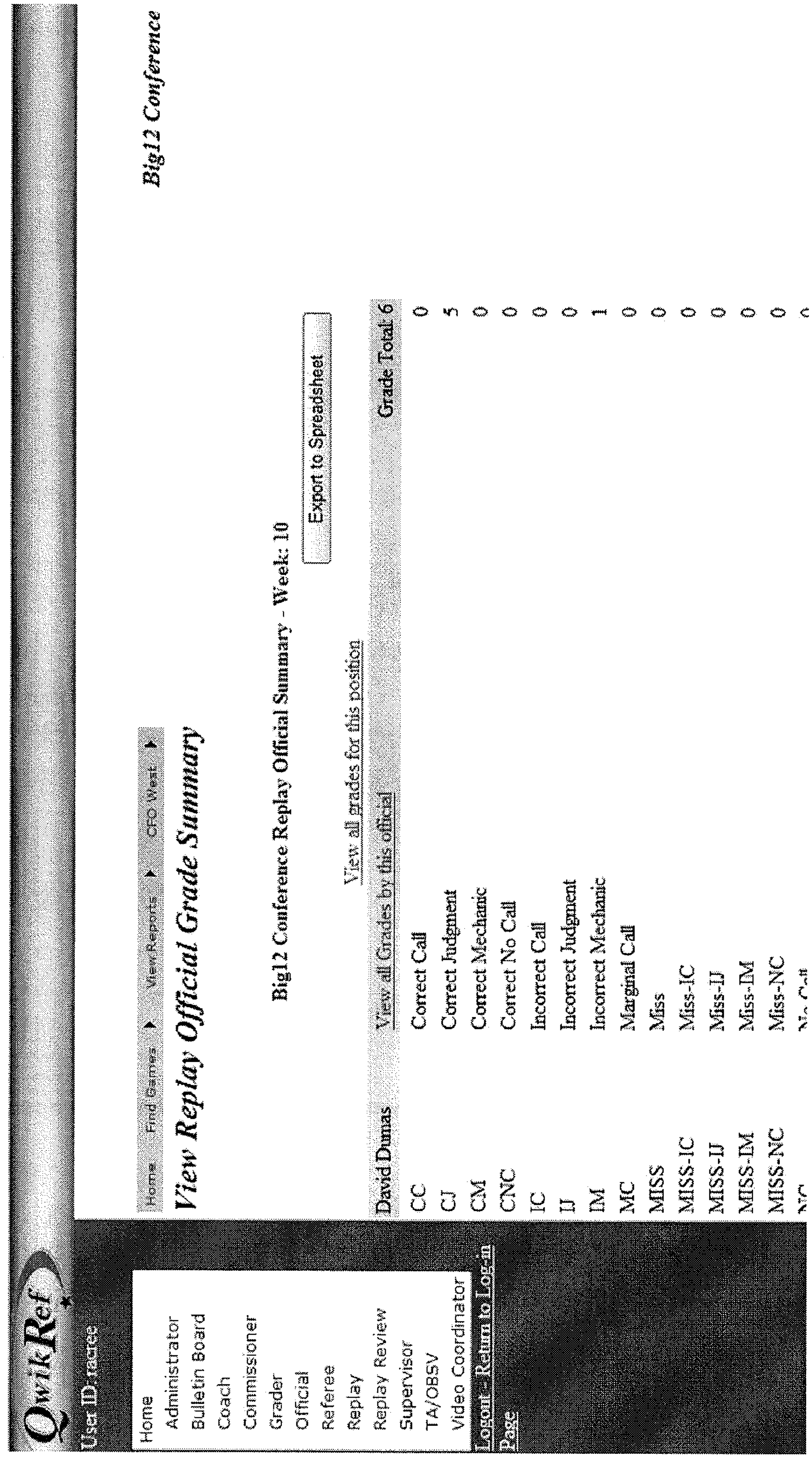
FIG. 111 is a screen shot of a supervisor permission, view reports, view replay official grade summary display that provides a replay summary by individual official for the entire season, in accordance with an embodiment of the present invention.
Figure 112:
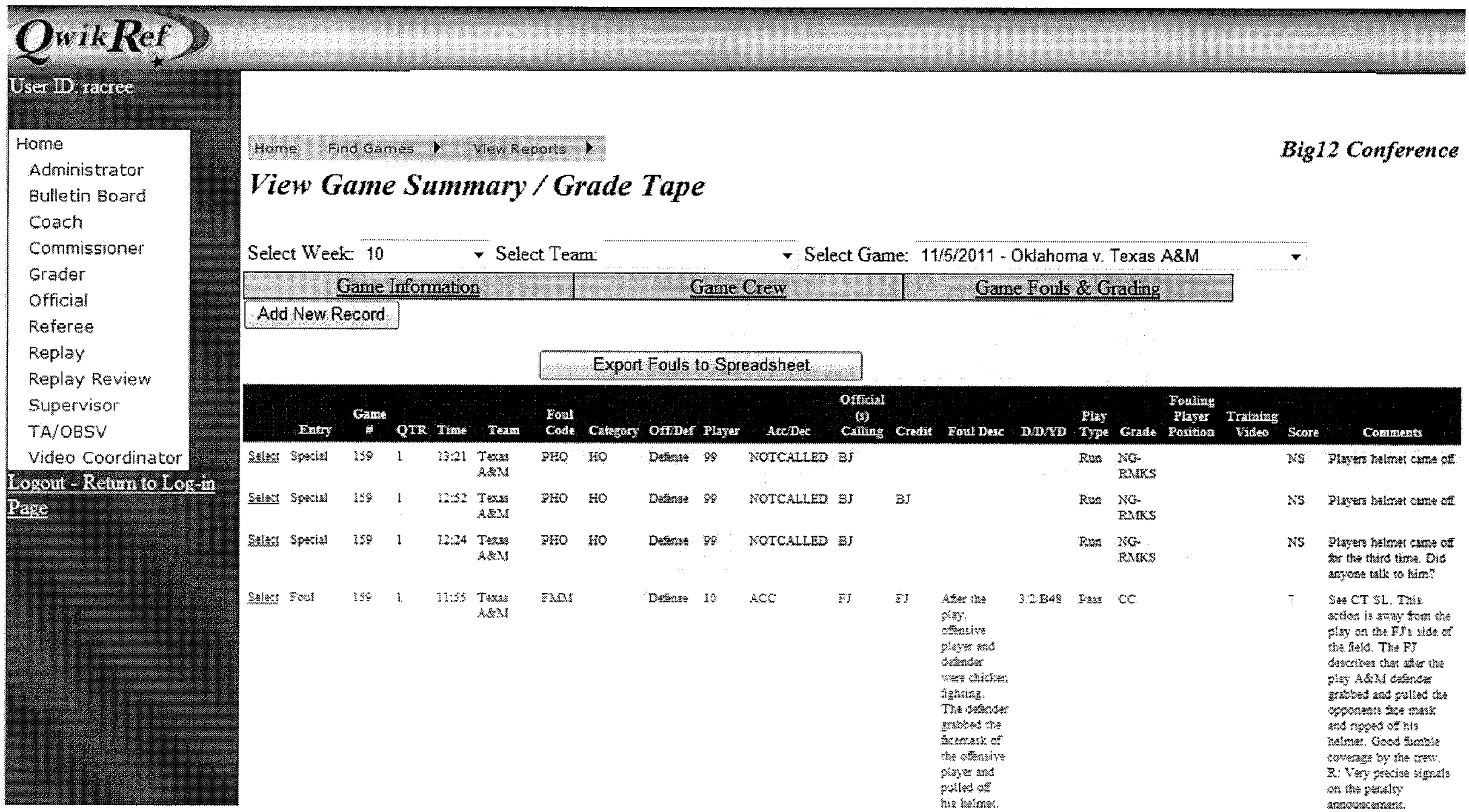
FIG. 112 is a screen shot of a grader permission, find games, view game summaries/grade tape display that permits the grader to grade each call by official, in accordance with an embodiment of the present invention.
Figure 113:
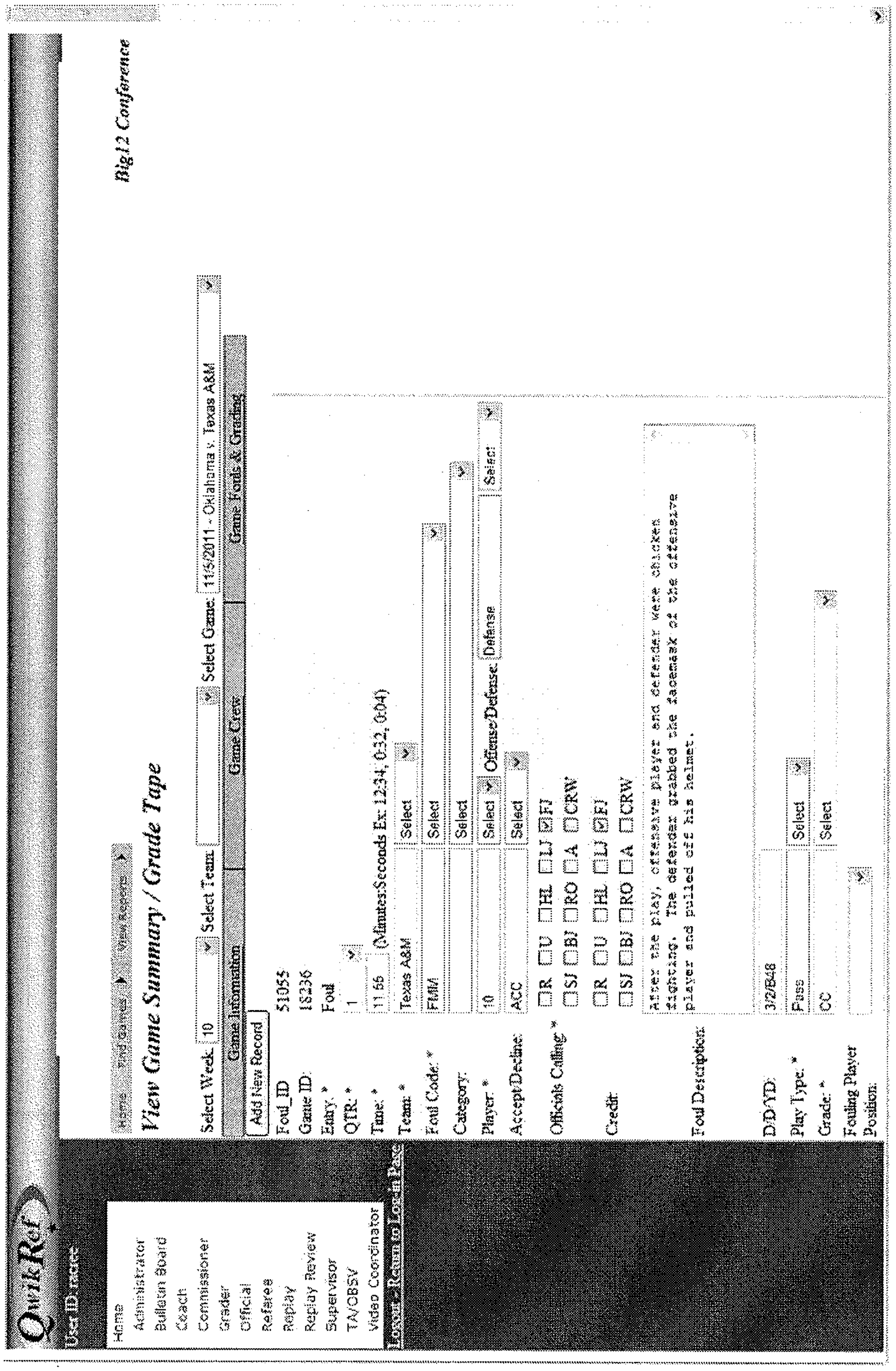
FIG. 113 is a screen shot of a grader permission, find games, view game summaries/grade tape display that permits the grader to grade each call by official after selecting the Select button from FIG. 112 which opens the data entry page to allow an evaluator to grade a foul entry entered by an official, in accordance with an embodiment of the present invention.
Figure 114:
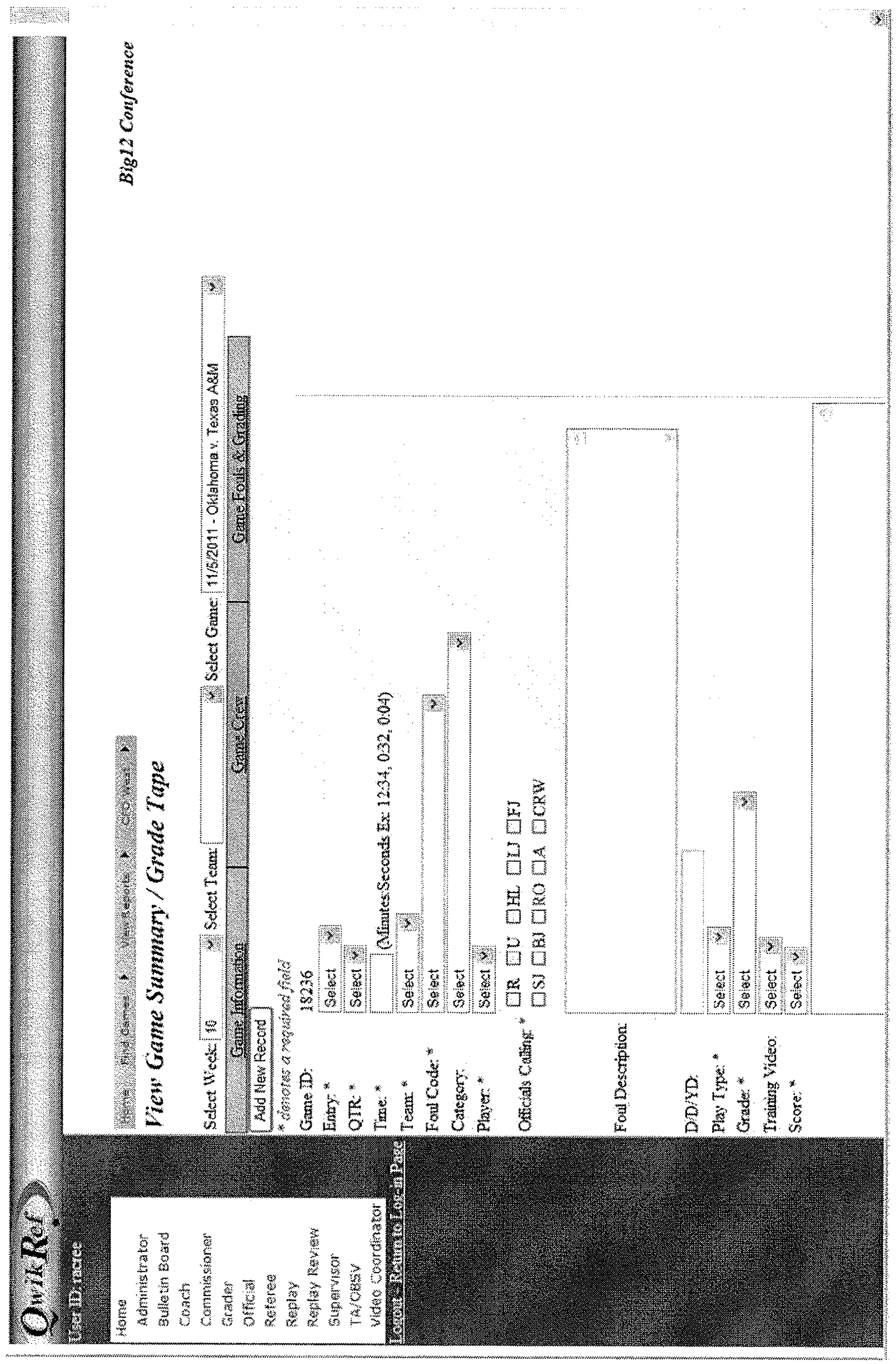
FIG. 114 is a screen shot of a grader permission, find games, view game summaries/grade tape display that permits the grader to grade each call by official after selecting the Add New Record button from FIG. 112 which opens the data entry page to enter a Comment entry by a grader, in accordance with an embodiment of the present invention.
Figure 115:
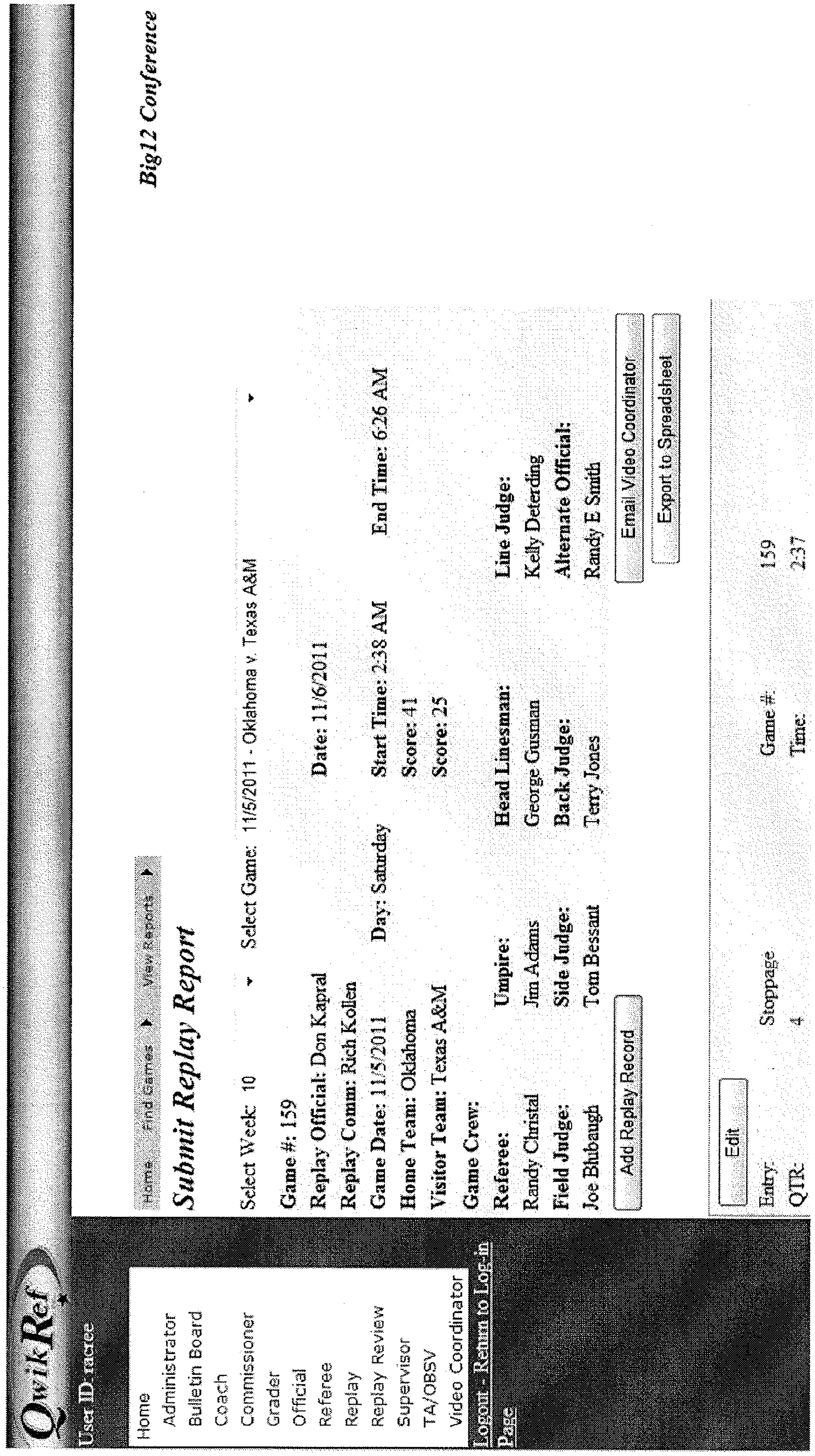
FIG. 115 is a screen shot of replay permission, find games, submit replay report display that permits the user to add comments on the replay call, in accordance with an embodiment of the present invention.
Figure 116:
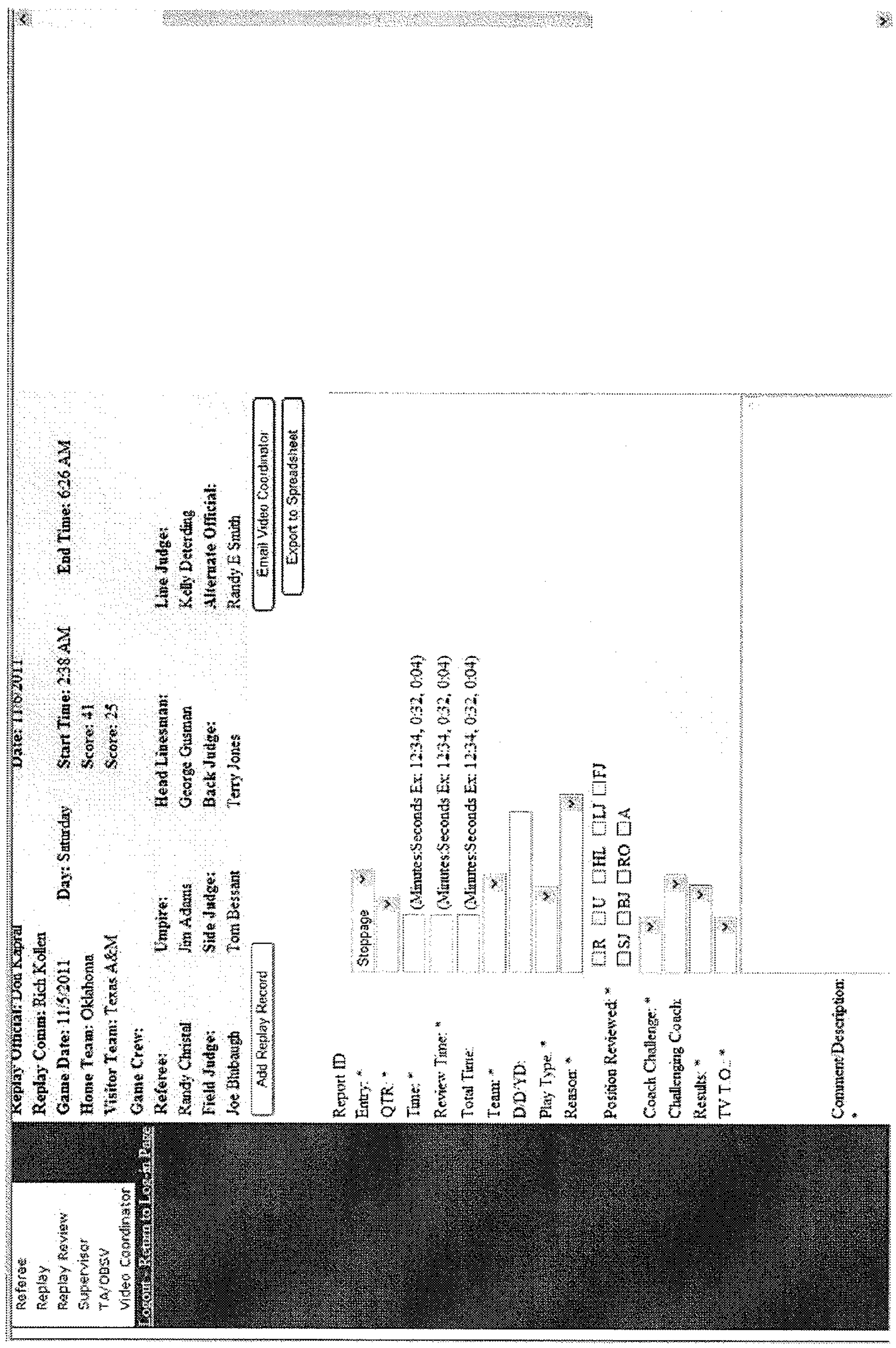
FIG. 116 is a screen shot of replay permission, find games, submit replay report display after selecting the Add Replay Record button in FIG. 115 that opens the data entry page for permitting the user to enter a replay stoppage and to initiate an e-mail alert to the Video Coordinator, Coordinator of Officials and other conference staff personnel, in accordance with an embodiment of the present invention.
Figure 117:
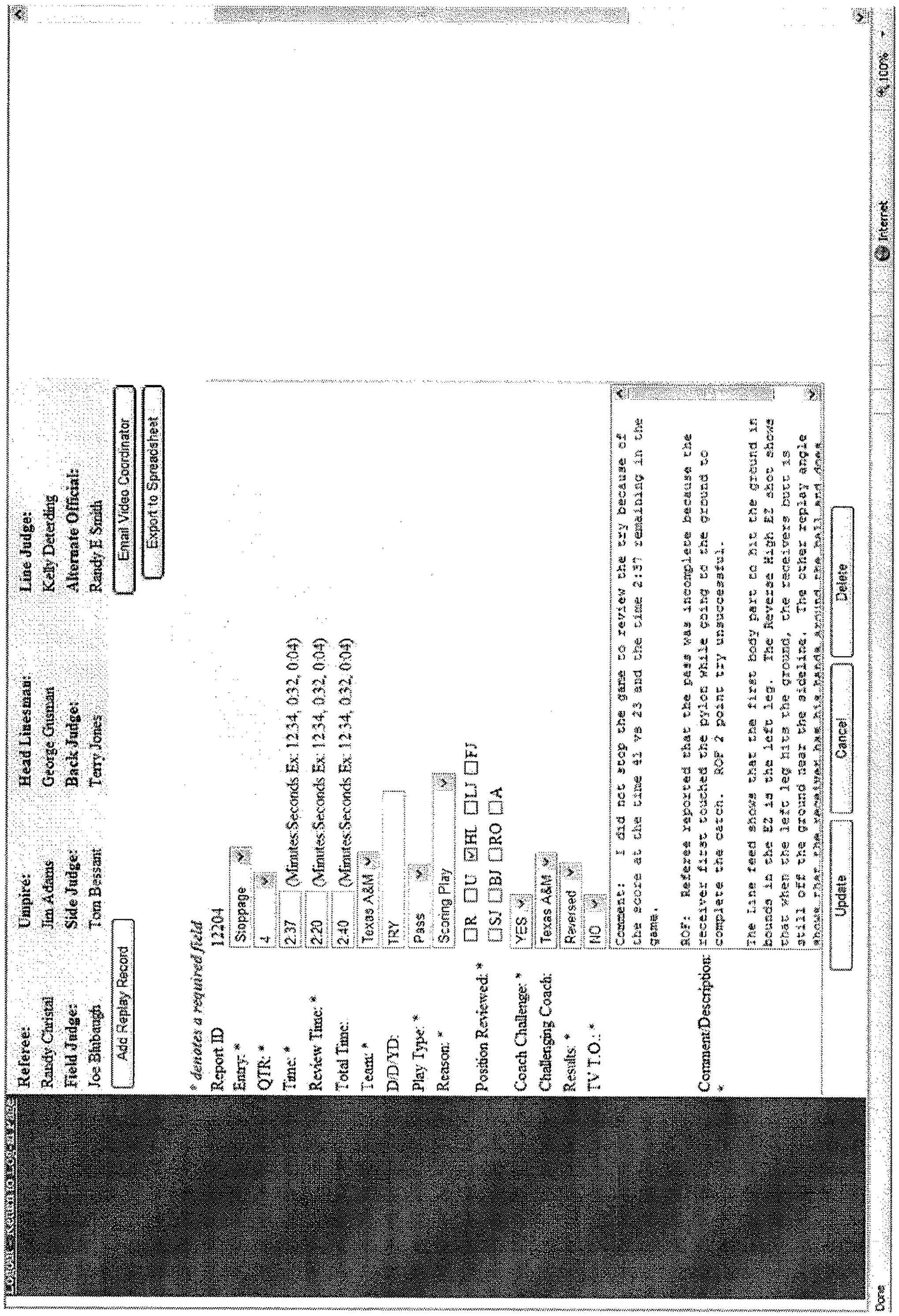
FIG. 117 is a screen shot of replay permission, find games, submit replay report display after selecting the Edit button in FIG. 115 that opens the data entry page for permitting the user to edit previous comments on the replay call and to initiate an e-mail alert to the Video Coordinator, Coordinator of Officials and other conference staff personnel in accordance with an embodiment of the present invention.
Figure 118:
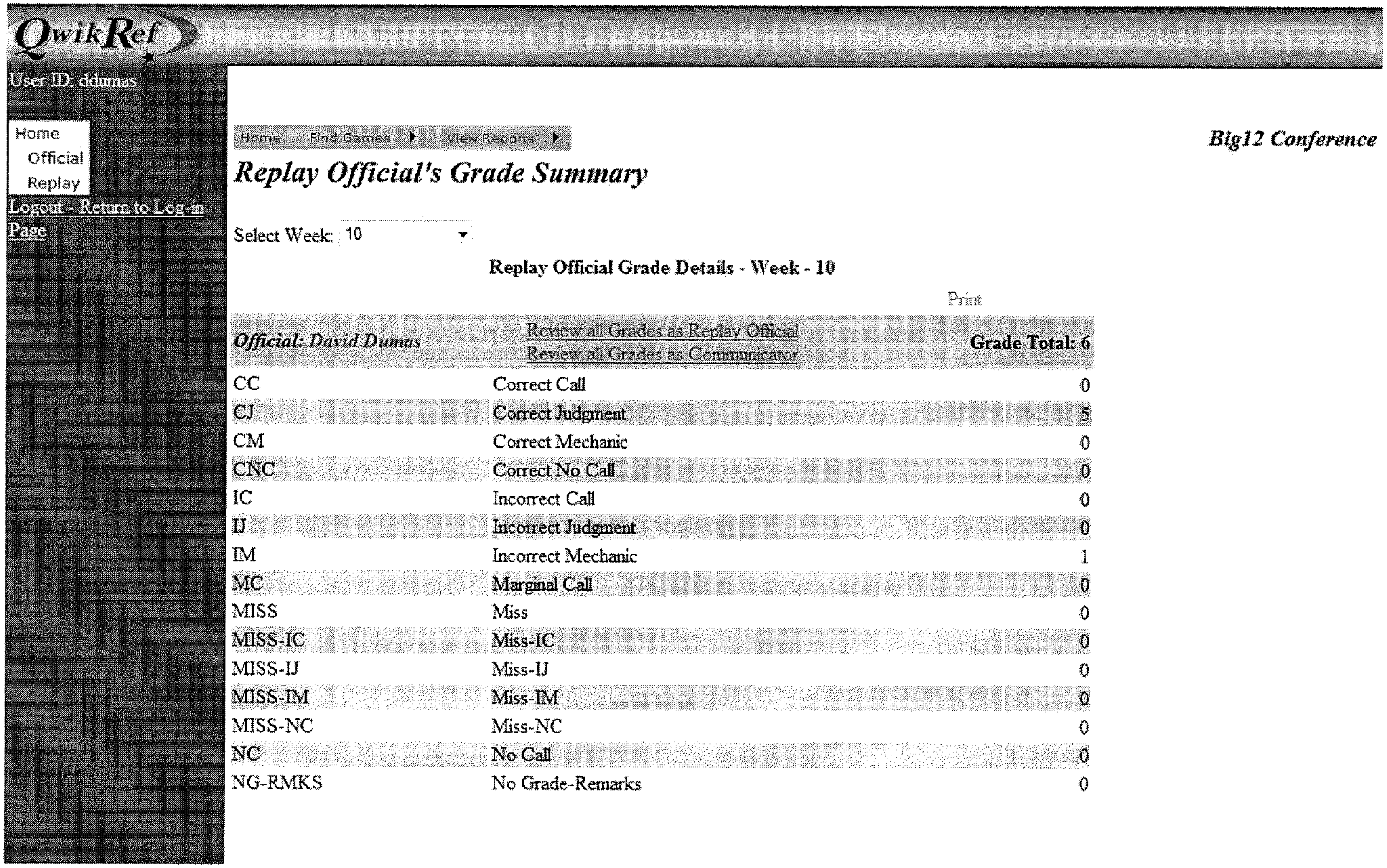
FIG. 118 is a screen shot of replay permission, view reports, replay official grade summary display that shows the grades given to the replay official for a given week's game, in accordance with an embodiment of the present invention.
Figure 119:
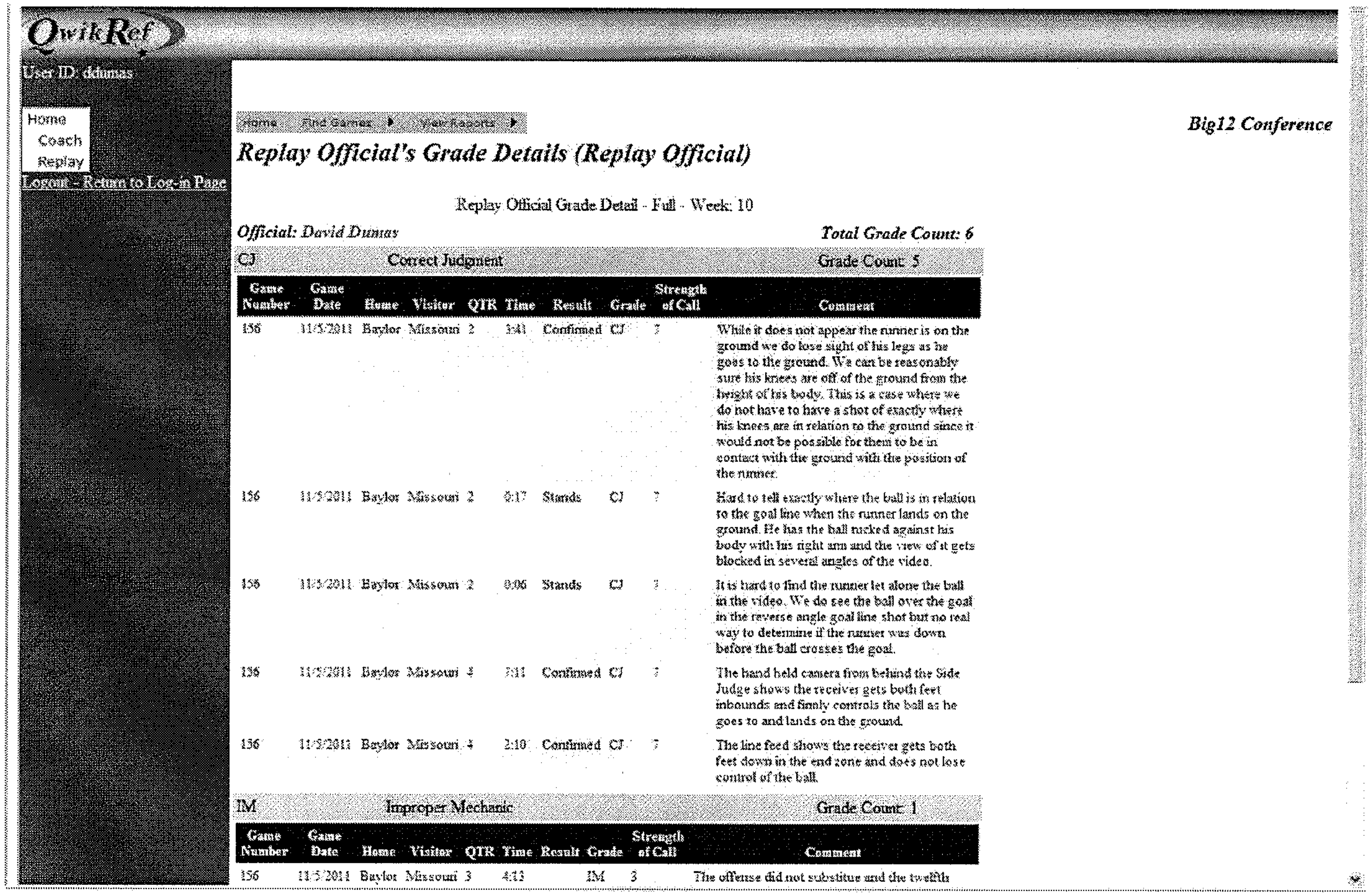
Figure 120:
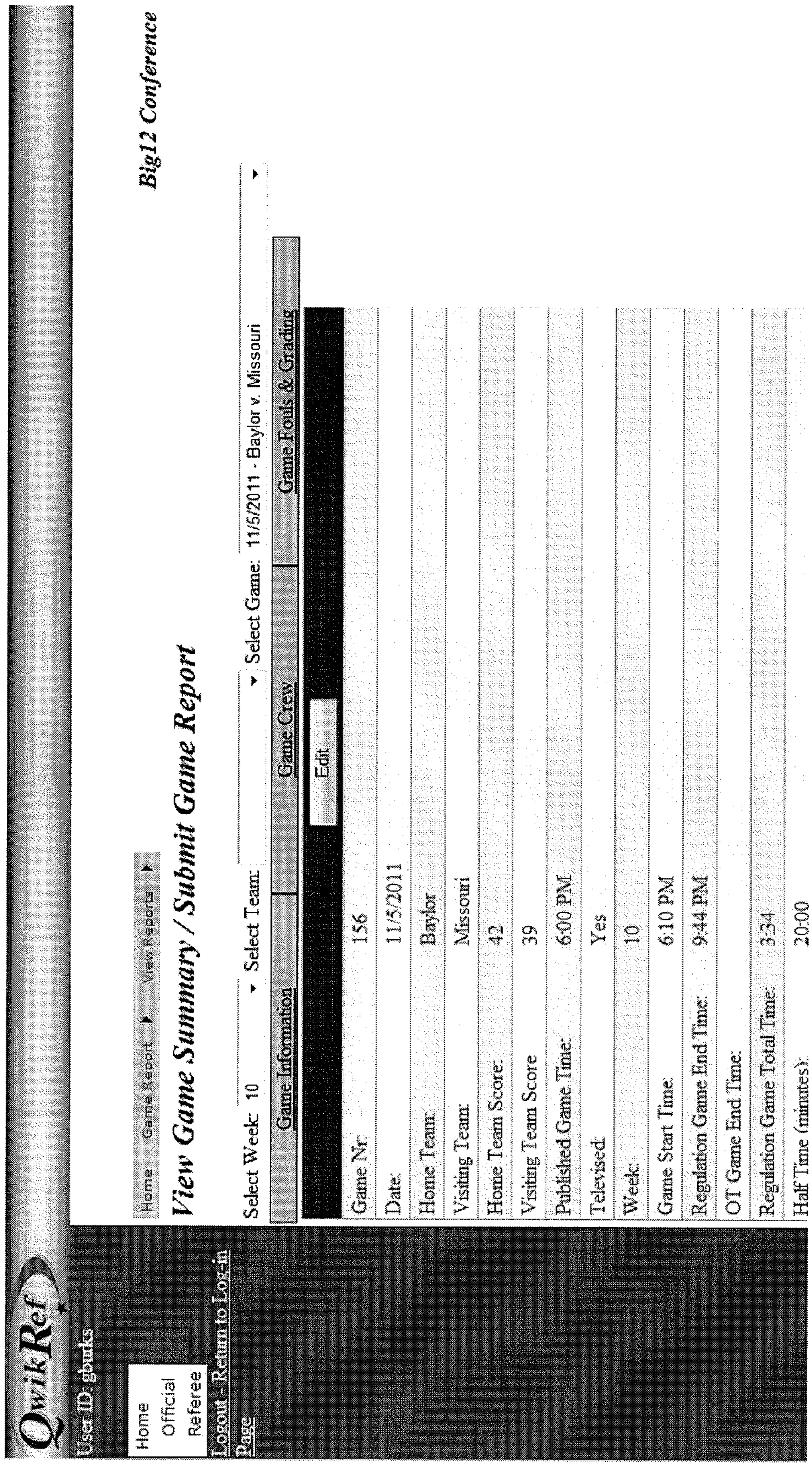
Figure 121:
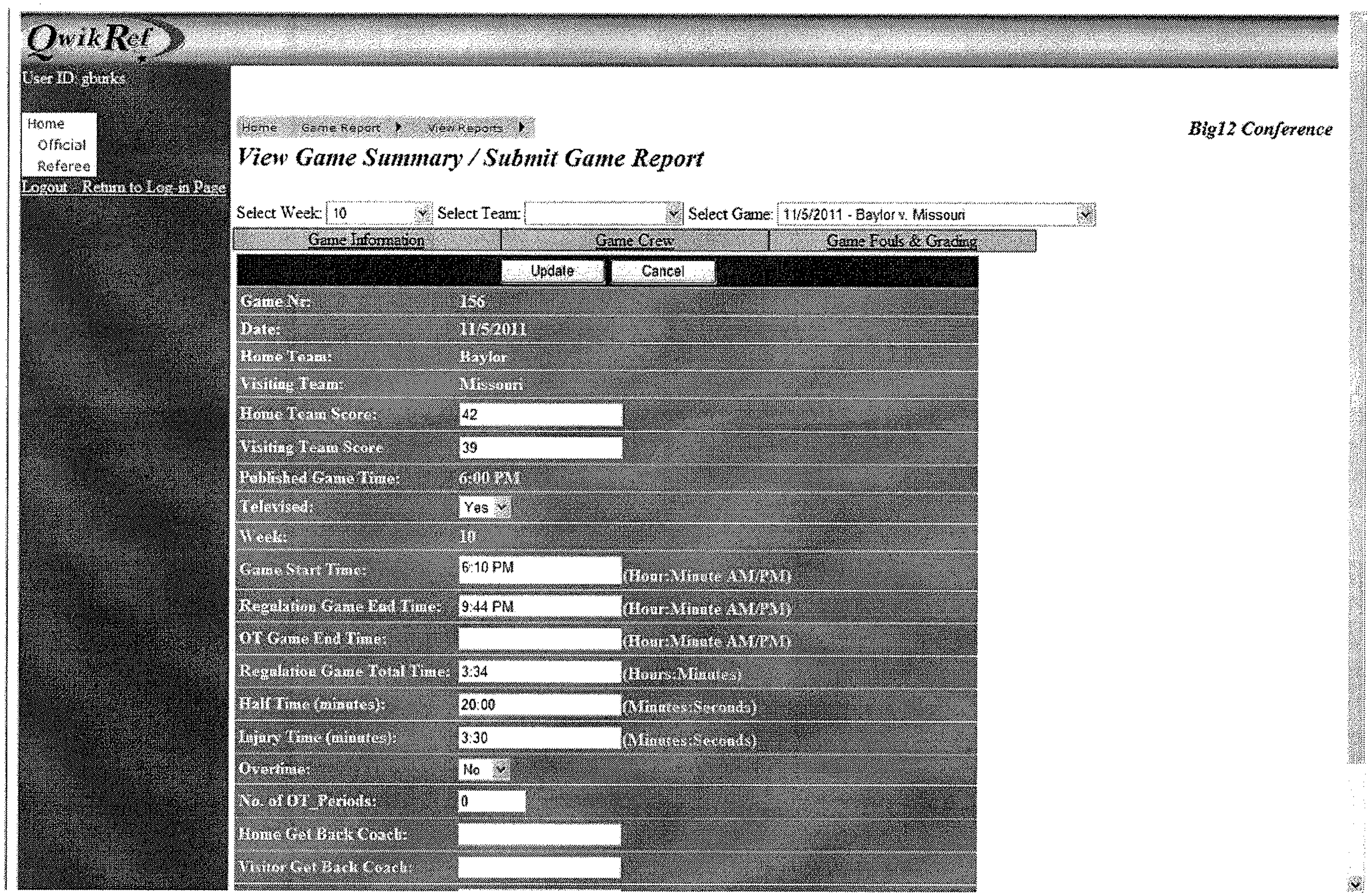
Figure 122:
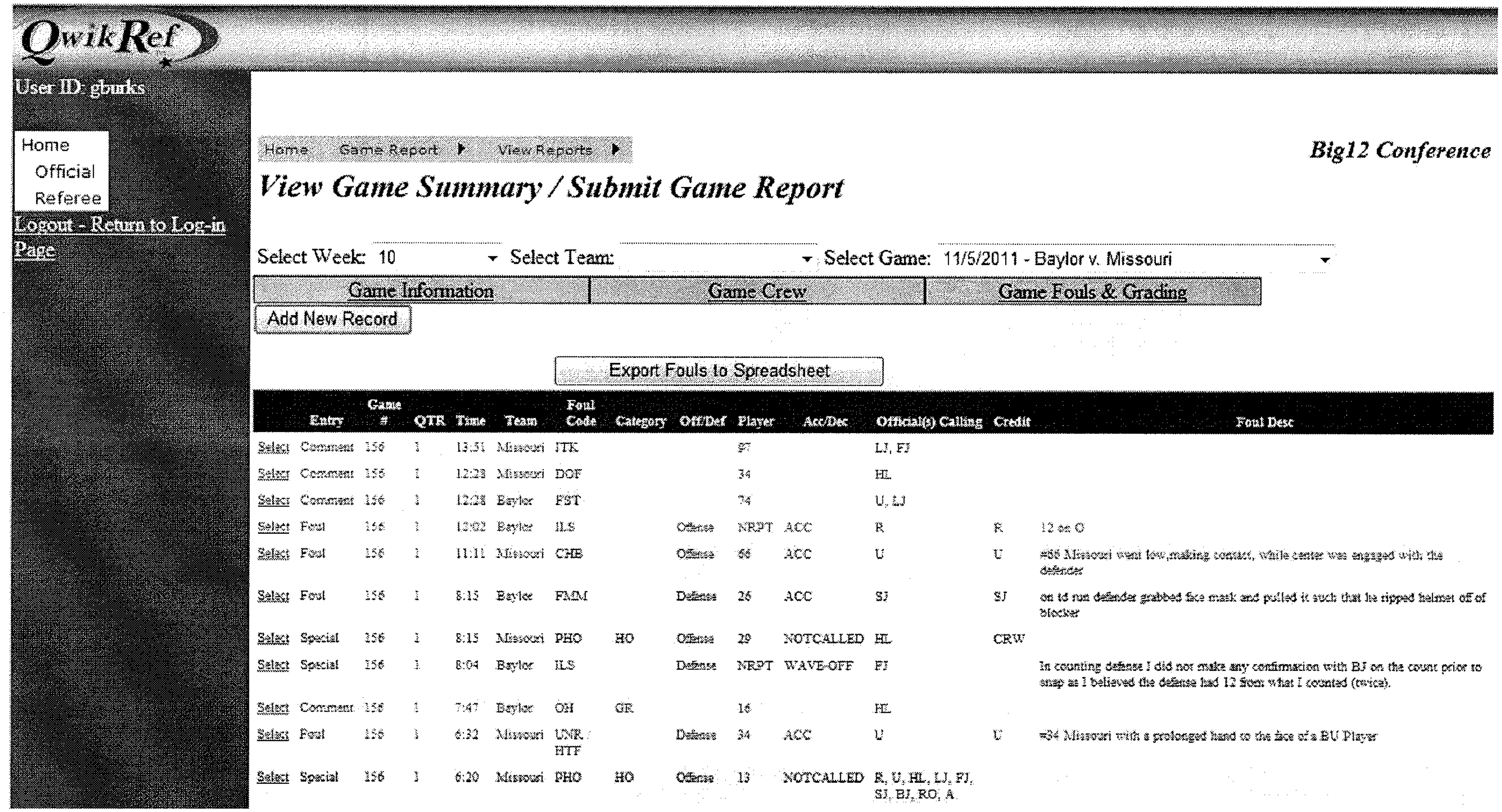
Figure 123:
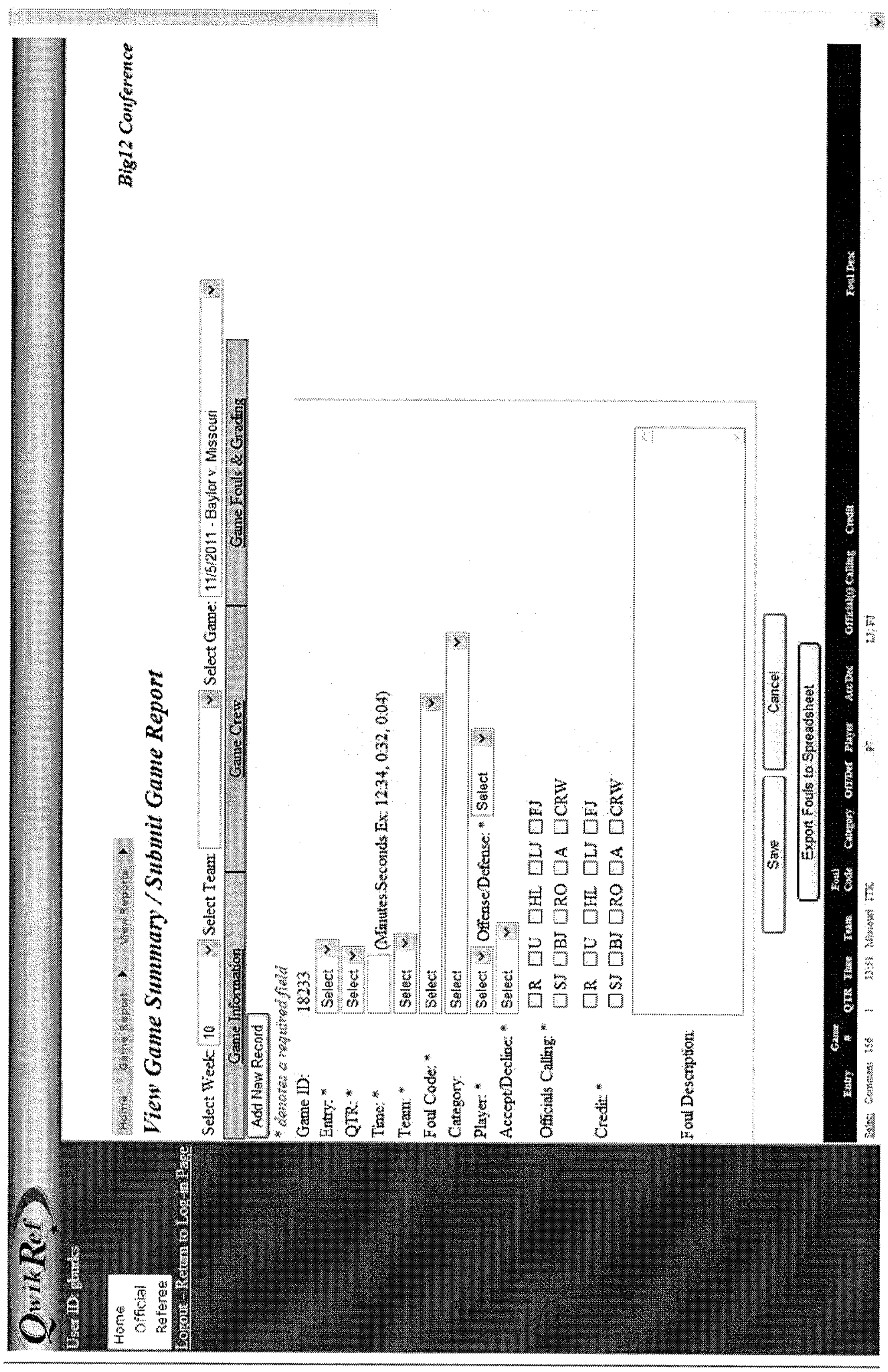
Figure 124:
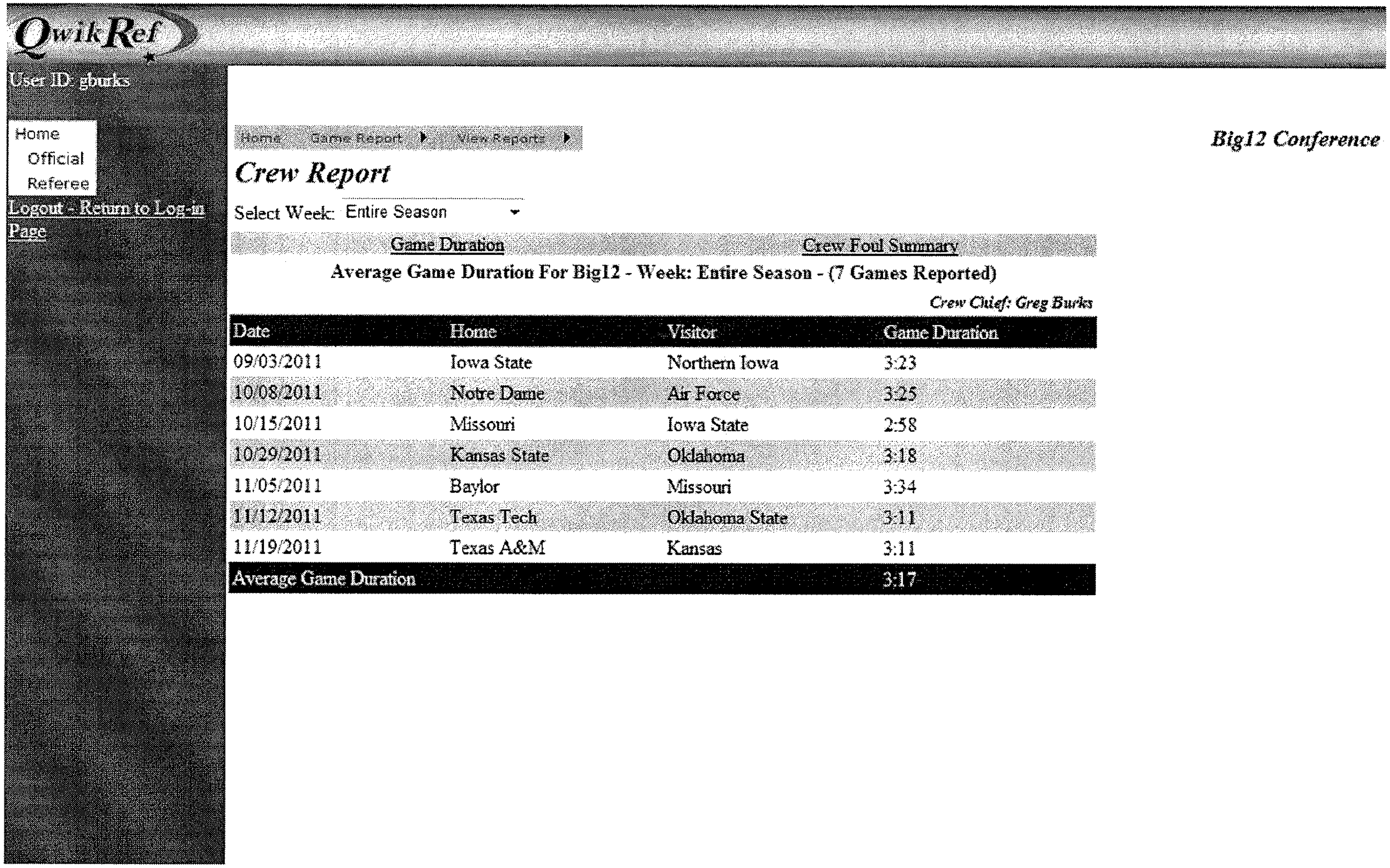
Figure 126:
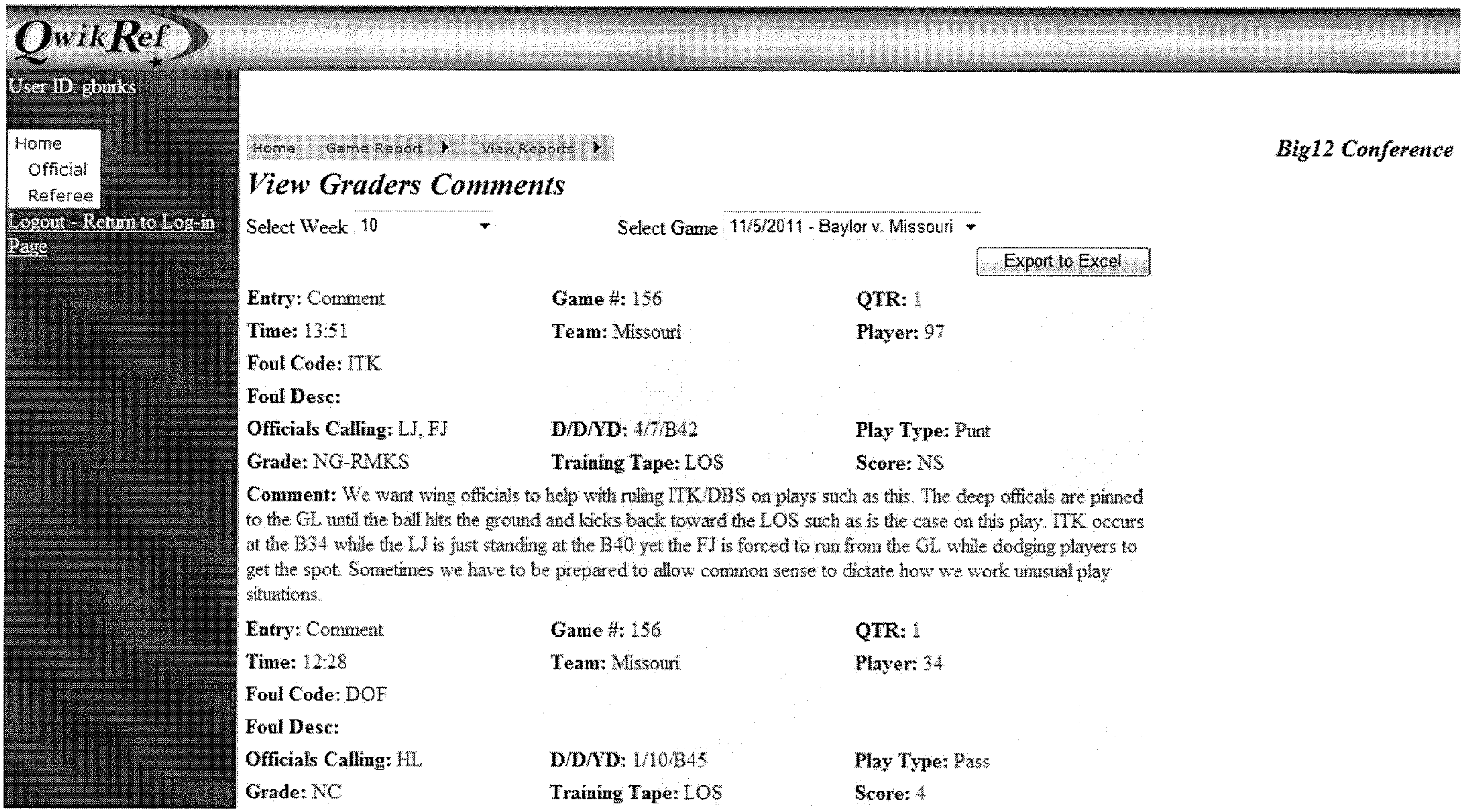
Figure 127:
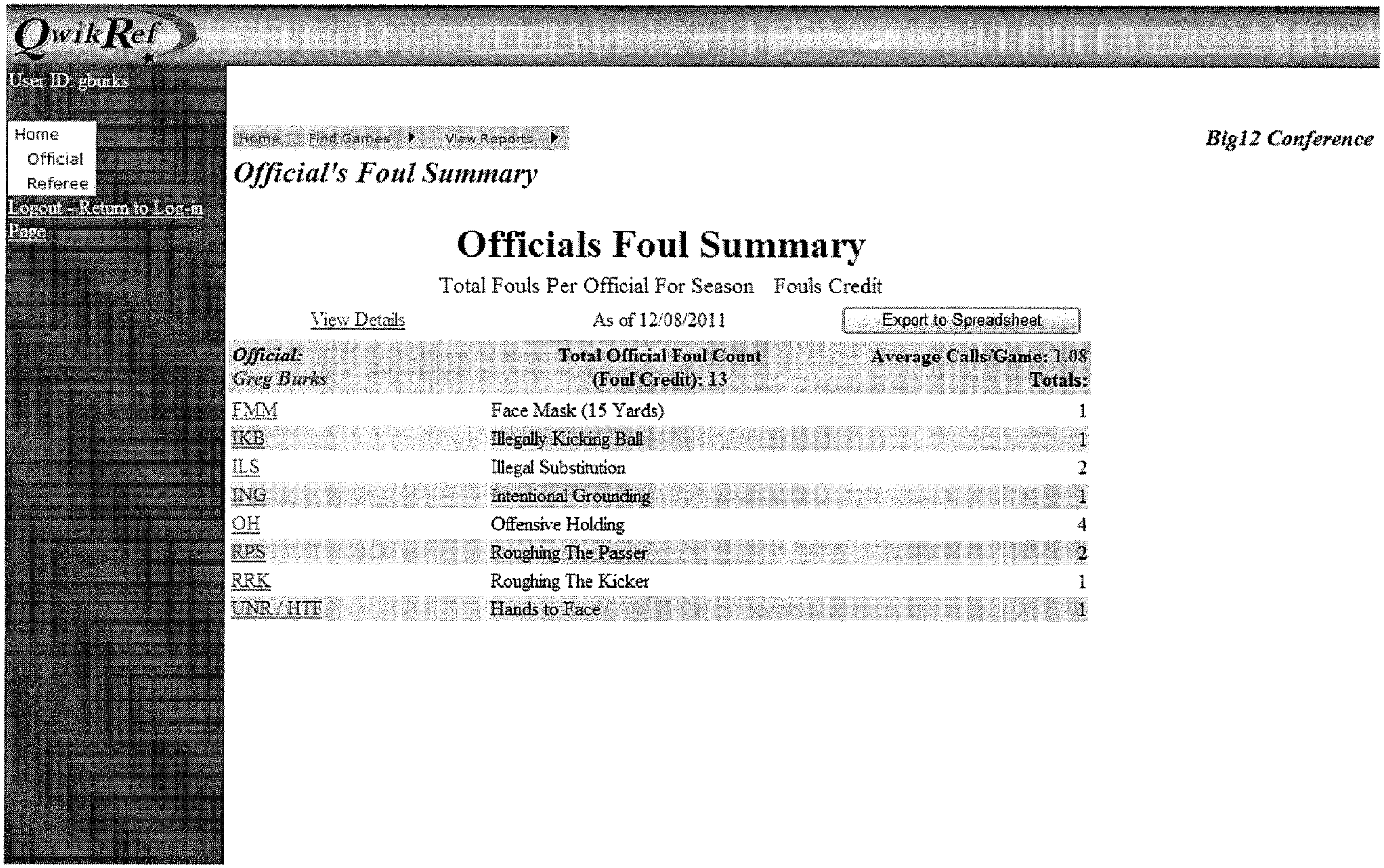
Figure 128:
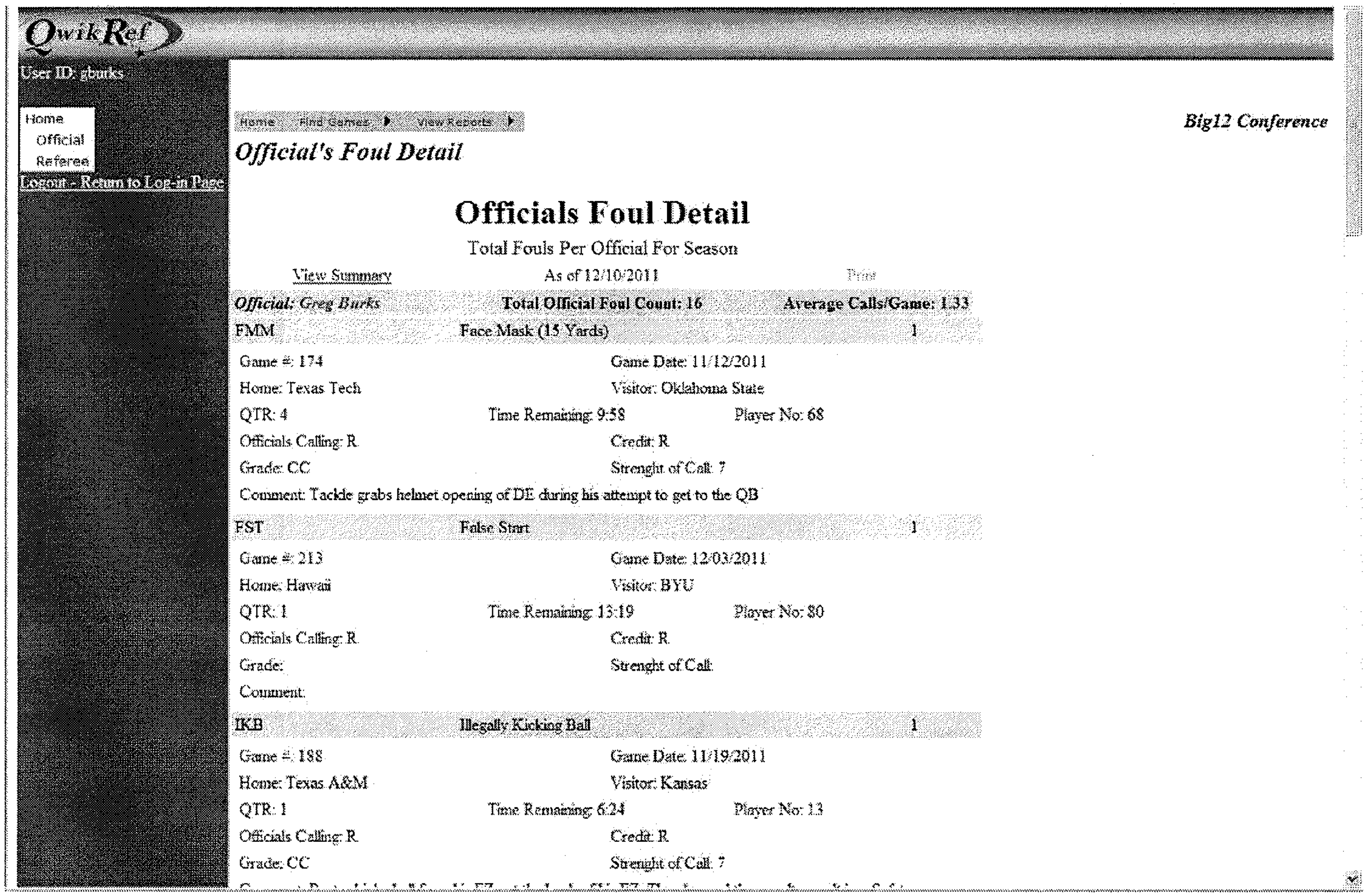
Figure 129:
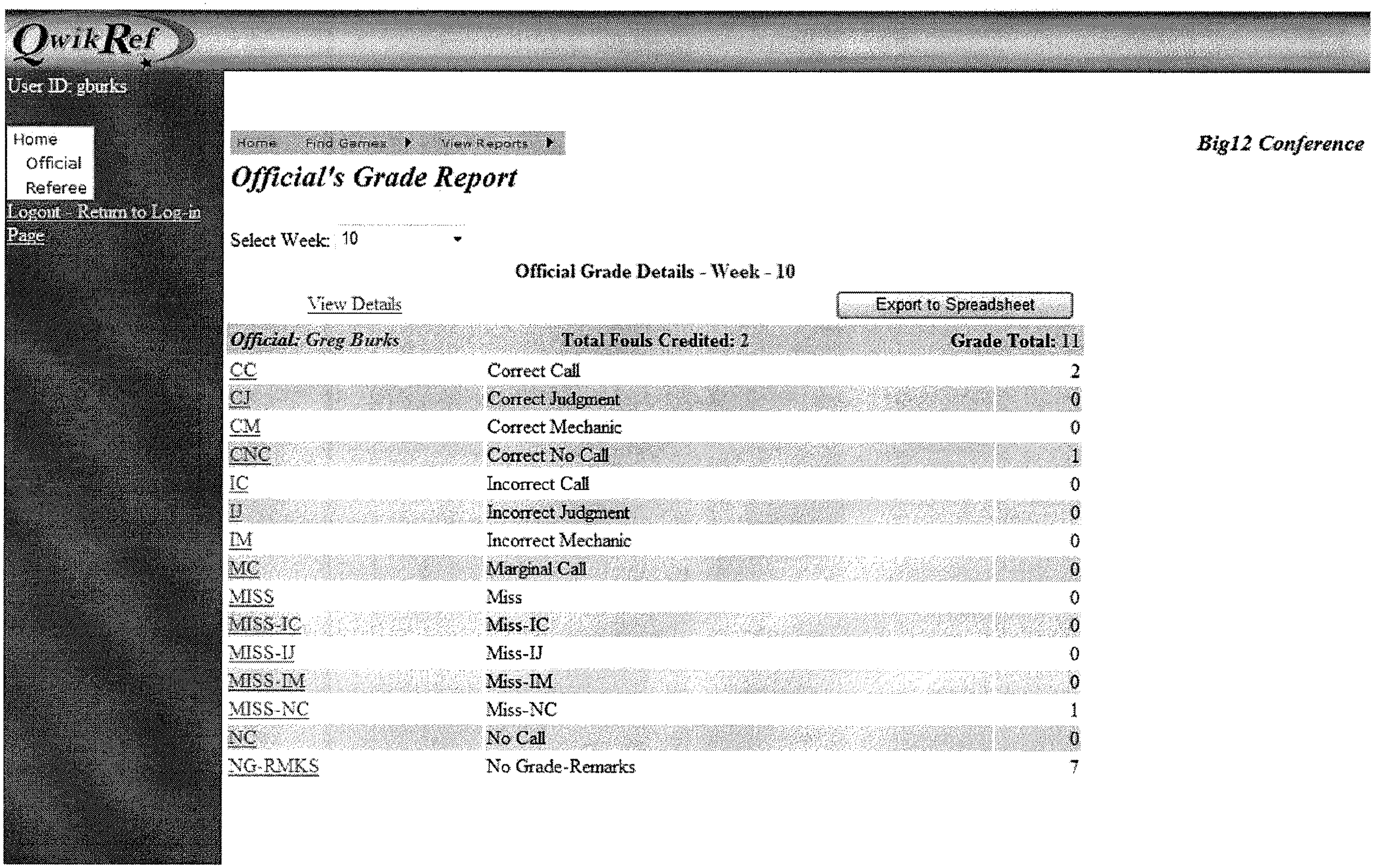
Figure 130:
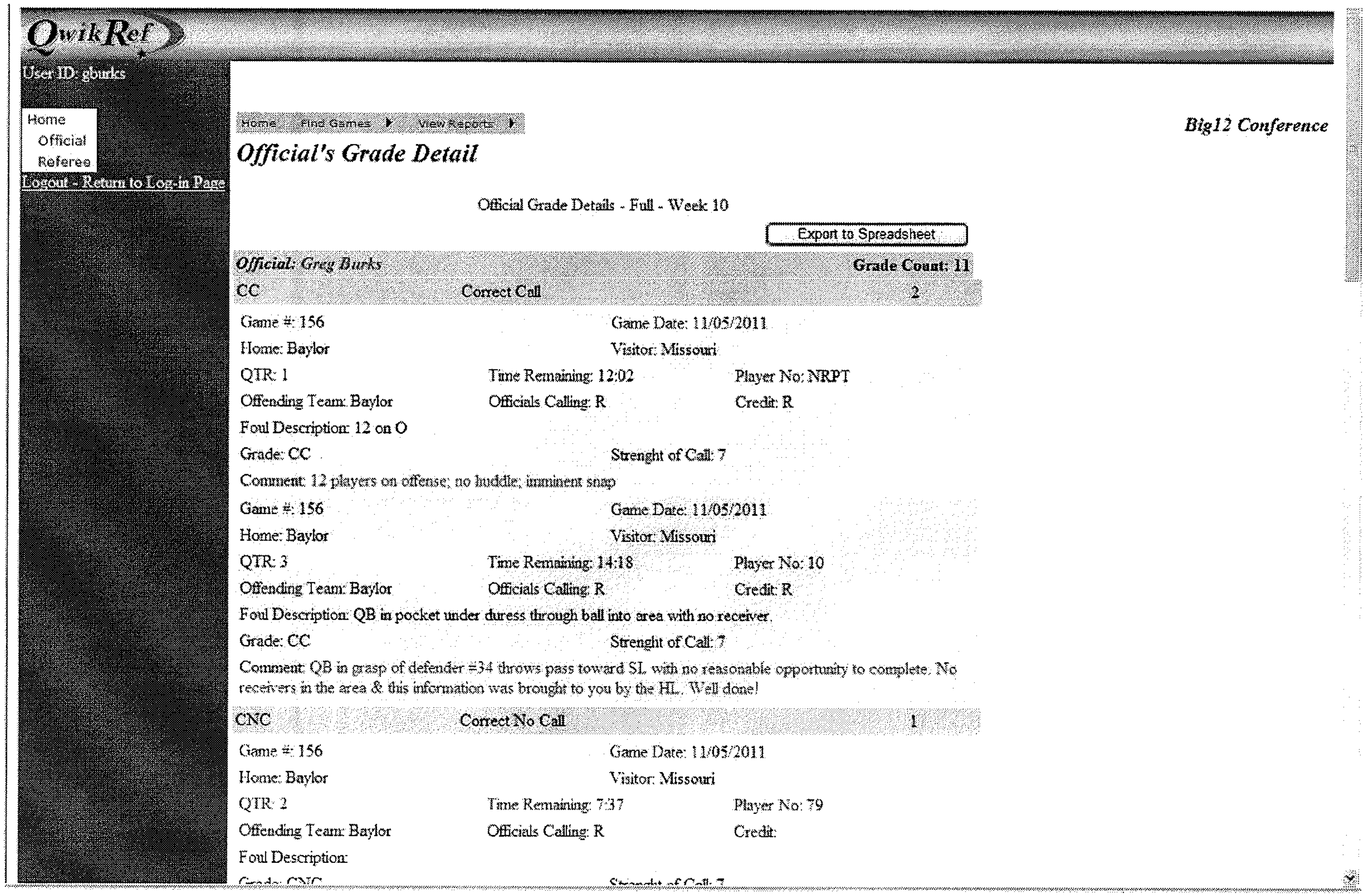

FIG. 76 is a flow diagram of how various users can use programs as shown and described herein, in accordance with embodiments of the present invention. In FIG. 76, a website (e.g., website 110 in FIG. 1) may receive 205 data, including game information, rosters and assignments at the website, generally from a coordinator of officials and store 210 the received data in a database associated with the website. The website can also receive 215 post game foul reports, including penalty data and store 220 the received penalty data in the database associated with the website. In general, this information usually is supplied by users who are referees or the like. The website can also receive 225 and store 230 stoppage reports in the database related to instant replay review of a play, and these reports can be supplied by users who may be replay officials. The website may further receive 235 related technical assistance data from one or more technical assistants assigned to help the referees and other officials. The technical assistance data may be stored 240 in the database for later use. The website may still further receive 245 a list or lists of plays/calls, from the coaches of the teams involved in the game (or even from a coach from a team not involved in the game), for instance, that are to be reviewed for correctness, and the lists may be stored 250 in the database. The list or lists of plays/calls to be reviewed may be responded to 255. The website can allow a coordinator or supervisor to enter responses 255 to the stored lists and also send an electronic alert (e.g., an email, text message, instant message, or the like) that some or all of the plays on the list or lists have been reviewed.

In FIG. 76, a grader may be permitted to access 260 the website and the database to review the data and provide grades and comments on one or more referee's performance for one or more games and store the grades and comments in the database.

Likewise, the one or more referee's whose performance was graded and commented on may be permitted to access 265 the website and database to review their individual grades and comments. In general, each referee will only be given restricted access to review the grades and comments specifically about their performance and/or the entire crew of referees that worked a given game together.

FIG. 173 is a block diagram of an exemplary embodiment of a system 17300 for connecting video clips in an online web-based database to game information stored in a separate online web-based database. System 17300 can include an Access database (or SQL database) 17302 that can be configured to store game/event information 17306 (e.g. fouls, evaluations, review, and comments), an SQL database 17304 that can be configured to reference and/or store a game/event video clip 17308 associated with game/event information 17306, and game/event video 17310.

In operation, the system 17300 can be configured to receive game/event video clips 17308 manually uploaded and associated with game/event information 17306 by one or more users, such as officials, administrators, graders, evaluators, coaches, video coordinators, or any other users. The game/event video clips 17308 can be stored in the SQL database 17304 and linked to game/event information 17306 stored in the Access database (or SQL database) 17302.

It will be appreciated that the Access database 17302 and SQL database 17304 can by any type of database capable of storing game/event information 17306 and game/event video clips 17308, respectively.

It will also be appreciated that access to the Access database 17302 and SQL database 17304 can be provided through a website, as described herein and in FIG. 175, to allow users to access the data stored within each of the Access database 17302 and SQL database 17304.

FIG. 174 is a block diagram of an exemplary embodiment of a system 17400 for connecting video clips in an online web-based database (and/or Game Video Library) to game/event information stored in a separate online web-based database. System 17400 can include an Access database (or SQL database) 17302 that can be configured to store game/event information 17306 (e.g. fouls, evaluations, review, and comments), an SQL database 17304 that can be configured to reference and/or store a game/event video clip 17308 associated with game/event information 17306, and a Game Video Library 17402 that can include one or more game/event summary videos 17404, each game/event summary video 17404 comprising a plurality of videos associated with a single game/event (17406-17410).

In operation, the system 17400 can be configured to allow users, such as officials, administrators, graders, evaluators, coaches, video coordinators, or any other users, to automatically upload video clips from a Game Video Library 17402 to the SQL database 17304 based on game identifiers and/or game play number. For example, the system 17400 can be configured to allow users to automatically upload video clips from the Game Video Library 17402 to the SQL database 17304 according to, for example, the methods described in FIGS. 176 and 177.

In some embodiments the Game Video Library 17402 is a third party video provider. Such embodiments can include more than one Game Video Library 17402, such as but not limited to Hudl, Snapdragon, and the like.

In some embodiments, the SQL database 17304 can also be configured to receive game/event video clips that are manually created and uploaded by users, such as officials, administrators, graders, evaluators, coaches, video coordinators, or any other users, as described above with respect to FIG. 173.

In some embodiments, the game/event summary video 17404 can be compiled by a video coordinator or by an automated process. For example, multiple video streams or video clips of the same game or event can be combined into a single video stream with all associated video clips (such as different angles, etc.) of any given play combined into one video clip which is identified with a single play or event number. The play number can optionally be associated with a begin pointer and an end pointer which mark the start time and end time, respectively, in the video of the play number associated with the pointers. This information, the play numbers and associated begin and end pointers can be stored as meta data associated with the game/event summary video 17404, or, optionally or alternatively, at the beginning of the game/event summary video 17404 file. Alternatively, every clip of the same play can be stored separately with multiple begin and end pointers each set of pointers being associated with one of clips. In such embodiments, the game/event summary video 17404 file and associated media file can be stored in a video library that can be accessed either publicly or by users such as officials, administrators, coaches, graders, etc.

FIG. 175 is a block diagram of an exemplary embodiment of a system 17500 for connecting video clips in a plurality of third party online web-based video provider systems to game/event information stored in a separate online web-based database. System 17500 can include a database 17502, a plurality of third party video providers 17504, a web server 17506, and a user terminal (or user) 17508.

In operation, the database 17502 can transmit data to and receive data from the video providers, the web server 17506 can transmit data to and receive data from the database 17502, the user can transmit data to and receive data from the database 17502 via the web server 17506, and the user can transmit data to and receive data from the video providers 17504, according to, for example, the methods described in FIGS. 176-178.

It will be appreciated that, in some embodiments, the database 17502 can, although not shown FIG. 175, be two separate databases as shown in FIGS. 173 and 174. In such embodiments, the user 17508 can access the two separate databases via the web server 17506.

It will also be appreciated that, in some embodiments, the database 17502 can store some or all video clips locally, and the user 17508 can access the local video clips via the web server 17506 without the need to access any of the video providers 17504. In some such embodiments where all video clips are stored locally in the database 17502, the video providers 17504 are optional.

It will further be appreciated that the user terminal 17508 can be any internet connected device such as, but not limited to, cellphones, PDAs, iPads, iPods, smartphones, laptops, tablets, etc.

FIG. 176 is a flowchart showing an exemplary method 17600 for connecting video clips in an online web-based system to game information stored in a separate online web-based database. Processing begins at 17602 and continues to 17604.

At 17604, a play number associated with game/event information, such as foul/comment information is received. For example, a user, such as an official, a grader, an evaluator, a coach, or an administrator, can include only a play number to identify video clips of that play when submitting game/event information, such as foul/comment information.

Processing continues to 17606.

At 17606, the play number is stored in a database and linked to the associated game/event information. Processing continues to 17608.

At 17608, the location of the video clip for the play number in a third party video library can be determined using, for example, at least the play number. For example, in some embodiments, after the play number is stored in the database a web link can be automatically generated (and also stored in the database) based on the play number and game/event information such as home team, visitor team, and game/event date. The web link can be generated using, for example, a predefined IP address of a third party video library that is associated with the game, the play number and game/event information such as home team, visitor team, and game/event date. The third party video library IP address information can be stored in and obtained from a cross-reference table or listing of which third party video libraries contain the film for each specific game and/or based on in which conference the game was played. For example, if the game was an ACC game, an ACC-specific video library would have the video of the game, if a Big 10 game, then a Big 10-specific video library would have the video of the game, and so on. In some embodiments, the video clip remains in the third party video library and is not copied into a local database. Processing continues to 17610.

At 17610, a request is received to view the video and/or game/event information. For example, a user can make such a request from any internet connected device such as, but not limited to, cellphones, PDAs, iPads, iPods, smartphones, laptops, tablets, etc. Processing continues to 17612.

At 17612, a response is provided that includes the location of the requested video associated with the game/event information. For example, the web link can be provided to the user as described herein. Processing continues to 17614, where processing ends.

FIG. 177 is a flowchart showing an exemplary method 17700 for connecting video clips in an online web-based system to game information stored in a separate online web-based database. Processing begins at 17702 and continues to 17704.

At 17704, a play number associated with game/event information, such as foul/comment information is received. For example, a user, such as an official, a grader, an evaluator, a coach, or an administrator, can include only a play number to identify video clips of that play when submitting game/event information, such as foul/comment information.

Processing continues to 17706.

At 17706, the play number is stored in a database and linked to the associated game/event information. Processing continues to 17708.

At 17708, a link is generated that points to the video clip for the given play number. The link can point to a third party video library and can be determined using, for example, at least the play number. For example, in some embodiments, after the play number is stored in the database a web link can be automatically generated and stored in the database based on the play number and game/even information such as home team, visitor team, and game/event date. The generated web link can include, for example, the IP address of a third party video library and other indicia such as the play number and/or game/even information such as home team, visitor team, and game/event date to identify the proper video clip within the third party video library. Processing continues to 17710.

At 17710, the video clip is copied using the link from the third party video provider (such as, for example, Hudl, DragonFly, DVSport, etc) into the same or a different database.

In some embodiments, as each play number is stored in the database the link is generated and the video clip is copied from the third party video provider into the same or a different database.

In other embodiments, links are not created until the user has finished entering play numbers or a predetermined number of play numbers have been stored in the database and once the user has finished or the predetermined number of play numbers have been stored, then the links are created and the video clips are copied into the same or a different database.

Processing continues to 17712, where a request is received to view the video and/or game/event information. For example, a user can make such a request from any internet connected device such as, but not limited to, cellphones, PDAs, iPads, iPods, smartphones, laptops, tablets, etc. Processing continues to 17714.

At 17714, a response is provided that includes the requested video associated with the game/event information. Processing continues to 17716, where processing ends.

FIG. 178 is a flowchart showing an exemplary method 17800 for connecting video clips in an online web-based system to game information stored in a separate online web-based database. Processing begins at 17802 and continues to 17804.

At 17804, a play number associated with game/event information, such as foul/comment information is received. For example, a user, such as an official, a grader, an evaluator, a coach, or an administrator, can include only a play number to identify video clips of that play when submitting game/event information, such as foul/comment information.

Processing continues to 17806.

At 17806, the play number is stored in a database and linked to the associated game/event information. Processing continues to 17808.

At 17808, a video is received that is associated with the play number received. For example, a user, such as an official, a grader, an evaluator, a coach, an administrator, or other user can upload a video from any internet connected device such as, but not limited to, cellphones, PDAs, iPads, iPods, smartphones, laptops, tablets, etc.

Processing continues to 17810.

At 17810, the uploaded video can be stored in a database. Processing continues to 17812.

At 17812, a request is received to view the video and/or game/event information. For example, a user can make such a request from any internet connected device such as, but not limited to, cellphones, PDAs, iPads, iPods, smartphones, laptops, tablets, etc. Processing continues to 17814.

At 17814, a response is provided that includes the requested video associated with the game/event information. Processing continues to 17816, where processing ends.

It will be appreciated that although some of the foregoing systems and methods have been discussed using the play number to identify and retrieve video clips of plays, other identifiers can be used in place of the play number if some video sources have not been processed and/or do not support identification of plays by play number. For example, digital time code marks on original video can be used to identify individual plays within a game video, and/or the game clock/time, such as how many minutes are left on the game clock for a particular quarter in a football game, may be used to identify individual plays within a game video, etc.

While the present invention has been described in conjunction with a number of embodiments, the invention is not to be limited to the description of the embodiments contained herein. It is further evident that many alternatives, modifications, and variations would be or are apparent to those of ordinary skill in the applicable arts. Accordingly, all such alternatives, modifications, equivalents, and variations that are within the spirit and scope of this invention.

It will be appreciated that the modules, processes, systems, and sections described above can be implemented in hardware, hardware programmed by software, software instructions stored on a nontransitory computer readable medium or a combination of the above. A system such as those disclosed herein, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as C, Ada, Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized.
Embodiments of the method, system, and computer program product can be implemented in hardware and/or software using any known or later developed systems or structures, devices and/or software by those of ordinary skill in the applicable art from the function description provided herein and with a general basic knowledge of the computer programming and network security arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and software for multi-level secure data import and export.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A computer-implemented method comprising:
- receiving data, including game information, rosters and assignments at a website;
- storing the received data in a database at the website;
- receiving post game foul reports, including penalty data;
- storing the received penalty data in the database;
- receiving stoppage reports related to an instant replay review of a play;
- storing the stoppage reports in the database;
- initiating email alerts of the stoppage reports to a plurality of users;
- receiving one or more video clips;
- storing the one or more video clips in a video database separate from the database;
- providing access to the video database through the website to permit users to view the one or more video clips stored in the video database;
- receiving a separate list of calls without any video clips, the separate list of calls including a plurality of game indicia and a play number, the plurality of game indicia indicating a specific game, a home team identifier, a visiting team identifier, and a game date, and the play number indicating a specific play of the specific game;

storing the separate list of calls without any video clips in the database;

providing access to the database through the website to permit a user to review the data on each call in the separate list of calls;

determining, responsive to the plurality of game indicia and the play number received, a predefined IP address for one of a plurality of third party video providers that contains a third party video clip showing the specific play from at least one viewing angle;

providing access to the third party video through the website to permit users to view the third party video clip showing the specific play from at least one viewing angle in a video window of a split screen on the website by generating a link to the third party video clip using the plurality of game indicia and the play number with the predefined IP address, the link pointing to the third party video clip being hosted on the one of the plurality of third party video providers determined to contain the third party video clip;

receiving grades and comments on the correctness of each call in the separate list of calls on one or more referee's performance for one or more games;

storing the received grades and comments in the database; and providing access to the database through the website to permit at least one official to review the individual grades and comments for the one or more referee.

2. The computer-implemented method of claim 1 further comprises:

providing access to the database to permit the list of calls to be reviewed; and receiving and storing an assessment for each call in the separate list of calls in the database.

3. The computer-implemented method of claim 2 wherein the receiving and storing an assessment for each call in the separate list of calls in the database further comprises:

receiving and storing the assessment for each call in the separate list of calls in the database from a first of the plurality of users.

4. The computer-implemented method of claim 3 wherein receiving the separate list of calls that are to be reviewed further comprises:

receiving the separate list of calls from at least one of the coaches of the teams involved in the game.

5. The computer-implemented method of claim 4 further comprising:

receiving and storing the assessment with a response for each call in the separate list of calls in the database from the first of the plurality of users.

6. The computer-implemented method of claim 1 wherein providing access to the database through the website further comprises:

providing a plurality of levels of predetermined access to the database through the website to permit a coordinator of officials user, a commissioner/staff user, and a head coach user to review customized reports about each game to which they have access.

7. The computer-implemented method of claim 1 wherein receiving post game foul reports, including penalty data further comprises:

receiving the post game foul reports, including the penalty data with at least one dynamic link to a video clip for each foul report.

8. The computer-implemented method of claim 1 wherein receiving stoppage reports related to an instant replay review of a play further comprises:

receiving the stoppage reports related to the instant replay review of a play with at least one dynamic link to a video clip for each instant replay review.

9. The computer-implemented method of claim 1 wherein receiving a separate list of calls further comprises:

receiving the separate list of calls with at least one dynamic link to a video clip for each call in the separate list of calls.

10. A computer program product having a plurality of executable instructions stored on a non-transitory computer-readable memory and adapted to be executed to review and evaluate performance of at least one official involved in officiating a game, comprising:

receiving data, including game information, rosters and assignments at a website;

storing the received data in a database at the website;

receiving post game foul reports, including penalty data;

storing the received penalty data in the database;

receiving stoppage reports related to an instant replay review of a play;

storing the stoppage reports in the database;

initiating email alerts of the stoppage reports to a plurality of users;

receiving a separate list of calls without any video clips, the separate list of calls including a plurality of game indicia and a play number, the plurality of game indicia indicating a specific game, a home team identifier, a visiting team identifier and a game date, and the play number indicating a specific play of the specific game;

storing the separate list of calls without any video clips in the database;

providing access to the database through the web site to permit a user to review the data and the separate list of calls and provide grades and comments on the correctness of each call in the separate list of calls on the at least one official's performance for one or more games and storing the grades and comments in the database;

determining, responsive to the plurality of game indicia and the play number received, a predefined IP address for one of a plurality of third party video providers that contains a third party video clip showing the specific play from at least one viewing angle; and providing access to the third party video through the website to permit users to view the third party video clip showing the specific play from at least one viewing angle in a video window of a split screen on the website by generating a link to the third party video clip using the plurality of game indicia and the play number with the predefined IP address, the link pointing to the third party video clip being hosted on the one of the plurality of third party video providers determined to contain the third party video clip.

11. The computer program product of claim 10 further comprises:

providing access to the database to permit the separate list of calls to be reviewed; and receiving and storing an assessment for each call in the separate list of calls in the database.

12. The computer program product of claim 11 further comprising:

receiving and storing the assessment with a response for each call in the separate list of calls in the database from a first of the plurality of users.

13. The computer program product of claim 12 wherein receiving the separate list of calls further comprises:

receiving the separate list of calls from at least one of the coaches of the teams involved in the game.

14. The computer program product of claim 10 wherein providing access to the database through the website further comprises:

providing a plurality of levels of predetermined access to the database through the website to permit a coordinator of officials user, a commissioner/staff user, and a head coach user to review customized reports about each game to which they have access.

15. The computer program product of claim 10 wherein receiving post game foul reports, including penalty data further comprises:

receiving the post game foul reports, including the penalty data with at least one dynamic link to a video clip for each foul report.

16. The computer program product of claim 10 wherein receiving stoppage reports related to an instant replay review of a play further comprises:

receiving the stoppage reports related to the instant replay review of a play with at least one dynamic link to a video clip for each instant replay review.

17. The computer program product of claim 10 receiving a list of calls further comprises:

receiving the separate list of calls with at least one dynamic link to a video clip for each call in the separate list of calls.

18. A computer-implemented method comprising:

receiving data, including game information, rosters and assignments at a website;

storing the received data in a database at the website;

receiving post game foul reports, including penalty data;

storing the received penalty data in the database;

receiving stoppage reports related to an instant replay review of a play;

storing the stoppage reports in the database;

initiating email alerts of the stoppage reports to a plurality of users;

receiving a separate list of calls without any video clips, the separate list of calls including a plurality of game indicia and a play number, the plurality of game indicia indicating a specific game, a home team identifier, a visiting team identifier and a game date, and the play number indicating a specific play of the specific game;

storing the separate list of calls without any video clips in the database;

providing access to the database through the website to permit a user to review the data and the separate list of calls to provide grades and comments on the correctness of each call in the separate list of calls on one or more referee's performance for one or more games and storing the grades and comments in the database;

providing access to the database through the website to permit at least the at least one official to review the individual grades and comments for the one or more referee;

determining, responsive to the plurality of indicia, a predefined IP address for one of a plurality of third party video providers that contains a third party video clip showing the specific play from at least one viewing angle; and providing access to the third party video through the website to permit users to view the third party video clip showing the specific play from at least one viewing angle in a video window of a split screen on the website by generating a link to the third party video clip using the plurality of indicia with the predefined IP address, the link pointing to the third party video clip being hosted on the one of the plurality of third party video providers determined to contain the third party video clip.

19. The computer-implemented method of claim 18 wherein the generating a link to the third party video clip using the plurality of indicia comprises initially determining which one of the plurality of third party video providers is hosting the third party video clip based on the home team identifier, the visiting team identifier, and the game date.

20. The computer-implemented method of claim 19 wherein the determining which one of the plurality of third party video providers is hosting the third party video clip based on the home team identifier, the visiting team identifier, and the game date comprises retrieving an IP address for the one of the plurality of third party video providers that is hosting the third party video clip from a predefined list based on the home team identifier, the visiting team identifier, and the game date.

* * * * *